(12) United States Patent
Fratta et al.

(10) Patent No.: US 12,522,826 B2
(45) Date of Patent: *Jan. 13, 2026

(54) THERAPEUTICS FOR THE TREATMENT OF NEURODEGENERATIVE DISORDERS

(71) Applicants: THE UNITED STATES OF AMERICA, AS REPRESENTED BY THE SECRETARY, DEPARTMENT OF HEALTH AND HUMAN SERVICES, Bethesda, MD (US); UCL BUSINESS LTD, London (GB)

(72) Inventors: Pietro Fratta, London (GB); Anna Leigh Brown, London (GB); Oscar Wilkins, London (GB); Matthew Keuss, London (GB); Michael Ward, Bethesda, MD (US); Sarah Hill, Bethesda, MD (US)

(73) Assignees: THE UNITED STATES OF AMERICA, AS REPRESENTED BY THE SECRETARY, DEPARTMENT OF HEALTH AND HUMAN SERVICES, Bethesda, MD (US); UCL BUSINESS LTD, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 18/920,273

(22) Filed: Oct. 18, 2024

(65) Prior Publication Data

US 2025/0051775 A1 Feb. 13, 2025

Related U.S. Application Data

(63) Continuation of application No. 18/266,210, filed as application No. PCT/EP2021/084908 on Dec. 9, 2021.

(30) Foreign Application Priority Data

Dec. 9, 2020 (GB) .................................. 2019418.9

(51) Int. Cl.
C12N 15/113 (2010.01)

(52) U.S. Cl.
CPC ........ *C12N 15/113* (2013.01); *C12N 2310/11* (2013.01); *C12N 2310/315* (2013.01); *C12N 2310/321* (2013.01); *C12N 2310/3231* (2013.01); *C12N 2320/33* (2013.01)

(58) Field of Classification Search
CPC .............. C12N 15/113; C12N 2310/11; C12N 2310/315; C12N 2310/321; C12N 2310/3231; C12N 2320/33
See application file for complete search history.

(56) References Cited

U.S. PATENT DOCUMENTS

| | | | |
|---|---|---|---|
| 3,687,808 A | 8/1972 | Merigan et al. |
| 4,675,189 A | 6/1987 | Kent et al. |
| 4,845,205 A | 7/1989 | Huynh et al. |
| 5,034,506 A | 7/1991 | Summerton et al. |
| 5,130,302 A | 7/1992 | Spielvogel et al. |
| 5,134,066 A | 7/1992 | Rogers et al. |
| 5,166,315 A | 11/1992 | Summerton et al. |
| 5,175,273 A | 12/1992 | Bischofberger et al. |
| 5,185,444 A | 2/1993 | Summerton et al. |
| 5,367,066 A | 11/1994 | Urdea et al. |
| 5,432,272 A | 7/1995 | Benner |
| 5,434,257 A | 7/1995 | Matteucci et al. |
| 5,457,187 A | 10/1995 | Gmeiner et al. |
| 5,457,191 A | 10/1995 | Cook et al. |
| 5,459,255 A | 10/1995 | Cook et al. |
| 5,484,908 A | 1/1996 | Froehler et al. |
| 5,502,177 A | 3/1996 | Matteucci et al. |
| 5,525,711 A | 6/1996 | Hawkins et al. |
| 5,552,540 A | 9/1996 | Haralambidis |
| 5,587,469 A | 12/1996 | Cook et al. |
| 5,587,470 A | 12/1996 | Cook et al. |
| 5,594,121 A | 1/1997 | Froehler et al. |
| 5,595,756 A | 1/1997 | Bally et al. |
| 5,596,091 A | 1/1997 | Switzer |
| 5,614,617 A | 3/1997 | Cook et al. |
| 5,645,985 A | 7/1997 | Froehler et al. |
| 5,681,941 A | 10/1997 | Cook et al. |
| 5,698,685 A | 12/1997 | Summerton et al. |
| 5,750,692 A | 5/1998 | Cook et al. |

(Continued)

FOREIGN PATENT DOCUMENTS

| | | |
|---|---|---|
| EP | 2298358 A1 | 3/2011 |
| EP | 2509636 A2 | 10/2012 |

(Continued)

OTHER PUBLICATIONS

Roberts et al., "Advances in oligonucleotide drug delivery", Nature Reviews: Drug Discovery, vol. 19, Oct. 2020, pp. 673-693. (Year: 2020).*
Kuijper et al., "Opportunities and challenges for antisense oligonucleotide therapies", J Inherit Metab Dis, Jun. 3, 2020, pp. 72-87. (Year: 2020).*
Bennett et al., "Antisense Oligonucleotide Therapies for Neurodegenerative Diseases", Annu Rev Neurosci Jul. 8, 2019; 42: 385-406. (Year: 2019).*
Nishina et al., Chimeric Antisense Oligonucleotide Conjugated to a-Tocopherol, Molecular Therapy Nucleic Acids, 4 (e220):1-10 (Jan. 2015).

(Continued)

*Primary Examiner* — Ram R Shukla
*Assistant Examiner* — Stephanie L Sullivan
(74) *Attorney, Agent, or Firm* — MARSHALL, GERSTEIN & BORUN LLP

(57) ABSTRACT

Antisense oligonucleotides (ASOs) are provided which are capable of modulating splicing by preventing inclusion of an UNC13A cryptic exon into an UNC13A mature mRNA. Such ASOs may be used as a medicament, for example, to treat neurodegenerative disorders, particularly those associated with TDP-43 pathology.

21 Claims, 56 Drawing Sheets

Specification includes a Sequence Listing.

(56) References Cited

U.S. PATENT DOCUMENTS

| | | |
|---|---|---|
| 5,763,588 A | 6/1998 | Matteucci et al. |
| 5,808,027 A | 9/1998 | Cook et al. |
| 5,811,534 A | 9/1998 | Cook et al. |
| 5,830,653 A | 11/1998 | Froehler et al. |
| 5,859,221 A | 1/1999 | Cook et al. |
| 5,948,903 A | 9/1999 | Cook et al. |
| 6,004,573 A | 12/1999 | Rathi et al. |
| 6,005,087 A | 12/1999 | Cook et al. |
| 6,005,096 A | 12/1999 | Matteucci et al. |
| 6,147,200 A | 11/2000 | Manoharan et al. |
| 6,166,199 A | 12/2000 | Cook et al. |
| 6,177,274 B1 | 1/2001 | Park et al. |
| 6,268,490 B1 | 7/2001 | Imanishi et al. |
| 6,525,191 B1 | 2/2003 | Ramasamy |
| 6,531,584 B1 | 3/2003 | Cook et al. |
| 6,670,461 B1 | 12/2003 | Wengel et al. |
| 6,696,038 B1 | 2/2004 | Mahato et al. |
| 6,770,748 B2 | 8/2004 | Imanishi et al. |
| 6,794,499 B2 | 9/2004 | Wengel et al. |
| 7,034,133 B2 | 4/2006 | Wengel et al. |
| 7,053,207 B2 | 5/2006 | Wengel |
| 7,189,705 B2 | 3/2007 | Lam et al. |
| 7,223,887 B2 | 5/2007 | Gaucheron et al. |
| 7,312,206 B2 | 12/2007 | Panzner et al. |
| 7,399,845 B2 | 7/2008 | Seth et al. |
| 7,404,969 B2 | 7/2008 | Chen et al. |
| 7,427,672 B2 | 9/2008 | Imanishi et al. |
| 7,547,684 B2 | 6/2009 | Seth et al. |
| 7,569,686 B1 | 8/2009 | Bhat et al. |
| 7,572,582 B2 | 8/2009 | Wengel et al. |
| 7,666,854 B2 | 2/2010 | Seth et al. |
| 7,696,345 B2 | 4/2010 | Allerson et al. |
| 7,700,542 B2 | 4/2010 | Zhao et al. |
| 7,741,457 B2 | 6/2010 | Seth et al. |
| 7,750,131 B2 | 7/2010 | Seth et al. |
| 7,780,983 B2 | 8/2010 | Panzner et al. |
| 7,875,733 B2 | 1/2011 | Bhat et al. |
| 7,893,302 B2 | 2/2011 | Chen et al. |
| 7,939,677 B2 | 5/2011 | Bhat et al. |
| 8,022,193 B2 | 9/2011 | Seth et al. |
| 8,030,467 B2 | 10/2011 | Seth et al. |
| 8,034,909 B2 | 10/2011 | Wengel et al. |
| 8,080,644 B2 | 12/2011 | Wengel et al. |
| 8,088,746 B2 | 1/2012 | Seth et al. |
| 8,088,904 B2 | 1/2012 | Swayze et al. |
| 8,124,745 B2 | 2/2012 | Allerson et al. |
| 8,148,344 B2 | 4/2012 | Akinc et al. |
| 8,153,365 B2 | 4/2012 | Wengel et al. |
| 8,211,473 B2 | 7/2012 | Troiano et al. |
| 8,236,330 B2 | 8/2012 | Zale et al. |
| 8,246,968 B2 | 8/2012 | Zale et al. |
| 8,263,665 B2 | 9/2012 | Sill et al. |
| 8,268,980 B2 | 9/2012 | Seth et al. |
| 8,278,283 B2 | 10/2012 | Seth et al. |
| 8,278,425 B2 | 10/2012 | Prakash et al. |
| 8,283,333 B2 | 10/2012 | Yaworski et al. |
| 8,287,849 B2 | 10/2012 | Langer et al. |
| 8,287,910 B2 | 10/2012 | Mirosevich et al. |
| 8,440,803 B2 | 5/2013 | Swayze et al. |
| 8,501,805 B2 | 8/2013 | Seth et al. |
| 8,530,640 B2 | 9/2013 | Seth et al. |
| 8,546,554 B2 | 10/2013 | De et al. |
| 8,546,556 B2 | 10/2013 | Seth et al. |
| 8,575,123 B2 | 11/2013 | Manoharan et al. |
| 8,580,297 B2 | 11/2013 | Essler et al. |
| RE44,779 E | 2/2014 | Imanishi et al. |
| 8,796,437 B2 | 8/2014 | Swayze et al. |
| 8,877,237 B2 | 11/2014 | Maurel |
| 9,005,906 B2 | 4/2015 | Swayze et al. |
| 9,012,421 B2 | 4/2015 | Migawa et al. |
| 10,695,443 B2 | 6/2020 | Ltvall et al. |
| 2003/0073619 A1 | 4/2003 | Mahato et al. |
| 2003/0158403 A1 | 8/2003 | Manoharan et al. |
| 2003/0175906 A1 | 9/2003 | Manoharan et al. |
| 2004/0142474 A1 | 7/2004 | Mahato et al. |
| 2004/0204377 A1 | 10/2004 | Rana |
| 2005/0222064 A1 | 10/2005 | Vargeese et al. |
| 2006/0008910 A1 | 1/2006 | MacLachlan et al. |
| 2008/0039618 A1 | 2/2008 | Allerson et al. |
| 2009/0042825 A1 | 2/2009 | Matar et al. |
| 2009/0042829 A1 | 2/2009 | Matar et al. |
| 2009/0163436 A1 | 6/2009 | Satishchandran |
| 2010/0036115 A1 | 2/2010 | Beigelman et al. |
| 2010/0087337 A1 | 4/2010 | Dewitt |
| 2010/0104645 A1 | 4/2010 | Ali et al. |
| 2010/0216804 A1 | 8/2010 | Zale et al. |
| 2010/0303850 A1 | 12/2010 | Lipford et al. |
| 2011/0020388 A1 | 1/2011 | Zepp et al. |
| 2011/0027217 A1 | 2/2011 | Zepp et al. |
| 2011/0076322 A1 | 3/2011 | Panzner et al. |
| 2011/0117125 A1 | 5/2011 | Hope et al. |
| 2011/0217377 A1 | 9/2011 | Zale et al. |
| 2011/0256175 A1 | 10/2011 | Hope et al. |
| 2011/0262491 A1 | 10/2011 | Keegan et al. |
| 2012/0004293 A1 | 1/2012 | Zale et al. |
| 2012/0021042 A1 | 1/2012 | Panzner et al. |
| 2012/0028342 A1 | 2/2012 | Ismagilov et al. |
| 2012/0076836 A1 | 3/2012 | Hori et al. |
| 2012/0101148 A1 | 4/2012 | Aking et al. |
| 2012/0140790 A1 | 6/2012 | Ali et al. |
| 2012/0171229 A1 | 7/2012 | Zepp et al. |
| 2012/0201859 A1 | 8/2012 | Carrasquillo et al. |
| 2012/0202871 A1 | 8/2012 | Heyes et al. |
| 2012/0207845 A1 | 8/2012 | Sung et al. |
| 2012/0244222 A1 | 9/2012 | Altreuter et al. |
| 2012/0258176 A1 | 10/2012 | Sung et al. |
| 2012/0264810 A1 | 10/2012 | Lin et al. |
| 2012/0269761 A1 | 10/2012 | Bettinger et al. |
| 2012/0276207 A1 | 11/2012 | Maurer et al. |
| 2012/0276209 A1 | 11/2012 | Cullis et al. |
| 2012/0282343 A1 | 11/2012 | Leong et al. |
| 2012/0283427 A1 | 11/2012 | Miller et al. |
| 2013/0017223 A1 | 1/2013 | Hope et al. |
| 2013/0129785 A1 | 5/2013 | Manoharan et al. |
| 2013/0156845 A1 | 6/2013 | Manoharan et al. |
| 2013/0195920 A1 | 8/2013 | Maier et al. |
| 2013/0202652 A1 | 8/2013 | Manoharan et al. |
| 2013/0203836 A1 | 8/2013 | Rajeev et al. |
| 2014/0227345 A1 | 8/2014 | Essler et al. |
| 2015/0099791 A1* | 4/2015 | Krieg ............... C12N 15/113 530/300 |
| 2015/0191727 A1 | 7/2015 | Migawa et al. |
| 2018/0216107 A1 | 8/2018 | Frank et al. |
| 2024/0301415 A1* | 9/2024 | Valas ............... C12N 15/113 |
| 2025/0011773 A1* | 1/2025 | Mekhoubad ......... C12N 15/113 |

FOREIGN PATENT DOCUMENTS

| | | |
|---|---|---|
| WO | 99/10390 A1 | 3/1999 |
| WO | 99/14226 A2 | 3/1999 |
| WO | 99/18933 A2 | 4/1999 |
| WO | 02/85309 A2 | 10/2002 |
| WO | 2004/106356 A1 | 12/2004 |
| WO | 2007/134181 A2 | 11/2007 |
| WO | 2008/043575 A2 | 4/2008 |
| WO | 2008/101157 A1 | 8/2008 |
| WO | 2008/103276 A2 | 8/2008 |
| WO | 2009/127060 A1 | 10/2009 |
| WO | 2009/132131 A1 | 10/2009 |
| WO | 2010/005740 A2 | 1/2010 |
| WO | 2010/021865 A1 | 2/2010 |
| WO | 2010/030763 A2 | 3/2010 |
| WO | 2010/075072 A2 | 7/2010 |
| WO | 2010/080724 A1 | 7/2010 |
| WO | 2010/138192 A2 | 12/2010 |
| WO | 2010/138193 A2 | 12/2010 |
| WO | 2010/138194 A2 | 12/2010 |
| WO | 2010/144740 A1 | 12/2010 |
| WO | 2011/022460 A1 | 2/2011 |
| WO | 2011/043913 A2 | 4/2011 |
| WO | 2011/071860 A2 | 6/2011 |
| WO | 2011/072218 A2 | 6/2011 |
| WO | 2011/090965 A1 | 7/2011 |
| WO | 2011/115862 A1 | 9/2011 |

(56) References Cited

FOREIGN PATENT DOCUMENTS

| | | |
|---|---|---|
| WO | 2011/127255 A1 | 10/2011 |
| WO | 2011/133876 A2 | 10/2011 |
| WO | 2011/149733 A2 | 12/2011 |
| WO | 2011/153120 A1 | 12/2011 |
| WO | 2012/013501 A1 | 2/2012 |
| WO | 2012/016184 A2 | 2/2012 |
| WO | 2012/040184 A2 | 3/2012 |
| WO | 2012/044638 A1 | 4/2012 |
| WO | 2012/047656 A1 | 4/2012 |
| WO | 2012/054365 A2 | 4/2012 |
| WO | 2012/061259 A2 | 5/2012 |
| WO | 2012/068187 A1 | 5/2012 |
| WO | 2012/082574 A1 | 6/2012 |
| WO | 2012/087983 A1 | 6/2012 |
| WO | 2012/099755 A1 | 7/2012 |
| WO | 2012/109121 A1 | 8/2012 |
| WO | 2012/149252 A2 | 11/2012 |
| WO | 2012/149255 A2 | 11/2012 |
| WO | 2012/149259 A1 | 11/2012 |
| WO | 2012/149265 A2 | 11/2012 |
| WO | 2012/149268 A1 | 11/2012 |
| WO | 2012/149282 A2 | 11/2012 |
| WO | 2012/149301 A2 | 11/2012 |
| WO | 2012/149393 A2 | 11/2012 |
| WO | 2012/149405 A2 | 11/2012 |
| WO | 2012/149411 A1 | 11/2012 |
| WO | 2012/149454 A2 | 11/2012 |
| WO | 2012/150467 A2 | 11/2012 |
| WO | 2012/166923 A2 | 12/2012 |
| WO | 2012/170889 A1 | 12/2012 |
| WO | 2012/170930 A1 | 12/2012 |
| WO | 2013/006825 A1 | 1/2013 |
| WO | 2013/019669 A2 | 2/2013 |
| WO | 2013/086322 A1 | 6/2013 |
| WO | 2014/179620 A1 | 11/2014 |
| WO | 2015/017519 A1 | 2/2015 |
| WO | 2015/106128 A2 | 7/2015 |
| WO | 2016/186204 A1 | 11/2016 |
| WO | 2017/015555 A1 | 1/2017 |
| WO | 2017/054085 A1 | 4/2017 |
| WO | 2018/126084 A1 | 7/2018 |
| WO | 2021/030778 A1 | 2/2021 |
| WO | 2022/018187 A1 | 1/2022 |
| WO | 2022/216759 A1 | 10/2022 |
| WO | 2022/246251 A2 | 11/2022 |
| WO | 2023/004049 A1 | 1/2023 |
| WO | 2023/102225 A2 | 6/2023 |
| WO | 2023/118087 A1 | 6/2023 |
| WO | 2024/155986 | 7/2024 |
| WO | 2024/178223 | 8/2024 |

OTHER PUBLICATIONS

Nishina et al., Efficient in vivo delivery of siRNA to the liver by conjugation of alpha-tocopherol, Molecular Therapy, 16 (4):734-740 (Apr. 2008).

Oberhauser et al., Effective incorporation of 2'-O-methyl-oligoribonuclectides into liposomes and enhanced cell association through modification with thiocholesterol, Nucleic Acids Research, 20(3):533-538 (Feb. 1992).

Patel et al., Naturally-occurring cholesterol analogues in lipid nanoparticles induce polymorphic shape and enhance intracellular delivery of mRNA, Nature Communications, 11(983):1-13 (Feb. 2020).

Peer et al., Selective gene silencing in activated leukocytes by targeting siRNAs to the integrin lymphocyte function-associated antigen-1, PNAS U.S.A., 104(10):4095-4100 (Mar. 2007).

Peer et al., Special delivery: targeted therapy with small RNAs, Gene Therapy, 18(12):1127-1133 (Dec. 2011).

Peer et al., Systemic leukocyte-directed siRNA delivery revealing cyclin D1 as an anti-inflammatory target, Science, 319(5863):627-630 (Feb. 2008).

Placek et al., UNC13A polymorphism contributes to frontotemporal disease in sporadic amyotrophic lateral sclerosis, Neurobiology of Aging, 73:190-199 (2019).

Prakash et al., 2'-O-[2-(Amino)-2-oxoethyl] Oligonucleotides, Organic Letters, 5(4):403-406 (Jan. 2003).

Roposo et al., Extracellular vesicles: exosomes, microvesicles, and friends, Journal of Cell Biology, 200(4):373-383 (Feb. 2013).

Rozema et al., Dynamic PolyConjugates for targeted in vivo delivery of siRNA to hepatocytes, PNAS U.S.A., 104 (32):12982-12987 (Aug. 2007).

Saison-Behmoaras et al., Short modified antisense oligonucleotides directed against Ha-ras point mutation induce selective cleavage of the mRNA and inhibit T24 cells proliferation, EMBO Journal, 10(5):1111-1118 (May 1991).

Santel et al., A novel siRNA-lipoplex technology for RNA interference in the mouse vascular endothelium, Gene Therapy, 13(16):1222-1234 (Aug. 2006).

Santel et al., RNA interference in the mouse vascular endothelium by systemic administration of siRNA-lipoplexes for cancer therapy, Gene Therapy, 13(1):1360-1370 (Apr. 2006).

Sayers et al., Vaxjo: a web-based vaccine adjuvant database and its application for analysis of vaccine adjuvants and their uses in vaccine development, Journal of Biomedicine and Biotechnology, 2012(831486):1-13 (Jan. 2012).

Schrom et al., Translation of Angiotensin-Converting Enzyme 2 upon Liver- and Lung-Targeted Delivery of Optimized Chemically Modified mRNA, Molecular Therapy Nucleic Acids, 7(1):350-365 (Jun. 2017).

Shea et al., Synthesis, hybridization properties and antiviral activity of lipid-oligodeoxynucleotide conjugates, Nucleic Acids Research, 18(13):3777-3783 (Jul. 1990).

Siegwart et al., Combinatorial synthesis of chemically diverse core-shell nanoparticles for intracellular delivery, PNAS U.S.A., 108(32):12996-13001 (Aug. 2011).

Singh et al., LNA (locked nucleic acids): synthesis and high-affinity nucleic acid recognition, Chemical Communications, 1998(4):455-456 (Jan. 1998).

Singh et al., Synthesis of 2'-Amino-LNA: A Novel Conformationally Restricted High-Affinity Oligonucleotide Analogue with a Handle, The Journal of Organic Chemistry, 63(26):10035-10039 (Nov. 1998).

Song et al., Antibody mediated in vivo delivery of small interfering RNAs via cell-surface receptors, Nature Biotechnology, 23(6):709-717 (Jun. 2005).

Srinivasan et al., Integrin-Targeted Stabilized Nanoparticles for an Efficient Delivery of siRNAs In Vitro and In Vivo, Methods in Molecular Biology, 820(1):105-116 (Oct. 2011).

Subramanya et al., Enhanced Induction of HIV-specific Cytotoxic T Lymphocytes by Dendritic Cell-targeted Delivery of SOCS-1 siRNA, Molecular Therapy, 18(11):2028-2037 (Nov. 2010).

Szoka et al., Procedure for preparation of liposomes with large internal aqueous space and high capture by reverse-phase evaporation, PNAS U.S.A., 75(9):4194-4198 (1978).

The Concise Encyclopedia of Polymer Science and Engineering, Kroschwitz, J.I., Ed., John Wiley & Sons, 858-859 (1990).

Validi et al., Exosome-mediated transfer of mRNAs and microRNAs is a novel mechanism of genetic exchange between cells, Nature Cell Biology, 9(6):654-659 (2007).

Wan et al., Synthesis, biophysical properties and biological activity of second generation antisense oligonucleotides containing chiral phosphorothioate linkages, Nucleic Acids Research, 42(22):13456-13468 (2014).

Wheeler et al., Stabilized plasmid-lipid particles: construction and characterization, Gene Therapy, 6(1):271-281 (1999).

Yang et al., UNC13A variant rs12608932 is associated with increased risk of amyotrophic lateral sclerosis and reduced patient survival: a meta-analysis, Neurological Science, 40(11):2293-2302 (2019).

Yu et al., Receptor-targeted nanocarriers for therapeutic delivery to cancer, Molecular Membrane Biology, 27 (7):286-298 (2010).

Zhang et al., Self-assembled lipid—polymer hybrid nanoparticles: a robust drug delivery platform, ACS Nano, 2 (8):1696-1702 (Aug. 2008).

(56) References Cited

OTHER PUBLICATIONS

Zhang et al., Stabilized plasmid-lipid particles for regional gene therapy: formulation and transfection properties, Gene Therapy, 6(1):1438-1447 (1999).

Zhou et al., Fine Tuning of Electrostatics around the Internucleotidic Phosphate through Incorporation of Modified 2',4'-Carbocyclic-LNAs and -ENAs Leads to Significant Modulation of Antisense Properties, The Journal of Organic Chemistry, 74(1):118-134 (2009).

Zimmermann et al., RNAi-mediated gene silencing in non-human primates, Nature, 441(1):111-114 (2006).

Akinc et al., A combinatorial library of lipid-like materials for delivery of RNAi therapeutics, Nature Biotechnology, 26 (5):561-569 (May 2008).

Akinc et al., Development of lipidoid-siRNA formulations for systemic delivery to the liver, Molecilar Therapy, 17 (5):872-879 (May 2009).

Akinc et al., Targeted delivery of RNAi therapeutics with endogenous and exogenous ligand-based mechanisms, Molecilar Therapy, 18(7):1357-1364 (Jul. 2010).

Altschul et al., Basic local alignment search tool, The Journal of Molecular Biology, 215(3):403-410 (Oct. 1990).

Ball et al., Lipid Nanoparticle Formulations for Enhanced Co-delivery of siRNA and mRNA, Nano Letters, 18 (6):3814-3822 (Jun. 2018).

Basha et al., Influence of cationic lipid composition on gene silencing properties of lipid nanoparticle formulations of siRNA in antigen-presenting cells, Molecular Therapy, 19(12):2186-2200 (Dec. 2011).

Ben-Arie et al., Integrin-targeted nanoparticles for siRNA delivery, Methods in Molecular Biology, 757(1):497-507 (Jan. 2011).

Benoit et al., Synthesis of folate-functionalized RAFT polymers for targeted siRNA delivery, Biomacromolecules, 12 (7):2708-2714 (Jun. 2011).

Braasch et al., Novel Antisense and Peptide Nucleic Acid Strategies for Controlling Gene Expression, Biochemistry, 41(14):4503-4510 (Mar. 2002).

Brown et al., Common ALS/TFD risk variants in UNC13A exacerbate its cryptic splicing and loss upon TDP-43 mislocalization, BioRxiv, 1-38 (2021).

Brown et al., TDP-43 loss and ALS-risk SNPs drive mis-splicing and depletion of UNC13A, Nature, 603(7899):131-137 (2022).

Brown et al., UNC13A contains a TDP-43-regulated cryptic exon that is exacerbated by ALS/FTLD-linked genomic variants, Amyotrophic Lateral Sclerosis and Frontotemporal Degeneration, 22(Sup 2):46 (2021).

Capito et al., Collagen scaffolds for nonviral IGF-1 gene delivery in articular cartilage tissue engineering, Gene Therapy, 14(9):721-732 (May 2007).

Carillo et al., The Multiple Sequence Alignment Problem in Biology, SIAM Journal on Applied Mathematics, 48 (5):1073-1082 (Oct. 1988).

Chang et al., Development of an UNC13A cryptic exon skipping antisense oligonucleotide as a treatment for ALS and FTD, AcuraStem Patient-Based Drug Discovery, MDA Clinical & Scientific Conference 2022, scientific poster (2022).

Chu et al., Application of Living Free Radical Polymerization for Nucleic Acid Delivery, Accounts of Chemical Research, 45(7):1089-1099 (Jan. 2012).

Convertine et al., pH-Responsive Polymeric Micelle Carriers for siRNA Drugs, Biomacromolecules, 11(11):2904-2911 (Oct. 2010).

Curtin et al., Combinatorial Gene Therapy Accelerates Bone Regeneration: Non-Viral Dual Delivery of VEGF and BMP2 in a Collagen-Nanohydroxyapatite Scaffold, Advanced Healthcare Materials, 4(2):223-227 (Jan. 2015).

Davis et al., Evidence of RNAi in humans from systemically administered siRNA via targeted nanoparticles, Nature, 464(7291):1067-1070 (Apr. 2010).

Devereux et al., A comprehensive set of sequence analysis programs for the VAX, Nucleic Acids Research, 12 (1):387-395 (Jan. 1984).

Fenske et al., Autaptic cultures of human induced neurons as a versatile platform for studying synaptic function and neuronal morphology, Scientific Reports, 9(4890):1-12 (2019).

Freier et al., The ups and downs of nucleic acid duplex stability: structure-stability studies on chemically-modified DNA:RNA duplexes, Nucleic Acids Research, 25(22):4429-4443 (Nov. 1997).

Frieden et al., Expanding the design horizon of antisense oligonucleotides with alpha-I-LNA, Nucleic Acids Research, 31(21):6365-6372 (Nov. 2003).

Geall et al., Nonviral delivery of self-amplifying RNA vaccines, PNAS U.S.A., 109(36):14604-14609 (Sep. 2012).

Heyes et al., Cationic lipid saturation influences intracellular delivery of encapsulated nucleic acids, Journal of Controlled Release, 107(2):276-287 (Oct. 2005).

Higashio et al., Inhibitory role of Munc13-1 in antigen-induced mast cell degranulation, Biomedical Research, 38 (6):321-329 (2017).

Hu-Lieskovan et al., Sequence-Specific Knockdown of EWS-FLI1 by Targeted, Nonviral Delivery of Small Interfering RNA Inhibits Tumor Growth in a Murine Model of Metastatic Ewing's Sarcoma, Cancer Research, 65(19):8984-8992 (Oct. 2005).

International Application No. PCT/EP2021/084908, International Preliminary Report on Patentability, mailed Jun. 22, 2023.

International Application No. PCT/EP2021/084908, International Search Report and Written Opinion, mailed Apr. 14, 2022.

Jeffs et al., A scalable, extrusion-free method for efficient liposomal encapsulation of plasmid DNA, Pharmaceutical Research, 22(3):362-372 (Mar. 2005).

Judge et al., Confirming the RNAi-mediated mechanism of action of siRNA-based cancer therapeutics in mice, The Journal of Clinical Investigation, 119(3):661-673 (Mar. 2009).

Kabanov et al., A new class of antivirals: antisense oligonucleotides combined with a hydrophobic substituent effectively inhibit influenza virus reproduction and synthesis of virus-specific proteins in MDCK cells, FEBS Letters, 259 (2):327-330 (Jan. 1990).

Keuss et al., Loss of TDP-43 induces synaptic dysfunction that is rescued by UNC13A splice switching ASOs, BioRxiv, 1-33 (2024).

Kim et al., Antibody-mediated delivery of siRNAs for anti-HIV therapy, Methods in Molecular Biology, 721(1):339-353 (Jan. 2011).

Koike et al., TDP-43 and other hnRNPs regulate cryptic exon inclusion of a key ALS/FTD risk gene, UNC13A, PLoS biology, 21(3):1-24 (2023).

Krans et al., Systemic RNA delivery to dendritic cells exploits antiviral defence for cancer immunotherapy, Nature, 534 (7607):396-401 (Jun. 2016).

Kumar et al., Design, synthesis, biophysical and primer extension studies of novel acyclic butyl nucleic acid (BuNA), Organic & Biomolecular Chemistry, 11(35):5853-5865 (Jul. 2013).

Kumar et al., The first analogues of LNA (locked nucleic acids): phosphorothioate-LNA and 2'-thio-LNA, Bioorganic & Medicinal Chemistry Letters, 8(16):2219-2222 (Aug. 1998).

Landen et al., Intraperitoneal delivery of liposomal siRNA for therapy of advanced ovarian cancer, Cancer Biology & Therapy, 5(12):1708-1713 (Dec. 2006).

Letsinger et al., Cholesteryl-conjugated oligonucleotides: synthesis, properties, and activity as inhibitors of replication of human immunodeficiency virus in cell culture, PNAS U.S.A., 86(17):6553-6556 (Sep. 1989).

Leuschner et al., Therapeutic siRNA silencing in inflammatory monocytes in mice, Nature Biotechnology, 29 (1):1005-1010 (Oct. 2011).

Liu et al., Designer Lipids Advance Systemic siRNA Delivery, Molecular Therapy, 18(4):669-670 (Apr. 2010).

Lokras et al., Engineering of Solid Dosage Forms of siRNA-Loaded Lipidoid-Polymer Hybrid Nanoparticles Using a Quality-by-Design Approach, Methods in Molecular Biology, 2282(1):137-157 (Apr. 2021).

Love et al., Lipid-like materials for low-dose, in vivo gene silencing, Pnas U.S.A., 107(5):1864-1869 (Feb. 2010).

Ma et al., TDP-43 represses cryptic exon inclusion in the FTD-ALS gene UNC13A, Nature, 603(7899): 124-130 (2022).

Manganiello et al., Diblock copolymers with tunable pH transitions for gene delivery, Biomaterials, 33(7):2301-2309 (Mar. 2012).

(56) References Cited

OTHER PUBLICATIONS

Mayer et al., Uptake of adriamycin into large unilamellar vesicles in response to a pH gradient, Biochimica et Biophysica Acta (BBA)—Biomembranes, 857(1):123-126 (May 1986).
Morrissey et al., Potent and persistent in vivo anti-HBV activity of chemically modified siRNAs, Nature Biotechnology, 23(8):1002-1007 (Aug. 2005).
Musacchio et al., Recent developments in lipid-based pharmaceutical nanocarriers, Frontiers in Bioscience-Landmark (FBL), 16(4):1388-1412 (Jan. 2011).
Myers et al., Optimal alignments in linear space, Computer Applications in Bio Science, 4(1):11-17 (Mar. 1988).

\* cited by examiner

A

B

THERAPEUTICS FOR THE TREATMENT OF NEURODEGENERATIVE DISORDERS

SEQUENCE LISTING

The present application is being filed along with a Sequence Listing in electronic format. The Sequence Listing file, entitled Sequence Listing—50001A_SeqListing.xml, was created on Oct. 8, 2024, and is 984,569 bytes in size. The information in electronic format of the Sequence Listing is incorporated herein by reference in its entirety.

FIELD OF THE DISCLOSURE

The present disclosure relates to novel therapeutics for the treatment of neurodegenerative disorders, more particularly, amyotrophic lateral sclerosis (ALS), and frontotemporal dementia (FTD) or those associated with TDP-43 pathology.

BACKGROUND OF THE DISCLOSURE

Amyotrophic lateral sclerosis (ALS) and frontotemporal dementia (FTD) are two devastating adult-onset neurodegenerative diseases which can co-occur and are considered to be part of one disease spectrum, ALS/FTD. In ALS, neuronal loss affects primarily upper and lower motor neurons (MNs), leading to a rapidly progressive deterioration of muscle function and ultimately death due to respiratory failure. In FTD, frontal and temporal cortical neurons are preferentially lost, inducing cognitive impairment with language and behavioral changes.

The exact etiology of ALS is still largely unknown. Disease-causative genetic mutations are identified in <15% of cases, and a combination of a number of neuronal insults, with potential genetic, viral, autoimmune, and neurotoxic origins, are thought to underlie the remaining cases. Proposed mechanisms for the pathogenesis of ALS includes glutamate excitotoxicity, structural and functional abnormalities with the mitochondria, impaired axonal structure and transport defects, altered protein handling and free-radical mediated oxidative stress.

TDP-43 is an RNA-binding protein that is normally prevalently located in the nucleus of cells but is depleted from the nucleus and accumulated in cytoplasmic inclusions in a number of neurodegenerative disorders, including >95% of amyotrophic lateral sclerosis (ALS) cases, approximately 50% of frontotemporal dementia (FTD) cases, approximately 30% of Alzheimer disease cases, Parkinson Disease and other rare neurodegenerative disorders. TDP-43 participates to numerous RNA processing functions, including repressing the inclusion of unwanted intronic RNA sequences in mature mRNAs.

When TDP-43 is lacking from the nucleus, it cannot perform this repressive action and spurious segments of introns, named "cryptic exons" are included in mRNAs. Cryptic exons may induce a reduction of protein levels either through aberrant RNA degradation or due to the presence of premature stop codons.

There is a need to further understand the mechanisms of TDP-43 depletion and TDP-43 pathology and how this leads to the onset of disease. There is also a need to develop therapeutic strategies to treat neurodegenerative disorders and/or diseases associated with TDP-43 depletion.

SUMMARY OF THE DISCLOSURE

This summary provides varied embodiments of the subject matter of the present disclosure, whereby the details, examples and preferences provided in relation to one or more of the stated aspects of the present invention will be further described herein and apply equally to all aspects of the present invention. Any combination of the embodiments, examples and preferences described herein in all possible variations thereof is encompassed by the present invention unless otherwise indicated herein, or otherwise clearly contradicted by context.

The present invention solves the problem of further understanding the mechanisms of TDP-43 depletion and TDP-43 pathology and how this leads to the onset of disease. Provided herein are polynucleotides, i.e., UNC13A antisense compounds, which are useful in the elucidation of TDP-43 pathology and/or UNC13A dysfunction and their role in disease. The present invention also solves the problem of the provision of alternative therapeutic strategies to treat neurodegenerative disorders and/or diseases associated with TDP-43 depletion as the UNC13A ASOs described herein are surprisingly found to prevent the splicing machinery from recognizing the cryptic exon arising from the diseased state and from incorporating the cryptic exon into the resulting UNC13A mRNA. The UNC13A antisense compounds in their effect thereby lead to a rescue effect in the disease state.

According to a first aspect, there is provided an antisense oligonucleotide (ASO) comprising a nucleotide sequence of 13-30 nucleotides, wherein the nucleotide sequence has sequence complementarity with SEQ ID NO 1 (i.e., a portion of SEQ ID NO 1 sequence having the same number of nucleotides). In an embodiment, the nucleotide sequence is 100% complementary with SEQ ID NO 1. In some embodiments, the ASO is complementarity to SEQ ID NO: 1 wherein the base at position 415 is G or C. In some embodiments, the ASO is complementary to SEQ ID NO:1 wherein the base at position 965 is U or G. In some embodiments, SEQ ID NO: 1 has a G at position 415 and a U at position 965. In some embodiments, SEQ ID NO: 1 has a G at position 415 and a G at position 965. In some embodiments, SEQ ID NO: 1 as a C at position 415 and a U at position 965. In some embodiments, SEQ ID NO: 1 has a C at position 415 and a G at position 965. The ASO is synthetic.

In an embodiment, the ASO is capable of modulating splicing by preventing inclusion of an UNC13A cryptic exon into an UNC13A mature mRNA.

According to a second aspect of the present invention, there is provided an antisense oligonucleotide (ASO) comprising a nucleotide sequence of 13-30 nucleotides, wherein the ASO is capable of modulating splicing by preventing inclusion of an UNC13A cryptic exon into an UNC13A mature mRNA. The ASO may be synthetic.

In an embodiment of the first and second aspect, the ASO comprises 20-24 nucleotides, preferably 21 or 22 nucleotides, preferably 21 nucleotides.

In an embodiment of the first and second aspect, the ASO is capable of binding to a UNC13A cryptic exon or flanking region thereof. In some embodiments, the ASO is complementarity to SEQ ID NO: 1 wherein the base at position 415 is G or C. In some embodiments, the ASO is complementary to SEQ ID NO:1 wherein the base at position 965 is U or G. In an embodiment, the ASO comprises a sequence corresponding to any one or more of SEQ ID NO 4-546.

In an embodiment, the ASO is capable of binding to a UNC13A cryptic exon, the UNC13A cryptic exon occurring in UNC13A pre-mRNA.

In an embodiment, the UNC13A cryptic exon corresponds to SEQ ID NO 2 or SEQ ID NO 3. In an embodiment, the ASO is complementary to SEQ ID NO 2 or SEQ ID NO 3. In SEQ ID NO: 2 the base at position 112 can be either G or C. In SEQ ID NO: 3 the base at position 162 can be either G or C.

In an embodiment of the first and second aspect, the ASO is capable of binding to a branchpoint of the UNC13A cryptic exon. In an embodiment, the ASO a sequence corresponding to any one or more of SEQ ID 4-104. These ASOs can target the branchpoint such that splicing is less efficient.

In an embodiment of the first and second aspect, the ASO is capable of binding to a splice site of the UNC13A cryptic exon. In an embodiment, the ASO comprises a sequence corresponding to any one or more of SEQ ID 105-189, or SEQ ID NO: 270-352. These ASOs can target the splice sites such that the splice sites are less available for splicing.

In an embodiment of the first and second aspect, the ASO is capable of binding to a splice regulatory element (SRE) associated with the UNC13A cryptic exon in the UNC13A pre-mRNA. In an embodiment, the ASO is capable of binding to i) the cryptic exon, ii) an SNP in the UNC13A intron, iii) a TDP-43 binding site or iv) a splice enhancer. In an embodiment, the ASO comprises a sequence corresponding to i) SEQ ID NO: 190-269 and is capable of binding to the cryptic exon, ii) SEQ ID NO: 353-426 and is capable of binding to a SNP in the UNC13A intron, iii) SEQ ID NO: 427-474 and is capable of binding to a TDP-43 binding site within an UNC13A pre-mRNA, or iv) SEQ ID NO:475-546 and is capable of binding to a splice enhancer associated with UNC13A cryptic exon. The ASOs of the present invention can target these splicing regulatory elements in order to limit the binding of RNA binding proteins that enhance/modulate the inclusion of the cryptic exon.

The ASO is synthetic and is preferably chemically modified (i.e., wherein the ASO comprises one or more modified nucleotides). In an embodiment, the nucleotides may have phosphate (i.e., phosphodiester), phosphorothioate or phosphorodiamidate linkages. In an embodiment of the first and second aspect, the ASO comprises locked, bridged or constrained nucleic acids. In an embodiment of the first and second aspect, the ASO has or comprises a backbone selected from RNA, DNA, LNA (locked nucleic acid), tcDNA (tri-cyclo DNA), HNA (hexitol nucleic acids), TNA (threose nucleic acid), morpholino oligomer (PMO), peptide nucleic acid (PNA), 2'-OMe-RNA, 2'-O,4'-C-Ethylene-bridged nucleic acid (ENA), 2'-O-methoxyethyl (MOE) nucleic acids, or 2-O-(2-methylcarbamoyl (MCE) nucleotides, or any combination thereof. The ASO may further comprise a portion of DNA nucleotides, for example, at least 10%, or at least 20%, or at least 30%, or at least 40%, or at least 50%, or at least 60%, or up to 70% of DNA nucleotides, i.e., in combination with LNA, tcDNA, cET, ENA, HNA, TNA, PMO, PNA, 2'-OMe-RNA, 2'-O-methoxyethyl (MOE) nucleic acids or MCE nucleotides. In some examples, disclosed herein, the ASO has a LNA or a 2-OMe-RNA backbone. In some examples, the ASO comprises from about 20-60% LNA, or preferably from about 30-50% LNA (i.e., wherein the other bases are chemically unmodified, e.g., formed from DNA). In some embodiments, the ASO comprises an LNA base at least every 3 nucleotides, or at least every 2 nucleotides. In some examples, the ASO comprises 100% 2-OMe-RNA.

According to a third aspect of the present invention, there is provided a guide RNA comprising the ASO of the first or second aspect and a scaffold sequence for a Cas nuclease. In an embodiment, the ASO has an RNA backbone. In an embodiment, the scaffold sequence is a scaffold sequence for a Cas13 nuclease.

According to a fourth aspect of the present invention, there is provided a viral vector comprising an ASO of the first or second aspect or a guide RNA of the third aspect. In an embodiment, the viral vector is a retrovirus, lentivirus, adenovirus, or adeno-associated virus.

According to a fifth aspect of the present invention, there is provided a pharmaceutical composition comprising one or more ASOs of the first aspect or second aspect, one or more guide RNAs of the third aspect, or one or more viral vectors of the fourth aspect. In an embodiment, the pharmaceutical composition comprises a pharmaceutical carrier, diluent or excipient. In an embodiment, the pharmaceutical composition comprises a polymer, liposomes, micelles, dendrimers, nanoparticles or a combination thereof.

According to a sixth aspect of the present invention, there is provided the ASO of the first or second aspect, the guide RNA of the third aspect, the viral vector of the fourth aspect or the pharmaceutical composition of the fifth aspect for use as a medicament.

According to a seventh aspect of the present invention, there is provided the ASO of the first or second aspect, the guide RNA of the third aspect, the viral vector of the fourth aspect or the pharmaceutical composition of the fifth aspect for use in a method of treating a neurodegenerative disorder. In an embodiment, the neurodegenerative disorder is associated with TDP-43 pathology. In an embodiment, the neurodegenerative disorder is ALS, frontotemporal dementia (FTD), Alzheimer's disease, Parkinson's disease, FOSMN, Perry Syndrome or any combination thereof. In an embodiment, the neurodegenerative disorder is ALS, wherein the ALS is familial ALS or sporadic ALS.

According to an eighth aspect of the present invention, there is provided a method of delivering to a cell the ASO of the first or second aspect, the guide RNA of the third aspect, the viral vector of the fourth aspect, or the pharmaceutical composition of the fifth aspect, wherein the method comprises contacting the ASO with a cell, wherein the ASO modulates splicing of UNC13A to prevent inclusion of a cryptic exon in UNC13A mature RNA. In an embodiment, this prevents loss of the UNC13A translated protein. In an embodiment, this restores functionality of the UNC13A protein. This may be an in vitro or an in vivo method.

Also disclosed herein is a method of treating a neurodegenerative disorder, the method comprising administering to a subject in need thereof a therapeutically effective amount of the ASO of the first or second aspect, the guide RNA of the third aspect, the viral vector of the fourth aspect or the pharmaceutical composition of the fifth aspect. Also disclosed herein is a method of treating a condition associated with TDP-43 pathology, the method comprising administering to a subject in need thereof a therapeutically effective amount of the ASO of the first or second aspect, the guide RNA of the third aspect, the viral vector of the fourth aspect or the pharmaceutical composition of the fifth aspect. In an example, the ASO, guide RNA, viral vector or pharmaceutical composition can be used to prevent loss of and/or restore functionality of the UNC13A protein. In an example, the ASO, guide RNA, viral vector or pharmaceutical composition can be used to modulate splicing such that the UNC13A cryptic exon is not included in the UNC13A mature RNA.

Also disclosed herein, is the use of the ASO of the first or second aspect, the guide RNA of the third aspect, the viral vector of the fourth aspect or the pharmaceutical composition of the fifth aspect, for the manufacture of a medicament. The medicament may be used to treat a neurodegenerative disorder and/or a disorder associated with TDP-pathology as is otherwise described herein.

Also disclosed herein is an ASO comprising a nucleotide sequence of 13-30 nucleotides, wherein the ASO is used in a method to prevent inclusion of an UNC13A cryptic exon into the UNC13A mature RNA.

Also disclosed herein is an ASO comprising a nucleotide sequence of 13-30 nucleotides, wherein the ASO (or at least a portion thereof) comprises a sequence corresponding to SEQ ID NO 4-546. As described elsewhere herein, U can be interchanged with T in SEQ ID NO 4-546. It is also intended that these sequences may have any nucleotide chemistry.

Also disclosed herein is an ASO according to any one of SEQ ID NO: 555-571 or SEQ ID NO: 579 or 580. In these sequences, U and T are interchangeable. It is also intended that these sequences may have any nucleotide chemistry.

Also disclosed herein is a method of modulating UNC13A splicing in a subject, the method comprising administering to a subject in need thereof an effective amount of the ASO of the first or second aspect, the guide RNA of the third aspect, the viral vector of the fourth aspect or the pharmaceutical composition of the fifth aspect. In an example, the ASO, guide RNA, viral vector or pharmaceutical composition can be used to prevent loss of and/or restore functionality of the UNC13A protein. In an example, the ASO, guide RNA, viral vector or pharmaceutical composition can be used to modulate splicing such that the UNC13A cryptic exon is not included in the UNC13A mRNA.

Also disclosed herein is the isolated cryptic exon sequence of UNC13A and flanking regions thereof, corresponding to SEQ ID NO:1. SEQ ID NO: 1 corresponds to the pre-mRNA sequence to which the ASO is capable of binding. Also disclosed herein is the isolated cryptic exon sequences corresponding to SEQ ID NO: 2 (shorter variant) or SEQ ID NO:3 (longer variant). The cryptic exon sequence of UNC13A and flanking regions thereof may be used to probe TDP-43 pathology and/or UNC13A dysfunction and its role in disease.

The present inventors have discovered a previously unreported cryptic exon in UNC13A, a gene that encodes for a crucial synaptic protein: UNC13A. This novel cryptic exon is found to cause UNC13A downregulation at the transcript and protein level. Notably, the cryptic exon was detected specifically in patient postmortem brain regions affected by TDP-43 proteinopathy, including both ALS and FTD and was found to overlap with the disease-associated variant rs12973192 previously identified in multiple genome-wide association studies linked to ALS/FTLD risk, as well as disease aggressiveness. Whilst at normal levels of TDP-43, the cryptic exon was found to be absent from UNC13A mRNA, the cryptic exon was included when TDP-43 levels were depleted, both in the presence and absence of a risk SNP. The risk SNP was found to induce higher levels of cryptic exon when TDP-43 loss occurs, both in cells and postmortem brain, thus implying that increased levels of this cryptic exon directly contribute to disease, and therefore that inhibiting its inclusion in the mRNA may be of therapeutic benefit.

The UNC13A cryptic exon is associated with TDP pathology, and disease aggressiveness, and therefore represents a novel therapeutic target for such disease. The present inventors have therefore developed novel therapeutics that can target UNC13A and modulate the splicing of UNC13A at the cryptic exon. The ASOs, guide RNAs and viral vectors disclosed herein can be used to prevent inclusion of the UNC13A cryptic exon in the mature mRNA, therefore preventing the loss of UNC13A translated protein such that fully functional UNC13A is produced. The ASOs are used to target motifs within the UNC13A cryptic exon, UNC13A cryptic exon splice sites (e.g., splice 5' donor or 3' acceptor sites), the branchpoint, or splice regulatory elements (SREs), including splice enhancers and RNA-binding protein sites, associated with the UNC13A cryptic exon. The ASOs, guide RNAs and viral vectors disclosed herein can be used to mask crucial elements of cryptic exon splicing. The ASOs, guide RNAs and viral vectors disclosed herein can prevent splicing machinery from recognizing the cryptic exon and incorporating the cryptic exon in UNC13A mRNA. The ASOs, guide RNAs and viral vectors disclosed herein are capable of binding to the UNC13A cryptic exon and intronic flanking regions thereof and can therefore be used to probe TDP-43 pathology and/or UNC13A dysfunction and its role in disease.

DESCRIPTION OF THE FIGURES

The following disclosure will be described with reference to the Figures.

DETAILED DESCRIPTION OF THE DISCLOSURE

I. Compositions of the Present Disclosure

Figure 1:
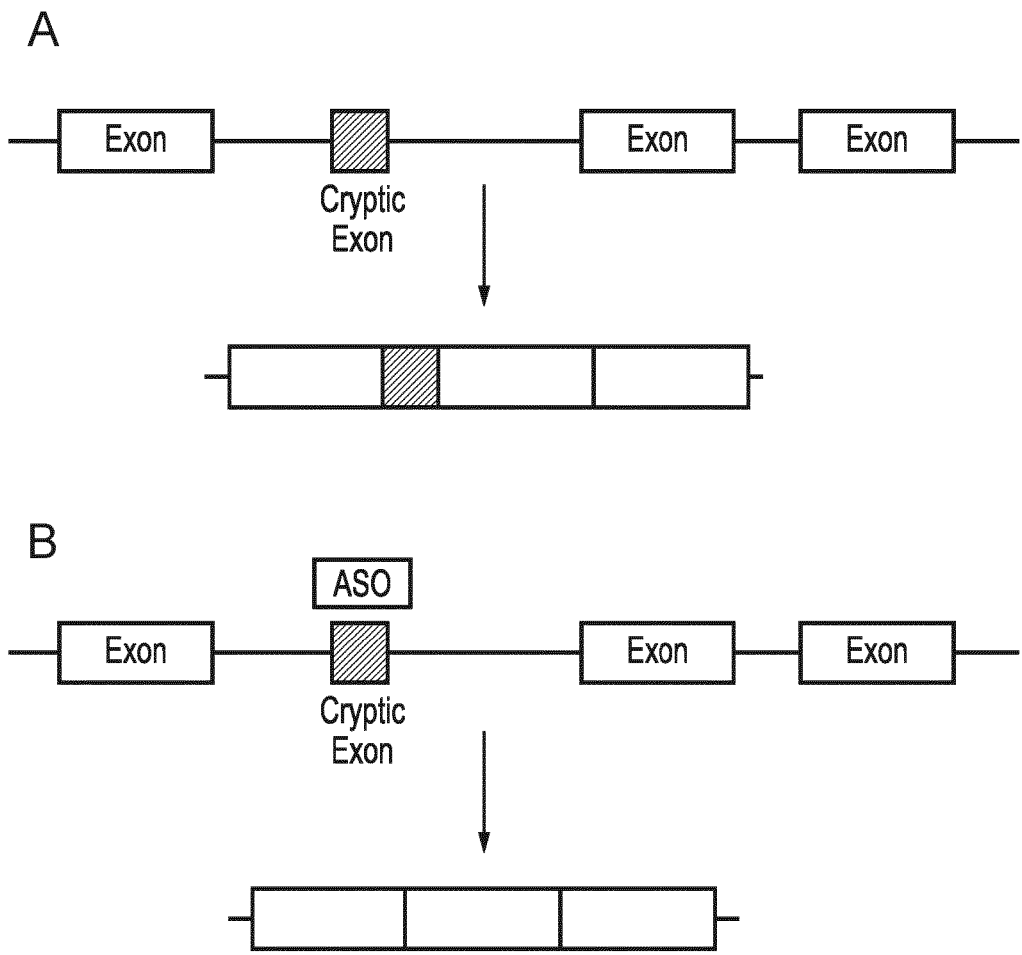
FIG. 1 shows an schematic representation of how an ASO of the present disclosure can modulate splicing of UNC13A: a) an aberrant splicing event, wherein the novel UNC13A cryptic exon is included in the mRNA; the upper portion of FIG. 1 (A) showing pre-mRNA and the lower portion showing mature mRNA b) the ASO can target the cryptic exon to modulate splicing, preventing its inclusion in the mature mRNA; the upper portion of FIG. 1 (B) showing pre-mRNA and the lower portion showing mature mRNA.

The work described herein relates to compositions and methods for suppressing or preventing the inclusion of a cryptic exon in UNC13A mRNA. The inclusion of a cryptic exon in UNC13A mRNA may lead to a truncated transcript and protein.

UNC13A expression may be restored through suppression of a cryptic splicing form of UNC13A that occurs when TDP-43 becomes sequestered or is reduced in functionality, such as by blocking the occurrence or accumulation of the cryptic form and converting it back to or restoring functional UNC13A RNA (e.g., by administration of an ASO or antisense oligonucleotide). In addition, work described herein relates to compositions and methods for increasing protein synthesis of UNC13A, i.e., increasing UNC13A protein expression.

Also provided in the present disclosure are compositions and formulations comprising ASOs or antisense polynucleotides described herein.

In some embodiments, the compositions are formulated for administration through a particular route, such as intravenous injection, intramuscular injection, subcutaneous injection, etc.

In another aspect of the present disclosure, methods for use of the antisense polynucleotides, composition and formulations as described herein, are provided. In some embodiments, the antisense polynucleotides, compositions, and formulations of the present disclosure may be used as tools to regulate gene expression, including but not limited to transcriptional regulation, splicing regulation, translational regulation, and post-translational regulation. In some embodiments, the antisense polynucleotides, compositions, and formulations of the present disclosure may be as therapeutic agents for disease treatment and prevention.

Some aspects of the present disclosure provide naked antisense polynucleotides. Other aspects of the present disclosure provide antisense polynucleotides encapsulated or formulated with a carrier such as a lipid containing carrier.

Antisense Polynucleotides (ASO Compounds)

In certain embodiments, provided herein are oligomeric compounds comprising oligonucleotide or polynucleotides, which consist of linked nucleosides. As used herein, the terms "oligonucleotide" and "polynucleotide" may be used interchangeably. These may also be described as ASOs throughout this disclosure.

ASOs or polynucleotides may be unmodified (RNA or DNA) or may be modified. Modified ASOs or antisense polynucleotides comprise at least one modification relative to unmodified RNA or DNA. That is, modified polynucleotides comprise at least one modified nucleoside (comprising a modified sugar moiety and/or a modified nucleobase) and/or at least one modified internucleoside linkage.

The antisense polynucleotides (ASO compounds) of the present invention may comprises a nucleotide sequence of 13-30 nucleotides, wherein the nucleotide sequence has sequence complementarity with SEQ ID NO 1 (i.e., the 13-30 nucleotide sequence is complementary to a portion of the SEQ ID NO 1 sequence that has the same length as the nucleotide sequence). SEQ ID NO 1 corresponds to a portion of the pre-mRNA UNC13A sequence and encompasses the UNC13A cryptic exon plus intronic flanking regions.

The ASO can prevent aberrant splicing of the UNC13A pre-mRNA to prevent inclusion of the UNC13A cryptic exon in the mature UNC13A mRNA. In an embodiment the ASO prevents splicing machinery (e.g., protein splicing factors) from recognizing the UNC13A cryptic exon. In an embodiment, the ASO is capable of preventing inclusion of an UNC13A cryptic exon into an UNC13A mature mRNA.

In an embodiment, the ASO is capable of binding to the UNC13A cryptic exon and/or intronic flanking regions thereof (i.e., in the UNC13A pre-mRNA). In an embodiment, the flanking regions correspond to 844 bp upstream or 303 bp downstream of the cryptic exon sequence. In an embodiment, the UNC13A cryptic exon and intronic regions thereof correspond to position chr19:17,641,557-17642844. In an embodiment, the ASO is capable of binding to the UNC13A cryptic exon. In an embodiment, the UNC13A cryptic exon corresponds to position chr19:17642414-17,642,541. In an embodiment, the UNC13A cryptic exon corresponds to SEQ ID NO 2. In an embodiment, the ASO comprises a nucleotide sequence that is complementary to SEQ ID NO:2. In an embodiment, the UNC13A cryptic exon is a longer variant of the UN13CA cryptic exon that corresponds to position chr19:17642414-17642591. In an embodiment, the UNC13A cryptic exon is a longer variant of the cryptic exon that corresponds to SEQ ID NO 3. In an embodiment, the ASO comprises a nucleotide sequence that is complementary to SEQ ID NO:3.

In an embodiment, the ASO is capable of binding to a splice site of the UNC13A cryptic exon (i.e., and flanking regions thereof). Targeting the splice sites makes them less available for splicing. In an embodiment, the splice sites correspond to positions chr19:17642414, chr19:17,642,541 or chr19:17642591. In an embodiment, the splice site may be a 5'-splice site (i.e., donor splice site) or a 3' splice site (i.e., acceptor splice site). In some embodiments, the splice site is a 3' splice site (acceptor site) is the long acceptor site (i.e., corresponding to position chr19:17642414) or the short acceptor site (i.e., corresponding to position chr19:17,642,541). In some embodiments, the splice site is a 5' splice site (i.e., donor site corresponding to position chr19:17642591).

In an embodiment, the ASO sequence comprises a sequence complementary to a splice site as described herein (e.g., the splice donor site, i.e., corresponding to the phosphodiester bond between chr19:17,642,413-17,642,414 or a splice acceptor site, i.e., corresponding to the phosphodiester bond between chr19:17,642,541-17,642,542 or chr19: 17,642,591-17,642,592).

In some embodiments, the ASO comprises a sequence complementary to SEQ ID NO 547-551 (i.e., a sequence complementary to a splice donor site). In some embodiments, the ASO may comprise one or more of SEQ ID NO: 270-352.

In some embodiments, the ASO comprises a sequence complementary to SEQ ID NO: 552 to 554 (i.e., a sequence complementary to a splice acceptor site).

In some embodiments, the ASO may comprise one or more of SEQ ID NO: 105-189.

In some embodiments, the ASO comprises a sequence complementary to the short acceptor site.

In some embodiments, the ASO comprises a sequence comprising one or more of SEQ ID NO: 155-180 or SEQ ID 160-175.

In some embodiments, the ASO comprises a sequence complementary to the long acceptor site.

In some embodiments, the ASO comprises a sequence comprising one or more of SEQ ID NO 105-127 or SEQ ID NO: 110-122.

The ASO capable of binding to a splice site of the UNC13A cryptic exon thereof may have sequence complementarity to a target sequence comprising the splice site (e.g., a donor or acceptor splice site) and flanking regions thereof. In some embodiments, the flanking region may be at least 100 nucleotides (nt) upstream or downstream from the splice site (e.g., donor or acceptor splice site), or at least 90 nucleotides, or at least 80 nucleotides, or at least 70 nucleotides, or at least 60 nucleotides, or at least 50 nucleotides, or at least 40 nucleotides, or at least 30 nucleotides, or at least 25 nucleotides, or at least 20 nucleotides, or at least 15 nucleotides, or at least 10 nucleotides, or at least 5 nucleotides upstream of downstream from the splice site.

In some embodiments, the ASO is capable of binding directly to a splice site.

In an embodiment, the ASO is capable of binding to a branchpoint of the UNC13A cryptic exon. Targeting the branchpoint makes the splicing less efficient. In an embodiment, the branchpoint corresponds to position chr19: 17642800. In an embodiment, the ASO sequence comprises a sequence complementary to the branchpoint as described herein.

In an embodiment, the ASO is capable of binding to a splice regulatory element (SRE) associated with UNC13A to modulate splicing of the UNC13A cryptic exon. Targeting splice regulatory elements limits the binding of RNA binding proteins that enhance the inclusion of the cryptic exon in the UNC13A mature mRNA.

In an embodiment, the SREs may be determined in silico. In an embodiment, the SRE is a splice enhancer, and the ASO is capable of binding to a splice enhancer. In an embodiment, the SRE is a TDP-43 binding site, and the ASO is capable of binding to a TDP-43 binding site to modulate splicing of the UNC13A cryptic exon. In an embodiment, the SRE is the cryptic exon, and the ASO is capable of binding to the cryptic exon. In an embodiment, the SRE is an SNP in the intronic flanking region of the CE. ASOs may be capable of binding to part of the sequence in the UNC13A pre-mRNA transcribed from a sequence comprising the intronic SNP. The intronic SNP is rs12608932. In an embodiment, the SRE is a SNP in the CE (e.g., cryptic exon SNP). ASOs may be capable of binding to part of the sequence in the UNC13A pre-mRNA transcribed from a sequence comprising the CE SNP (e.g., cryptic exon SNP). The CE SNP is rs12973192. In some embodiments, the ASO is capable of binding to a sequence comprising binding to both the CE SNP rs12973192 and the donor splice site, in other words, the ASO is complementary to both the CE SNP and the donor splice site.

In an embodiment, the ASO blocks the interaction of certain proteins with the UNC13A pre-mRNA, for example, splicing factors. In an embodiment, binding of the ASO to UNC13A pre-mRNA prevents loss of the fully translated UNC13A protein (i.e., the ASO corrects the reduced levels of the UNC13A protein).

In an embodiment, the ASO prevents inclusion of the cryptic exon into the UNC13A mRNA. In an embodiment, the ASO prevents loss and/or restores functionality of the UNC13A translated protein.

UNC13A and the Cryptic Exon

According to the present disclosure, SEQ ID NO: 1 refers to the target sequence of the UNC13A cryptic exon and intronic flanking regions thereof. As described elsewhere herein, the target sequence SEQ ID NO: 1 encompasses the sequence with the minor allele (e.g., risk variant of the SNP) or the major allele at rs12973192, and therefore also encompasses the sequence wherein G at rs12973192 is replaced with C and/or wherein U at rs12608932 is replaced with G. Thus, while SEQ ID NO: 1 described herein is demonstrated with G at rs12973192 (position 415 in SEQ ID NO: 1) and U at rs12608932 (position 965 in SEQ ID NO:1), SEQ ID NO: 1 may comprise either a G or a C at position 415 and/or a U or a G at position 965. The coordinates refer to the hg38 assembly.

SEQ ID NO: 2 and 3 disclosed herein are the short and long sequences of the UNC13A cryptic exon. As described elsewhere herein, the SEQ ID NO: 2 and 3 encompasses the sequence with and without the SNP at rs12973192, and therefore also encompasses the sequence wherein G at rs12973192 is replaced with C. Thus, while SEQ ID NO: 2 and SEQ ID NO: 3 described herein are demonstrated with G at rs12973192 (i.e., corresponding to position 112 and 162 in SEQ ID NO: 2 and SEQ ID NO: 3 respectively), are intended to encompass SEQ ID NO: 2 and SEQ ID NO: 2 may comprise a G or a C at position 112 and 162 in SEQ ID NO: 2 and SEQ ID NO: 3 respectively.

UNC13A cryptic exon as defined herein refers to a cryptic exon sequence that is aberrantly included in UNC13A mRNA, in some examples, due to TDP pathology. The UNC13A cryptic exon may correspond to SEQ ID NO: 2 (shorter UNC13A cryptic variant) corresponding to position chr19:17642414-17,642,541 or SEQ ID NO: 3 (longer UNC13A cryptic variant) corresponding to position chr19: 17642414-17642591. The UNC13A cryptic exon is positioned between exons 20 and 21 of UNC13A. SEQ ID NO: 1 corresponds to the UNC13A cryptic exon and flanking regions thereof in the UNC13A pre-RNA.

As defined herein, crucial elements involved in cryptic exon splicing encompass the a) branchpoint; b) splicing sites, including i) 3' splice sites (otherwise referred to as splice acceptor sites), ii) 5' splice site (otherwise referred to as a splice donor site); and c) splicing regulatory elements (SREs). Splice sites defined herein refer to the sites or sequences where splicing occurs. Branchpoints as defined herein refer to an "A" nucleotide upstream of the splice acceptor, and often its loss can be compensated by another neighboring "A". Splicing regulator elements (SREs) as referred to herein are sites or sequences where RNA binding proteins bind and promote the splicing event. SREs as defined herein include splice enhancers, TDP-43 binding sites, and RNA-binding protein sites, and/or portions of the transcribed UNC13A pre-mRNA sequence comprising a SNP (e.g., a risk SNP—rs12973192 and/or rs12608932).

Complementarity

In an embodiment, the antisense polynucleotide (e.g., ASO) has at least 95% sequence complementarity with SEQ ID NO 1, or at least 95.5%, or at least 96%, or at least 96.5%, or at least 97%, or at least 97.5%, or at least 98%, or at least 98.5%, or at least 99%, or at least 99.5%, or at least 100% complementarity with SEQ ID NO 1.

In an embodiment, the antisense polynucleotide (e.g., ASO) has at least 95% sequence complementarity with SEQ ID NO 2, or at least 95.5%, or at least 96%, or at least 96.5%, or at least 97%, or at least 97.5%, or at least 98%, or at least 98.5%, or at least 99%, or at least 99.5%, or at least 100% complementarity with SEQ ID NO 2.

In an embodiment, the antisense polynucleotide (e.g., ASO) has at least 95% sequence complementarity with SEQ ID NO 3, or at least 95.5%, or at least 96%, or at least 96.5%, or at least 97%, or at least 97.5%, or at least 98%, or at least 98.5%, or at least 99%, or at least 99.5%, or at least 100% complementarity with SEQ ID NO 3.

Complementarity with SEQ ID NO 1, SEQ ID NO 2, or SEQ ID NO 3 refers to complementary of the antisense polynucleotide (e.g., ASO) with the portion of the SEQ ID NO 1, SEQ ID NO 2 and SEQ ID NO 3.

It is possible to introduce mismatch bases without eliminating activity. For example, Gautschi et al (J. Natl. Cancer Inst. 93:463-471, March 2001) demonstrated the ability of an oligonucleotide having 100% complementarity to the bcl-2 mRNA and having 3 mismatches to the bcl-xL mRNA to reduce the expression of both bcl-2 and bcl-xL in vitro and in vivo.

In certain embodiments, antisense polynucleotides or antisense oligonucleotides (ASOs) are complementary to the target nucleic acid over the entire length of the oligonucleotide. In certain embodiments, antisense polynucleotides or antisense oligonucleotides (ASOs) are 99%, 95%, 90%, 85%, or 80% complementary to the target nucleic acid. In certain embodiments, oligonucleotides are at least 80% complementary to the target nucleic acid over the entire length of the oligonucleotide and comprise a portion that is 100% or fully complementary to a target nucleic acid. In certain embodiments, the portion of full complementarity is 6, 7, 8, 9, 10, 11, 12, 13, 14, 15, 16, 17, 18, 19, or 20 nucleobases in length.

In certain embodiments, antisense polynucleotides or antisense oligonucleotides (ASOs) comprise one or more mismatched nucleobases relative to the target nucleic acid. In certain embodiments, the mismatch is at position 1, 2, 3, 4, 5, 6, 7, 8, 9, 10, 11, 12, 13, 14, 15, 16, 17, 18, 19, or 20 from the 5'-end of the oligonucleotide.

In some embodiments, the nucleic acid-based compositions described herein, including ASOs described herein, comprise an oligo- or polynucleotide that is at least 80% complementary to a region of the target transcript. This region on the target transcript where the nucleic acid-based compositions hybridize or bind to the target transcript is referred to as the "targeted sequence" or "target site."

The term "complementary to" means being able to hybridize under physiological conditions, or in some cases being able to hybridize under stringent conditions with respect to hybridization temperature and salt concentration. It is to be understood that thymidine (T) of any given DNA sequence is replaced by uridine (U) in its corresponding RNA transcript and that this difference does not alter the understanding of the term "complementarity."

The nucleic acid-based compositions described (e.g, the antisense polynucleotides or antisense oligonucleotides (ASOs)) (e.g, the antisense polynucleotides or antisense oligonucleotides (ASOs)) can share at least 80% sequence identity, at least 90% sequence identity, at least 95% sequence identity, at least 98% sequence identity, at least 99% sequence identity, or can be 100% identical with, the reverse complement of the targeted sequence. Thus, the reverse complements of the described nucleic acid-based compositions have a high degree of sequence identity with the targeted sequence. The targeted sequence can have the same length, i.e., the same number of nucleotides, as the nucleic acid-based compositions, or the targeted sequence can have a similar length, i.e., within 1 nucleotide, within 2 nucleotides, within 3 nucleotides, within 4 nucleotides, or within 5 nucleotides compared to the length of the nucleic acid-based compositions. The nucleic acid-based compositions may hybridize with all or a portion of the targeted sequence or hybridize intermittently with the targeted sequence. In some embodiments, targeted sequence may hybridize with all or a portion of the nucleic acid-based compositions described herein, or the targeted sequence may hybridize intermittently with the nucleic acid-based compositions.

In some embodiments, the targeted sequence comprises at least 8 nucleotides. Thus, the targeted sequence can be 8 nucleotides, 9 nucleotides, 10 nucleotides, 11 nucleotides, 12 nucleotides, 13 nucleotides, 14 nucleotides, 15 nucleotides, 16 nucleotides, 17 nucleotides, 18 nucleotides, 19 nucleotides, 20 nucleotides, 21 nucleotides, 22 nucleotides, 23 nucleotides, 24 nucleotides, 25 nucleotides, 26 nucleotides, 27 nucleotides, 28 nucleotides, 29 nucleotides, or 30 nucleotides in length. In some cases, the targeted sequence is greater than 30 nucleotides in length. In some embodiments, the targeted sequence is between 6 and 18 nucleotides in length.

In some embodiments, the targeted sequence is between 7 and 18 nucleotides in length. In some embodiments, the targeted sequence is between 8 and 18 nucleotides in length. In some embodiments, the targeted sequence is between 9 and 18 nucleotides in length. In some embodiments, the targeted sequence is between 10 and 18 nucleotides in length. In some embodiments, the targeted sequence is between 11 and 18 nucleotides in length. In some embodiments, the targeted sequence is between 12 and 18 nucleotides in length. In some embodiments, the targeted sequence is between 13 and 18 nucleotides in length. In some embodiments, the targeted sequence is between 14 and 18 nucleotides in length. In some embodiments, the targeted sequence is about 14 nucleotides in length. In some embodiments, the targeted sequence is about 15 nucleotides in length. In some embodiments, the targeted sequence is about 16 nucleotides in length.

For example, in certain embodiments, nucleic acid-based compositions described (e.g, the antisense polynucleotides or antisense oligonucleotides (ASOs)) consist of 12 to 13, 12 to 14, 12 to 15, 12 to 16, 12 to 17, 12 to 18, 12 to 19, 12 to 20, 12 to 21, 12 to 22, 12 to 23, 12 to 24, 12 to 25, 12 to 26, 12 to 27, 12 to 28, 12 to 29, 12 to 30, 13 to 14, 13 to 15, 13 to 16, 13 to 17, 13 to 18, 13 to 19, 13 to 20, 13 to 21, 13 to 22, 13 to 23, 13 to 24, 13 to 25, 13 to 26, 13 to 27, 13 to 28, 13 to 29, 13 to 30, 14 to 15, 14 to 16, 14 to 17, 14 to 18, 14 to 19, 14 to 20, 14 to 21, 14 to 22, 14 to 23, 14 to 24, 14 to 25, 14 to 26, 14 to 27, 14 to 28, 14 to 29, 14 to 30, 15 to 16, 15 to 17, 15 to 18, 15 to 19, 15 to 20, 15 to 21, 15 to 22, 15 to 23, 15 to 24, 15 to 25, 15 to 26, 15 to 27, 15 to 28, 15 to 29, 15 to 30, 16 to 17, 16 to 18, 16 to 19, 16 to 20, 16 to 21, 16 to 22, 16 to 23, 16 to 24, 16 to 25, 16 to 26, 16 to 27, 16 to 28, 16 to 29, 16 to 30, 17 to 18, 17 to 19, 17 to 20, 17 to 21, 17 to 22, 17 to 23, 17 to 24, 17 to 25, 17 to 26, 17 to 27, 17 to 28, 17 to 29, 17 to 30, 18 to 19, 18 to 20, 18 to 21, 18 to 22, 18 to 23, 18 to 24, 18 to 25, 18 to 26, 18 to 27, 18 to 28, 18 to 29, 18 to 30, 19 to 20, 19 to 21, 19 to 22, 19 to 23, 19 to 24, 19 to 25, 19 to 26, 19 to 29, 19 to 28, 19 to 29, 19 to 30, 20 to 21, 20 to 22, 20 to 23, 20 to 24, 20 to 25, 20 to 26, 20 to 27, 20 to 28, 20 to 29, 20 to 30, 21 to 22, 21 to 23, 21 to 24, 21 to 25, 21 to 26, 21 to 27, 21 to 28, 21 to 29, 21 to 30, 22 to 23, 22 to 24, 22 to 25, 22 to 26, 22 to 27, 22 to 28, 22 to 29, 22 to 30, 23 to 24, 23 to 25, 23 to 26, 23 to 27, 23 to 28, 23 to 29, 23 to 30, 24 to 25, 24 to 26, 24 to 27, 24 to 28, 24 to 29, 24 to 30, 25 to 26, 25 to 27, 25 to 28, 25 to 29, 25 to 30, 26 to 27, 26 to 28, 26 to 29, 26 to 30, 27 to 28, 27 to 29, 27 to 30, 28 to 29, 28 to 30, or 29 to 30 linked nucleosides.

The ASO described herein has or may comprise a length of 13-30 nucleotides. In an embodiment, the ASO may consist essentially of 13-30 nucleotides that are complementary with SEQ ID NO 1, SEQ ID NO 2 or SEQ ID NO 3.

In an embodiment, the ASO has at least 13-nucleotides, or at least 14 nucleotides, or at least 15 nucleotides, or at least 16 nucleotides, or at least 17 nucleotides, 18 nucleotides, or at least 19 nucleotides, or at least 20 nucleotides, or at least 21 nucleotides, or at least 22 nucleotides, or at least 23 nucleotides, or at least 24 nucleotides. In an embodiment, the ASO has less than 30 nucleotides, or less than 29, or less than 28, or less than 27, or less than 26, or less than 25, or less than 24, or less than 23, or less than 22, or less than 21, or less than 20 nucleotides. In an embodiment, the ASO has from 15 to 30 nucleotides, or from 16 to 30 nucleotides, or from 17 to 30 nucleotides, or from 17 to 28 nucleotides, or from 18 to 30 nucleotides, or from 17 to 28 nucleotides, or from 18 to 28 nucleotides, or from 19 to 26 nucleotides, or from 19 to 25 nucleotides, or from 20 to 25 nucleotides, or from 20 to 24 nucleotides, or from 20 to 23 nucleotides, or from 20 to 22 nucleotides, or from 21 to 24 nucleotides, or from 21 to 23 nucleotides, or from 22 to 24 nucleotides. In an embodiment, the ASO may have 13, 14, 15, 16, 17, 18, 19, 20, 21, 22, 23, 24, 25, 26, 27, 28, 29 or 30 nucleotides.

In an embodiment, the ASO may have 13, 14, 15, 16, 17, 18, 19, 20, 21, 22, 23, 24, 25, 26, 27, 28, 29 or 30 nucleotides that are complementary to SEQ ID NO 1, SEQ ID NO 2 or SEQ ID NO 3. In an embodiment, the ASO has a length of 13-30 nucleotides and the ASO comprises 13-30 nucleotides that are complementary with SEQ ID NO 1, SEQ ID NO 2 or SEQ ID NO 3.

In some embodiments, the ASO may, (i.e., in the context of hybridizing to a target) comprise a nucleotide overhang. A nucleotide overhang is a part of the ASO which is not complementary to the target sequence (e.g., SEQ ID NO 1). In some embodiments, the overhang may comprise 1 to 3 nucleotides. In some embodiments, the overhang is at the 3' end. In an embodiment, the ASO may comprise no nucleotide overhang, for example, wherein the entire ASO is complementary with SEQ ID NO:1, or SEQ ID NO 2, or SEQ ID NO 3.

Sequences

The ASO of the present invention comprises a nucleotide sequence of from about 13 to about 30 nucleotides, wherein the nucleotide sequence has sequence complementarity with SEQ ID NO 1. As described elsewhere herein, the target sequence SEQ ID NO: 1 is also intended to encompass the sequence wherein one or more SNP is present in the inside the cryptic exon and/or flanking regions, at rs12973192 and/or rs12608932. The coordinates refer to the hg38 assembly.

In some embodiments, the ASO consists of a nucleotide sequence of 13-30 nucleotides, wherein the nucleotide sequence has sequence complementarity with SEQ ID NO 1.

In an embodiment of the first and second aspect, the ASO is capable of binding to a UNC13A cryptic exon or flanking region thereof. In an embodiment, the ASO (i.e., at least a portion of the ASO) comprises a 13-nucleotide sequence corresponding to any one or one or more of SEQ ID NO 4-546.

In an embodiment, the ASO (i.e., at least a portion of the ASO) comprises at least a 13-nucleotide sequence corresponding to any one or one or more of SEQ ID NO 4-104. These ASOs can target the branchpoint such that splicing is less efficient.

In an embodiment, the ASO (i.e., at least a portion of the ASO) comprises at least a 13-nucleotide sequence corresponding to any one, or one or more of SEQ ID NO: 105-189 or SEQ ID NO: 270-352. These correspond to sequences that target the UNC13A cryptic exon splice sites (i.e., acceptor and donor splice sites respectively).

In an embodiment the ASO (i.e., at least a portion of the ASO) comprises at least a 13-nucleotide sequence corresponding to any one, or one or more of SEQ ID NO: 105-189. These correspond to sequences that target the UNC13A cryptic exon 3'-splice sites (i.e., acceptor sites). In some examples, the ASO comprise at least a 13-nucleotide sequence corresponding to SEQ ID NO: 150 to 185, more preferably SEQ ID NO: 160 to 175. In an embodiment, the ASO (i.e., at least a portion of the ASO) comprises at least a 13-nucleotide sequence corresponding to one or more of SEQ ID NO 270-352. These correspond to sequences that target the UNC13A cryptic exon 5'-splice site. In some examples, the ASO comprises at least a 13-nucleotide sequence corresponding to any one or more of SEQ ID NO: 270 to 345, more preferably SEQ ID NO: 275 to 340, more preferably SEQ ID NO: 280 to 330, more preferably SEQ ID NO: 285 to 325, more preferably SEQ ID NO: 290 to 320, more preferably SEQ ID NO 295 to 324.

In an embodiment, the ASO (i.e., at least a portion of the ASO) comprises at least a 13-nucleotide sequence corresponding to one or more of SEQ ID NO 190-269, SEQ ID NO: 353-426, SEQ ID NO:427-474, or SEQ ID NO:475-546. These correspond to sequences that target the UNC13A splice regulatory elements.

In an embodiment, the SRE is a TDP-43 binding site. The ASO (i.e., at least a portion of the ASO) may comprise a 13-nucleotide sequence corresponding to any one or more of SEQ ID NO 427-474. In an embodiment, the SRE is an enhancer. The ASO may comprise at least a 13-nucleotide sequence corresponding to any one or more of SED ID: 475-546.

In an embodiment, the SRE is within the cryptic exon. In an embodiment, the ASO is capable of binding to a UNC13A cryptic exon. In an embodiment, the UNC13A cryptic exon corresponds to SEQ ID NO 2 or SEQ ID NO 3. As described elsewhere herein, the sequences SEQ ID NO: 2 and 3 are also intended to encompass a potential SNP inside the cryptic exon, rs12973192. In an embodiment, the ASO is complementary to SEQ ID NO 2 or SEQ ID NO 3. In an embodiment, the ASO (i.e., or at least a portion thereof) comprises at least a 13-nucleotide sequence corresponding to any one or more of SEQ ID NO 190-269. These correspond to sequences that target the cryptic exon. Targeting the cryptic exon prevents splicing machinery from recognizing the CE.

In an embodiment, the SRE is an intronic SNP. In an embodiment the ASO (i.e., at least a portion of the ASO) comprises at least a 13-nucleotide sequence corresponding to any one or more of SEQ ID NO 353-426. These correspond to sequences that target the pre-mRNA transcribed from a sequence comprising the intronic SNP. The intronic SNP is linked with disease. The intronic SNP is rs12608932.

In some embodiments, the ASO (i.e., at least a portion of the ASO) may comprise 13-nucleotides and correspond exactly to the sequence of one or more of SEQ ID NO 4-546. In some embodiments, the ASO comprises one or more further nucleotides (1, 2, 3, 4, 5, 6, 7, 8, 9, 10, 11, 12, 13, 14, 15, 16, 17 further nucleotides) that flank the sequence of one of SEQ ID NO 4-546, e.g., wherein the ASO has 14, 15, 16, 17, 18, 19, 20, 21, 22, 23, 24, 25, 26, 27, 28, 29 or 30 nucleotides respectively. The further nucleotides may be present at either the 5' and/or 3' end of the 13-nucleotide sequence corresponding to SEQ ID NO 4-546.

In an embodiment, the ASO is longer than 13-nucleotides and comprises more than one sequence that is complementary with SEQ ID NO: 1. In an embodiment, the ASO may comprise one, two, three, four, five, six, seven, eight, nine, ten, eleven, twelve, thirteen, fourteen, fifteen, sixteen, seventeen or eighteen overlapping consecutive sequences, for example, selected from SEQ ID NO: 4-104, SEQ ID NO-105-189, SEQ ID NO: 190-269, SEQ ID NO 270-352, SEQ ID NO 353-426, or SEQ ID NO 427-474, or SEQ ID NO: 475-546, wherein consecutive refers to the number of the SEQ ID. For example, an ASO comprising 20 nucleotides may comprise eight consecutive sequences selected from SEQ ID NO 4-104 (e.g., wherein the ASO comprises SEQ ID NO 4, 5, 6, 7, 8, 9, 10 and 11). In some examples, the ASO comprises SEQ ID NO: n and SEQ ID, n+1, and optionally SEQ ID NO: n+2, and further optionally SEQ ID NO: n+3, and further, optionally SEQ ID NO: n+4, and further optionally SEQ ID NO: n+4, and further optionally SEQ ID NO: n+5; and further optionally SEQ ID NO: n+6; and further optionally SEQ ID NO: n+7, and further optionally SEQ ID NO: n+8, and further optionally SEQ ID NO: n+9, and further optionally SEQ ID NO: n+10, and further optionally SEQ ID NO: n+11, and further optionally SEQ ID NO: n+12, and further optionally SEQ ID NO: n+13, and further optionally SEQ ID NO: n+14, and further optionally SEQ ID NO: n+15, and further optionally SEQ ID NO: n+16, and further optionally SEQ ID NO: n+17, and further optionally SEQ ID NO: n+18, wherein n is the number of the SEQ ID.

In some embodiments, the ASO comprises a nucleotide sequence that has sequence complementarity with one or more of SEQ ID NO: 547 to 551, or one or more of SEQ ID NO: 552 to 554.

Modifications

Modifications may be introduced into the polynucleotides (e.g., ASO(s)) described herein. The polynucleotides (e.g., ASO(s)) of the present disclosure may include one, two, three, or more modifications. The modifications may be various distinct modifications. In some embodiments, the modifications may locate at various regions and fragments of the polynucleotides of the present disclosure, including but not limited to, the coding region(s), the untranslated region(s), the flanking region(s), and/or the terminal or tailing regions.

The modifications which render the nucleic acid molecules, when introduced to a cell, more resistant to degradation in the cell and/or more stable in the cell as compared to unmodified polynucleotides (e.g., ASO). The modifications may also increase the biological functions of nucleic acid molecules as compared to unmodified polynucleotides, such as binding to an RBP or another polynucleotide (e.g., ASO).

The modifications may be structural and/or chemical modifications. The chemical modification may be a nucleotide and/or nucleoside modification including a nucleobase modification and/or a sugar modification, and a backbone linkage modification (i.e., the internucleoside linkage, e.g., a linking phosphate, a phosphodiester linkage, and a phosphodiester backbone). The structural modification may include a secondary structural modification, and a tertiary structural modification.

Modifications according to the present disclosure may be modifications of ribonucleic acids (RNAs) to deoxyribonucleic acids (DNAs), threose nucleic acids (TNAs), glycol nucleic acids (GNAs), peptide nucleic acids (PNAs), locked nucleic acids (LNAs) or hybrids thereof.

In some embodiments, one, two, or more (optionally different) nucleoside or nucleotide modifications may be incorporated to the polynucleotides (e.g., ASO(s)) of the present disclosure. As described herein, "nucleoside" is defined as a compound containing a sugar molecule (e.g., a pentose or ribose) or a derivative thereof in combination with an organic base (e.g., a purine or a pyrimidine) or a derivative thereof (also referred to herein as "nucleobase"). Five primary/canonical nucleobases: adenine (A), cytosine (C), guanine (G), thymine (T), and uracil (U) are the fundamental units of nucleic acid molecules, in which Adenine and guanine, referred to purine bases, have a fused-ring skeletal structure derived of purine while uracil, and thymine, derived of pyrimidine, are referred to pyrimidine bases. As described herein, "nucleotide" is defined as a nucleoside including a phosphate group or other backbone linkage (internucleoside linkage).

In some embodiments, the polynucleotide (e.g., ASO or antisense polynucleotide) comprises at least one modification described herein. In other embodiments, the polynucleotides (e.g., ASO) comprise two, three, four, or more (optionally different) chemical modifications described herein. The modifications may be combinations of nucleobase (purine and/or pyrimidine), sugar and backbone (internucleoside) linkage modifications. The modifications may be located on one or more nucleotides of the polynucleotide. In some embodiments, all the nucleotides of the polynucleotide (e.g., ASO) are chemically modified. In some embodiments, all the nucleotides of the nucleic acid sequence with a biological function are chemically modified.

The polynucleotides (e.g., ASO(s)) of the present disclosure may contain from about 1% to about 100% modified nucleotides (either in relation to overall nucleotide content, or in relation to one or more types of nucleotide, i.e. any one or more of A, G, T/U or C) or any intervening percentage (e.g., from 1% to 20%, from 1% to 25%, from 1% to 50%, from 1% to 60%, from 1% to 70%, from 1% to 80%, from 1% to 90%, from 1% to 95%, from 10% to 20%, from 10% to 25%, from 10% to 50%, from 10% to 60%, from 10% to 70%, from 10% to 80%, from 10% to 90%, from 10% to 95%, from 10% to 100%, from 20% to 25%, from 20% to 50%, from 20% to 60%, from 20% to 70%, from 20% to 80%, from 20% to 90%, from 20% to 95%, from 20% to 100%, from 50% to 60%, from 50% to 70%, from 50% to 80%, from 50% to 90%, from 50% to 95%, from 50% to 100%, from 70% to 80%, from 70% to 90%, from 70% to 95%, from 70% to 100%, from 80% to 90%, from 80% to 95%, from 80% to 100%, from 85% to 95%, from 85% to 100%, from 90% to 95%, from 90% to 100%, and from 95% to 100%).

In some embodiments, the polynucleotides (e.g., ASO(s) are at least 50% modified, e.g., at least 50% of the nucleotides are modified. In some embodiments, the polynucleotides (e.g., ASO(s) are at least 75% modified, e.g., at least 75% of the nucleotides are modified. It is to be understood that since a nucleotide (sugar, base and phosphate moiety, e.g., linkage) may each be modified, any modification to any portion of a nucleotide, or nucleoside, will constitute a modification.

In some embodiments, the polynucleotides (e.g., ASO(s)) are at least 10% modified in only one component of the nucleotide, with such component being the nucleobase, sugar, or linkage between nucleosides. For example, modifications may be made to at least 10%, 15%, 20%, 25%, 30%, 35%, 40%, 45%, 50%, 55%, 60%, 65%, 70%, 75%, 80%, 85%, 90%, 95% or 100% of the nucleobases, sugars, or linkages of a polynucleotide (e.g., ASO) described herein.

The polynucleotides (e.g., ASO(s)) can be designed with a patterned array of sugar, nucleobase or linkage modifications. In some embodiments, the polynucleotides (e.g., ASO(s)) can comprise modifications to maximize stability.

Modifications: Sugars

Modifications of the modified nucleosides and nucleotides can be present in the sugar subunit. In some embodiments, the polynucleotide (e.g., ASO) comprises at least one sugar modification. Generally, RNA includes the sugar subunit: ribose, which is a 5-membered ring having an oxygen.

In one example, the 2' hydroxyl group (OH) can be modified or replaced with a number of different substituents. Exemplary substitutions at the 2'OH-position include, but are not limited to, H, halo, optionally substituted $C_{1-6}$ alkyl; optionally substituted C1-6 alkoxy; optionally substituted $C_{6-10}$ aryloxy; optionally substituted $C_{3-8}$ cycloalkyl; optionally substituted $C_{3-8}$ cycloalkoxy; optionally substituted $C_{6-10}$ aryloxy; optionally substituted $C_{6-10}$ aryl-$C_{1-6}$ alkoxy, optionally substituted $C_{1-12}$ (heterocyclyl)oxy; a sugar (e.g., ribose, pentose, or any described herein); a polyethyleneglycol (PEG)-O($CH_2CH_2O$)n$CH_2CH_2OR$, where R is H or optionally substituted alkyl, and n is an integer from 0 to 20 (e.g., from 0 to 4, from 0 to 8, from 0 to 10, from 0 to 16, from 1 to 4, from 1 to 8, from 1 to 10, from 1 to 16, from 1 to 20, from 2 to 4, from 2 to 8, from 2 to 10, from 2 to 16, from 2 to 20, from 4 to 8, from 4 to 10, from 4 to 16, and from 4 to 20); and "locked" nucleic acids (LNA) in which the 2'-hydroxyl is connected by a $C_{1-6}$ alkylene or $C_{1-6}$ heteroalkylene bridge to the 4'-carbon of the same ribose sugar, where exemplary bridges include methylene, propylene, ether, or amino bridges; aminoalkyl; aminoalkoxy; amino; and amino acid.

Other exemplary sugar modifications include replacement of the oxygen (O) in ribose (e.g., with S, Se, or alkylene, such as methylene or ethylene); addition of a double bond (e.g., to replace ribose with cyclopentenyl or cyclohexenyl); ring contraction of ribose (e.g., to form a 4-membered ring of cyclobutane or oxetane); ring expansion of ribose (e.g., to form a 6- or 7-membered ring having an additional carbon or heteroatom, such as for anhydrohexitol, altritol, mannitol, cyclohexanyl, cyclohexenyl, and morpholino that also has a phosphoramidate backbone); multicyclic forms (e.g., tricyclo; and "unlocked" forms, such as glycol nucleic acid (GNA) (e.g., R-GNA or S-GNA, where ribose is replaced by glycol units attached to phosphodiester bonds), threose nucleic acid (TNA, where ribose is replace with α-L-threofuranosyl-(3'→2')), and peptide nucleic acid (PNA, where 2-amino-ethyl-glycine linkages replace the ribose and phosphodiester backbone).

The sugar subunit can also contain one or more carbons that possess the opposite stereochemical configuration than that of the corresponding carbon in ribose. Thus, antisense polynucleotides (e.g., ASO(s)) as described herein can include nucleotides containing, e.g., arabinose, as the sugar.

In some embodiments, at least one of the 2' positions of the sugar (OH in RNA or H in DNA) of a nucleotide of the polynucleotides (e.g., ASO) is substituted with —O—Methoxyethyl, referred to as 2'-OMe. In some embodiments, at least one of the 2' positions of the sugar (OH in RNA or H in DNA) of a nucleotide of the polynucleotides (e.g., ASO) is substituted with —F, referred to as 2'-F. In some embodiments, the sugar modification can be one or more locked nucleic acids (LNAs). In some embodiments, the polynucleotides (e.g., ASO) can be fully 2'-MOE-sugar modified.

In certain embodiments, modified sugar moieties are non-bicyclic modified sugar moieties. In certain embodiments, modified sugar moieties are bicyclic or tricyclic sugar moieties. In certain embodiments, modified sugar moieties are sugar surrogates. Such sugar surrogates may comprise one or more substitutions corresponding to those of other types of modified sugar moieties. In certain embodiments, modified sugar moieties are non-bicyclic modified sugar moieties comprising a furanosyl ring with one or more substituent groups none of which bridges two atoms of the furanosyl ring to form a bicyclic structure. Such non bridging substituents may be at any position of the furanosyl, including but not limited to substituents at the 2', 4', and/or 5' positions. In certain embodiments one or more non-bridging substituent of non-bicyclic modified sugar moieties is branched. Examples of 2'-substituent groups suitable for non-bicyclic modified sugar moieties include but are not limited to: 2'-F, 2'-OCH$_3$ ("OMe" or "O-methyl"), and 2'-O(CH$_2$)$_2$OCH$_3$ ("MOE" or "O-methoxyethyl"), and 2'-O—N-alkyl acetamide, e.g., 2'-O—N-methyl acetamide ("NMA"), 2'-O—N-dimethyl acetamide, 2'-O—N-ethyl acetamide, or 2'-O—N-propyl acetamide. For example, see U.S. Pat. No. 6,147,200, Prakash et al., 2003, Org. Lett., 5, 403-6.

In certain embodiments, 2'-substituent groups are selected from among: halo, allyl, amino, azido, SH, CN, OCN, CF, OCF$_3$, O—C$_1$-C$_{10}$ alkoxy, O—C1-C10 substituted alkoxy, O—C$_1$-C$_{10}$ alkyl, O—C$_1$-C$_{10}$ substituted alkyl, S-alkyl, N(Rm)-alkyl, O-alkenyl, S-alkenyl, N(Rm)-alkenyl, O-alkynyl, S-alkynyl, N(Rm)-alkynyl, O-alkylenyl-O-alkyl, alkynyl, alkaryl, aralkyl, O-alkaryl, O-aralkyl, O(CH$_2$)$_2$SCH$_3$, O(CH$_2$)$_2$ON(Rm)(Rn) or OCH$_2$C(=O)—N(Rm)(Rn), where each Rm and Rn is, independently, H, an amino protecting group, or substituted or unsubstituted C1-C10 alkyl, and the 2'-substituent groups described in Cook et al., U.S. Pat. No. 6,531,584; Cook et ah, U.S. Pat. No. 5,859,221; and Cook et ah, U.S. Pat. No. 6,005,087. Certain embodiments of these 2'-substituent groups can be further substituted with one or more substituent groups independently selected from among: hydroxyl, amino, alkoxy, carboxy, benzyl, phenyl, nitro (NO$_2$), thiol, thioalkoxy, thioalkyl, halogen, alkyl, aryl, alkenyl and alkynyl. Examples of 4'-substituent groups suitable for non-bicyclic modified sugar moieties include but are not limited to alkoxy (e.g., methoxy), alkyl, and those described in Manoharan et al., WO 2015/106128. Examples of 5'-substituent groups suitable for non-bicyclic modified sugar moieties include but are not limited to: 5'-methyl (R or S), 5'-vinyl, and 5'-methoxy. In certain embodiments, non-bicyclic modified sugar moieties comprise more than one non-bridging sugar substituent, for example, 2'-F-5'-methyl sugar moieties and the modified sugar moieties and modified nucleosides described in Migawa et al., WO 2008/101157 and Rajeev et al., US2013/0203836.

In certain embodiments, a 2'-substituted non-bicyclic modified nucleoside comprises a sugar moiety comprising a non-bridging 2'-substituent group selected from: F, NH$_2$, N$_3$, OCF$_3$OCH$_3$, O(CH$_2$)$_3$NH$_2$, CH$_2$CH=CH$_2$, OCH$_2$CH=CH$_2$, OCH$_2$CH$_2$OCH$_3$, O(CH$_2$)$_2$SCH$_3$, O(CH$_2$)$_2$ON(Rm)(Rn), O(CH$_2$), ON(CH$_3$)$_2$, O(CH$_2$)$_2$O(CH$_2$)$_2$N(CH$_3$)$_2$, and N-substituted acetamide (OCH2C(=O)—N(Rm)(Rn)), where each Rm and Rn is, independently, H, an amino protecting group, or substituted or unsubstituted C1-C10 alkyl, e.g., for example, OCH2C(=O)—N(H)CH3 ("NMA").

In certain embodiments, a 2'-substituted non-bicyclic modified nucleoside comprises a sugar moiety comprising a non-bridging 2'-substituent group selected from: F, OCF$_3$OCH$_3$, OCH$_2$CH$_2$OCH$_3$, O(CH$_2$)$_2$SCH$_3$, O(CH$_2$)$_2$ON (CH$_3$)$_2$, O(CH$_2$)$_2$O(CH$_2$)$_2$N(CH$_3$)$_2$, and OCH$_2$C(=O)—N(H)CH$_3$ ("NMA"). In certain embodiments, a 2'-substituted non-bicyclic modified nucleoside comprises a sugar moiety comprising a non-bridging 2'-substituent group selected from: F, OCH, OCH$_2$CH$_2$OCH$_3$, and OCH$_2$C(=O)—N(H)CH$_3$.

Certain modified sugar moieties comprise a substituent that bridges two atoms of the furanosyl ring to form a second ring, resulting in a bicyclic sugar moiety. In certain such embodiments, the bicyclic sugar moiety comprises a bridge between the 4' and the 2' furanose ring atoms. Examples of such 4' to 2' bridging sugar substituents include but are not limited to: 4'-CH2-2', 4'-(CH2)2-2', 4'-(CH2)3-2', 4'-CH2-O-2' ("LNA"), 4'-CH2-S-2', 4'-(CH2)2-O-2' ("ENA"), 4'-CH(CH3)-O-2' (referred to as "constrained ethyl" or "cEt"), 4'-CH2-O-CH2-2', 4'-CH2-N(R)-2', 4'-CH(CH2OCH3)-O-2' ("constrained MOE" or "cMOE") and analogs thereof (see, e.g., Seth et al., U.S. Pat. No. 7,399,845, Bhat et al., U.S. Pat. No. 7,569,686, Swayze et al., U.S. Pat. No. 7,741,457, and Swayze et al., U.S. Pat. No. 8,022,193), 4'-C(CH3)(CH3)-O-2' and analogs thereof (see, e.g., Seth et al., U.S. Pat. No. 8,278,283), 4'-CH2-N(OCH)-2' and analogs thereof (see, e.g., Prakash et al., U.S. Pat. No. 8,278,425), 4'-CH2-O—N(CH3)-2' (see, e.g., Allerson et al., U.S. Pat. No. 7,696,345 and Allerson et al., U.S. Pat. No. 8,124,745), 4'-CH2-C(H)(CH3)-2' (see, e.g., Zhou, et al., J. Org. Chem., 2009, 74, 118-134), 4'-CH2-C(=CH2)-2' and analogs thereof (see e.g., Seth et al., U.S. Pat. No. 8,278,426), 4, —C(RaRb)—N(R)-0-2', 4'-C(RaRb)—O—N(R)-2', 4'-CH2-O—N(R)-2', and 4'-CH2-N(R)-0-2', wherein each R, Ra, and Rb is, independently, H, a protecting group, or C1-C12 alkyl (see, e.g. Imanishi et al., U.S. Pat. No. 7,427,672).

In certain embodiments, such 4' to 2' bridges independently comprise from 1 to 4 linked groups independently selected from: —[C(Ra)(R)]n-, —[C(Ra)(Rb)]n-O—, —C(Ra)=C(Rb)—, —C(Ra)=N—, —C(=NRa)—, —C(=O)—, —C(=S)—, —O—, —Si(Ra)2-, —S(=O)x-, and —N(Ra)—; wherein: x is 0, 1, or 2; n is 1, 2, 3, or 4; each Ra and Rb is, independently, H, a protecting group, hydroxyl, C1-C12 alkyl, substituted C1-C12 alkyl, C2-C12 alkenyl, substituted C2-C12 alkenyl, C2-C12 alkynyl, substituted C2-C12 alkynyl, C5-C20 aryl, substituted C5-C20 aryl, heterocycle radical, substituted heterocycle radical, heteroaryl, substituted heteroaryl, C5-C7 alicyclic radical, substituted C5-C7 alicyclic radical, halogen, OJi, NJIJ2, SJi, N3, COOJi, acyl (C(=O)—H), substituted acyl, CN, sulfonyl (S(=O)2-Ji), or sulfoxyl (S(=O)-Ji); and each Ji and J2 is, independently, H, C1-C12 alkyl, substituted C1-C12 alkyl, C2-C12 alkenyl, substituted C2-C12 alkenyl, C2-C12 alkynyl, substituted C2-C12 alkynyl, C5-C20 aryl, substituted C5-C20 aryl, acyl (C(=O)—H), substituted acyl, a heterocycle radical, a substituted heterocycle radical, C1-C12 aminoalkyl, substituted C1-C12 aminoalkyl, or a protecting group.

Additional bicyclic sugar moieties are known in the art, see, for example: Freier et al., Nucleic Acids Research, 1997, 25(22), 4429-4443, Albaek et al., J. Org. Chem., 2006, 71, 7731-7740, Singh et al., Chem. Commun., 1998, 4, 455-456; Koshkin et al., Tetrahedron, 1998, 54, 3607-3630;

Kumar et al., Bioorg. Med. Chem. Lett., 1998, 8, 2219-2222; Singh et al., Org. Chem., 1998, 63, 10035-10039; Srivastava et al., J. Am. Chem. Soc., 2007, 129, 8362-8379; Wengel et al., U.S. Pat. No. 7,053,207; Imanishi et al., U.S. Pat. No. 6,268,490; Imanishi et al. U.S. Pat. No. 6,770,748; Imanishi et al., U.S. RE44,779; Wengel et al., U.S. Pat. No. 6,794, 499; Wengel et al., U.S. Pat. No. 6,670,461; Wengel et al., U.S. Pat. No. 7,034,133; Wengel et al., U.S. Pat. No. 8,080,644; Wengel et al., U.S. Pat. No. 8,034,909; Wengel et al., U.S. Pat. No. 8,153,365; Wengel et al., U.S. Pat. No. 7,572,582; and Ramasamy et al., U.S. Pat. No. 6,525,191; Torsten et al., WO 2004/106356; Wengel et al., WO 1999/014226; Seth et al., WO 2007/134181; Seth et al., U.S. Pat. No. 7,547,684; Seth et al., U.S. Pat. No. 7,666,854; Seth et al., U.S. Pat. No. 8,088,746; Seth et al., U.S. Pat. No. 7,750,131; Seth et al., U.S. Pat. No. 8,030,467; Seth et al, U.S. Pat. No. 8,268,980; Seth et al, U.S. Pat. No. 8,546,556; Seth et al, U.S. Pat. No. 8,530,640; Migawa et al, U.S. Pat. No. 9,012,421; Seth et al., U.S. Pat. No. 8,501,805; and U.S. Patent Publication Nos. Allerson et al., US2008/0039618 and Migawa et al., US2015/0191727.

In certain embodiments, bicyclic sugar moieties and nucleosides incorporating such bicyclic sugar moieties are further defined by isomeric configuration. For example, an LNA nucleoside (described herein) may be in the α-L configuration or in the b-D configuration.

LNA (β-D-configuration) α-L-LNA (α-L-configuration) bridge=4'-CH2-0-2' bridge=4'-CH2-O-2' α-L-methyleneoxy (4'-CH2-O-2') or α-L-LNA bicyclic nucleosides have been incorporated into oligonucleotides that showed antisense activity (Frieden et al., Nucleic Acids Research, 2003, 21, 6365-6372). Herein, general descriptions of bicyclic nucleosides include both isomeric configurations. When the positions of specific bicyclic nucleosides (e.g., LNA or cEt) are identified in exemplified embodiments herein, they are in the b-D configuration, unless otherwise specified.

In certain embodiments, modified sugar moieties comprise one or more non-bridging sugar substituent and one or more bridging sugar substituent (e.g., 5'-substituted and 4'-2' bridged sugars).

In certain embodiments, modified sugar moieties are sugar surrogates. In certain such embodiments, the oxygen atom of the sugar moiety is replaced, e.g., with a sulfur, carbon or nitrogen atom. In certain such embodiments, such modified sugar moieties also comprise bridging and/or non-bridging substituents as described herein. For example, certain sugar surrogates comprise a 4'-sulfur atom and a substitution at the 2'-position (see. e.g., Bhat et al., U.S. Pat. No. 7,875,733 and Bhat et al., U.S. Pat. No. 7,939,677) and/or the 5' position.

In certain embodiments, sugar surrogates comprise rings having other than 5 atoms. For example, in certain embodiments, a sugar surrogate comprises a six-membered tetrahydropyran ("THP"). Such tetrahydropyrans may be further modified or substituted. Nucleosides comprising such modified tetrahydropyrans include but are not limited to hexitol nucleic acid ("HNA"), anitol nucleic acid ("ANA"), manitol nucleic acid ("MNA") (see, e.g., Leumann, C J. Bioorg. & Med. Chem. 2002, 10, 841-854), fluoro HNA: ("F-HNA", see e.g. Swayze et al., U.S. Pat. No. 8,088,904; Swayze et al., U.S. Pat. No. 8,440,803; Swayze et al., U.S. Pat. No. 8,796,437; and Swayze et al., U.S. Pat. No. 9,005,906; F-HNA can also be referred to as a F-THP or 3'-fluoro tetrahydropyran), and nucleosides comprising additional modified THP compounds.

In certain embodiments, sugar surrogates comprise rings having more than 5 atoms and more than one heteroatom.

For example, nucleosides comprising morpholino sugar moieties and their use in oligonucleotides have been reported (see, e.g., Braasch et al., Biochemistry, 2002, 41, 4503-4510 and Summerton et ah, U.S. Pat. No. 5,698,685; Summerton et ah, U.S. Pat. No. 5,166,315; Summerton et ah, U.S. Pat. No. 5,185,444; and Summerton et ah, U.S. Pat. No. 5,034,506). As used here, the term "morpholino" means a sugar surrogate having the following structure:

In certain embodiments, morpholinos may be modified, for example by adding or altering various substituent groups from the above morpholino structure. Such sugar surrogates are referred to herein as "modified morpholinos."

In certain embodiments, sugar surrogates comprise acyclic moieties. Examples of nucleosides and oligonucleotides comprising such acyclic sugar surrogates include but are not limited to: peptide nucleic acid ("PNA"), acyclic butyl nucleic acid (see, e.g., Kumar et ah, Org. Biomol. Chem., 2013, 11, 5853-5865), and nucleosides and oligonucleotides described in Manoharan et ah, WO2011/133876.

Many other bicyclic and tricyclic sugar and sugar surrogate ring systems are known in the art that can be used in modified nucleosides.

Modifications: Nucleosides

In some embodiments, the ASOs comprise nucleosides that comprise, or consist of, non-modified nucleosides, for example, adenine, guanine, uracil, thymine, or cytosine.

In one embodiment, the ASOs may comprise modified variants of nucleosides (i.e., provided that Watson-Crick base-pairing of the base nucleoside is not affected). In an embodiment, the ASOs may comprise modified A, modified C, modified G or modified U. In one embodiment, the modified ASOs may comprise, but are not limited to, modified C such as 5-methylcytosine, or 5-hydroxymethylcytosine, modified U such as 5-methyluridine or replacement with thymine, or modified A such as $N_6$-methyladenine. In one embodiment, the ASO may comprise a mixture of non-modified and modified nucleosides. For SEQ ID NOS; 4-546 set out herein, whilst shown with non-modified nucleosides, the present invention also embraces modified variants of the nucleosides.

In certain embodiments, oligonucleotides comprise one or more nucleosides comprising an unmodified nucleobase. In certain embodiments, modified oligonucleotides comprise one or more nucleosides comprising a modified nucleobase. In certain embodiments, modified oligonucleotides comprise one or more nucleosides that does not comprise a nucleobase, referred to as an abasic nucleoside.

The polynucleotide (e.g., ASO) of the present disclosure may comprise a nucleoside modification. One or more atoms of a pyrimidine nucleobase may be replaced or substituted, for example, with optionally substituted amino, optionally substituted thiol, optionally substituted alkyl (e.g., methyl or ethyl), optionally substituted or halo (e.g., chloro or fluoro) atoms or groups.

As non-limiting examples, the uracil nucleosides of the polynucleotide (e.g. ASO) of the present disclosure are all modified. The modifications may be the same or different. In some embodiments, the guanine nucleosides of the polynucleotide (e.g., ASO) of the present disclosure are all modified. The modifications may be the same or different. In some embodiments, the guanine nucleosides of the polynucleotide (e.g., ASO) of the present disclosure are all modified. The modifications may be the same or different. In some embodiments, the cytosine nucleosides of the polynucleotide (e.g., ASO) of the present disclosure are all modified. The modifications may be the same or different. In some embodiments, the adenine nucleosides of the polynucleotide (e.g., ASO) of the present disclosure are all modified. The modifications may be the same or different.

Modifications: Nucleobases

The modified nucleosides and nucleotides can include a modified nucleobase. Examples of nucleobases in RNA include, but are not limited to, adenine (A), guanine (G), cytosine (C), and uracil (U). Examples of nucleobases in DNA include, but are not limited to, adenine (A), guanine (G), cytosine (C), and thymine (T).

In some embodiments, the modified nucleobase is a modified uracil (U).

Exemplary nucleobases and nucleosides having a modified uracil include pseudouridine (ψ), pyridin-4-one ribonucleoside, 5-aza-uridine, 6-aza-uridine, 2-thio-5-aza-uridine, 2-thio-uridine ($s^2U$), 4-thio-uridine ($s^4U$), 4-thio-pseudouridine, 2-thio-pseudouridine, 5-hydroxy-uridine ($ho^5U$), 5-aminoallyl-uridine, 5-halo-uridine (e.g., 5-iodo-uridine ($I^5U$) or 5-bromo-uridine ($br^5U$)), 3-methyl-uridine ($m^3U$), 5-methoxy-uridine ($mo^5U$), uridine 5-oxyacetic acid ($cmo^5U$), uridine 5-oxyacetic acid methyl ester ($mcmo^5U$), 5-carboxymethyl-uridine ($cm^5U$), 1-carboxymethyl-pseudouridine, 5-carboxyhydroxymethyl-uridine ($chm^5U$), 5-carboxyhydroxymethyl-uridine methyl ester ($mchm^5U$), 5-methoxycarbonylmethyl-uridine ($mcm^5U$), 5-methoxycarbonylmethyl-2-thio-uridine ($mcm^5s^2U$), 5-aminomethyl-2-thio-uridine ($nm^5s^2U$), 5-methylaminomethyl-uridine ($mnm^5U$), 5-methylaminomethyl-2-thio-uridine ($mnm^5s^2U$), 5-methylaminomethyl-2-seleno-uridine ($mnm^5se^2U$), 5-carbamoylmethyl-uridine ($ncm^5U$), 5-carboxymethylaminomethyl-uridine ($cmnm^5U$), 5-carboxymethylaminomethyl-2-thio-uridine ($cmnm^5s^2U$), 5-propynyl-uridine, 1-propynyl-pseudouridine, 5-taurinomethyl-uridine ($τm^5U$), 1-taurinomethyl-pseudouridine, 5-taurinomethyl-2-thio-uridine ($τm^5s^2U$), 1-taurinomethyl-4-thio-pseudouridine, 5-methyl-uridine ($m^5U$, i.e., having the nucleobase deoxythymine), 1-methylpseudouridine ($m^1ψ$), 5-methyl-2-thio-uridine ($m^5s^2U$), pseudouracil (ψ), 1-methyl-4-thio-pseudouridine ($m^1s^4ψ$), 4-thio-1-methyl-pseudouridine, 3-methyl-pseudouridine ($m^3ψ$), 2-thio-1-methyl-pseudouridine, 1-methyl-1-deaza-pseudouridine, 2-thio-1-methyl-1-deaza-pseudouridine, dihydrouridine (D), dihydropseudouridine, 5,6-dihydrouridine, 5-methyl-dihydrouridine ($m^5D$), 2-thio-dihydrouridine, 2-thio-dihydropseudouridine, 2-methoxy-uridine, 2-methoxy-4-thio-uridine, 4-methoxy-pseudouridine, 4-methoxy-2-thio-pseudouridine, N1-methyl-pseudouridine (also known as 1-methylpseudouridine ($m^1ψ$)), 3-(3-amino-3-carboxypropyl)uridine ($acp^3U$), 1-methyl-3-(3-amino-3-carboxypropyl)pseudouridine ($acp^3ψ$), 5-(isopentenylaminomethyl)uridine ($inm^5U$), 5-(isopentenylaminomethyl)-2-thio-uridine ($inm^5s^2U$), α-thio-uridine, 2'-O-methyl-uridine (Um), 5,2'-O-dimethyl-uridine ($m^5Um$), 2'-O-methyl-pseudouridine (ψm), 2-thio-2'-O-methyl-uridine ($s^2Um$), 5-methoxycarbonylmethyl-2'-O-methyl-uridine ($mcm^5Um$), 5-carbamoylmethyl-2'-O-methyl-uridine ($ncm^5Um$), 5-carboxymethylaminomethyl-2'-O-methyl-uridine ($cmnm^5Um$), 3,2'-0-dimethyl-uridine ($m^3Um$), 5-(isopentenylaminomethyl)-2'-O-methyl-uridine ($inm^5Um$), 1-thio-uridine, deoxythymidine, 2'-F-ara-uridine, 2'-F-uridine, 2'-OH-ara-uridine, 5-(2-carbomethoxyvinyl) uridine, and 5-[3-(1-E-propenylamino)uridine.

In some embodiments, the modified nucleobase is a modified cytosine (C).

Exemplary nucleobases and nucleosides having a modified cytosine include 5-aza-cytidine, 6-aza-cytidine, pseudoisocytidine, 3-methyl-cytidine ($m^3C$), N4-acetyl-cytidine ($ac^4C$), 5-formyl-cytidine ($f^5C$), N4-methyl-cytidine ($m^4C$), 5-methyl-cytidine ($m^5C$), 5-halo-cytidine (e.g., 5-iodo-cytidine), 5-hydroxymethyl-cytidine ($hm^5C$), 1-methyl-pseudoisocytidine, pyrrolo-cytidine, pyrrolo-pseudoisocytidine, 2-thio-cytidine ($s^2C$), 2-thio-5-methyl-cytidine, 4-thio-pseudoisocytidine, 4-thio-1-methyl-pseudoisocytidine, 4-thio-1-methyl-1-deaza-pseudoisocytidine, 1-methyl-1-deaza-pseudoisocytidine, zebularine, 5-aza-zebularine, 5-methyl-zebularine, 5-aza-2-thio-zebularine, 2-thio-zebularine, 2-methoxy-cytidine, 2-methoxy-5-methyl-cytidine, 4-methoxy-pseudoisocytidine, 4-methoxy-1-methyl-pseudoisocytidine, lysidine ($k_2C$), α-thio-cytidine, 2'-O-methyl-cytidine (Cm), 5,2'-O-dimethyl-cytidine ($m^5Cm$), N4-acetyl-2'-O-methyl-cytidine ($ac^4Cm$), N4,2'-O-dimethyl-cytidine ($m^4Cm$), 5-formyl-2'-O-methyl-cytidine ($f^5Cm$), N4,N4,2'-O-trimethyl-cytidine ($m^4{}_2Cm$), 1-thio-cytidine, 2'-F-ara-cytidine, 2'-F-cytidine, and 2'-OH-ara-cytidine.

In some embodiments, the modified nucleobase is a modified adenine (A).

Exemplary nucleobases and nucleosides having a modified adenine include 2-amino-purine, 2, 6-diaminopurine, 2-amino-6-halo-purine (e.g., 2-amino-6-chloro-purine), 6-halo-purine (e.g., 6-chloro-purine), 2-amino-6-methyl-purine, 8-azido-adenosine, 7-deaza-adenine, 7-deaza-8-aza-adenine, 7-deaza-2-amino-purine, 7-deaza-8-aza-2-amino-purine, 7-deaza-2,6-diaminopurine, 7-deaza-8-aza-2,6-diaminopurine, 1-methyl-adenosine ($m^1A$), 2-methyl-adenine ($m^2A$), N6-methyl-adenosine ($m^6A$), 2-methylthio-N6-methyl-adenosine ($ms^2m^6A$), N6-isopentenyl-adenosine ($i^6A$), 2-methylthio-N6-isopentenyl-adenosine ($ms^2i^6A$), N6-(cis-hydroxyisopentenyl)adenosine ($io^6A$), 2-methylthio-N6-(cis-hydroxyisopentenyl)adenosine ($ms^2io^6A$), N6-glycinylcarbamoyl-adenosine ($g^6A$), N6-threonylcarbamoyl-adenosine ($t^6A$), N6-methyl-N6-threonylcarbamoyl-adenosine ($m^6t^6A$), 2-methylthio-N6-threonylcarbamoyl-adenosine ($ms^2g^6A$), N6,N6-dimethyl-adenosine ($m^6{}_2A$), N6-hydroxynorvalylcarbamoyl-adenosine ($hn^6A$), 2-methylthio-N6-hydroxynorvalylcarbamoyl-adenosine ($ms^2hn^6A$), N6-acetyl-adenosine ($ac^6A$), 7-methyl-adenine, 2-methylthio-adenine, 2-methoxy-adenine, α-thio-adenosine, 2'-O-methyl-adenosine (Am), N6,2'-O-dimethyl-adenosine ($m^6Am$), N6,N6,2'-O-trimethyl-adenosine ($m^6{}_2Am$), 1,2'-O-dimethyl-adenosine ($m^1Am$), 2'-O-ribosyladenosine (phosphate) (Ar(p)), 2-amino-N6-methyl-purine, 1-thio-adenosine, 8-azido-adenosine, 2'-F-ara-adenosine, 2'-F-adenosine, 2'-OH-ara-adenosine, and N6-(19-amino-pentaoxanonadecyl)-adenosine.

In some embodiments, the modified nucleobase is a modified guanine (G).

Exemplary nucleobases and nucleosides having a modified guanine include inosine (I), 1-methyl-inosine ($m^1I$), wyosine (imG), methylwyosine (mimG), 4-demethyl-wyosine (imG-14), isowyosine (imG2), wybutosine (yW), peroxywybutosine ($o_2yW$), hydroxywybutosine (OHyW), undermodified hydroxywybutosine (OHyW*), 7-deaza-guanosine, queuosine (Q), epoxyqueuosine (oQ), galactosyl-queuosine (galQ), mannosyl-queuosine (manQ), 7-cyano-7-deaza-guanosine ($preQ_0$), 7-aminomethyl-7-deaza-guanosine ($preQ_1$), archaeosine ($G^+$), 7-deaza-8-aza-guanosine, 6-thio-guanosine, 6-thio-7-deaza-guanosine, 6-thio-7-deaza-8-aza-guanosine, 7-methyl-guanosine ($m^7G$), 6-thio-7-methyl-guanosine, 7-methyl-inosine, 6-methoxy-guanosine, 1-methyl-guanosine ($m^1G$), N2-methyl-guanosine ($m^2G$), N2,N2-dimethyl-guanosine ($m^2{}_2G$), N2,7-dimethyl-guanosine ($m^{2,7}G$), N2, N2,7-dimethyl-guanosine ($m^{2,2,7}G$), 8-oxo-guanosine, 7-methyl-8-oxo-guanosine, 1-methyl-6-thio-guanosine, N2-methyl-6-thio-guanosine, N2,N2-dimethyl-6-thio-guanosine, α-thioguanosine, 2'-O-methyl-guanosine (Gm), N2-methyl-2'-O-methyl-guanosine (m²Gm), N2,N2-dimethyl-2'-O-methyl-guanosine (m²₂Gm), 1-methyl-2'-O-methyl-guanosine (m¹Gm), N2,7-dimethyl-2'-O-methyl-guanosine (m²,⁷Gm), 2'-O-methyl-inosine (Im), 1,2'-O-dimethyl-inosine (m¹Im), and 2'-O-ribosylguanosine (phosphate) (Gr(p)).

In some embodiments, the nucleobase of the nucleotide can be independently selected from a purine, a pyrimidine, a purine or pyrimidine analog. The nucleobase and/or analog may be each be independently selected from adenine, cytosine, guanine, thymine, uracil, naturally-occurring and synthetic derivatives of a base, including but not limited to pyrazolo[3,4-d]pyrimidines, 5-methylcytosine (5-me-C), 5-hydroxymethyl cytosine, xanthine, hypoxanthine, 2-aminoadenine, 6-methyl and other alkyl derivatives of adenine and guanine, 2-propyl and other alkyl derivatives of adenine and guanine, 2-thiouracil, 2-thiothymine and 2-thiocytosine, 5-propynyl uracil and cytosine, 6-azo uracil, cytosine and thymine, 5-uracil (pseudouracil), 4-thiouracil, 8-halo (e.g., 8-bromo), 8-amino, 8-thiol, 8-thioalkyl, 8-hydroxyl and other 8-substituted adenines and guanines, 5-halo particularly 5-bromo, 5-trifluoromethyl and other 5-substituted uracils and cytosines, 7-methylguanine and 7-methyladenine, 8-azaguanine and 8-azaadenine, deazaguanine, 7-deazaguanine, 3-deazaguanine, deazaadenine, 7-deazaadenine, 3-deazaadenine, pyrazolo[3,4-d]pyrimidine, imidazo[1,5-a]1,3,5 triazinones, 9-deazapurines, imidazo[4,5-d]pyrazines, thiazolo[4,5-d]pyrimidines, pyrazin-2-ones, 1,2,4-triazine, pyridazine; and 1,3,5 triazine.

In certain embodiments, modified nucleobases are selected alone or in combination from: 5-substituted pyrimidines, 6-azapyrimidines, alkyl or alkynyl substituted pyrimidines, alkyl substituted purines, and N-2, N-6 and O-6 substituted purines. In certain embodiments, modified nucleobases are selected from: 2-aminopropyladenine, 5-hydroxymethyl cytosine, xanthine, hypoxanthine, 2-aminoadenine, 6-N-methylguanine, 6-N-methyladenine, 2-propyl adenine, 2-thiouracil, 2-thiothymine and 2-thiocytosine, 5-propynyl (—C≡C—CH) uracil, 5-propynylcytosine, 6-azouracil, 6-azocytosine, 6-azothymine, 5-ribosyluracil (pseudouracil), 4-thiouracil, 8-halo, 8-amino, 8-thiol, 8-thioalkyl, 8-hydroxyl, 8-aza and other 8-substituted purines, 5-halo, particularly 5-bromo, 5-trifluoromethyl, 5-halouracil, and 5-halocytosine, 7-methylguanine, 7-methyladenine, 2-F-adenine, 2-aminoadenine, 7-deazaguanine, 7-deazaadenine, 3-deazaguanine, 3-deazaadenine, 6-N-benzoyladenine, 2-N-isobutyrylguanine, 4-N-benzoylcytosine, 4-N-benzoyluracil, 5-methyl 4-N-benzoylcytosine, 5-methyl 4-N-benzoyluracil, universal bases, hydrophobic bases, promiscuous bases, size-expanded bases, and fluorinated bases. Further modified nucleobases include tricyclic pyrimidines, such as 1,3-diazaphenoxazine-2-one, 1,3-diazaphenothiazine-2-one and 9-(2-aminoethoxy)-1,3-diazaphenoxazine-2-one (G-clamp). Modified nucleobases may also include those in which the purine or pyrimidine base is replaced with other heterocycles, for example 7-deazaadenine, 7-deazaguanosine, 2-aminopyridine and 2-pyridone. Further nucleobases include those disclosed in Merigan et al., U.S. Pat. No. 3,687,808, those disclosed in The Concise Encyclopedia Of Polymer Science And Engineering, Kroschwitz, J. I., Ed., John Wiley & Sons, 1990, 858-859; Englisch et ah, Angewandte Chemie, International Edition, 1991, 30, 613; Sanghvi, Y. S., Chapter 15, Antisense Research and Applications, Crooke, S. T. and Lebleu, B., Eds., CRC Press, 1993, 273-288; and those disclosed in Chapters 6 and 15, Antisense Drug Technology, Crooke S. T., Ed., CRC Press, 2008, 163-166 and 442-443.

Publications that teach the preparation of certain of the above noted modified nucleobases as well as other modified nucleobases include without limitation, Manoharan et al., US2003/0158403; Manoharan et al., US2003/0175906; Dinh et ah, U.S. Pat. No. 4,845,205; Spielvogel et al., U.S. Pat. No. 5,130,302; Rogers et ah, U.S. Pat. No. 5,134,066; Bischofberger et al., U.S. Pat. No. 5,175,273; Urdea et ah, U.S. Pat. No. 5,367,066; Benner et ah, U.S. Pat. No. 5,432,272; Matteucci et ah, U.S. Pat. No. 5,434,257; Gmeiner et ah, U.S. Pat. No. 5,457,187; Cook et al., U.S. Pat. No. 5,459,255; Froehler et ah, U.S. Pat. No. 5,484,908; Matteucci et ah, U.S. Pat. No. 5,502,177; Hawkins et ah, U.S. Pat. No. 5,525,711; Haralambidis et al., U.S. Pat. No. 5,552,540; Cook et al., U.S. Pat. No. 5,587,469; Froehler et al., U.S. Pat. No. 5,594,121; Switzer et al., U.S. Pat. No. 5,596,091; Cook et ah, U.S. Pat. No. 5,614,617; Froehler et ah, U.S. Pat. No. 5,645,985; Cook et ah, U.S. Pat. No. 5,681,941; Cook et ah, U.S. Pat. No. 5,811,534; Cook et al., U.S. Pat. No. 5,750,692; Cook et ah, U.S. Pat. No. 5,948,903; Cook et ah, U.S. Pat. No. 5,587,470; Cook et ah, U.S. Pat. No. 5,457,191; Matteucci et al., U.S. Pat. No. 5,763,588; Froehler et ah, U.S. Pat. No. 5,830,653; Cook et ah, U.S. Pat. No. 5,808,027; Cook et al., 6,166,199; and Matteucci et al., U.S. Pat. No. 6,005,096.

Modifications: Internucleoside Linkages

In certain embodiments, nucleosides of modified oligonucleotides may be linked together using any internucleoside linkage. The two main classes of internucleoside linking groups are defined by the presence or absence of a phosphorus atom. Representative phosphorus-containing internucleoside linkages include but are not limited to phosphodiesters, which contain a phosphodiester bond, $P(O_2)$=O, (also referred to as unmodified or naturally occurring linkages); phosphotriesters; methylphosphonates; methoxypropylphosphonates ("MOP"); phosphoramidates; mesyl phosphoramidates; phosphorothioates ($P(O_2)$=S); and phosphorodithioates (HS—P=S). Representative non-phosphorus containing internucleoside linking groups include but are not limited to methylenemethylimino (—CH2-N(CH)-0-CH2-); thiodiester, thionocarbamate (—O—C(=O)(NH)—S—); siloxane (—O—SiH₂—O—); and N,N'-dimethylhydrazine (—CH₂—N(CH₃)—N(CH₃)—). Modified internucleoside linkages, compared to naturally occurring phosphate linkages, can be used to alter, typically increase, nuclease resistance of the oligonucleotide. In certain embodiments, internucleoside linkages having a chiral atom can be prepared as a racemic mixture, or as separate enantiomers. Methods of preparation of phosphorous-containing and non-phosphorous-containing internucleoside linkages are well known to those skilled in the art.

Representative internucleoside linkages having a chiral center include but are not limited to alkylphosphonates and phosphorothioates. Modified oligonucleotides comprising internucleoside linkages having a chiral center can be prepared as populations of modified oligonucleotides comprising stereorandom internucleoside linkages, or as populations of modified oligonucleotides comprising phosphorothioate internucleoside linkages in particular stereochemical configurations. In certain embodiments, populations of modified oligonucleotides comprise phosphorothioate internucleoside linkages wherein all of the phosphorothioate internucleoside linkages are stereorandom. Such modified oligonucleotides can be generated using synthetic methods that result in random selection of the stereochemical configuration of each phosphorothioate internucleoside linkage. Nonetheless, as is well understood by those of skill in the art, each individual phosphorothioate of each individual oligonucleotide molecule has a defined stereo configuration. In certain embodiments, populations of modified oligonucleotides are enriched for modified oligonucleotides comprising one or more particular phosphorothioate internucleoside linkages in a particular, independently selected stereochemical configuration. In certain embodiments, the particular configuration of the particular phosphorothioate internucleoside linkage is present in at least 65% of the molecules in the population. In certain embodiments, the particular configuration of the particular phosphorothioate internucleoside linkage is present in at least 70% of the molecules in the population. In certain embodiments, the particular configuration of the particular phosphorothioate internucleoside linkage is present in at least 80% of the molecules in the population. In certain embodiments, the particular configuration of the particular phosphorothioate internucleoside linkage is present in at least 90% of the molecules in the population. In certain embodiments, the particular configuration of the particular phosphorothioate internucleoside linkage is present in at least 99% of the molecules in the population. Such chirally enriched populations of modified oligonucleotides can be generated using synthetic methods known in the art, e.g., methods described in Oka et al, JACS, 2003, 125, 8307, Wan et al. Nuc. Acid. Res., 2014, 42, 13456, and WO 2017/015555. In certain embodiments, a population of modified oligonucleotides is enriched for modified oligonucleotides having at least one indicated phosphorothioate in the (Sp) configuration. In certain embodiments, a population of modified oligonucleotides is enriched for modified oligonucleotides having at least one phosphorothioate in the (Rp) configuration.

Unless otherwise indicated, chiral internucleoside linkages of modified oligonucleotides described herein can be stereorandom or in a particular stereochemical configuration.

Neutral internucleoside linkages include, without limitation, phosphotriesters, methylphosphonates, MMI (3'-CH2-N(CH3)-O-5'), amide-3 (3'-CH2-C(=O)—N(H)-5'), amide-4 (3'-CH2-N(H)—C(=O)-5'), formacetal (3'-O-CH2-O-5'), methoxypropyl, and thioformacetal (3'-S-CH2-O-5'). Further neutral internucleoside linkages include nonionic linkages comprising siloxane (dialkylsiloxane), carboxylate ester, carboxamide, sulfide, sulfonate ester and amides (see e.g., Carbohydrate Modifications in Antisense Research, Y. S. Sanghvi and P. D. Cook, Eds., ACS Symposium Series 580; Chapters 3 and 4, 40-65). Further neutral internucleoside linkages include nonionic linkages comprising mixed N, O, S and CH2 component parts.

In certain embodiments, a modified internucleoside linkage is any of those described in WO 2021/030778, incorporated by reference herein.

Modifications: Backbone Phosphate Groups

Backbone phosphate groups can be modified by replacing one or more of the oxygen atoms with a different substituent. Further, the modified nucleosides and nucleotides can include the wholesale replacement of an unmodified phosphate moiety with another internucleoside linkage as described herein. Examples of modified phosphate groups include, but are not limited to, phosphorothioate, methylphosphonates phosphoroselenates, boranophosphates, boranophosphate esters, hydrogen phosphonates, phosphoramidates, phosphorodiamidates, alkyl or aryl phosphonates, and phosphotriesters. Phosphorodithioates have both non-linking oxygens replaced by sulfur. The phosphate linker can also be modified by the replacement of a linking oxygen with nitrogen (bridged phosphoramidates), sulfur (bridged phosphorothioates), and carbon (bridged methylene-phosphonates).

The α-thio substituted phosphate moiety is provided to confer stability to RNA and DNA polynucleotides through the unnatural phosphorothioate backbone linkages. Phosphorothioate DNA and RNA have increased nuclease resistance and subsequently a longer half-life in a cellular environment. Phosphorothioate linked polynucleotide molecules are expected to also reduce the innate immune response through weaker binding/activation of cellular innate immune molecules.

In some embodiments, the polynucleotides (e.g., ASO(s)) of the present disclosure comprise at least one phosphorothioate linkage, methylphosphonate linkage between nucleotides, 5'-(E)-vinylphosphonate (5'-E-VP), a phosphate mimic, as a modification.

The ASO defined herein may have any suitable backbone (i.e., any suitable nucleoside linkage and/or any suitable nucleoside, wherein the nucleoside may have any suitable sugar and/or any suitable nucleobase). In an embodiment, the ASO defined herein is resistant to RNase H cleavage. In an embodiment, the ASO may be a steric block ASO. In an embodiment, the ASO may be resistant to cleavage and/or a poor substrate for RNase H when bound to a crucial element or target sequence. In an embodiment, the ASO does not cause degradation of the UNC13A pre-mRNA or mRNA.

In one embodiment, the backbone is formed from RNA (alternating phosphate and ribose), LNA (locked nucleic acid), tcDNA (tri-cyclo DNA), cEt (constrained ethyl bridged nucleic acid); ENA (ethylene-bridged nucleic acid), HNA (hexitol nucleic acids), TNA (threose nucleic acid), PMO (phosphorodiamidate morpholino oligomer) PMO, PNA (peptide nucleic acid), 2-OMe-RNA, 2'-O-methoxyethyl (MOE) nucleic acids, or 2-O-(2-methylcarbomoyl (MCE) nucleotides, or any combination thereof. The ASO may further comprise a portion of DNA nucleotides, for example, at least 10%, or at least 20%, or at least 30%, or at least 40%, or at least 50%, or at least 60%, or up to 70% of DNA nucleotides, i.e., in combination with LNA, tcDNA, cET, ENA, HNA, TNA, PMO, PNA, 2'-OMe-RNA, 2'-O-methoxyethyl (MOE) nucleic acids or MCE nucleotides. The backbone may consist entirely of one nucleotide, or a mixture of one or more nucleotides. In an embodiment, the ASO has a bridged nucleic acid (i.e., locked or constrained) backbone, for example, LNA, cET or ENA backbone. These backbones may have good stability, high binding constants with RNA and/or resistance to RNase H cleavage. In some embodiments, the ASO comprises a phosphate (i.e., phosphodiester) nucleotide linkage. In some embodiments, the ASO comprises a phosphorodiamidate nucleotide linkage. other embodiments, the ASO comprises a phosphorothioate nucleotide linkage (i.e., otherwise known as a PS-ASO).

In some embodiments, the ASO comprises LNA, i.e., comprising LNA and DNA and more particularly phosphorothioate LNA and DNA. In some examples, disclosed herein, the ASO comprises LNA or 2-OMe-RNA.

In some examples, the ASO comprises only a portion of a bridged nucleic acid, such as LNA. In some examples, the ASO comprises from about 20-60% bridged nucleic acid (e.g., LNA), or preferably from about 30-50% bridged nucleic acid (e.g., LNA). In some embodiments, the ASO having an LNA backbone comprises bridge nucleic acids (e.g., LNA bases) in combination with DNA bases. In some examples, the ASO comprises at least 20% bridged nucleic acids (e.g., LNA) or at least 30%, or at least 40% bridged nucleic acids (e.g., LNA). In some examples, the ASO comprises less than 100% bridged nucleic acids (e.g., LNA), or less than 90%, or less than 80%, or less than 70%, or less than 60%, or less than 50% bridged nucleic acids (e.g., LNA). In some embodiments, the ASO comprises a bridged nucleic acid (e.g., LNA) at least or equal to every 3 nucleotides, or at least or equal to every 2 nucleotides.

In some examples, the ASO comprises 2-OMe-RNA. In some examples, the ASO comprises 100% 2-OMe-RNA, more particularly 100% phosphorothioated 2-OMe-RNA. In some embodiments, the ASO comprises only a portion of 2-OMe-RNA.

In an embodiment, the ASO has an RNA backbone. While the ASO sequences/portions of ASO sequences provided with the sequence listing herein have an RNA backbone, any other suitable backbone may be used provided the nucleoside sequence is the same (as is elsewhere described herein, in the ASOs disclosed herein "U" and "T" nucleosides, e.g. uracil or thymine, may be used interchangeably. Therefore "U" in any of the ASO sequences described herein (e.g., including SEQ ID NOS: 4-546) may be replaced by "T").

Modifications: Motifs

Different sugar modifications, nucleobase modifications, and/or internucleoside linkages (e.g., backbone structures) may be introduced at various positions in a polynucleotide (e.g., ASO) described herein. One of ordinary skill in the art will appreciate that the nucleotide analogs or other modification(s) may be located at any position(s) of a polynucleotide (e.g., ASO) such that the function of the polynucleotide (e.g., ASO) is not substantially decreased.

Modifications: Sugar Motifs

In certain embodiments, oligonucleotides comprise one or more type of modified sugar and/or unmodified sugar moiety arranged along the oligonucleotide, or portion thereof, in a defined pattern or sugar motif. In certain instances, such sugar motifs include but are not limited to any of the sugar modifications discussed herein.

Certain modified oligonucleotides have a gapmer motif, which is defined by two external regions or "wings" and a central or internal region or "gap." The three regions of a gapmer motif (the 5'-wing, the gap, and the 3'-wing) form a contiguous sequence of nucleosides wherein at least some of the sugar moieties of the nucleosides of each of the wings differ from at least some of the sugar moieties of the nucleosides of the gap. Specifically, at least the sugar moieties of the nucleosides of each wing that are closest to the gap (the 3'-most nucleoside of the 5'-wing and the 5'-most nucleoside of the 3'-wing) differ from the sugar moiety of the neighboring gap nucleosides, thus defining the boundary between the wings and the gap (i.e., the wing/gap junction). In certain embodiments, the sugar moieties within the gap are the same as one another. In certain embodiments, the gap includes one or more nucleoside having a sugar moiety that differs from the sugar moiety of one or more other nucleosides of the gap. In certain embodiments, the sugar motifs of the two wings are the same as one another (symmetric gapmer). In certain embodiments, the sugar motif of the 5'-wing differs from the sugar motif of the 3'-wing (asymmetric gapmer). In certain embodiments, modified oligonucleotides of the present invention are not gapmers.

In certain embodiments, the wings of a gapmer comprise 1-6 nucleosides. In certain embodiments, each nucleoside of each wing of a gapmer comprises a modified sugar moiety. In certain embodiments, at least one, at least two, at least three, at least four, at least five, or at least six nucleosides of each wing of a gapmer comprises a modified sugar moiety.

In certain embodiments, the gap of a gapmer comprises 7-12 nucleosides. In certain embodiments, each nucleoside of the gap of a gapmer comprises a 2'-deoxyribosyl sugar moiety. In certain embodiments, at least one nucleoside of the gap of a gapmer comprises a modified sugar moiety and each remaining nucleoside comprises a 2'-deoxyribosyl sugar moiety.

Herein, the lengths (number of nucleosides) of the three regions of a gapmer may be provided using the notation [# of nucleosides in the 5'-wing]-[# of nucleosides in the gap]-[# of nucleosides in the 3'-wing] Thus, a 5-10-5 gapmer consists of 5 linked nucleosides in each wing and 10 linked nucleosides in the gap. Where such nomenclature is followed by a specific modification, that modification is the modification in each sugar moiety of each wing and the gap nucleosides comprise a 2'-deoxyribosyl sugar moiety. Thus, a 5-10-5 MOE gapmer consists of 5 linked 2'-MOE nucleosides in the 5'-wing, 10 linked 2'-deoxyribonucleosides in the gap, and 5 linked 2'-MOE nucleosides in the 3'-wing.

In certain embodiments, each nucleoside of a modified oligonucleotide, or portion thereof, comprises a 2'-substituted sugar moiety, a bicyclic sugar moiety, a sugar surrogate, or a 2'-deoxyribosyl sugar moiety. In certain embodiments, the 2'-substituted sugar moiety is selected from a 2'-MOE sugar moiety, a 2'-NMA sugar moiety, a 2'-OMe sugar moiety, and a 2'-F sugar moiety. In certain embodiments, the bicyclic sugar moiety is selected from a cEt sugar moiety and an LNA sugar moiety. In certain embodiments, the sugar surrogate is selected from morpholino, modified morpholino, PNA, THP, and F-HNA.

In certain embodiments, modified oligonucleotides comprise at least 12, at least 13, at least 14, at least 15, at least 16, at least 17, at least 18, at least 19, or at least 20 nucleosides comprising a modified sugar moiety. In certain embodiments, the modified sugar moiety is selected independently from a 2'-substituted sugar moiety, abicyclic sugar moiety, or a sugar surrogate. In certain embodiments, the 2'-substituted sugar moiety is selected from a 2'-MOE sugar moiety, a 2'-NMA sugar moiety, a 2'-OMe sugar moiety, and a 2'-F sugar moiety. In certain embodiments, the bicyclic sugar moiety is selected from a cEt sugar moiety and an LNA sugar moiety. In certain embodiments, the sugar surrogate is selected from morpholino, modified morpholino, THP, and F-HNA.

In certain embodiments, each nucleoside of a modified oligonucleotide comprises a modified sugar moiety ("fully modified oligonucleotide"). In certain embodiments, each nucleoside of a fully modified oligonucleotide comprises a 2'-substituted sugar moiety, abicyclic sugar moiety, or a sugar surrogate. In certain embodiments, the 2'-substituted sugar moiety is selected from a 2'-MOE sugar moiety, a 2'-NMA sugar moiety, a 2'-OMe sugar moiety, and a 2'-F sugar moiety. In certain embodiments, the bicyclic sugar moiety is selected from a cEt sugar moiety and an LNA sugar moiety. In certain embodiments, the sugar surrogate is selected from morpholino, modified morpholino, THP, and F-HNA. In certain embodiments, each nucleoside of a fully modified oligonucleotide comprises the same modified sugar moiety ("uniformly modified sugar motif"). In certain embodiments, the uniformly modified sugar motif is 7 to 20 nucleosides in length. In certain embodiments, each nucleoside of the uniformly modified sugar motif comprises a 2'-substituted sugar moiety, abicyclic sugar moiety, or a sugar surrogate. In certain embodiments, the 2'-substituted sugar moiety is selected from a 2'-MOE sugar moiety, a 2'-NMA sugar moiety, a 2'-OMe sugar moiety, and a 2'-F sugar moiety. In certain embodiments, the bicyclic sugar moiety is selected from a cEt sugar moiety and an LNA sugar moiety. In certain embodiments, the sugar surrogate is selected from morpholino, modified morpholino, THP, and F-HNA.

In certain embodiments, modified oligonucleotides have a sugar motif comprising at least 1, at least 2, at least 3, or at least 42'-deoxyribonucleosides, but are otherwise fully modified. In certain embodiments, modified oligonucleotides having at least one fully modified sugar motif may also comprise not more than 1, not more than 2, not more than 3, or not more than 42'-deoxyribonucleosides. In certain embodiments, modified oligonucleotides having at least one fully modified sugar motif may also comprise exactly 1, exactly 2, exactly 3, or exactly 42'-deoxyribonucleosides. In certain embodiments, modified oligonucleotides comprise more than 42'-deoxyribonucleosides, provided they do not include a region comprising 4 or more contiguous 2'-deoxyribonucleosides Modifications: Nucleobase Motifs In certain embodiments, the ASOs or oligonucleotides comprise modified and/or unmodified nucleobases arranged along the ASO or oligonucleotide, or portion thereof, in a defined pattern or motif. In certain embodiments, each nucleobase is modified. In certain embodiments, none of the nucleobases are modified. In certain embodiments, each purine or each pyrimidine is modified. In certain embodiments, each adenine is modified. In certain embodiments, each guanine is modified. In certain embodiments, each thymine is modified. In certain embodiments, each uracil is modified. In certain embodiments, each cytosine is modified. In certain embodiments, some or all of the cytosine nucleobases in a modified oligonucleotide are 5-methyl cytosines. In certain embodiments, all of the cytosine nucleobases are 5-methyl cytosines and all of the other nucleobases of the modified oligonucleotide are unmodified nucleobases.

In certain embodiments, modified ASOs or oligonucleotides comprise a block of modified nucleobases. In certain such embodiments, the block is at the 3'-end of the oligonucleotide. In certain embodiments the block is within 3 nucleosides of the 3'-end of the oligonucleotide. In certain embodiments, the block is at the 5'-end of the oligonucleotide. In certain embodiments the block is within 3 nucleosides of the 5'-end of the oligonucleotide. In certain embodiments, oligonucleotides having a gapmer motif comprise a nucleoside comprising a modified nucleobase. In certain such embodiments, one nucleoside comprising a modified nucleobase is in the central gap of an oligonucleotide having a gapmer motif. In certain such embodiments, the sugar moiety of the nucleoside is a 2'-deoxyribosyl sugar moiety. In certain embodiments, the modified nucleobase is selected from: a 2-thiopyrimidine and a 5-propynepyrimidine.

Modifications: Internucleoside Linkage Motifs

In certain embodiments, ASOs or oligonucleotides comprise modified and/or unmodified internucleoside linkages arranged along the oligonucleotide, or portion thereof, in a defined pattern or motif. In certain embodiments, each internucleoside linking group is a phosphodiester internucleoside linkage. In certain embodiments, each internucleoside linking group of a modified oligonucleotide is a phosphorothioate internucleoside linkage. In certain embodiments, each internucleoside linkage of a modified oligonucleotide is independently selected from a phosphorothioate internucleoside linkage and phosphodiester internucleoside linkage. In certain embodiments, each phosphorothioate internucleoside linkage is independently selected from a stereorandom phosphorothioate, a (Sp) phosphorothioate, and a (Rp) phosphorothioate. In certain embodiments, the sugar motif of a modified oligonucleotide is a gapmer and the internucleoside linkages within the gap are all modified. In certain such embodiments, some or all of the internucleoside linkages in the wings are unmodified phosphodiester internucleoside linkages. In certain embodiments, the terminal internucleoside linkages are modified. In certain embodiments, the sugar motif of a modified oligonucleotide is a gapmer, and the internucleoside linkage motif comprises at least one phosphodiester internucleoside linkage in at least one wing, wherein the at least one phosphodiester internucleoside linkage is not a terminal internucleoside linkage, and the remaining internucleoside linkages are phosphorothioate internucleoside linkages. In certain such embodiments, all of the phosphorothioate internucleoside linkages are stereorandom. In certain embodiments, all of the phosphorothioate internucleoside linkages in the wings are (Sp) phosphorothioates, and the gap comprises at least one Sp, Sp, Rp motif. In certain embodiments, populations of modified oligonucleotides are enriched for modified oligonucleotides comprising such internucleoside linkage motifs.

In certain embodiments, modified oligonucleotides comprise at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, or at least 19 phosphodiester internucleoside linkages. In certain embodiments, modified oligonucleotides comprise at least 1, at least 2, at least 3, at least 4, at least 5, at least 6, at least 7, at least 8, at least 9, at least 10, at least 11, at least 12, at least 13, at least 14, at least 15, at least 16, at least 17, at least 18, or at least 19 phosphorothioate internucleoside linkages. In certain embodiments, modified oligonucleotides comprise at least 1, at least 2, at least 3, at least 4, or at least 5 phosphodiester internucleoside linkages and the remainder of the internucleoside linkages are phosphorothioate internucleoside linkages.

Conjugates

In certain embodiments, ASOs or oligonucleotides are covalently attached to one or more conjugate groups. In certain embodiments, conjugate groups modify one or more properties of the attached oligonucleotide, including but not limited to pharmacodynamics, pharmacokinetics, stability, binding, absorption, tissue distribution, cellular distribution, cellular uptake, charge, and clearance. In certain embodiments, conjugate groups impart a new property on the attached oligonucleotide, e.g., fluorophores or reporter groups that enable detection of the oligonucleotide. Certain conjugate groups and conjugate moieties have been described previously, for example: cholesterol moiety (Letsinger et al., Proc. Natl. Acad. Sci. USA, 1989, 86, 6553-6556), cholic acid (Manoharan et al., Bioorg. Med. Chem. Lett., 1994, 4, 1053-1060), a thioether, e.g., hexyl-S-tritylthiol (Manoharan et al., Ann. N. Y. Acad. Sci., 1992, 660, 306-309; Manoharan et al., Bioorg. Med. Chem. Lett., 1993, 3, 2765-2770), a thiocholesterol (Oberhauser et al., Nucl. Acids Res., 1992, 20, 533-538), an aliphatic chain, e.g., do-decan-diol orundecyl residues (Saison-Behmoaras et al., EMBO J., 1991, 10, 1111-1118; Kabanov et al., FEBS Lett., 1990, 259, 327-330; Svinarchuk et al., Biochimie, 1993, 75, 49-54), a phospholipid, e.g., di-hexadecyl-rac-glycerol or triethyl-ammonium 1,2-di-0-hexadecyl-rac-glycero-3-H-phosphonate (Manoharan et al., Tetrahedron Lett., 1995, 36, 3651-3654; Shea et al., Nucl. Acids Res., 1990, 18, 3777-3783), a polyamine or a polyethylene glycol chain (Manoharan et al., Nucleosides & Nucleotides, 1995, 14, 969-973), or adamantane acetic acid a palmityl moiety (Mishra et al., Biochim. Biophys. Acta, 1995, 1264, 229-237), an octadecylamine or hexylamino-carbonyl-oxycholesterol moiety (Crooke et al., J. Pharmacol. Exp. Ther., 1996, 277, 923-937), a tocopherol group (Nishina et al., Molecular Therapy Nucleic Acids, 2015, 4, e220; and Nishina et al., Molecular Therapy, 2008, 16, 734-740), or a GalNAc cluster {e.g., WO2014/179620).

Conjugate moieties include, without limitation, intercalators, reporter molecules, polyamines, polyamides, peptides, carbohydrates, vitamin moieties, polyethylene glycols, thioethers, polyethers, cholesterols, thiocholesterols, cholic acid moieties, folate, lipids, lipophilic groups, phospholipids, biotin, phenazine, phenanthridine, anthraquinone, adamantane, acridine, fluoresceins, rhodamines, coumarins, fluorophores, and dyes.

In certain embodiments, a conjugate moiety comprises an active drug substance, for example, aspirin, warfarin, phenylbutazone, ibuprofen, suprofen, fen-bufen, ketoprofen, (S')-(+)-pranoprofcn. carprofen, dansylsarcosine, 2,3,5-triiodobenzoic acid, fingolimod, flufenamic acid, folinic acid, a benzothiadiazide, chlorothiazide, a diazepine, indomethicin, a barbiturate, a cephalosporin, a sulfa drug, an antidiabetic, an antibacterial, or an antibiotic.

Conjugate Linkers

Conjugate moieties are attached to oligonucleotides through conjugate linkers. In certain oligomeric compounds, the conjugate linker is a single chemical bond (i.e., the conjugate moiety is attached directly to an oligonucleotide through a single bond). In certain oligomeric compounds, a conjugate moiety is attached to an oligonucleotide via a more complex conjugate linker comprising one or more conjugate linker moieties, which are subunits making up a conjugate linker. In certain embodiments, the conjugate linker comprises a chain structure, such as a hydrocarbyl chain, or an oligomer of repeating units such as ethylene glycol, nucleosides, or amino acid units.

In certain embodiments, a conjugate linker comprises one or more groups selected from alkyl, amino, oxo, amide, disulfide, polyethylene glycol, ether, thioether, and hydroxylamino. In certain such embodiments, the conjugate linker comprises groups selected from alkyl, amino, oxo, amide and ether groups. In certain embodiments, the conjugate linker comprises groups selected from alkyl and amide groups. In certain embodiments, the conjugate linker comprises groups selected from alkyl and ether groups. In certain embodiments, the conjugate linker comprises at least one phosphorus moiety. In certain embodiments, the conjugate linker comprises at least one phosphate group. In certain embodiments, the conjugate linker includes at least one neutral linking group.

In certain embodiments, conjugate linkers, including the conjugate linkers described above, are bifunctional linking moieties, e.g., those known in the art to be useful for attaching conjugate groups to parent compounds, such as the oligonucleotides provided herein. In general, a bifunctional linking moiety comprises at least two functional groups. One of the functional groups is selected to bind to a particular site on a parent compound and the other is selected to bind to a conjugate group. Examples of functional groups used in a bifunctional linking moiety include but are not limited to electrophiles for reacting with nucleophilic groups and nucleophiles for reacting with electrophilic groups. In certain embodiments, bifunctional linking moieties comprise one or more groups selected from amino, hydroxyl, carboxylic acid, thiol, alkyl, alkenyl, and alkynyl.

Examples of conjugate linkers include but are not limited to pyrrolidine, 8-amino-3,6-dioxaoctanoic acid (ADO), succinimidyl 4-(N-maleimidomethyl) cyclohexane-1-carboxylate (SMCC) and 6-aminohexanoic acid (AHEX or AHA). Other conjugate linkers include but are not limited to substituted or unsubstituted C1-C10 alkyl, substituted or unsubstituted C2-C10 alkenyl or substituted or unsubstituted C2-C10 alkynyl, wherein a nonlimiting list of preferred substituent groups includes hydroxyl, amino, alkoxy, carboxy, benzyl, phenyl, nitro, thiol, thioalkoxy, halogen, alkyl, aryl, alkenyl and alkynyl.

In certain embodiments, conjugate linkers comprise 1-10 linker-nucleosides. In certain embodiments, conjugate linkers comprise 2-5 linker-nucleosides. In certain embodiments, conjugate linkers comprise exactly 3 linker-nucleosides. In certain embodiments, conjugate linkers comprise the TCA motif. In certain embodiments, such linker-nucleosides are modified nucleosides. In certain embodiments such linker-nucleosides comprise a modified sugar moiety. In certain embodiments, linker-nucleosides are unmodified. In certain embodiments, linker-nucleosides comprise an optionally protected heterocyclic base selected from a purine, substituted purine, pyrimidine or substituted pyrimidine. In certain embodiments, a cleavable moiety is a nucleoside selected from uracil, thymine, cytosine, 4-N-benzoylcytosine, 5-methyl cytosine, 4-N-benzoyl-5-methyl cytosine, adenine, 6-N-benzoyladenine, guanine and 2-N-isobutyrylguanine. It is typically desirable for linker-nucleosides to be cleaved from the oligomeric compound after it reaches a target tissue. Accordingly, linker-nucleosides are typically linked to one another and to the remainder of the oligomeric compound through cleavable bonds. In certain embodiments, such cleavable bonds are phosphodiester bonds.

Herein, linker-nucleosides are not considered to be part of the oligonucleotide. Accordingly, in embodiments in which an oligomeric compound comprises an oligonucleotide consisting of a specified number or range of linked nucleosides and/or a specified percent complementarity to a reference nucleic acid and the oligomeric compound also comprises a conjugate group comprising a conjugate linker comprising linker-nucleosides, those linker-nucleosides are not counted toward the length of the oligonucleotide and are not used in determining the percent complementarity of the oligonucleotide for the reference nucleic acid. For example, an oligomeric compound may comprise (1) a modified oligonucleotide consisting of 8-30 nucleosides and (2) a conjugate group comprising 1-10 linker-nucleosides that are contiguous with the nucleosides of the modified oligonucleotide. The total number of contiguous linked nucleosides in such an oligomeric compound is more than 30. Alternatively, an oligomeric compound may comprise a modified oligonucleotide consisting of 8-30 nucleosides and no conjugate group. The total number of contiguous linked nucleosides in such an oligomeric compound is no more than 30. Unless otherwise indicated conjugate linkers comprise no more than 10 linker-nucleosides. In certain embodiments, conjugate linkers comprise no more than 5 linker-nucleosides. In certain embodiments, conjugate linkers comprise no more than 3 linker-nucleosides. In certain embodiments, conjugate linkers comprise no more than 2 linker-nucleosides. In certain embodiments, conjugate linkers comprise no more than 1 linker-nucleoside.

In certain embodiments, it is desirable for a conjugate group to be cleaved from the oligonucleotide. For example, in certain circumstances oligomeric compounds comprising a particular conjugate moiety are better taken up by a particular cell type, but once the oligomeric compound has been taken up, it is desirable that the conjugate group be cleaved to release the unconjugated or parent oligonucleotide. Thus, certain conjugate linkers may comprise one or more cleavable moieties. In certain embodiments, a cleavable moiety is a cleavable bond. In certain embodiments, a cleavable moiety is a group of atoms comprising at least one cleavable bond. In certain embodiments, a cleavable moiety comprises a group of atoms having one, two, three, four, or more than four cleavable bonds. In certain embodiments, a cleavable moiety is selectively cleaved inside a cell or subcellular compartment, such as a lysosome. In certain embodiments, a cleavable moiety is selectively cleaved by endogenous enzymes, such as nucleases.

In certain embodiments, a cleavable bond is selected from among: an amide, an ester, an ether, one or both esters of a phosphodiester, a phosphate ester, a carbamate, or a disulfide. In certain embodiments, a cleavable bond is one or both of the esters of a phosphodiester. In certain embodiments, a cleavable moiety comprises a phosphate or phosphodiester. In certain embodiments, the cleavable moiety is a phosphate linkage between an oligonucleotide and a conjugate moiety or conjugate group.

In certain embodiments, a cleavable moiety comprises or consists of one or more linker-nucleosides. In certain such embodiments, the one or more linker-nucleosides are linked to one another and/or to the remainder of the oligomeric compound through cleavable bonds. In certain embodiments, such cleavable bonds are unmodified phosphodiester bonds. In certain embodiments, a cleavable moiety is 2'-deoxyribonucleoside that is attached to either the 3' or 5'-terminal nucleoside of an oligonucleotide by a phosphate internucleoside linkage and covalently attached to the remainder of the conjugate linker or conjugate moiety by a phosphate or phosphorothioate internucleoside linkage.

In certain such embodiments, the cleavable moiety is 2'-deoxyadenosine.

Preferred ASOs

Also disclosed herein is an ASO comprising 17-24 nucleotides which is capable of binding to a UNC13A splice site or flanking regions thereof (i.e., to modulate UNC13A cryptic exon splicing). In an embodiment, the ASO is capable of binding to a UNC13A splice donor site or flanking regions thereof (e.g., capable of binding and/or substantially complementary to one or more of SEQ ID NO: 547, SEQ ID NO: 548, SEQ ID NO: 549, or SEQ ID NO: 551) to modulate UNC13A cryptic splicing. In some embodiments, the ASO comprises a) at least SEQ ID NO: 295, SEQ ID NO: 297, SEQ ID NO: 299, SEQ ID NO: 300 and SEQ ID NO: 301, or b) at least SEQ ID NO: 296, SEQ ID NO: 298, SEQ ID NO: 299, SEQ ID NO: 300 and SEQ ID NO: 301, or c) at least SEQ ID NO: 297, SEQ ID NO: 299 and SEQ ID NO: 300, and SEQ ID NO: 301 and SEQ ID NO: 302, or d) at least SEQ ID NO: 298, SEQ ID NO: 299 and SEQ ID NO: 300, and SEQ ID NO: 301 and SEQ ID NO: 302, or e) at least SEQ ID NO: 299, SEQ ID NO: 300, SEQ ID NO: 301 and SEQ ID NO: 302 and SEQ ID NO: 303 or f) at least SEQ ID NO: 300, SEQ ID NO: 301 and SEQ ID NO: 302, and SEQ ID NO: 303 and SEQ ID NO: 304, or g) at least SEQ ID NO: 301, SEQ ID NO: 302 and SEQ ID NO: 303, and SEQ ID NO: 304 and SEQ ID NO: 305, or h) at least SEQ ID NO: 302, SEQ ID NO: 303 and SEQ ID NO: 304, and SEQ ID NO: 305 and SEQ ID NO: 306 or i) at least SEQ ID NO: 303, SEQ ID NO: 304 and SEQ ID NO: 305, and SEQ ID NO: 306 and SEQ ID NO: 307, or j) at least SEQ ID NO: 304, SEQ ID NO: 305 and SEQ ID NO: 306, and SEQ ID NO: 307 and SEQ ID NO: 308, k) at least SEQ ID NO: 305, SEQ ID NO: 306 and SEQ ID NO: 307, and SEQ ID NO: 308 and SEQ ID NO: 309 or 1) at least SEQ ID NO: 306, SEQ ID NO: 307 and SEQ ID NO: 308, and SEQ ID NO: 309 and SEQ ID NO: 310, or m) at least SEQ ID NO: 307, SEQ ID NO: 308 and SEQ ID NO: 309, and SEQ ID NO: 310 and SEQ ID NO: 311, or n) at least SEQ ID NO: 308, SEQ ID NO: 309 and SEQ ID NO: 310, and SEQ ID NO: 311 and SEQ ID NO: 312, or o) at least SEQ ID NO: 312, SEQ ID NO: 313 and SEQ ID NO: 314, and SEQ ID NO: 315 and SEQ ID NO: 316, or p) at least SEQ ID NO: 313, SEQ ID NO: 314 and SEQ ID NO: 315, and SEQ ID NO: 316 and SEQ ID NO: 317, or q) at least SEQ ID NO: 314, SEQ ID NO: 315 and SEQ ID NO: 316, and SEQ ID NO: 317 and SEQ ID NO: 318, or r) at least SEQ ID NO: 315, SEQ ID NO: 316 and SEQ ID NO: 317, and SEQ ID NO: 318 and SEQ ID NO: 319, or s) at least SEQ ID NO: 316, SEQ ID NO: 317 and SEQ ID NO: 318, and SEQ ID NO: 319 and SEQ ID NO: 320, or t) at least SEQ ID NO: 317, SEQ ID NO: 318 and SEQ ID NO: 319, and SEQ ID NO: 320 and SEQ ID NO: 321, or u) at least SEQ ID NO: 318, SEQ ID NO: 319 and SEQ ID NO: 320, and SEQ ID NO: 321 and SEQ ID NO: 322, or v) at least SEQ ID NO: 319, SEQ ID NO: 320 and SEQ ID NO: 321, and SEQ ID NO: 322 and SEQ ID NO: 323, or w) at least SEQ ID NO: 320, SEQ ID NO: 321 and SEQ ID NO: 322, and SEQ ID NO: 323 and SEQ ID NO: 324 or a combination thereof. In an embodiment, the ASO is capable of binding to a splice acceptor site or flanking regions thereof, more specifically a short acceptor site, (e.g., capable of binding to or substantially complementary to SEQ ID NO: 552 or SEQ ID NO: 554), and wherein the ASO comprises at least aa) SEQ ID NO: 159, SEQ ID NO: 160, SEQ ID NO: 161, SEQ ID NO: 162 and SEQ ID NO: 163, or bb) SEQ ID NO: 160, SEQ ID NO 161, SEQ ID NO 162, SEQ ID NO 163 and SEQ ID NO: 164, or cc) SEQ ID NO: 161, SEQ ID NO: 162. SEQ ID NO: 163, SEQ ID NO: 164, and SEQ ID NO: 165, or dd) SEQ ID NO: 162, SEQ ID NO: 163. SEQ ID NO: 164, SEQ ID NO: 165, and SEQ ID NO: 166, or ee) SEQ ID NO: 163, SEQ ID NO: 164. SEQ ID NO: 165, SEQ ID NO: 166, and SEQ ID NO: 167, or ff) SEQ ID NO: 164, SEQ ID NO: 165. SEQ ID NO: 166, SEQ ID NO: 167, and SEQ ID NO: 168, or gg) SEQ ID NO: 165, SEQ ID NO: 166, SEQ ID NO: 167, SEQ ID NO: 168, and SEQ ID NO: 169, or hh) SEQ ID NO: 166, SEQ ID NO: 167. SEQ ID NO: 168, SEQ ID NO: 169, and SEQ ID NO: 170, or ii) SEQ ID NO: 167, SEQ ID NO: 168. SEQ ID NO: 169, SEQ ID NO: 170, and SEQ ID NO: 171, or jj) SEQ ID NO: 168, SEQ ID NO: 169, SEQ ID NO: 170, SEQ ID NO: 171, and SEQ ID NO: 172, or kk) SEQ ID NO: 169, SEQ ID NO: 170, SEQ ID NO: 171, SEQ ID NO: 172, and SEQ ID NO: 173, or ll) SEQ ID NO: 169, SEQ ID NO: 170, SEQ ID NO: 171, SEQ ID NO: 172, and SEQ ID NO: 173, or mm) SEQ ID NO: 170, SEQ ID NO: 171, SEQ ID NO: 172, SEQ ID NO: 173, and SEQ ID NO: 174, or nn) SEQ ID NO: 171, SEQ ID NO: 172, SEQ ID NO: 173, SEQ ID NO: 174, and SEQ ID NO: 175, or oo) SEQ ID NO: 172, SEQ ID NO: 173, SEQ ID NO: 174, SEQ ID NO: 175, and SEQ ID NO: 176, or pp) SEQ ID NO: 173, SEQ ID NO: 174, SEQ ID NO: 175, SEQ ID NO: 176, and SEQ ID NO: 177, or a combination thereof. In an embodiment, the ASO is capable of binding to a splice acceptor site, more specifically a long acceptor site, (e.g., capable of binding to or substantially complementary to SEQ ID NO: 552 or SEQ ID NO: 553), and wherein the ASO comprises at least aaa) SEQ ID NO: 105, SEQ ID NO: 106, SEQ ID NO: 107 and SEQ ID NO: 108, and SEQ ID NO: 109 or bbb) SEQ ID NO: 106, SEQ ID NO: 107, SEQ ID NO: 108, SEQ ID NO: 109 and SEQ ID NO: 110, or ccc) SEQ ID NO: 107, SEQ ID NO: 108, SEQ ID NO: 109, SEQ ID NO: 110 and SEQ ID NO: 111, or ddd) SEQ ID NO: 108, SEQ ID NO: 109, SEQ ID NO: 110, SEQ ID NO: 111 and SEQ ID NO: 112, or eee) SEQ ID NO: 109, SEQ ID NO: 110, SEQ ID NO: 111 and SEQ ID NO: 112 and SEQ ID NO: 113 or fff) SEQ ID NO: 110, SEQ ID NO: 111, SEQ ID NO: 112, SEQ ID NO 113 and SEQ ID NO: 114, or ggg) SEQ ID NO: 111, SEQ ID NO: 112, SEQ ID NO 113, SEQ ID NO: 114 and SEQ ID NO: 115, or hhh) SEQ ID NO: 112, SEQ ID NO 113, SEQ ID NO: 114, SEQ ID NO: 115 and SEQ ID NO: 116, or iii) SEQ ID NO: 113, SEQ ID NO: 114, SEQ ID NO: 115, SEQ ID NO: 116 and SEQ ID NO: 117, or jjj) SEQ ID NO: 114, SEQ ID NO: 115, SEQ ID NO: 116, SEQ ID NO: 117, and SEQ ID NO: 118, or kkk) SEQ ID NO: 115, SEQ ID NO: 116, SEQ ID NO: 117, SEQ ID NO: 118 and SEQ ID NO: 119, or lll) SEQ ID NO: 116, SEQ ID NO: 117, SEQ ID NO: 118, SEQ ID NO: 119 and SEQ ID NO: 120, or mmm) SEQ ID NO: 117, SEQ ID NO: 118, SEQ ID NO: 119, SEQ ID NO: 120 and SEQ ID NO: 121, or nnn) SEQ ID NO: 118, SEQ ID NO: 119, SEQ ID NO: 120, SEQ ID NO: 121 and SEQ ID NO: 122, or ooo) SEQ ID NO: 119, SEQ ID NO: 120, SEQ ID NO: 121, SEQ ID NO: 122 and SEQ ID NO: 123, or ppp) SEQ ID NO: 120, SEQ ID NO: 121, SEQ ID NO: 122, SEQ ID NO: 123 and SEQ ID NO: 124, or qqq) SEQ ID NO: 120, SEQ ID NO: 121, SEQ ID NO: 122, SEQ ID NO: 123 and SEQ ID NO: 124, or rrr) SEQ ID NO: 121, SEQ ID NO: 122, SEQ ID NO: 123, SEQ ID NO: 124 and SEQ ID NO: 125 or a combination thereof.

In a preferred embodiment, the ASO comprises a bridged nucleic acid, preferably from 30-50% bridged nucleic acid, and preferably wherein the bridged nucleic acid is LNA. In a preferred embodiment, the ASO comprises phosphothioate linkages.

Also disclosed herein, is an ASO comprising 20-24 nucleotides which is capable of binding to a UNC13A splice site or flanking regions thereof. In an embodiment, the ASO is capable of binding to a donor splice site or flanking regions thereof (e.g., capable of binding to or substantially complementary to one or more of SEQ ID NO: 547, 548, 549, 550 or 551). In an embodiment, the ASO comprises SEQ ID NO: 295, SEQ ID NO: 297, SEQ ID NO: 299, SEQ ID NO: 300, SEQ ID NO: 301, SEQ ID NO: 302, SEQ ID NO: 303, SEQ ID NO: 304, and optionally SEQ ID NO: 305 (i.e., for a 21 nucleotide ASO), and further optionally SEQ ID NO 306 (i.e., for a 22 nucleotide ASO), and further optionally SEQ ID NO 307 (i.e., for a 23 nucleotide ASO), and further optionally SEQ ID NO: 308 (i.e., for a 24 nucleotide ASO). In an embodiment, the ASO comprises SEQ ID NO: 296, SEQ ID NO: 298, SEQ ID NO: 299, SEQ ID NO: 300, SEQ ID NO: 301, SEQ ID NO: 302, SEQ ID NO: 303, SEQ ID NO: 304, and optionally SEQ ID NO: 305 (i.e., for a 21 nucleotide ASO), and further optionally SEQ ID NO 306 (i.e., for a 22 nucleotide ASO), and further optionally SEQ ID NO 307 (i.e., for a 23 nucleotide ASO), and further optionally SEQ ID NO: 308 (i.e., for a 24 nucleotide ASO). In an embodiment, the ASO comprises SEQ ID NO: 297, SEQ ID NO: 299, SEQ ID NO: 300, SEQ ID NO: 301, SEQ ID NO: 302, SEQ ID NO: 303, SEQ ID NO: 304, SEQ ID NO: 305, and optionally SEQ ID NO: 306 (i.e., for a 21 nucleotide ASO), and further optionally SEQ ID NO 307 (i.e., for a 22 nucleotide ASO), and further optionally SEQ ID NO 308 (i.e., for a 23 nucleotide ASO), and further optionally SEQ ID NO: 309 (i.e., for a 24 nucleotide ASO). In an embodiment, the ASO comprises SEQ ID NO: 298, SEQ ID NO: 299, SEQ ID NO: 300, SEQ ID NO: 301, SEQ ID NO: 302, SEQ ID NO: 303, SEQ ID NO: 304, SEQ ID NO: 305, and optionally SEQ ID NO: 306 (i.e., for a 21 nucleotide ASO), and further optionally SEQ ID NO 307 (i.e., for a 22 nucleotide ASO), and further optionally SEQ ID NO 308 (i.e., for a 23 nucleotide ASO), and further optionally SEQ ID NO: 309 (i.e., for a 24 nucleotide ASO). In an embodiment, the ASO comprises SEQ ID NO: 299, SEQ ID NO: 300, SEQ ID NO: 301, SEQ ID NO: 302, SEQ ID NO: 303, SEQ ID NO: 304, SEQ ID NO: 305, SEQ ID NO: 306, and optionally SEQ ID NO: 307 (i.e., for a 21 nucleotide ASO), and further optionally SEQ ID NO 308 (i.e., for a 22 nucleotide ASO), and further optionally SEQ ID NO 309 (i.e., for a 23 nucleotide ASO), and further optionally SEQ ID NO: 310 (i.e., for a 24 nucleotide ASO). In an embodiment, the ASO comprises SEQ ID NO: 300, SEQ ID NO: 301, SEQ ID NO: 302, SEQ ID NO: 303, SEQ ID NO: 304, SEQ ID NO: 305, SEQ ID NO: 306, SEQ ID NO: 307 and optionally SEQ ID NO: 308 (i.e., for a 21 nucleotide ASO), and further optionally SEQ ID NO 309 (i.e., for a 22 nucleotide ASO), and further optionally SEQ ID NO 310 (i.e., for a 23 nucleotide ASO), and further optionally SEQ ID NO: 311 (i.e., for a 24 nucleotide ASO). In an embodiment, the ASO comprises SEQ ID NO: 301, SEQ ID NO: 302, SEQ ID NO: 303, SEQ ID NO: 304, SEQ ID NO: 305, SEQ ID NO: 306, SEQ ID NO: 307, SEQ ID NO: 308 and optionally SEQ ID NO: 309 (i.e., for a 21 nucleotide ASO), and further optionally SEQ ID NO 310 (i.e., for a 22 nucleotide ASO), and further optionally SEQ ID NO 311 (i.e., for a 23 nucleotide ASO), and further optionally SEQ ID NO: 312 (i.e., for a 24 nucleotide ASO). In an embodiment, the ASO comprises SEQ ID NO: 302, SEQ ID NO: 303, SEQ ID NO: 304, SEQ ID NO: 305, SEQ ID NO: 306, SEQ ID NO: 307, SEQ ID NO: 308, SEQ ID NO: 309 and optionally SEQ ID NO: 310 (i.e., for a 21 nucleotide ASO), and further optionally SEQ ID NO 311 (i.e., for a 22 nucleotide ASO), and further optionally SEQ ID NO 312 (i.e., for a 23 nucleotide ASO), and further optionally SEQ ID NO: 313 (i.e., for a 24 nucleotide ASO). In an embodiment, the ASO comprises SEQ ID NO: 303, SEQ ID NO: 304, SEQ ID NO: 305, SEQ ID NO: 306, SEQ ID NO: 307, SEQ ID NO: 308, SEQ ID NO: 309, SEQ ID NO: 310 and optionally SEQ ID NO: 311 (i.e., for a 21 nucleotide ASO), and further optionally SEQ ID NO 312 (i.e., for a 22 nucleotide ASO), and further optionally SEQ ID NO 313 (i.e., for a 23 nucleotide ASO), and further optionally SEQ ID NO: 314 (i.e., for a 24 nucleotide ASO). In an embodiment, the ASO comprises SEQ ID NO: 304, SEQ ID NO: 305, SEQ ID NO: 306, SEQ ID NO: 307, SEQ ID NO: 308, SEQ ID NO: 309, SEQ ID NO: 310, SEQ ID NO: 311 and optionally SEQ ID NO: 312 (i.e., for a 21 nucleotide ASO), and further optionally SEQ ID NO 313 (i.e., for a 22 nucleotide ASO), and further optionally SEQ ID NO 314 (i.e., for a 23 nucleotide ASO), and further optionally SEQ ID NO: 315 (i.e., for a 24 nucleotide ASO). In an embodiment, the ASO comprises SEQ ID NO: 305, SEQ ID NO: 306, SEQ ID NO: 307, SEQ ID NO: 308, SEQ ID NO: 309, SEQ ID NO: 310, SEQ ID NO: 311, SEQ ID NO: 312 and optionally SEQ ID NO: 313 (i.e., for a 21 nucleotide ASO), and further optionally SEQ ID NO 314 (i.e., for a 22 nucleotide ASO), and further optionally SEQ ID NO 315 (i.e., for a 23 nucleotide ASO), and further optionally SEQ ID NO: 316 (i.e., for a 24 nucleotide ASO). In an embodiment, the ASO comprises SEQ ID NO: 306, SEQ ID NO: 307, SEQ ID NO: 308, SEQ ID NO: 309, SEQ ID NO: 310, SEQ ID NO: 311, SEQ ID NO: 312, SEQ ID NO: 313 and optionally SEQ ID NO: 314 (i.e., for a 21 nucleotide ASO), and further optionally SEQ ID NO 315 (i.e., for a 22 nucleotide ASO), and further optionally SEQ ID NO 316 (i.e., for a 23 nucleotide ASO), and further optionally SEQ ID NO: 317 (i.e., for a 24 nucleotide ASO). In an embodiment, the ASO comprises SEQ ID NO: 307, SEQ ID NO: 308, SEQ ID NO: 309, SEQ ID NO: 310, SEQ ID NO: 311, SEQ ID NO: 312, SEQ ID NO: 313, SEQ ID NO: 314 and optionally SEQ ID NO: 315 (i.e., for a 21 nucleotide ASO), and further optionally SEQ ID NO 316 (i.e., for a 22 nucleotide ASO), and further optionally SEQ ID NO 317 (i.e., for a 23 nucleotide ASO), and further optionally SEQ ID NO: 318 (i.e., for a 24 nucleotide ASO). In an embodiment, the ASO comprises SEQ ID NO: 308, SEQ ID NO: 309, SEQ ID NO: 310, SEQ ID NO: 311, SEQ ID NO: 312, SEQ ID NO: 313, SEQ ID NO: 314, SEQ ID NO: 315 and optionally SEQ ID NO: 316 (i.e., for a 21 nucleotide ASO), and further optionally SEQ ID NO 317 (i.e., for a 22 nucleotide ASO), and further optionally SEQ ID NO 318 (i.e., for a 23 nucleotide ASO), and further optionally SEQ ID NO: 319 (i.e., for a 24 nucleotide ASO). In an embodiment, the ASO comprises SEQ ID NO: 309, SEQ ID NO: 310, SEQ ID NO: 311, SEQ ID NO: 312, SEQ ID NO: 313, SEQ ID NO: 314, SEQ ID NO: 315, SEQ ID NO: 316 and optionally SEQ ID NO: 317 (i.e., for a 21 nucleotide ASO), and further optionally SEQ ID NO 318 (i.e., for a 22 nucleotide ASO), and further optionally SEQ ID NO 319 (i.e., for a 23 nucleotide ASO), and further optionally SEQ ID NO: 320 (i.e., for a 24 nucleotide ASO). In an embodiment, the ASO comprises SEQ ID NO: 310, SEQ ID NO: 311, SEQ ID NO: 312, SEQ ID NO: 313, SEQ ID NO: 314, SEQ ID NO: 315, SEQ ID NO: 316, SEQ ID NO: 317 and optionally SEQ ID NO 318 (i.e., for a 21 nucleotide ASO), and further optionally SEQ ID NO 319 (i.e., for a 22 nucleotide ASO), and further optionally SEQ ID NO 320 (i.e., for a 23 nucleotide ASO), and further optionally SEQ ID NO: 321 (i.e., for a 24 nucleotide ASO). In an embodiment, the ASO comprises SEQ ID NO: 311, SEQ ID NO: 312, SEQ ID NO: 313, SEQ ID NO: 314, SEQ ID NO: 315, SEQ ID NO: 316, SEQ ID NO: 317 and SEQ ID NO: 318 and optionally SEQ ID NO 319 (i.e., for a 21 nucleotide ASO), and further optionally SEQ ID NO 320 (i.e., for a 22 nucleotide ASO), and further optionally SEQ ID NO 321 (i.e., for a 23 nucleotide ASO), and further optionally SEQ ID NO: 322 (i.e., for a 24 nucleotide ASO). In an embodiment, the ASO comprises SEQ ID NO: 312, SEQ ID NO: 313, SEQ ID NO: 314, SEQ ID NO: 315, SEQ ID NO: 316, SEQ ID NO: 317 and SEQ ID NO: 318 and SEQ ID NO: 319 and optionally SEQ ID NO 320 (i.e., for a 21 nucleotide ASO), and further optionally SEQ ID NO 321 (i.e., for a 22 nucleotide ASO), and further optionally SEQ ID NO 322 (i.e., for a 23 nucleotide ASO), and further optionally SEQ ID NO: 323 (i.e., for a 24 nucleotide ASO). In an embodiment, the ASO comprises SEQ ID NO: 313, SEQ ID NO: 314, SEQ ID NO: 315, SEQ ID NO: 316, SEQ ID NO: 317 and SEQ ID NO: 318 SEQ ID NO: 319 and SEQ ID NO: 320 and optionally SEQ ID NO 321 (i.e., for a 21 nucleotide ASO), and further optionally SEQ ID NO 322 (i.e., for a 22 nucleotide ASO), and further optionally SEQ ID NO 323 (i.e., for a 23 nucleotide ASO), and further optionally SEQ ID NO: 324 (i.e., for a 24 nucleotide ASO). In an embodiment, the ASO comprises SEQ ID NO: 314, SEQ ID NO: 315, SEQ ID NO: 316, SEQ ID NO: 317 and SEQ ID NO: 318 SEQ ID NO: 319, SEQ ID NO: 320 and SEQ ID NO: 321 and optionally SEQ ID NO 322 (i.e., for a 21 nucleotide ASO), and further optionally SEQ ID NO 323 (i.e., for a 22 nucleotide ASO), and further optionally SEQ ID NO 324 (i.e., for a 23 nucleotide ASO), and further optionally SEQ ID NO: 325 (i.e., for a 24 nucleotide ASO). In an embodiment, the ASO comprises SEQ ID NO: 315, SEQ ID NO: 316, SEQ ID NO: 317 and SEQ ID NO: 318 SEQ ID NO: 319, SEQ ID NO: 320, SEQ ID NO: 321 and SEQ ID NO: 322 and optionally SEQ ID NO 323 (i.e., for a 21 nucleotide ASO), and further optionally SEQ ID NO 324 (i.e., for a 22 nucleotide ASO), and further optionally SEQ ID NO 325 (i.e., for a 23 nucleotide ASO), and further optionally SEQ ID NO: 326 (i.e., for a 24 nucleotide ASO). In an embodiment, the ASO comprises SEQ ID NO: 316, SEQ ID NO: 317 and SEQ ID NO: 318 SEQ ID NO: 319, SEQ ID NO: 320, SEQ ID NO: 321, SEQ ID NO: 322 and SEQ ID NO: 323 and optionally SEQ ID NO 324 (i.e., for a 21 nucleotide ASO), and further optionally SEQ ID NO 325 (i.e., for a 22 nucleotide ASO), and further optionally SEQ ID NO 326 (i.e., for a 23 nucleotide ASO), and further optionally SEQ ID NO: 327 (i.e., for a 24 nucleotide ASO). In a preferred embodiment, the ASO comprises a bridged nucleic acid, preferably from 30-50% bridged nucleic acid, and preferably wherein the bridged nucleic acid is LNA. In a preferred embodiment, the ASO comprises phosphothioate linkages.

Also disclosed herein, is an ASO comprising 20-24 nucleotides which is capable of binding to a UNC13A splice site, wherein the ASO is an acceptor splice site (e.g., capable of binding to SEQ ID NO: 552). In an embodiment, the ASO comprises SEQ ID NO: 159, SEQ ID NO: 160, SEQ ID NO: 161, SEQ ID NO: 162, SEQ ID NO: 163, SEQ ID NO: 164, SEQ ID NO: 165, SEQ ID NO: 166, and optionally SEQ ID NO: 167 (i.e., for a 21 nucleotide ASO), and further optionally SEQ ID NO 168 (i.e., for a 22 nucleotide ASO), and further optionally SEQ ID NO 169 (i.e., for a 23 nucleotide ASO), and further optionally SEQ ID NO: 170 (i.e., for a 24 nucleotide ASO). In an embodiment, the ASO comprises SEQ ID NO: 160, SEQ ID NO: 161, SEQ ID NO: 162, SEQ ID NO: 163, SEQ ID NO: 164, SEQ ID NO: 165, SEQ ID NO: 166, SEQ ID NO: 167 and optionally SEQ ID NO: 168 (i.e., for a 21 nucleotide ASO), and further optionally SEQ ID NO 169 (i.e., for a 22 nucleotide ASO), and further optionally SEQ ID NO 170 (i.e., for a 23 nucleotide ASO), and further optionally SEQ ID NO: 171 (i.e., for a 24 nucleotide ASO). In an embodiment, the ASO comprises SEQ ID NO: 161, SEQ ID NO: 162, SEQ ID NO: 163, SEQ ID NO: 164, SEQ ID NO: 165, SEQ ID NO: 166, SEQ ID NO: 167 and SEQ ID NO: 168 and optionally SEQ ID NO: 169 (i.e., for a 21 nucleotide ASO), and further optionally SEQ ID NO 170 (i.e., for a 22 nucleotide ASO), and further optionally SEQ ID NO 171 (i.e., for a 23 nucleotide ASO), and further optionally SEQ ID NO: 172 (i.e., for a 24 nucleotide ASO). In an embodiment, the ASO comprises SEQ ID NO: 161, SEQ ID NO: 162, SEQ ID NO: 163, SEQ ID NO: 164, SEQ ID NO: 165, SEQ ID NO: 166, SEQ ID NO: 167 and SEQ ID NO: 168 and optionally SEQ ID NO: 169 (i.e., for a 21 nucleotide ASO), and further optionally SEQ ID NO 170 (i.e., for a 22 nucleotide ASO), and further optionally SEQ ID NO 171 (i.e., for a 23 nucleotide ASO), and further optionally SEQ ID NO: 172 (i.e., for a 24 nucleotide ASO). In an embodiment, the ASO comprises SEQ ID NO: 162, SEQ ID NO: 163, SEQ ID NO: 164, SEQ ID NO: 165, SEQ ID NO: 166, SEQ ID NO: 167 and SEQ ID NO: 168, SEQ ID NO: 169 and optionally SEQ ID NO: 170 (i.e., for a 21 nucleotide ASO), and further optionally SEQ ID NO 171 (i.e., for a 22 nucleotide ASO), and further optionally SEQ ID NO 172 (i.e., for a 23 nucleotide ASO), and further optionally SEQ ID NO: 173 (i.e., for a 24 nucleotide ASO). In an embodiment, the ASO comprises SEQ ID NO: 163, SEQ ID NO: 164, SEQ ID NO: 165, SEQ ID NO: 166, SEQ ID NO: 167 and SEQ ID NO: 168, SEQ ID NO: 169 and SEQ ID NO: 170 optionally SEQ ID NO:

171 (i.e., for a 21 nucleotide ASO), and further optionally SEQ ID NO 172 (i.e., for a 22 nucleotide ASO), and further optionally SEQ ID NO 173 (i.e., for a 23 nucleotide ASO), and further optionally SEQ ID NO: 174 (i.e., for a 24 nucleotide ASO). In an embodiment, the ASO comprises SEQ ID NO: 164, SEQ ID NO: 165, SEQ ID NO: 166, SEQ ID NO: 167 and SEQ ID NO: 168, SEQ ID NO: 169 SEQ ID NO: 170 and SEQ ID NO: 171 optionally SEQ ID NO: 172 (i.e., for a 21 nucleotide ASO), and further optionally SEQ ID NO 173 (i.e., for a 22 nucleotide ASO), and further optionally SEQ ID NO 174 (i.e., for a 23 nucleotide ASO), and further optionally SEQ ID NO: 175 (i.e., for a 24 nucleotide ASO). In an embodiment, the ASO comprises SEQ ID NO: 165, SEQ ID NO: 166, SEQ ID NO: 167 and SEQ ID NO: 168, SEQ ID NO: 169 SEQ ID NO: 170 SEQ ID NO: 171 and SEQ ID NO: 172 and optionally SEQ ID NO: 173 (i.e., for a 21 nucleotide ASO), and further optionally SEQ ID NO 174 (i.e., for a 22 nucleotide ASO), and further optionally SEQ ID NO 175 (i.e., for a 23 nucleotide ASO), and further optionally SEQ ID NO: 176 (i.e., for a 24 nucleotide ASO). In an embodiment, the ASO comprises SEQ ID NO: 166, SEQ ID NO: 167 and SEQ ID NO: 168, SEQ ID NO: 169 SEQ ID NO: 170, SEQ ID NO: 171, SEQ ID NO: 172 and SEQ ID NO: 173 optionally SEQ ID NO: 174 (i.e., for a 21 nucleotide ASO), and further optionally SEQ ID NO 175 (i.e., for a 22 nucleotide ASO), and further optionally SEQ ID NO 176 (i.e., for a 23 nucleotide ASO), and further optionally SEQ ID NO: 177 (i.e., for a 24 nucleotide ASO). In an embodiment, the ASO comprises SEQ ID NO: 167 SEQ ID NO: 168, SEQ ID NO: 169 SEQ ID NO: 170, SEQ ID NO: 171, SEQ ID NO: 172, SEQ ID NO: 173 and SEQ ID NO: 174 optionally SEQ ID NO: 175 (i.e., for a 21 nucleotide ASO), and further optionally SEQ ID NO 176 (i.e., for a 22 nucleotide ASO), and further optionally SEQ ID NO 177 (i.e., for a 23 nucleotide ASO), and further optionally SEQ ID NO: 178 (i.e., for a 24 nucleotide ASO). In an embodiment, the ASO comprises SEQ ID NO: 168, SEQ ID NO: 169 SEQ ID NO: 170, SEQ ID NO: 171, SEQ ID NO: 172, SEQ ID NO: 173 and SEQ ID NO: 174 and SEQ ID NO: 175 optionally SEQ ID NO: 176 (i.e., for a 21 nucleotide ASO), and further optionally SEQ ID NO 177 (i.e., for a 22 nucleotide ASO), and further optionally SEQ ID NO 178 (i.e., for a 23 nucleotide ASO), and further optionally SEQ ID NO: 179 (i.e., for a 24 nucleotide ASO). In an embodiment, the ASO comprises SEQ ID NO: 169 SEQ ID NO: 170, SEQ ID NO: 171, SEQ ID NO: 172, SEQ ID NO: 173 and SEQ ID NO: 174, SEQ ID NO: 175 and SEQ ID NO: 176 optionally SEQ ID NO: 177 (i.e., for a 21 nucleotide ASO), and further optionally SEQ ID NO 178 (i.e., for a 22 nucleotide ASO), and further optionally SEQ ID NO 179 (i.e., for a 23 nucleotide ASO), and further optionally SEQ ID NO: 180 (i.e., for a 24 nucleotide ASO). In a preferred embodiment, the ASO comprises a bridged nucleic acid, preferably from 30-50% bridged nucleic acid, and preferably wherein the bridged nucleic acid is LNA. In a preferred embodiment, the ASO comprises phosphothioate linkages.

In a preferred embodiment, the ASO is capable of binding to a UNC13A donor splice site and the ASO comprises 21 nucleotides. In an embodiment, the ASO comprises SEQ ID NO: 295, SEQ ID NO: 297, SEQ ID NO: 299, SEQ ID NO: 300, SEQ ID NO: 301, SEQ ID NO: 302, SEQ ID NO: 303, SEQ ID NO: 304, and SEQ ID NO: 305. In an embodiment, the ASO comprises SEQ ID NO: 296, SEQ ID NO: 298, SEQ ID NO: 299, SEQ ID NO: 300, SEQ ID NO: 301, SEQ ID NO: 302, SEQ ID NO: 303, SEQ ID NO: 304, and SEQ ID NO: 305. In an embodiment, the ASO comprises SEQ ID NO: 297, SEQ ID NO: 299, SEQ ID NO: 300, SEQ ID NO: 301, SEQ ID NO: 302, SEQ ID NO: 303, SEQ ID NO: 304, SEQ ID NO: 305, and SEQ ID NO: 306. In an embodiment, the ASO comprises SEQ ID NO: 298, SEQ ID NO: 299, SEQ ID NO: 300, SEQ ID NO: 301, SEQ ID NO: 302, SEQ ID NO: 303, SEQ ID NO: 304, SEQ ID NO: 305, and SEQ ID NO: 306. In an embodiment, the ASO comprises SEQ ID NO: 299, SEQ ID NO: 300, SEQ ID NO: 301, SEQ ID NO: 302, SEQ ID NO: 303, SEQ ID NO: 304, SEQ ID NO: 305, SEQ ID NO: 306, and SEQ ID NO: 307. In an embodiment, the ASO comprises SEQ ID NO: 300, SEQ ID NO: 301, SEQ ID NO: 302, SEQ ID NO: 303, SEQ ID NO: 304, SEQ ID NO: 305, SEQ ID NO: 306, SEQ ID NO: 307 and SEQ ID NO: 308. In an embodiment, the ASO comprises SEQ ID NO: 301, SEQ ID NO: 302, SEQ ID NO: 303, SEQ ID NO: 304, SEQ ID NO: 305, SEQ ID NO: 306, SEQ ID NO: 307, SEQ ID NO: 308 and SEQ ID NO: 309. In an embodiment, the ASO comprises SEQ ID NO: 302, SEQ ID NO: 303, SEQ ID NO: 304, SEQ ID NO: 305, SEQ ID NO: 306, SEQ ID NO: 307, SEQ ID NO: 308, SEQ ID NO: 309 and SEQ ID NO: 310. In an embodiment, the ASO comprises SEQ ID NO: 303, SEQ ID NO: 304, SEQ ID NO: 305, SEQ ID NO: 306, SEQ ID NO: 307, SEQ ID NO: 308, SEQ ID NO: 309, SEQ ID NO: 310 and SEQ ID NO: 311. In an embodiment, the ASO comprises SEQ ID NO: 304, SEQ ID NO: 305, SEQ ID NO: 306, SEQ ID NO: 307, SEQ ID NO: 308, SEQ ID NO: 309, SEQ ID NO: 310, SEQ ID NO: 311 and SEQ ID NO: 312. In an embodiment, the ASO comprises SEQ ID NO: 305, SEQ ID NO: 306, SEQ ID NO: 307, SEQ ID NO: 308, SEQ ID NO: 309, SEQ ID NO: 310, SEQ ID NO: 311, SEQ ID NO: 312 and SEQ ID NO: 313. In an embodiment, the ASO comprises SEQ ID NO: 306, SEQ ID NO: 307, SEQ ID NO: 308, SEQ ID NO: 309, SEQ ID NO: 310, SEQ ID NO: 311, SEQ ID NO: 312, SEQ ID NO: 313 and SEQ ID NO: 314. In an embodiment, the ASO comprises SEQ ID NO: 307, SEQ ID NO: 308, SEQ ID NO: 309, SEQ ID NO: 310, SEQ ID NO: 311, SEQ ID NO: 312, SEQ ID NO: 313, SEQ ID NO: 314 and SEQ ID NO: 315. In an embodiment, the ASO comprises SEQ ID NO: 308, SEQ ID NO: 309, SEQ ID NO: 310, SEQ ID NO: 311, SEQ ID NO: 312, SEQ ID NO: 313, SEQ ID NO: 314, SEQ ID NO: 315 and SEQ ID NO: 316. In an embodiment, the ASO comprises SEQ ID NO: 309, SEQ ID NO: 310, SEQ ID NO: 311, SEQ ID NO: 312, SEQ ID NO: 313, SEQ ID NO: 314, SEQ ID NO: 315, SEQ ID NO: 316 and SEQ ID NO: 317. In an embodiment, the ASO comprises SEQ ID NO: 310, SEQ ID NO: 311, SEQ ID NO: 312, SEQ ID NO: 313, SEQ ID NO: 314, SEQ ID NO: 315, SEQ ID NO: 316, SEQ ID NO: 317 and SEQ ID NO 318. In an embodiment, the ASO comprises SEQ ID NO: 311, SEQ ID NO: 312, SEQ ID NO: 313, SEQ ID NO: 314, SEQ ID NO: 315, SEQ ID NO: 316, SEQ ID NO: 317 and SEQ ID NO: 318 and SEQ ID NO 319. In an embodiment, the ASO comprises SEQ ID NO: 312, SEQ ID NO: 313, SEQ ID NO: 314, SEQ ID NO: 315, SEQ ID NO: 316, SEQ ID NO: 317 and SEQ ID NO: 318 and SEQ ID NO: 319 and SEQ ID NO 320. In an embodiment, the ASO comprises SEQ ID NO: 313, SEQ ID NO: 314, SEQ ID NO: 315, SEQ ID NO: 316, SEQ ID NO: 317 and SEQ ID NO: 318 SEQ ID NO: 319 and SEQ ID NO: 320 and SEQ ID NO 321. In an embodiment, the ASO comprises SEQ ID NO: 314, SEQ ID NO: 315, SEQ ID NO: 316, SEQ ID NO: 317 and SEQ ID NO: 318 SEQ ID NO: 319, SEQ ID NO: 320 and SEQ ID NO: 321 and SEQ ID NO 322. In an embodiment, the ASO comprises SEQ ID NO: 315, SEQ ID NO: 316, SEQ ID NO: 317 SEQ ID NO: 318 SEQ ID NO: 319, SEQ ID NO: 320, SEQ ID NO: 321 and SEQ ID NO: 322 and SEQ ID NO 323. In an embodiment, the ASO comprises SEQ ID NO: 316, SEQ ID NO: 317 and SEQ ID NO: 318 SEQ ID NO: 319, SEQ ID NO: 320, SEQ ID NO: 321, SEQ ID NO: 322 and SEQ ID NO: 323 and SEQ ID NO 324. In a preferred embodiment, the ASO comprises a bridged nucleic acid, preferably from 30-50% bridged nucleic acid, and preferably wherein the bridged nucleic acid is LNA. In a preferred embodiment, the ASO comprises phosphothioate linkages.

Also disclosed herein is a pharmaceutical composition comprising a first ASO selected from the above, and a second ASO different to the first ASO selected from the above. In some embodiments, the pharmaceutical composition comprises a first ASO capable of binding to an UNC13A donor splice site or flanking regions thereof, and a second ASO capable of binding to an UNC13A acceptor splice site or flanking regions thereof. In some embodiments, the pharmaceutical composition comprises a first ASO capable of binding to an UNC13A long acceptor splice site or flanking regions thereof, and a second ASO capable of binding to a short acceptor splice site or flanking regions thereof. In some embodiments, the pharmaceutical composition comprises a first ASO is capable of binding the risk (i.e., minor) allele of the cryptic exon SNP and a second ASO capable of binding to the major allele of the cryptic exon SNP As disclosed above, the flanking regions may be less than 100 nucleotides upstream or downstream of the splice site, more preferably less than 75, more preferably less than 50, more preferably less than 25, more preferably less than 20, and more preferably less than 10. As disclose above "capable of binding" means "complementary to" or "substantially complementary to".

Manufacture and/or Synthesis of Antisense Polynucleotides

The polynucleotides (e.g., ASO(s)) described herein may be synthesized using any methods known in the art or those described herein.

Evaluation

Purification of the antisense polynucleotides (e.g., ASO (s)) described herein may include, but is not limited to, polynucleotide clean-up, quality assurance and quality control. Clean-up may be performed by methods known in the arts such as, but not limited to, AGEN-COURT® beads (Beckman Coulter Genomics, Danvers, Mass.), poly-T beads, LNA™ oligo-T capture probes (EX-IQON® Inc, Vedbaek, Denmark) or HPLC based purification methods such as, but not limited to, strong anion exchange HPLC, weak anion exchange HPLC, reverse phase HPLC (RP-HPLC), and hydrophobic interaction HPLC (HIC-HPLC). The term "purified" when used in relation to a polynucleotide such as a "purified polynucleotide" refers to one that is separated from at least one contaminant. As used herein, a "contaminant" is any substance which makes another unfit, impure or inferior. Thus, a purified polynucleotide (e.g., DNA and RNA) is present in a form or setting different from that in which it is found in nature, or a form or setting different from that which existed prior to subjecting it to a treatment or purification method In some embodiments, the antisense polynucleotides (e.g., ASOs) may be quantified using methods such as, but not limited to, ultraviolet visible spectroscopy (UV/Vis). A non-limiting example of a UV/Vis spectrometer is a NANO-DROP® spectrometer (ThermoFisher, Waltham, Mass.). The quantified polynucleotide may be analyzed in order to determine if the polynucleotide may be of proper size, check that no degradation of the polynucleotide has occurred.

Degradation of the antisense polynucleotide (e.g., ASO) may be checked by methods such as, but not limited to, agarose gel electrophoresis, HPLC based purification methods such as, but not limited to, strong anion exchange HPLC, weak anion exchange HPLC, reverse phase HPLC (RP-HPLC), and hydrophobic interaction HPLC (MC-HPLC), liquid chromatography-mass spectrometry (LCMS), capillary electrophoresis (CE) and capillary gel electrophoresis (CGE).

II. Pharmaceutical Compositions

Provided by the present disclosure include compositions such as pharmaceutical compositions comprising at least one antisense polynucleotide (e.g., ASO) as described herein. Compositions comprising the antisense polynucleotides (e.g., ASO(s)) described herein may be formulated for administration to a particular target cell, a target tissue, or a target organ and/or a subject.

The pharmaceutical composition of the present invention may comprise one or more polynucleotides (e.g., ASO, guide RNA, vectorized construct) as described herein, or two or more, or three or more or four or more polynucleotides (e.g., ASO, guide RNA, vectorized construct) as described herein.

In some embodiments, the pharmaceutical composition comprises two or more, three or more, or four or more ASOs as described herein. In some embodiments, the pharmaceutical composition comprises two or more ASOs which are capable of binding to different parts of the SEQ ID NO: 1 (i.e., UNC13A cryptic exon or intronic flanking regions thereof).

In some embodiments, the pharmaceutical composition comprises one or more ASOs capable of binding to the UNC13A donor splice site, and one or more ASOs capable of binding to an UNC13A acceptor splice site. In some embodiments, the pharmaceutical composition comprises two or more ASOs capable of binding to the UNC13A donor site.

In some embodiments pharmaceutical composition comprises two or more ASOs capable of binding to an UNC13A acceptor site, for example, where one or more ASOs is capable of binding to the short acceptor site, and one or more ASOs is capable of binding to the long acceptor site. In some embodiments, the pharmaceutical composition comprises a first ASO capable of binding (e.g., substantially complementary to) the risk (i.e., minor) allele of the CE SNP and a second ASO capable of binding (e.g., substantially complementary to) the major allele of the CE SNP. This ensures enhanced binding is obtained against both alleles.

In some embodiments, the pharmaceutical composition comprises two or more, three or more, or four or more guide RNAs as described herein. In some embodiments, the pharmaceutical composition comprises two or more, three or more, or four or more viral vectors as described herein. In some embodiments, the pharmaceutical composition may comprise a combination of one or more ASOs, one or more guide RNAs and/or one or more viral vectors as described herein.

The antisense polynucleotide (e.g., ASO) compositions may also be formulated for direct delivery to an organ or tissue in any of several ways in the art including, but not limited to, direct soaking or bathing, via a catheter, by gels, powder, ointments, creams, gels, lotions, and/or drops, by using substrates such as fabric or biodegradable materials coated or impregnated with the compositions, and the like.

Formulations

Pharmaceutical formulations may additionally comprise a pharmaceutically acceptable excipient, which, as used herein, includes, but is not limited to, any and all solvents including water, dispersion media, diluents, or other liquid vehicles, dispersion or suspension aids, surface active agents, isotonic agents, a solubilizing agent, a tonicity agent, a pH adjuster, a buffering agent, thickening or emulsifying agents, preservatives, and the like, as suited to the particular dosage form desired.

Various excipients for formulating pharmaceutical compositions and techniques for preparing the composition are known in the art (see Remington: The Science and Practice of Pharmacy, 21$^{st}$ Edition, A. R. Gennaro, Lippincott, Williams & Wilkins, Baltimore, MD, 2006; incorporated herein by reference in its entirety). The use of a conventional excipient medium may be contemplated within the scope of the present disclosure, except insofar as any conventional excipient medium may be incompatible with a substance or its derivatives, such as by producing any undesirable biological effect or otherwise interacting in a deleterious manner with any other component(s) of the pharmaceutical composition.

Formulations of the pharmaceutical compositions described herein may be prepared by any method known or hereafter developed in the art of pharmacology. In general, such preparatory methods include the step of bringing the active ingredient (e.g., antisense polynucleotide) into association with an excipient and/or one or more other accessory ingredients, and then, if necessary and/or desirable, dividing, shaping and/or packaging the product into a desired single- or multi-dose unit.

A pharmaceutical composition in accordance with the disclosure may be prepared, packaged, and/or sold in bulk, as a single unit dose, and/or as a plurality of single unit doses. As used herein, a "unit dose" is discrete amount of the pharmaceutical composition comprising a predetermined amount of the active ingredient. The amount of the active ingredient is generally equal to the dosage of the active ingredient which would be administered to a subject and/or a convenient fraction of such a dosage such as, for example, one-half or one-third of such a dosage.

Relative amounts of the active ingredient, the pharmaceutically acceptable excipient, and/or any additional ingredients in a pharmaceutical composition in accordance with the disclosure will vary, depending upon the identity, size, and/or condition of the subject treated and further depending upon the route by which the composition is to be administered. By way of example, the composition may comprise between 0.1% and 100%, e.g., between 0.5 and 50%, between 1 and 30%, between 5 and 80%, between 10 and 50%, between 20 and 90%, at least 70% (w/w), or at least 80% (w/w) active ingredient.

In some embodiments, the formulations described herein may contain at least one antisense polynucleotide (e.g., ASO). In some embodiments, the formulations may contain one, two, three, four or five antisense polynucleotides (e.g., ASO(s)) with different sequences. In one embodiment, the formulation contains at least two antisense polynucleotides (e.g., ASO(s)). In one embodiment, the formulation contains at least three antisense polynucleotides (e.g., ASO(s)). In another embodiment, the formulation contains at least four antisense polynucleotides (e.g., ASO(s)). In yet another embodiment, the formulation contains at least five antisense polynucleotides (e.g., ASO(s)).

The pharmaceutical compositions and formulations of the present disclosure can be formulated with one or more excipients to increase the stability of the antisense polynucleotide (e.g., ASO); increase cell penetration; permit the sustained, controlled or delayed release; alter the biodistribution (e.g., target the nucleic acid vaccine composition to specific tissues or cell types); increase the translation of encoded protein in vivo; and/or alter the release of encoded protein in vivo.

In addition to traditional excipients, excipients of the present disclosure can include, without limitation, lipids, lipidoids, liposomes, lipid nanoparticles, polymers, lipoplexes, core-shell nanoparticles, peptides, proteins, nucleic acid molecules, cells, organelles, explants, nanoparticle mimics and combinations thereof.

In vivo delivery of nucleic acids may be affected by many parameters, including, but not limited to, the formulation composition, nature of particle, degree of loading, polynucleotide (e.g., ASO) to lipid/lipidoid ratio, nature of polynucleotides (e.g., ASO) such as sequence contents, single-stranded or double-stranded, linear or circular, length and modifications, particle sizes and charges, and administration routes, etc.

The present disclosure contemplates the formulation and use in delivering at least one antisense polynucleotide (e.g., ASO) compositions and at least one pharmaceutically acceptable carrier. Complexes, micelles, liposomes or particles can be prepared containing any suitable lipids and lipidoids and therefore, can result in an effective delivery of the antisense polynucleotide compositions following the injection of a formulation via localized and/or systemic routes of administration, e.g., by various means including, but not limited to those described herein.

Lipids and Lipidoids

In some embodiments, the antisense polynucleotides (ASO compounds) and compositions of the present disclosure may be formulated using one or more lipids and/or lipidoids. As used herein, the term "lipidoid" refers to any material having characteristics of a lipid. Lipidoids can be lipid-like structures containing multiple secondary and tertiary amine functionalities, which confer highly efficient interaction with nucleic acid molecules.

The synthesis of lipids and lipidoids has been extensively discussed and formulations containing the lipids and lipidoids are particularly suitable for delivery of nucleic acids. Use of the lipids and lipidoids to formulate and effectively deliver double stranded small RNAs (siRNAs), singled stranded mRNAs and gene therapy has been described in mice and non-human primates (e.g., Lvins et al., 2010); Akinc et al., *Nat Biotechnol.* 2008 26:561-569; Love et al., *Proc Natl Acad Sci USA*. 2010, 107:1864-1869; Siegwart et al., *Proc Natl Acad Sci USA*. 2011, 108:12996-3001; Leuschner et al., *Nat Biotechnol.* 2011, 29:1005-1010; Roberts et al., *Methods Mol. Biol.*, 2016, 1364:2991-310; Ball et al. *Nato. Lett.* 2018, 18(6):3814-3822; Lokras et al., *Methods Mol. Biol.*, 2021, 2282:137-157; Schrom et al., *Mol. Ther. Nucleic Acids,* 2017, 7:350-365; the contents of all of which are incorporated herein by references in their entirety).

The lipids and lipidoids can be cationic lipids and lipidoids. Cationic lipids typically features a positively charged head group followed by hydrophobic tails of varying compositions, wherein the head and tail are connected by a linker, such as an ether, ester or amide. Without wishing to be bound by any theory, their cationic head groups neutralize the anionic charges of the nucleic acids that they transport.

In some embodiments, ionizable cationic lipids can be used for formulations.

In some embodiments, the lipids can be anionic lipids.

In some embodiments, the lipids and lipidoids can be neutral lipids.

In some embodiments, ionizable lipids such as Dlin-MC3-DMA (MC3), Dlin-KC2-DMA (KC2), and cKK-E12 may be used for package circular nucleic acid molecules.

As non-limiting examples, lipidoids for formulation may include: "98N12-5" that is disclosed by Akinc et al., *Mol Ther.* 2009, 17:872-879; "C12-200" that is disclosed by Love et al., *Proc Natl Acad Sci USA.* 2010, 107:1864-1869 and Liu and Huang, Molecular Therapy. 2010, 669-670.

Polymers and Polymeric Nanoparticles (NPs)

In some embodiments, the polynucleotide (e.g., ASO) compositions of the present disclosure may be formulated using one or more polymers, or polymer containing nanoparticles (NPs). In some embodiments, the polymer may be biocompatible and biodegradable.

The physicochemical properties of polymers (e.g., composition, molecular weight, and polydispersity) can be modified to achieve specialized formulations for nucleic acid delivery. Polymers may be naturally derived or synthetic. In some embodiments, the polymers used in the present disclosure have undergone processing to reduce and/or inhibit the attachment of unwanted substances such as, but not limited to, bacteria, to the surface of the polymer. The polymer may be processed by methods known and/or described in the art and/or described in PCT Patent Application Publication No. WO2012150467; the contents of which are herein incorporated by reference in their entirety.

Many polymer approaches have demonstrated efficacy in delivering nucleic acids in vivo into the cell cytoplasm (reviewed in de Fougerolles *Hum Gene Ther.* 2008, 19:125-132). An approach using dynamic polyconjugates has been shown in vivo in mice to effectively deliver siRNA and silence endogenous target mRNA in hepatocytes. In this approach, a multicomponent polymer system includes a membrane-active polymer to which nucleic acid, is covalently coupled via a disulfide bond and where both PEG (for charge masking) and N-acetylgalactosamine (for hepatocyte targeting) groups are linked via pH-sensitive bonds. On binding to the hepatocyte and entry into the endosome, the polymer complex disassembles in the low-pH environment, with the polymer exposing its positive charge, leading to endosomal escape and cytoplasmic release of the siRNA from the polymer. Replacing the N-acetylgalactosamine group with a mannose group can alter targeting sinusoidal endothelium and Kupffer cells (Rozema et al., *Proc Natl Acad Sci USA.* 2007, 104:12982-12887). Another approach using cyclodextrin-containing polycation nanoparticles to formulate siRNAs demonstrates targeted silencing of the EWS-FLI1 gene product in Ewing's sarcoma tumor cells (Hu-Lieskovan et al., *Cancer Res.* 2005, 65: 8984-8982); the contents of each of which are incorporated by reference in their entirety. Both of these delivery strategies incorporate rational approaches using polymers for both targeted delivery and endosomal escape mechanisms.

In some embodiments, the antisense polynucleotides (e.g., ASO(s)) of the present disclosure may be formulated using naturally derived polymers, structural proteins and polysaccharides, such as cationic collagen derivatives and chitosan. Cationic collagenous proteins have been used for nucleic acid delivery to articular cartilage and bone for regenerative medicine and metastatic tumor treatment (Capito et al., *Gene Ther.*, 2007, 14:721-732; Curtin et al., *Adv. Healthc. Mater.,* 2015, 4:223-227). Chitosan, a linear cationic polysaccharide, is produced by the deactylation of chitin (poly-d-glucosamine), which is non-toxic even at a high concentration and can be formulated into polyplexes. A non-limiting example of chitosan-based formulation includes a core of positively charged chitosan and an outer portion of negatively charged substrate (U.S. Pub. No. US20120258176; the contents of which are herein incorporated by reference in their entirety). Chitosan includes, but is not limited to N-trimethyl chitosan, mono-N-carboxymethyl chitosan (MCC), N-palmitoyl chitosan (NPCS), EDTA-chitosan, low molecular weight chitosan, chitosan derivatives, or combinations thereof.

Cyclodextrins (CDs) are another family of naturally derived carbohydrate-based polymers with favorable physiochemical properties. $\alpha$-, $\beta$-, or $\gamma$-CD forms can be used in combination with other cationic polymers for delivering nucleic acids, e.g., to the liver, and metastatic tumors.

The antisense polynucleotides (e.g., ASO(s)) of the present disclosure may be formulated using synthetic polymers which may incorporate versatile chemistries in a controlled manner providing flexibility and more options for polynucleotide formulations. Various synthetic strategies exist in the art to control polymerization reactions and, therefore, the properties of the resulting polymer. Examples of methods include controlled free-radical polymerizations such as reversible addition-fragmentation chain transfer (RAFT) polymerization and atom transfer radical polymerization (ATRP) (Boyer et al., *Chem. Rev.,* 2009, 109:5402-5436). The polymers formulated with the polynucleotide (e.g., ASO) compositions of the present disclosure may be synthesized by the methods described in PCT Patent Application Publication Nos. WO2012082574 or WO2012068187; the contents of each of which are herein incorporated by reference in their entirety.

In some embodiments, cationic groups may be incorporated to polymers for formulating nucleic acid molecules. Without wishing to be bound by any theory, cationic groups can aid with the loading of negatively charged nucleic acid cargo and facilitate the interaction with negatively charged glycoproteins on the cell membrane when delivering the loaded polynucleotides to a cell.

In some embodiments, the antisense polynucleotide (e.g., ASO) compositions of the present disclosure may comprise at least one polymeric compound such as but not limited to, polyethenes, polyethylene glycol (PEG), poly(l-lysine) (PLL), PEG grafted to PLL, cationic lipopolymer, biodegradable cationic lipopolymer, polyethyleneimine (PEI), cross-linked branched poly(alkylene imines), a polyamine derivative, a modified poloxamer, a biodegradable polymer, elastic biodegradable polymer, biodegradable block copolymer, biodegradable random copolymer, biodegradable polyester copolymer, biodegradable polyester block copolymer, biodegradable polyester block random copolymer, multiblock copolymers, linear biodegradable copolymer, poly[$\alpha$-(4-aminobutyl)-L-glycolic acid) (PAGA), biodegradable cross-linked cationic multi-block copolymers, polycarbonates, polyanhydrides, polyhydroxyacids, polypropylfumerates, polycaprolactones, polyamides, polyacetals, polyethers, polyesters, poly(orthoesters), polycyanoacrylates, polyvinyl alcohols, polyurethanes, polyphosphazenes, polyacrylates, polymethacrylates, polycyanoacrylates, polyureas, polystyrenes, polyamines, polylysine, poly(ethylene imine), poly(serine ester), poly(L-lactide-co-L-lysine), poly (4-hydroxy-L-proline ester), acrylic polymers, amine-containing polymers, dextran polymers, dextran polymer derivatives or combinations thereof.

In some embodiments, the synthetic polymers are biodegradable. Synthetic biodegradable polymers may be generated by assembling low molecular weight monomers into polymers via bioreversible linkages such as sulfide or ester bonds. Examples of synthetic biodegradable polymers include, but are not limited to, poly(lactic acid) (PLA), poly(glycolic acid) (PGA), poly(lactic-co-glycolic acid) (PLGA), poly(beta amino) esters (PBAEs), Poly(amine-co-esters) (PACEs).

Biodegradable polymers have been previously used to protect nucleic acids from degradation and been shown to result in sustained release of payloads in vivo (Rozema et al., Proc Natl Acad Sci USA. 2007, 104:12982-12887; Sullivan et al., Expert Opin Drug Deliv. 2010, 7:1433-1446; Convertine et al., Biomacromolecules. 2010 Oct. 1; Chu et al., Acc Chem Res. 2012 Jan. 13; Manganiello et al., Biomaterials. 2012, 33:2301-2309; Benoit et al., Biomacromolecules. 2011, 12:2708-2714; Singha et al., Nucleic Acid Ther. 2011, 2:133-147; de Fougerolles Hum Gene Ther. 2008, 19:125-132; Schaffert and Wagner, Gene Ther. 2008, 16:1131-1138; Chaturvedi et al., Expert Opin Drug Deliv. 2011, 8:1455-1468; Davis, Mol Pharm. 2009, 6:659-668; Davis, Nature, 2010, 464:1067-1070; the contents of each of which are herein incorporated by reference in their entirety).

The biodegradable polymers may be polymers comprising a polyethylenimine group as described in U.S. Pat. No. 7,700,542. The polymers may be the biodegradable cationic lipopolymer made by methods described in U.S. Pat. No. 6,696,038, and U.S. Pub. Nos. US20030073619 and US20040142474; the contents of each of which are incorporated herein by reference in their entirety.

The antisense polynucleotides (e.g., ASO(s)) of the present disclosure may be formulated in polymeric carriers using polymers-containing different nanoparticles. For example, the therapeutic polymer nanoparticles may be identified by the methods described in US Pub No. US20120140790, the contents of which are herein incorporated by reference in their entirety. In some embodiments, the therapeutic nanoparticles may comprise a polymeric matrix. As a non-limiting example, the nanoparticle may comprise two or more polymers and diblock copolymers such as, but not limited to, polyethylenes, polycarbonates, polyanhydrides, polyhydroxyacids, polypropylfumerates, polycaprolactones, polyamides, polyacetals, polyethers, polyesters, poly(orthoesters), polycyanoacrylates, polyvinyl alcohols, polyurethanes, polyphosphazenes, polyacrylates, polymethacrylates, polycyanoacrylates, polyureas, polystyrenes, polyamines, polylysine, poly(ethylene imine), poly(serine ester), poly(L-lactide-co-L-lysine), poly(4-hydroxy-L-proline ester) or combinations thereof. Polymers may also include those described in PCT Patent Application Publication Nos. WO2011115862, WO2012082574 and WO2012068187 and U.S. Pub. No. US20120283427; a polymer of formula Z as described in WO2011115862; a polymer of formula Z, Z' or Z" as described in PCT Patent Application Publication Nos. WO2012082574 and WO2012068187 and U.S. Pub. No. US2012028342; the contents of each of which are herein incorporated by reference in their entirety.

As a non-limiting example, the antisense polynucleotide (e.g., ASO) compositions of the present disclosure are formulated in a therapeutic nanoparticle comprising a PLGA-PEG block copolymer (see US Pub. No. US20120004293 and U.S. Pat. No. 8,236,330), or PEG-PLA diblock copolymer or PEG-PLGA copolymer (see U.S. Pat. No. 8,246,968 and PCT Patent Application Publication No. WO2012166923), or a multiblock copolymer described in U.S. Pat. Nos. 8,263,665 and 8,287,910; the contents of each of which are herein incorporated by reference in their entirety.

In some embodiments, the block copolymers may include those of formula I, formula II, formula III, formula IV, formula V, formula VI and formula VII of PCT Patent Application Publication No. WO2015017519, the contents of which are herein incorporated by reference in their entirety. The block copolymers may be included in a polyion complex comprising a non-polymeric micelle and the block copolymer. (See e.g., U.S. Pub. No. US20120076836; the contents of which are herein incorporated by reference in their entirety).

In some embodiments, the antisense polynucleotide (e.g., ASO) compositions of the present disclosure may be formulated using acrylic polymers including but not limited to, acrylic acid, methacrylic acid, acrylic acid and methacrylic acid copolymers, methyl methacrylate copolymers, ethoxyethyl methacrylates, cyanoethyl methacrylate, amino alkyl methacrylate copolymer, poly(acrylic acid), poly(methacrylic acid), polycyanoacrylates and combinations thereof. In other embodiments, the antisense polynucleotide (e.g., ASO) compositions of the present disclosure may be formulated using amine-containing polymers such as, but not limited to polylysine, polyethylene imine, poly(amidoamine) dendrimers, poly(beta-amino esters) (See e.g., U.S. Pat. No. 8,287,849; the contents of which are herein incorporated by reference in their entirety).

In some embodiments, the nanoparticles may comprise at least one degradable polyester which may contain polycationic side chains. Degradable polyesters include, but are not limited to, poly(serine ester), poly(L-lactide-co-L-lysine), poly(4-hydroxy-L-proline ester), and combinations thereof. The degradable polyesters may include a PEG conjugation to form a PEGylated polymer. In other embodiments, the polynucleotide (e.g., ASO) compositions of the present disclosure may be formulated with at least one cross-linkable polyester. Crosslinkable polyesters include those known in the art and described in US Pub. No. US20120269761; the contents of which herein are incorporated by reference in their entirety.

In some embodiments, the polymer formulations comprising the polynucleotides (e.g., ASO(s)) of the present disclosure may include branched PEG molecules as described in or made by the methods described in PCT Patent Application Publication No. WO20180126084. The branched PEG which may be used in the formulations described in WO20180126084 may have the formula I, formula II, formula III, formula IV, formula V, and formula VI; the contents of which are incorporated herein by reference in their entirety.

In some embodiments, the antisense polynucleotide (e.g., ASO) is covalently attached to a carrier molecule. In an example, the ASO is covalently attached to a carbohydrate, a protein, a small molecule (e.g., α-tocopherol), a peptide (e.g., a cell-penetrating peptide), an antibody, a lipid (e.g., cholesterol) or a polymer (e.g., PEG). In an embodiment, the ASO is not covalently attached to a carrier molecule.

In some embodiments, the polymer nanoparticles for formulating the antisense polynucleotides (e.g., ASO(s)) of the present disclosure may include a conjugation of at least one targeting ligand. The targeting ligand may be any ligand known in the art such as, but not limited to, a monoclonal antibody, a peptide and a nucleic acid (e.g., aptamer). In other embodiments, the polymer nanoparticles can be selectively targeted to cells, tissues and/or organs through expression of different ligands (e.g., folate, transferrin, and N-acetylgalactosamine (GalNAc)).

In some embodiments, the polymer nanoparticles (NPs) for formulating the antisense polynucleotide (e.g., ASO) compositions of the present disclosure may permit the sustained or delayed release of the polynucleotide compositions. The altered release profile for the antisense polynucleotide compositions can result in regulation over an extended period of time. In some embodiments, the polymeric formulations for sustained release may include, but are not limited to, PLGA microspheres, ethylene vinyl acetate (EVAc), poloxamer, and fibrinogen polymers. For example, the antisense polynucleotide compositions may be formulated in PLGA microspheres by preparing the PLGA microspheres with tunable release rates (e.g., days and weeks) and encapsulating the polynucleotide (e.g., ASO(s)) compositions in the PLGA microspheres while maintaining the integrity of the polynucleotides during the encapsulation process.

In some embodiments, the antisense polynucleotide (e.g., ASO) compositions of the present disclosure may be formulated for controlled release in polymeric formulations comprising copoly(lactic/glycolic) acid (see, e.g., U.S. Pat. No. 4,675,189 to Kent et al.), or block copolymers of lactic acid and PEG, which is injected subcutaneously or intramuscularly to achieve a depot formulation for controlled release.

As non-limiting examples, the antisense polynucleotides (e.g., ASO(s)) of the present disclosure may be formulated in a polymeric formulation comprising polymeric compound of PEG-PLL as described in U.S. Pat. No. 6,177,274, or in a formulation comprising PLGA-PEG-PLGA block copolymers as described in U.S. Pat. No. 6,004,573, or in a dry formulation or in a solution that is capable of being dried as described in U.S. Pub. Nos. US20090042829 and US20090042825; the contents of each of which are herein incorporated by reference in their entirety.

Liposomes

The polynucleotides and polynucleotide (e.g., ASOs and ASO) compositions of the disclosure can be formulated using one or more liposomes. As used herein, the term "liposome" refers to an artificially prepared vesicle which may primarily be composed of one or several lipid bilayers and may be used as a delivery vehicle. Liposomes can be of different sizes such as, but not limited to, a multilamellar vesicle (MLV) which may be hundreds of nanometers in diameter and may contain a series of concentric bilayers separated by narrow aqueous compartments, a small unicellular vesicle (SUV) which may be smaller than 50 nm in diameter, and a large unilamellar vesicle (LUV) which may be between 50 and 500 nm in diameter.

Liposome design may include, but is not limited to, opsonins or ligands in order to improve the attachment of liposomes to unhealthy tissue or to activate events such as, but not limited to, endocytosis. Liposomes may contain a low or a high pH in order to improve the delivery of the pharmaceutical formulations. The formation of liposomes may depend on the physicochemical characteristics such as, but not limited to, the pharmaceutical formulation entrapped and the liposomal ingredients, the nature of the medium in which the lipid vesicles are dispersed, the effective concentration of the entrapped substance and its potential toxicity, any additional processes involved during the application and/or delivery of the vesicles, the optimization size, polydispersity and the shelf-life of the vesicles for the intended application, and the batch-to-batch reproducibility and possibility of large-scale production of safe and efficient liposomal products.

Liposomes may be lipid-based liposomes, polymer-based liposomes, or hybrids. Liposomes can be cationic liposomes, neutral liposomes. Cationic liposomes have been used to deliver siRNA to various cell types (e.g., US Patent Application Publication No.: US2004/0204377).

In some embodiments, the liposome may contain a sugar-modified lipid disclosed in U.S. Pat. No. 5,595,756 to Bally et al.; the contents of which are incorporated herein by reference in their entirety. The lipid may be a ganglioside and cerebroside in an amount of about 10 mol percent.

In some embodiments, liposomes are formed by the self-assembly of dissolved lipid molecules and/or polymers. The polynucleotides (e.g., ASO(s)) of the present disclosure may be entrapped passively into the lipid bilayers through the preparation of liposomes, e.g., encapsulated in the aqueous core of the liposome or the aqueous phase between bilayers (in the case of multilamellar vesicles) using passive loading methods, such as reverse phase evaporation, dehydration-rehydration method, or active loading involving pH-gradient across the liposome membrane (Szoka and Papahadjopoulos, *PNAS,* 1978; 9:4194-4198; Shew and Deamer, *Biochim. Biophy Acta.,* 1985; 1:1-8; and Mayer et al., *Biochim. Biophy Acta.,* 1986; 1:123-126).

The liposome formulation may be influenced by, but not limited to, the selection of the cationic lipid component, the degree of cationic lipid saturation, the nature of the PEGylation, ratio of all components and biophysical parameters such as size. In one example by Semple et al. (Semple et al. *Nature Biotech.* 2010, 28:172-176; the contents of which are herein incorporated by reference in their entirety), the liposome formulation was composed of 57.1% cationic lipid, 7.1% dipalmitoylphosphatidylcholine, 34.3% cholesterol, and 1.4% PEG-c-DMA.

In some embodiments, liposomes may be targeted liposomes with surface-attached ligands, capable of recognizing and binding to cells of interest. The targeted liposomes may increase delivery and accumulation of liposomes and entrapped polynucleotides (e.g., ASO(s)) in the desired tissues and organs. The surface targeting ligands may include immunoglobolins (Ig) and their fragments, peptides and aptamers.

In some embodiments, the surface of liposomes may be coated with inert, biocompatible polymers such as PEG. The polymer coating forms a protective layer over the liposomal surface and slows down the liposome recognition by opsonins; thereby increasing circulation of liposomes in vivo.

In some embodiments, the polynucleotides (e.g., ASO(s)) and pharmaceutical compositions comprising the polynucleotides (e.g., ASO(s)) described herein may include, without limitation, liposomes such as those formed from 1,2-dioleyloxy-N,N-dimethylaminopropane (DODMA) liposomes, DiLa2 liposomes from Marina Biotech (Bothell, WA), SMARTICLES®/NOV340 (Marina Biotech, Bothell), 1,2-dilinoleyloxy-3-dimethylaminopropane (DLin-DMA), 2,2-dilinoleyl-4-(2-dimethylaminoethyl)-[1,3]-dioxolane (DLin-KC2-DMA), and MC3 (US Patent Application Publication US20100324120; the contents of which are herein incorporated by reference in their entirety), neutral DOPC (1,2-dioleoyl-sn-glycero-3-phosphocholine) based liposomes (e.g., siRNA delivery for ovarian cancer (Landen et al. *Cancer Biology & Therapy* 2006, 5(12): 1708-1713); the contents of which is herein incorporated by reference in its entirety), hyaluronan-coated liposomes (Quiet Therapeutics, Israel), and liposomes which may deliver small molecule drugs such as, but not limited to, DOXIL® from Janssen Biotech, Inc. (Horsham, PA).

In some embodiments, the polynucleotides (e.g., ASO(s)) and pharmaceutical compositions comprising the polynucleotides (e.g., ASO(s) described herein may include, without limitation, liposomes such as those formed from the synthesis of stabilized plasmid-lipid particles (SPLP) or stabilized nucleic acid lipid particle (SNALP) that have been previously described and shown to be suitable for oligonucleotide delivery in vitro and in vivo (see Wheeler et al. *Gene Therapy*. 1999, 6:271-281; Zhang et al. *Gene Therapy*. 1999, 6:1438-1447; Jeffs et al. *Pharm Res*. 2005, 22:362-372; Morrissey et al., *Nat Biotechnol*. 2005, 2:1002-1007; Zimmermann et al., *Nature*. 2006, 441:111-114; Heyes et al. *J Contr Rel*. 2005, 107:276-287; Semple et al. *Nature Biotech*. 2010, 28:172-176; Judge et al. *J Clin Invest*. 2009, 119:661-673; deFougerolles *Hum Gene Ther*. 2008, 19:125-132; the contents of each of which are incorporated herein in their entireties). The original manufacturing method by Wheeler et al. was a detergent dialysis method, which was later improved by Jeffs et al. and is referred to as the spontaneous vesicle formation method. The liposome formulations may be composed of 3 to 4 lipid components in addition to the nucleic acid vaccine compositions. As a non-limiting example, a liposome can contain, but is not limited to, 55% cholesterol, 20% disteroylphosphatidyl choline (DSPC), 10% PEG-S-DSG, and 15% 1,2-dioleyloxy-N,N-dimethylaminopropane (DODMA), as described by Jeffs et al. In another example, certain liposome formulations may contain, but are not limited to, 48% cholesterol, 20% DSPC, 2% PEG-c-DMA, and 30% cationic lipid, where the cationic lipid can be 1,2-distearloxy-N,N-dimethylaminopropane (DSDMA), DODMA, DLin-DMA, or 1,2-dilinolenyloxy-3-dimethylaminopropane (DLenDMA), as described by Heyes et al. In another example, the nucleic acid-lipid particle may comprise a cationic lipid comprising from about 50 mol % to about 85 mol % of the total lipid present in the particle; a non-cationic lipid comprising from about 13 mol % to about 49.5 mol % of the total lipid present in the particle; and a conjugated lipid that inhibits aggregation of particles comprising from about 0.5 mol % to about 2 mol % of the total lipid present in the particle as described in WO2009127060 to Maclachlan et al; the contents of which are incorporated herein by reference in their entirety. In another example, the nucleic acid-lipid particle may be any nucleic acid-lipid particle disclosed in US2006008910 to Maclachlan et al.; the contents of which are incorporated herein by reference in their entirety. As a non-limiting example, the nucleic acid-lipid particle may comprise a cationic lipid of Formula I, a non-cationic lipid, and a conjugated lipid that inhibits aggregation of particles.

In some embodiments, the polynucleotide (e.g. ASO) compositions of the present disclosure may be formulated in a liposome comprising a cationic lipid. The liposome may have a molar ratio of nitrogen atoms in the cationic lipid to the phosphates in the nucleic acid vaccine compositions (N:P ratio) of between 1:1 and 20:1 as described in PCT Patent Application Publication No. WO2013006825, the contents of which are herein incorporated by reference in their entirety. In some embodiments, the liposome may have a N:P ratio of greater than 20:1 or less than 1:1.

In some embodiments, the polynucleotide (e.g., ASO) compositions may be formulated with any amphoteric liposome disclosed in PCT Patent Application Publication No.: WO 2008043575 to Panzner and U.S. Pat. No. 8,580,297 to Essler et al. (Marina Biotech), the contents of which are incorporated herein by reference in their entirety. The amphoteric liposome may comprise a mixture of lipids including a cationic amphiphile, an anionic amphiphile and optional one or more neutral amphiphiles. The amphoteric liposome may comprise amphoteric compounds based on amphiphilic molecules, the head groups of which being substituted with one or more amphoteric groups. In some embodiments, the pharmaceutical compositions may be formulated with an amphoteric lipid comprising one or more amphoteric groups having an isoelectric point between 4 and 9, as disclosed in US Patent Application Publication No.: US20140227345 to Essler et al. (Marina Biotech), the contents of which are incorporated herein by reference in their entirety. In some embodiments, the pharmaceutical composition may be formulated with amphoteric liposomes comprising at least one amphipathic cationic lipid, at least one amphipathic anionic lipid, and at least one neutral lipid, or liposomes comprise at least one amphipathic lipid with both a positive and a negative charge, and at least one neutral lipid, wherein the liposomes are stable at pH 4.2 and pH 7.5, as disclosed in U.S. Pat. No. 7,780,983 to Panzner et al. (Novosom), the contents of which are incorporated herein by reference in their entirety.

In some embodiments, the polynucleotide (e.g., ASO) composition may be formulated with liposomes comprising a sterol derivative as disclosed in U.S. Pat. No. 7,312,206 to Panzner et al. (Novosom), the contents of which are incorporated herein by reference in their entirety.

In some embodiments, the pharmaceutical composition may be formulated with liposomes comprising a serum-stable mixture of lipids taught in US Patent Application Publication No.: US 20110076322 to Panzner et al, the contents of which are incorporated herein by reference in their entirety, capable of encapsulating the nucleic acid vaccine compositions of the present disclosure. The lipid mixture comprises phosphatidylcholine and phosphatidylethanolamine in a ratio in the range of about 0.5 to about 8. The lipid mixture may also include pH sensitive anionic and cationic amphiphiles, such that the mixture is amphoteric, being negatively charged or neutral at pH 7.4 and positively charged at pH 4. The drug/lipid ratio may be adjusted to target the liposomes to particular organs or other sites in the body. In some embodiments, liposomes loaded with the nucleic acid vaccine compositions of the present disclosure as cargo, are prepared by the method disclosed in US Patent Application Publication No.: US 20120021042 to Panzner et al., the contents of which are incorporated herein by reference in their entirety. The method comprises steps of admixing an aqueous solution of a polyanionic active agent (e.g., polynucleotides) and an alcoholic solution of one or more amphiphiles and buffering said admixture to an acidic pH, wherein the one or more amphiphiles are susceptible of forming amphoteric liposomes at the acidic pH, thereby to form amphoteric liposomes in suspension encapsulating the active agent.

Lipoplexes

The compositions of the present disclosure can be formulated using one or more lipoplexes. In some embodiments, the antisense polynucleotide (e.g., ASO) compositions may be formulated as a lipoplex, such as, without limitation, the ATUPLEX™ system, the DACC system, the DBTC system and other RNA-lipoplex technology from Silence Therapeutics (London, United Kingdom), STEMFECT™ from STEMGENT® (Cambridge, MA), and polyethylenimine (PEI).

In some embodiments, the lipoplex-formulated RNA (RNA-LPX) may be generated by complexing RNA with liposomes containing consisting of the cationic lipid DOTMA and the helper lipid DOPE (Kranz et al., Nature, 2016; 534(7607):396-401). The RNA-lipoplexes may be formed for intravenous injection, with pharmaceutical and physiological characteristics that allow selective targeting of antisense polynucleotides (e.g., ASO(s)) to target cells, tissues and/or organs. The RNA-lipoplex product may be formed from RNA and dedicated cationic (positively charged) liposomes in a self-assembly process, comprising a topological transition from liposomes into compact RNA-lipoplex nanoparticles with a distinct internal molecular organization. The effect of parameters such as particle charge, size molecular organization, lipid composition and phase state on the biological activity is individually investigated to evaluate efficacy of the lipoplex formulation in vitro and in vivo. The ratio between the cationic lipids and the RNA, expressed as the charge ratio, will be determined for the particle characteristics and the targeting selectivity. RNA-lipoplex formulations may be formed either with an excess of positive (cationic liposomes) or negative (RNA) charge. Positive charged or negative charged lipoplexes may affect delivery targets. Therefore, variation of the characteristics of the liposomes used for lipoplex assembly, the biological activity could be further controlled. In some embodiments, lipoplex formation may be achieved in the presence of various monovalent and divalent ions, peptides and buffers.

Lipid Nanoparticles (LNPs)

In some embodiments, the antisense polynucleotides (e.g., ASO(s)) and compositions of the present disclosure may be formulated in a lipid nanoparticle (LNP).

In general, LNPs can be characterized as small solid or semi-solid particles possessing an exterior lipid layer with a hydrophilic exterior surface that is exposed to the non-LNP environment, an interior space which may aqueous (vesicle like) or non-aqueous (micelle like), and at least one hydrophobic inter-membrane space. LNP membranes may be lamellar or non-lamellar and may be comprised of 1, 2, 3, 4, 5 or more layers.

The LNPs for formulating the antisense polynucleotides (e.g., ASO(s)) of the present disclosure may have a diameter from 10-1000 nm. The nanoparticle may be 10, 15, 20, 25, 30, 35, 40, 45, 50, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 205, 210, 215, 220, 225, 230, 235, 240, 245, 250, 255, 260, 265, 270, 275, 280, 285, 290, 295, 300, 305, 310, 315, 320, 325, 330, 335, 340, 345, 350, 355, 360, 365, 370, 375, 380, 385, 390, 395, 400, 405, 410, 415, 420, 425, 430, 435, 440, 445, 450, 455, 460, 465, 470, 475, 480, 485, 490, 495, 500, 505, 510, 515, 520, 525, 530, 535, 540, 545, 550, 555, 560, 565, 570, 575, 580, 585, 590, 595, 600, 605, 610, 615, 620, 625, 630, 635, 640, 645, 650, 655, 660, 665, 670, 675, 680, 685, 690, 695, 700, 705, 710, 715, 720, 725, 730, 735, 740, 745, 750, 755, 760, 765, 770, 775, 780, 785, 790, 795, 800, 805, 810, 815, 820, 825, 830, 835, 840, 845, 850, 855, 860, 865, 870, 875, 880, 885, 890, 895, 900, 905, 910, 915, 920, 925, 930, 935, 940, 945, 950, 955, 960, 965, 970, 975, 980, 985, 990, 995, or 1000 nm, or greater than 100 nm, greater than 150 nm, greater than 200 nm, greater than 250 nm, greater than 300 nm, greater than 350 nm, greater than 400 nm, greater than 450 nm, greater than 500 nm, greater than 550 nm, greater than 600 nm, greater than 650 nm, greater than 700 nm, greater than 750 nm, greater than 800 nm, greater than 850 nm, greater than 900 nm, greater than 950 nm or greater than 1000 nm.

In some embodiments, the lipid nanoparticles formulating the antisense polynucleotides (e.g., ASO(s)) of the present disclosure may have a diameter from about 1 to about 100 nm, such as but not limited to, from about 1 nm to about 10 nm, about 1 nm to about 20 nm, from about 1 nm to about 30 nm, from about 1 nm to about 40 nm, from about 1 nm to about 50 nm, from about 1 nm to about 60 nm, from about 1 nm to about 70 nm, from about 1 nm to about 80 nm, from about 1 nm to about 90 nm, from about 5 nm to about from 100 nm, from about 5 nm to about 10 nm, about 5 nm to about 20 nm, from about 5 nm to about 30 nm, from about 5 nm to about 40 nm, from about 5 nm to about 50 nm, from about 5 nm to about 60 nm, from about 5 nm to about 70 nm, from about 5 nm to about 80 nm, from about 5 nm to about 90 nm, and/or from about 5 nm to about 100 nm.

In some embodiments, the lipid nanoparticles formulating the antisense polynucleotides (e.g., ASO(s)) of the present disclosure may have a diameter from about 10 to about 100 nm, such as, but not limited to, about 10 nm to about 20 nm, about 10 nm to about 30 nm, about 10 nm to about 40 nm, about 10 nm to about 50 nm, about 10 nm to about 60 nm, about 10 nm to about 70 nm, about 10 nm to about 80 nm, about 10 nm to about 90 nm, about 20 nm to about 30 nm, about 20 nm to about 40 nm, about 20 nm to about 50 nm, about 20 nm to about 60 nm, about 20 nm to about 70 nm, about 20 nm to about 80 nm, about 20 nm to about 90 nm, about 20 nm to about 100 nm, about 30 nm to about 40 nm, about 30 nm to about 50 nm, about 30 nm to about 60 nm, about 30 nm to about 70 nm, about 30 nm to about 80 nm, about 30 nm to about 90 nm, about 30 nm to about 100 nm, about 40 nm to about 50 nm, about 40 nm to about 60 nm, about 40 nm to about 70 nm, about 40 nm to about 80 nm, about 40 nm to about 90 nm, about 40 nm to about 100 nm, about 50 nm to about 60 nm, about 50 nm to about 70 nm about 50 nm to about 80 nm, about 50 nm to about 90 nm, about 50 nm to about 100 nm, about 60 nm to about 70 nm, about 60 nm to about 80 nm, about 60 nm to about 90 nm, about 60 nm to about 100 nm, about 70 nm to about 80 nm, about 70 nm to about 90 nm, about 70 nm to about 100 nm, about 80 nm to about 90 nm, about 80 nm to about 100 nm and/or about 90 nm to about 100 nm.

In some embodiments, the lipid nanoparticles formulating the antisense polynucleotides (e.g., ASO(s)) of the present disclosure may have a diameter from about 10 to about 500 nm.

In some embodiments, the LNPs formulating the antisense polynucleotides (e.g., ASO(s)) of the present disclosure are smaller LNPs, having a diameter from below 0.1 µm up to 100 nm such as, but not limited to, less than 0.1 µm, less than 1.0 µm, less than 5 µm, less than 10 µm, less than 15 µm, less than 20 µm, less than 25 µm, less than 30 µm, less than 35 µm, less than 40 µm, less than 50 µm, less than 55 µm, less than 60 µm, less than 65 µm, less than 70 µm, less than 75 µm, less than 80 µm, less than 85 µm, less than 90 µm, less than 95 µm, less than 100 µm, less than 125 µm, less than 150 µm, less than 175 µm, less than 200 µm, less than 225 µm, less than 250 µm, less than 275 µm, less than 300 µm, less than 325 µm, less than 350 µm, less than 375 µm, less than 400 µm, less than 425 µm, less than 450 µm, less than 475 µm, less than 500 µm, less than 525 µm, less than 550 µm, less than 575 µm, less than 600 µm, less than 625 µm, less than 650 µm, less than 675 µm, less than 700 µm, less than 725 µm, less than 750 µm, less than 775 µm, less than 800 µm, less than 825 µm, less than 850 µm, less than 875 µm, less than 900 µm, less than 925 µM, less than 950 µm, less than 975 µm.

LNPs useful herein are known in the art and generally comprise cholesterol (aids in stability and promotes membrane fusion), a helper lipid (e.g., a phospholipid which provides structure to the LNP bilayer and also may aid in endosomal escape), a polyethylene glycol (PEG) derivative (which reduces LNP aggregation and "shields" the LNP from non-specific endocytosis by immune cells and reduce opsonization by serum proteins and reticuloendothelial clearance), and an ionizable lipid (complexes negatively charged RNA and enhances endosomal escape), which form the LNP-forming composition. The components of the LNP may be selected based on the desired target, tropism, cargo (e.g., a antisense polynucleotide), size, or other desired feature or property. The relative amounts (ratio) of ionizable lipid, helper lipid, cholesterol and PEG substantially affect the efficacy of lipid nanoparticles and may be optimized for a given application and administration route.

In general, the antisense polynucleotide (e.g., ASO) compositions of the present disclosure may be formulated using LNPs into their interior space, into the inter membrane space, onto their exterior surface, or any combination thereof.

The LNP for formulating the antisense polynucleotides (e.g., ASO(s)) of the present disclosure comprises at least one cationic lipid. The cationic lipid may be selected from any lipid known in the art such as, but not limited to, DLin-MC3-DMA, DLin-DMA, C12-200 and DLin-KC2-DMA.

In some embodiments, the cationic lipid which may be used in formulations of the present disclosure may be selected from, but not limited to, a cationic lipid described in PCT Patent Application Publication Nos. WO2012040184, WO2011153120, WO2011149733, WO2011090965, WO2011043913, WO2011022460, WO2012061259, WO2012054365, WO2012044638, WO2010080724, WO201021865 and WO2008103276, U.S. Pat. Nos. 7,893,302, 7,404,969 and 8,283,333 and US Patent Publication No. US20100036115 and US20120202871; the contents of each of which are herein incorporated by reference in their entirety. The cationic lipid may be also selected from, but not limited to, formula A described in PCT Patent Application Publication Nos. WO2012040184, WO2011153120, WO2011149733, WO2011090965, WO2011043913, WO2011022460, WO2012061259, WO2012054365 and WO2012044638; the contents of each of which are herein incorporated by reference in their entirety. Alternatively, the cationic lipid may be selected from, but not limited to, formula CLI-CLXXIX of PCT Patent Application No. WO2008103276, formula CLI-CLXXIX of U.S. Pat. No. 7,893,302, formula CLI-CLXXXII of U.S. Pat. No. 7,404,969 and formula I-VI of US Patent Publication No. US20100036115; the contents of each of which are herein incorporated by reference in their entirety. The cationic lipid may be a multivalent cationic lipid disclosed in U.S. Pat. No. 7,223,887 (the contents of which are incorporated herein by reference in their entirety), which has a positively charged head group including two quaternary amine groups and a hydrophobic portion including four hydrocarbon chains. The cationic lipid may be biodegradable as the biodegradable lipids disclosed in US Patent Application Publication No.: US20130195920 to Maier et al. (the contents of which are incorporated herein by reference in their entirety), which have one or more biodegradable groups located in a lipidic moiety of the cationic lipid. In some embodiments, the cationic lipid may also be the cationic lipids disclosed in US20130156845 and US 20130129785 to Manoharan et al., WO 2012047656 to Wasan et al., WO 2010144740 to Chen et al., WO 2013086322 to Ansell et al., and WO 2012016184 to Manoharan et al., the contents of each of which are incorporated herein by reference in their entirety.

As a non-limiting example, the cationic lipid may be selected from (20Z,23Z)—N,N-dimethylnonacosa-20,23-dien-10-amine, (17Z,20Z)—N,N-dimemylhexacosa-17,20-dien-9-amine, (1Z,19Z)—N5N-dimethylpentacosa-16,19-dien-8-amine, (13Z,16Z)—N,N-dimethyldocosa-13,16-dien-5-amine, (12Z,15Z)—N,N-dimethylhenicosa-12,15-dien-4-amine, (14Z,17Z)—N,N-dimethyltricosa-14,17-dien-6-amine, (15Z,18Z)—N,N-dimethyltetracosa-15,18-dien-7-amine, (18Z,21Z)—N,N-dimethylheptacosa-18,21-dien-10-amine, (15Z,18Z)—N,N-dimethyltetracosa-15,18-dien-5-amine, (14Z,17Z)—N,N-dimethyltricosa-14,17-dien-4-amine, (19Z,22Z)—N,N-dimeihyloctacosa-19,22-dien-9-amine, (18Z,21Z)—N,N-dimethylheptacosa-18,21-dien-8-amine, (17Z,20Z)—N,N-dimethylhexacosa-17,20-dien-7-amine, (16Z,19Z)—N,N-dimethylpentacosa-16,19-dien-6-amine, (22Z,25Z)—N,N-dimethylhentriaconta-22,25-dien-10-amine, (21 Z,24Z)—N,N-dimethyltriaconta-21,24-dien-9-amine, (18Z)—N,N-dimetylheptacos-18-en-10-amine, (17Z)—N,N-dimethylhexacos-17-en-9-amine, (19Z,22Z)—N,N-dimethyloctacosa-19,22-dien-7-amine, N,N-dimethylheptacosan-10-amine, (20Z,23Z)—N-ethyl-N-methylnonacosa-20,23-dien-10-amine, 1-[(11Z,14Z)-1-nonylicosa-11,14-dien-1-yl]pyrrolidine, (20Z)—N,N-dimethylheptacos-20-en-10-amine, (15Z)—N,N-dimethyl eptacos-15-en-10-amine, (14Z)—N,N-dimethylnonacos-14-en-10-amine, (17Z)—N,N-dimethylnonacos-17-en-10-amine, (24Z)—N,N-dimethyltritriacont-24-en-10-amine, (20Z)—N,N-dimethylnonacos-20-en-10-amine, (22Z)—N,N-dimethylhentriacont-22-en-10-amine, (16Z)—N,N-dimethylpentacos-16-en-8-amine, (12Z,15Z)—N,N-dimethyl-2-nonylhenicosa-12,15-dien-1-amine, (13Z,16Z)—N,N-dimethyl-3-nonyldocosa-13,16-dien-1-amine, N,N-dimethyl-1-[(1S,2R)-2-octylcyclopropyl]eptadecan-8-amine, 1-[(1S,2R)-2-hexylcyclopropyl]-N,N-dimethylnonadecan-10-amine, N,N-dimethyl-1-[(1S,2R)-2-octylcyclopropyl]nonadecan-10-amine, N,N-dimethyl-21-[(1S,2R)-2-octylcyclopropyl]henicosan-10-amine, N,N-dimethyl-1-[(1S,2S)-2-{[(1R,2R)-2-pentylcyclopropyl] methyl}cyclopropyl]nonadecan-10-amine, N,N-dimethyl-1-[(1S,2R)-2-octylcyclopropyl]hexadecan-8-amine, N,N-dimethyl-[(1R,2S)-2-undecylcyclopropyl]tetradecan-5-amine, N,N-dimethyl-3-{7-[(1S,2R)-2-octylcyclopropyl] heptyl}dodecan-1-amine, 1-[(1R,2S)-2-heptylcyclopropyl]-N,N-dimethyloctadecan-9-amine, 1-[(1S,2R)-2-decylcyclopropyl]-N,N-dimethylpentadecan-6-amine, N,N-dimethyl-1-[(1S,2R)-2-octylcyclopropyl]pentadecan-8-amine, R—N,N-dimethyl-1-[(9Z,12Z)-octadeca-9,12-dien-1-yloxy]-3-(octyloxy)propan-2-amine, S—N,N-dimethyl-1-[(9Z,12Z)-octadeca-9,12-dien-1-yloxy]-3-(octyloxy) propan-2-amine, 1-{2-[(9Z,12Z)-octadeca-9,12-dien-1-yloxy]-1-[(octyloxy)methyl]ethyl}pyrrolidine, (2S)—N,N-dimethyl-1-[(9Z,12Z)-octadeca-9,12-dien-1-yloxy]-3-[(5Z)-oct-5-en-1-yloxy]propan-2-amine, 1-{2-[(9Z,12Z)-octadeca-9,12-dien-1-yloxy]-1-[(octyloxy)methyl] ethyl}azetidine, (2S)-1-(hexyloxy)-N,N-dimethyl-3-[(9Z,12Z)-octadeca-9,12-dien-1-yloxy]propan-2-amine, (2S)-1-(heptyloxy)-N,N-dimethyl-3-[(9Z,12Z)-octadeca-9,12-dien-1-yloxy]propan-2-amine, N,N-dimethyl-1-(nonyloxy)-3-[(9Z,12Z)-octadeca-9,12-dien-1-yloxy]propan-2-amine, N,N-dimethyl-1-[(9Z)-octadec-9-en-1-yloxy]-3-(octyloxy) propan-2-amine; (2S)—N,N-dimethyl-1-[(6Z,9Z,12Z)-octadeca-6,9,12-trien-1-yloxy]-3-(octyloxy)propan-2-amine, (2S)-1-[(11Z,14Z)-icosa-11,14-dien-1-yloxy]-N,N-dimethyl-3-(pentyloxy)propan-2-amine, (2S)-1-(hexyloxy)-3-[(11Z,14Z)-icosa-11,14-dien-1-yloxy]-N,N-dimethylpropan-2-amine, 1-[(11Z,14Z)-icosa-11,14-dien-1-yloxy]-N,N-dimethyl-3-(octyloxy)propan-2-amine, 1-[(13Z,16Z)-docosa-13,16-dien-1-yloxy]-N,N-dimethyl-3-(octyloxy) propan-2-amine, (2S)-1-[(13Z,16Z)-docosa-13,16-dien-1-yloxy]-3-(hexyloxy)-N,N-dimethylpropan-2-amine, (2S)-1-[(13Z)-docos-13-en-1-yloxy]-3-(hexyloxy)-N,N-dimethylpropan-2-amine, 1-[(13Z)-docos-13-en-1-yloxy]-N,N-dimethyl-3-(octyloxy)propan-2-amine, 1-[(9Z)- hexadec-9-en-1-yloxy]-N,N-dimethyl-3-(octyloxy)propan-2-amine, (2R)—N,N-dimethyl-H(1-metoyloctyl)oxy]-3-[(9Z,12Z)-octadeca-9,12-dien-1-yloxy]propan-2-amine, (2R)-1-[(3,7-dimethyloctyl)oxy]-N,N-dimethyl-3-[(9Z, 12Z)-octadeca-9,12-dien-1-yloxy]propan-2-amine, N,N-dimethyl-1-(octyloxy)-3-({8-[(1S,2S)-2-{[(1R,2R)-2-pentylcyclopropyl]methyl}cyclopropyl]octyl}oxy)propan-2-amine, N,N-dimethyl-1-{[8-(2-oclylcyclopropyl)octyl]oxy}-3-(octyloxy)propan-2-amine and (11E,20Z,23Z)—N, N-dimethylnonacosa-11,20,2-trien-10-amine or a pharmaceutically acceptable salt or stereoisomer thereof.

In some embodiments, the LNP for formulating the antisense polynucleotide (e.g., ASO) compositions of the present disclosure may comprise a plurality of cationic lipids, such as a first and a second cationic lipid as described in US Patent Application Publication No.: US20130017223 to Hope et al. (the contents of which are incorporated herein by reference in their entirety). The first cationic lipid can be selected on the basis of a first property and the second cationic lipid can be selected on the basis of a second property. The first and second properties may be complementary. In some embodiments, the LNP may comprise one or more first cationic lipids and one or more second lipids, wherein the lipid particle comprises a solid core, as described in US Patent Publication No. US20120276209 to Cullis et al. (the contents of which are incorporated herein by reference in their entirety).

In some embodiments, the LNPs may contain one or more ionizable lipids such as C 12-200, DLin-KC2-DMA, and/or HGT5001, helper lipids, structural lipids, PEG-modified lipids, MC3, DLinDMA, DLinkC2DMA, cKK-E12, ICE, HGT5000, DODAC, DDAB, DMRIE DOSPA, DOGS, DODAP, DODMA, DMDMA, DODAC, DLenDMA, DMRIE, CLinDMA, CpLinDMA, DMOBA, DOcarbDAP, DLinDAP, DLincarbDAP, DLinCDAP, KLin-K-DMA, DLin-K-XTC2-DMA, HGT4003, and combinations thereof.

In some embodiments, the cationic lipid may be synthesized by methods known in the art and/or as described in PCT Patent Application Publication Nos. WO2012040184, WO2011153120, WO2011149733, WO2011090965, WO2011043913, WO2011022460, WO2012061259, WO2012054365, WO2012044638, WO2010080724 and WO201021865; the contents of each of which are herein incorporated by reference in their entirety.

In some embodiments, the nanoparticles described herein may comprise at least one cationic polymer described herein and/or known in the art.

The LNP for formulating the antisense polynucleotides (e.g., ASO(s)) of the present disclosure may comprise at least one helper lipid. The helper lipids in LNPs may contribute to their stability and delivery efficiency, and/or mitigate the toxicity owing to the cationic lipids. In some embodiments, the helper lipid is a lipid having cone-shape geometry, e.g., dioleoylphosphatidylethanolamine (DOPE). In some embodiments, the helper lipid is a cylindrical-shaped lipid such as phosphatidylcholine.

In some embodiments, the LNP for formulating the antisense polynucleotides (e.g., ASO(s)) of the present disclosure may comprise a phospholipid such as a synthetic phospholipid, including but not limited to, DDPC, DLPC, DMPC, DPPC, DSPC, DOPC, POPC and DEPC; DMPG, DPPG, DSPG and POPG; DMPA, DPPA and DSPA; DMPE, DPPE, DSPE and DOPE; DOPS; and polyglycerin attached phospholipids (PG phospholipid). The phospholipid may be selected based on administration routes, e.g., DPPC, POPC and POPG used in LNPs for injection and DOPC, POPC and DDPC used in LNPs for pulmonary delivery. In some embodiments, the phospholipid may be a purified lipid from a natural source.

In some embodiments, the LNP for formulating the antisense polynucleotides (e.g., ASO(s)) of the present disclosure may comprise one or more neutral helper lipids such as dioleoyl phosphoethanolamine (DOPE), prostaglandins, eicosanoids, glycerides, glycosylated diacyl glycerols, oxygenated fatty acids, NAGly and PAHSA.

The LNP for formulating the antisense polynucleotides (e.g., ASO(s)) of the present disclosure comprises a cholesterol, a naturally occurring cholesterol analogue, or a synthetic cholesterol like compound and the cholesterol derivatives. In some embodiments, a naturally occurring cholesterol analog may be selected from those by Patel et al., (*Nature Communications*, 2020; 983: doi.org/10.1038/s41467-020-14527-2); the contents of which are incorporated herein by reference in their entirety. In some embodiments, the LNPs comprise one or more cholesterol derivatives, e.g., PtdChol.

The LNP for formulating the antisense polynucleotides (e.g., ASO(s)) of the present disclosure comprises at least a PEGylated compound, such as a PEG polymer and a PEGylated lipid.

In some embodiments, the antisense polynucleotide (e.g., ASO) compositions of the preset disclosure may include at least one of the PEGylated lipids described in PCT Patent Application Publication No. WO2012099755, the contents of which are herein incorporated by reference in their entirety.

In some embodiments, the ratio of PEG in the lipid nanoparticle (LNP) formulations may be increased or decreased and/or the carbon chain length of the PEG lipid may be modified from C14 to C18 to alter the pharmacokinetics and/or biodistribution of the LNP formulations.

In some embodiments, The LNP for formulating the antisense polynucleotides (e.g., ASO(s)) of the present disclosure comprise PEG-c-DOMG. In some embodiments, the PEG-c-DOMG may be replaced with a PEG lipid such as, but not limited to, PEG-DSG (1,2-Distearoyl-sn-glycerol, methoxypolyethylene glycol), PEG-DPG (1,2-Dipalmitoyl-sn-glycerol, methoxypolyethylene glycol), or PEG-DMG 2000 (1,2-dimyristoyl-sn-glycero-3-phophoethanolamine-N-[methoxy(polyethylene glycol)-2000). As a non-limiting example, the LNP formulation may contain PEG-DMG 2000, DLin-DMA, DSPC and cholesterol. As another non-limiting example, the LNP formulation may contain PEG-DMG 2000, DLin-DMA, DSPC and cholesterol in a molar ratio of 2:40:10:48 (see e.g., Geall et al., *PNAS*, 2012, 109(36): 14604-14609; herein incorporated by reference in its entirety).

In some embodiments, the LNP formulations described herein may comprise a polycationic composition. As a non-limiting example, the polycationic composition may be selected from formula 1-60 of US Patent Publication No. US20050222064; the contents of which are herein incorporated by reference in their entirety. The LNP formulations comprising a polycationic composition may be used for the delivery of the nucleic acid vaccine compositions described herein in vivo and/or in vitro.

Lipid nanoparticle formulations may be improved by replacing the cationic lipid with a biodegradable cationic lipid which is known as a rapidly eliminated lipid nanoparticle (reLNP). Ionizable cationic lipids, such as, but not limited to, DLinDMA, DLin-KC2-DMA, and DLin-MC3-DMA, have been shown to accumulate in plasma and tissues over time and may be a potential source of toxicity. The rapid metabolism of the rapidly eliminated lipids can improve the tolerability and therapeutic index of the lipid nanoparticles. Inclusion of an enzymatically degraded ester linkage can improve the degradation and metabolism profile of the cationic component, while still maintaining the activity of the reLNP formulation. The ester linkage can be internally located within the lipid chain or it may be terminally located at the terminal end of the lipid chain. The internal ester linkage may replace any carbon in the lipid chain.

In some embodiments, the LNP for formulating the antisense polynucleotides (e.g., ASO(s)) of the present disclosure may comprise a cleavable lipid such as those described in PCT Patent Application Publication No. WO2012170889, the contents of which are herein incorporated by reference in their entirety.

In some embodiments, the LNP for formulating the antisense polynucleotide (e.g., ASO) compositions of the present disclosure may comprises a conjugated lipid. In a non-limiting example, the conjugated lipid may have a formula such as described in US Pub. No. US 20120264810 to Lin et al., the contents of which are incorporated herein by reference in their entirety. The conjugate lipid may form a lipid particle which further comprises a cationic lipid, a neutral lipid, and a lipid capable of reducing aggregation.

In some embodiments, the LNP for formulating the antisense polynucleotides (e.g., ASO(s)) of the present disclosure may comprise a mixture of cationic compounds and neutral lipids. As a non-limiting example, the cationic compounds may be formula (I) disclosed in PCT Patent Application Publication No.: WO 1999010390 to Ansell et al., the contents of which are described herein by reference in their entirety, and the neutral lipid may be selected from the group consisting of diacylphosphatidylcholine, diacylphosphatidylethanolamine, ceramide and sphingomyelin.

In some embodiments, the LNP formulations described herein may additionally comprise a permeability enhancer molecule. Non-limiting permeability enhancer molecules are described in US Patent Publication No. US20050222064; the contents of which are herein incorporated by reference in their entirety.

In some embodiments, the LNP for formulating the antisense polynucleotide (e.g., ASO) compositions of the present disclosure may be encapsulated into any polymer known in the art which may form a gel when injected into a subject. As another non-limiting example, the lipid nanoparticle may be encapsulated into a polymer matrix which may be biodegradable.

In some embodiments, the LNP for formulating the antisense polynucleotide (e.g., ASO) compositions of the present disclosure may be encapsulated in the lipid formulation to form a stable nucleic acid-lipid particle (SNALP) such as described in U.S. Pat. No. 8,546,554 to de Fougerolles et al., the contents of which are incorporated here by reference in their entirety. In one non-limiting example, the SNALP includes 40% 2,2-Dilinoleyl-4-dimethylaminoethyl-[1,3]-dioxolane (Lipid A), 10% dioleoylphosphatidylcholine (DSPC), 40% cholesterol, 10% polyethylene glycol (PEG)-C-DOMG (mole percent) with a particle size of 63.0±20 nm and a 0.027 nucleic acid/lipid ratio.

In some embodiments, the LNPs for formulating the antisense polynucleotide (e.g., ASO) compositions of the present disclosure may comprise an endosomal membrane destabilizer as disclosed in U.S. Pat. No. 7,189,705 to Lam et al., the contents of which are incorporated herein by reference in their entirety. As a non-limiting example, the endosomal membrane destabilizer may be a $Ca^{2+}$ ion.

In some embodiments, the LNPs for formulating the antisense polynucleotide (e.g., ASO) compositions of the present disclosure may comprise a charged lipid or an amino lipid. As used herein, the term "charged lipid" is meant to include those lipids having one or two fatty acyl or fatty alkyl chains and a quaternary amino head group. The quaternary amine carries a permanent positive charge. The head group can optionally include an ionizable group, such as a primary, secondary, or tertiary amine that may be protonated at physiological pH. The presence of the quaternary amine can alter the pKa of the ionizable group relative to the pKa of the group in a structurally similar compound that lacks the quaternary amine (e.g., the quaternary amine is replaced by a tertiary amine). In a non-limiting example, the charged lipid used in any of the formulations described herein may be any charged lipid described in EP2509636 to Manoharan et al., the contents of which are incorporated herein by reference in their entirety. In some embodiments, a charged lipid is referred to as an "amino lipid." In a non-limiting example, the amino lipid may be any amino lipid described in US Pub. No. US20110256175 to Hope et al., the contents of which are incorporated herein by reference in their entirety. For example, the amino lipids may have the structure disclosed in Tables 3-7 of Hope, such as structure (II), DLin-K-C2-DMA, DLin-K2-DMA, DLin-K6-DMA, etc. In another non-limiting example, the amino lipids may be any amino lipid described in US 20110117125 to Hope et al., the contents of which are incorporated herein by reference in their entirety, such as a lipid of structure (I), DLin-K-DMA, DLin-C-DAP, DLin-DAC, DLin-MA, DLin-S-DMA, etc. In another non-limiting example, the amino lipid may have the structure (I), (II), (III), or (IV), or 4-(R)-DLin-K-DMA (VI), 4-(S)-DLin-K-DMA (V) as described in PCT Patent Application Publication No. WO2009132131 to Manoharan et al., the contents of which are incorporated herein by reference in their entirety.

In some embodiments, the LNPs for formulating the antisense polynucleotide (e.g., ASO) compositions of the present disclosure may comprise reverse head group lipids, e.g., formulated with a zwitterionic lipid comprising a headgroup wherein the positive charge is located near the acyl chain region and the negative charge is located at the distal end of the head group, such as a lipid having structure (A) or structure (I) described in PCT Patent Application Publication No. WO2011056682 to Leung et al., the contents of which are incorporated herein by reference in their entirety.

In some embodiments, the lipid components of the LNP to nucleic acid ratio (mass/mass ratio) (e.g., lipids to polynucleotide (e.g., ASO) compositions ratio) may be in the range of from about 1:1 to about 50:1, from about 1:1 to about 25:1, from about 3:1 to about 15:1, from about 4:1 to about 10:1, from about 5:1 to about 9:1, or about 6:1 to about 9:1, or 1:1, 2:1, 3:1, 4:1, 5:1, 6:1, 7:1, 8:1. 9:1, 10:1, 11:1, 12:1, 13:1. 14:1, 15:1, 16:1, 17:1, 18:1, 19:1, 20:1, 21:1, 22:1, 23:1, 24:1, 25:1, 26:1, 27:1, 28:1, 29:1, 30:1, 31:1, 32:1, 33:1, 34:1, 35:1, 36:1, 37:1, 38:1, 38:1, 39:1, 40:1, 41:1, 42:1, 43:1, 44:1, 45:1, 46:1, 47:1, 48:1, 49:1, or 50:1.

In some embodiments, the LNP formulation may be formulated by the methods described in International Publication Nos. WO2011127255 or WO2008103276. As a non-limiting example, the antisense polynucleotide (e.g., ASO) compositions of the present disclosure may be encapsulated in any of the lipid nanoparticle (LNP) formulations described in WO2011127255 and/or WO2008103276; the contents of each of which are herein incorporated by reference in their entirety.

As a non-limiting example, the LNP may be the lipid nanoparticles described in PCT Patent Application Publication No. WO2012170930, the contents of which are herein incorporated by reference in their entirety. As another non-limiting example, the lipid formulation may comprise a cationic lipid of formula A, a neutral lipid, a sterol and a PEG or PEG-modified lipid disclosed in US Patent Publication No.: US 20120101148 to Akinc et al., the contents of which are incorporated herein by reference in their entirety.

As another non-limiting example, the LNP may be a nanoparticle to be delivered by a parenteral route as described in U.S. Patent Application Publication No. US20120207845; the contents of which are herein incorporated by reference in their entirety.

In some embodiments, the antisense polynucleotide (e.g., ASO) compositions may be encapsulated into a rapidly eliminated lipid nanoparticle and the rapidly eliminated lipid nanoparticle may then be encapsulated into a polymer, hydrogel and/or surgical sealant described herein and/or known in the art. As a non-limiting example, the polymer, hydrogel or surgical sealant may be PLGA, ethylene vinyl acetate (EVAc), poloxamer, GELSITE® (Nanotherapeutics, Inc. Alachua, FL), HYLENEX® (Halozyme Therapeutics, San Diego CA), surgical sealants such as fibrinogen polymers (Ethicon Inc. Cornelia, GA), TISSELL® (Baxter International, Inc., Deerfield, IL), PEG-based sealants, and COSEAL® (Baxter International, Inc., Deerfield, IL).

In some embodiments, the antisense polynucleotide (e.g., ASO) compositions may be formulated in a solid lipid nanoparticle (SLN). A solid lipid nanoparticle (SLN) may be spherical with an average diameter between 10 to 1000 nm, or between 100 to 1000 nm. SLN possess a solid lipid core matrix that can solubilize lipophilic molecules and may be stabilized with surfactants and/or emulsifiers. The lipid nanoparticle may be a self-assembly lipid-polymer nanoparticle (see Zhang et al., *ACS Nano*, 2008, 2 (8):1696-1702; the contents of which are herein incorporated by reference in their entirety.

In some embodiments, the LNPs for formulating the antisense polynucleotide (e.g., ASO) composition of the present disclosure may comprise a targeting lipid with a targeting moiety such as the targeting moieties disclosed in US Patent Application Publication No.: US20130202652 to Manoharan et al., the contents of which are incorporated herein by reference in their entirety. As a non-limiting example, the targeting moiety of formula I of US 20130202652 to Manoharan et al. may be selected in order to favor the lipid being localized with a desired organ, tissue, cell, cell type or subtype, or organelle. Non-limiting targeting moieties that are contemplated in the present disclosure include transferrin, anisamide, an RGD peptide, prostate specific membrane antigen (PSMA), fucose, an antibody, or an aptamer.

Micelles

In some embodiments, the antisense polynucleotide (e.g., ASO) compositions may be formulated in micelles. The term "micelle", as used herein, refers to any water-soluble aggregate which is spontaneously and reversibly formed from amphiphilic compounds or ions. The size of micelles may be small, less than 10 nm, or less than 9 nm, or less than 8 nm, or less than 7 nm, or less than 6 nm.

In some embodiments, the antisense polynucleotide (e.g., ASO) compositions may be formulated in reverse micelles. The reverse micelle is a microemulsion comprising a dispersion of water-nanodroplets in oil. The reverse micelles can be defined as a system wherein water forms the internal phase and the hydrophobic tails of the lipids form the continuous phase. The reverse micelle may comprise a phospholipid or a sphingolipid. Reverse micelles containing oil(s), surfactant(s), co-surfactant(s), and an aqueous phase are also characterized as water-in-oil microemulsions. As a non-limiting example, the reverse micelle may be prepared using methods described in U.S. Pat. No. 8,877,237; the contents of which are incorporated herein by reference in their entirety. The reverse micelle may be formulated for absorption of the antisense polynucleotides to be delivered across mucosa, such as mouth, nasal and/or rectal mucosa.

In some embodiments, the antisense polynucleotide compositions may be formulated in a micelle using a temperature sensitive polymer. The micelle may be covered with glucose which allows significant delivery of the antisense polynucleotide compositions into the brain. The temperature-sensitive copolymer comprises a cationic block (e.g., a cationic amino acid polymer block) and a temperature-sensitive block (e.g., polyethylene glycol). As a non-limiting example, the temperature sensitive polymer may be made by methods described in the PCT Publication No.: WO2016186204; the contents of which are incorporated herein by reference in their entirety.

Exosomes and ECVs

Exosomes and extracellular vesicles (ECVs) are small membrane vesicles of endocytic origin that are released into the extracellular environment following fusion of multivesicular bodies with the plasma membrane. Exosomes and ECVs can transport large molecules which are appropriated as nucleic acid delivery vehicles (e.g., Raposo, 2013, *J Cell Biol*, 200:373; and Validi, 2007, *Nat Cell Biol*, 9:654). Exosomes may be small in size from 10 to 200 nm, for from 10-150 nm, or from 20-180 nm, or from 40-120 nm, or 10 nm, 20 nm, 30 nm, 40 nm, 50 nm, 60 nm, 70 nm, 80 nm, 100 nm, 120 nm, 140 nm, 160 nm, 180 nm, 200 nm. In some embodiments, exosomes and ECVs may be large in size from 100-1000 nm, or from 100-600 nm.

In some embodiments, the antisense polynucleotide (e.g., ASO) compositions may be formulated using extracellular vesicles (ECVs) and/or exosomes. Exosomes may be made using exosome producing cells. As a non-limiting example, the antisense polynucleotide-exosome formulations may be made using methods known in the art and/or as described in the PCT Publication No.: WO2017054085; the contents of which are incorporated herein by reference in their entirety.

In some embodiments, the antisense polynucleotide (e.g., ASO) compositions formulated into exosomes by transferring the antisense polynucleotides (e.g., ASO constructs) into exosome-producing cells using any methods known in the art such as but not limited to electroporation, transfection using a transfection agent such as lipofection, transformation using heat shock and viral infection. As a non-limiting example, the polynucleotide-exosome formulations may be made using methods described in U.S. Pat. No. 10,695,443; the contents of which are incorporated herein by reference in their entirety.

In some embodiments, the antisense polynucleotide (e.g., ASO) compositions of the present disclosure may be formulated using a targeted and modular exosome loading system. The targeted exosome may comprise a fusion protein that includes an RNA-binding domain and an exosome targeting domain. The RNA biding domain of the fusion protein can bind to the antisense polynucleotide (e.g., ASO) of the present disclosure such that the antisense polynucleotides are packaged inside of the exosome. The exosome targeting domain may include exosome targeting domains of lysosome-associated proteins (e.g., LAMPs and LIMPs).

Other Nanoparticles and Delivery Agents

In some embodiments, the antisense polynucleotide (e.g., ASO) compositions of the present disclosure may be complexed with a cationic amphiphile in an oil-in-water (o/w) emulsion such as described in European Publication No.: EP2298358 to Satishchandran et al., the contents of which are incorporated herein by reference in their entirety. The cationic amphiphile may be a cationic lipid, modified or unmodified spermine, bupivacaine, or benzalkonium chloride and the oil may be a vegetable or an animal oil. As a non-limiting example, at least 10% of the nucleic acid-cationic amphiphile complex is in the oil phase of the oil-in-water emulsion (see e.g., the complex described in EP2298358 to Satishchandran et al.; the contents of which are incorporated herein by reference in its entirety.

The antisense polynucleotide (e.g., ASO) compositions of the present disclosure may be formulated in a carbohydrate nanoparticle comprising a carbohydrate carrier. As a non-limiting example, the carbohydrate carrier may include, but is not limited to, an anhydride-modified phytoglycogen or glycogen-type material, phytoglycogen octenyl succinate, phytoglycogen beta-dextrin, anhydride-modified phytoglycogen beta-dextrin. (See e.g., PCT Patent Application Publication No. WO2012109121; the contents of which are herein incorporated by reference in their entirety).

The antisense polynucleotide (e.g., ASO) compositions of the present disclosure may be encapsulated in, linked to and/or associated with synthetic nanocarriers. Synthetic nanocarriers include, but are not limited to, those described in PCT Patent Application Publication Nos. WO2010005740, WO2010030763, WO201213501, WO2012149252, WO2012149255, WO2012149259, WO2012149265, WO2012149268, WO2012149282, WO2012149301, WO2012149393, WO2012149405, WO2012149411, WO2012149454 and WO2013019669, and US Pub. Nos. US20110262491, US20100104645, US20100087337 and US20120244222. The synthetic nanocarriers may be formulated using methods known in the art and/or described herein, for example, by the methods described in PCT Patent Application Publication Nos. WO2010005740, WO2010030763 and WO201213501 and US Pub. Nos. US20110262491, US20100104645, US20100087337 and US2012024422. The synthetic nanocarrier formulations may be lyophilized by methods described in PCT Patent Application Publication Pub. No. WO2011072218 and U.S. Pat. No. 8,211,473; the contents of each of which are herein incorporated by reference in their entirety.

In some embodiments, the synthetic nanocarriers may contain reactive groups to release the antisense polynucleotide (e.g., ASO) compositions of the present disclosure (see PCT Patent Application Publication No. WO20120952552 and US Pub No. US20120171229, the contents of each of which are herein incorporated by reference in their entirety). The synthetic nanocarrier may be formulated to release the antisense polynucleotide (e.g., ASO) compositions at a specified pH and/or after a desired time interval, for example, after 24 hours and/or at a pH of 4.5 (see PCT Patent Application Publication Nos. WO2010138193 and WO2010138194 and US Pub Nos. US20110020388 and US20110027217, the contents of each of which are herein incorporated by reference in their entirety).

In some embodiments, the synthetic nanocarriers may be formulated for targeted release, controlled and/or sustained release of the antisense polynucleotide (e.g., ASO) compositions of the present disclosure. As a non-limiting example, the synthetic nanocarriers for sustained release may be formulated by methods known in the art, described herein and/or as described in PCT Patent Application Publication No. WO2010138192 and US Pub No. US20100303850, the contents each of which are herein incorporated by reference in their entirety.

In some embodiments, the antisense polynucleotide (e.g., ASO) compositions of the present disclosure may be formulated in a modular composition such as described in U.S. Pat. No. 8,575,123 to Manoharan et al., the contents of which are herein incorporated by reference in their entirety. The modular composition may comprise at least one endosomolytic component, and at least one targeting ligand.

In some embodiments, the antisense polynucleotide (e.g., ASO) composition of the present disclosure may be formulated with formulated lipid particles (FLiPs) disclosed in U.S. Pat. No. 8,148,344 to Akinc et al., the contents of which are herein incorporated by reference in their entirety.

In some embodiments, the antisense polynucleotide (e.g., ASO) composition of the present disclosure may be fully encapsulated in a lipid particle disclosed in US Pub. No. US 20120276207 to Maurer et al., the contents of which are incorporated herein by reference in their entirety. The lipid particles may include a cationic lipid having the formula A, or a lipid composition comprising preformed lipid vesicles and a destabilizing agent which forms a mixture with an active agent.

In some embodiments, the antisense polynucleotide (e.g., ASO) composition of the present disclosure may be formulated in a neutral liposomal formulation such as disclosed in US Pub. No. US 20120244207 to Fitzgerald et al., the contents of which are incorporated herein by reference in their entirety. The phrase "neutral liposomal formulation" refers to a liposomal formulation with a near neutral or neutral surface charge at a physiological pH (e.g., about 7.0).

In some embodiments, the antisense polynucleotide (e.g., ASO) compositions of the present disclosure may be formulated with a lipid bilayer carrier, wherein the antisense polynucleotide (e.g., ASO) compositions may be combined with a lipid-detergent mixture comprising a lipid mixture of an aggregation-preventing agent, a cationic lipid and a fusogenic lipid and a detergent. The nucleic acid-lipid-detergent mixture is dialyzed against a buffered salt solution to remove the detergent and to encapsulate the nucleic acid in a lipid bilayer carrier and provide a lipid bilayer-nucleic acid composition (see, e.g., PCT Patent Application Publication No. WO1999018933 to Cullis et al., the contents of which are incorporated herein by reference in their entirety).

In some embodiments, formulations comprising the antisense polynucleotide (e.g., ASO) compositions described herein may also be constructed or altered such that they passively or actively are directed to different cell types in vivo, including but not limited to immune cells, endothelial cells, antigen presenting cells, and leukocytes (Akinc et al. *Mol Ther.* 2010, 18:1357-1364; Song et al., *Nat Biotechnol.* 2005, 23:709-717; Judge et al., *J Clin Invest.* 2009, 119: 661-673; Kaufmann et al., *Microvasc Res,* 2010, 80:286-293; Santel et al., *Gene Ther* 2006, 13:1222-1234; Santel et al., *Gene Ther,* 2006, 13:1360-1370; Gutbier et al., *Pulm Pharmacol. Ther.* 2010, 23:334-344; Basha et al., *Mol. Ther.* 2011, 19:2186-2200; Fenske and Cullis, *Expert Opin Drug Deliv.* 2008, 5:25-44; Peer et al., *Science.* 2008, 319:627-630; Peer and Lieberman, *Gene Ther.* 2011, 18:1127-1133; the contents of each of which are incorporated herein by reference in their entirety).

One example of passive targeting of formulations to liver cells includes the DLin-DMA, DLin-KC2-DMA and DLin-MC3-DMA-based lipid nanoparticle formulations which have been shown to bind to apolipoprotein E and promote binding and uptake of these formulations into hepatocytes in vivo (Akinc et al. *Mol Ther.* 2010, 18:1357-1364). The LNPs may also be coated on their surface with cell-specific ligands to selective targeting. Exemplary ligands may include folate, transferrin, N-acetylgalactosamine (GalNAc), and antibody and/or its fragment targeted approaches (Kolhatkar et al., *Curr Drug Discov Technol.* 2011, 8:197-206; Musacchio and Torchilin, *Front Biosci.* 2011, 16:1388-1412; Yu et al., *Mol Membr Biol.* 2010, 27:286-298; Patil et al., *Crit Rev Ther Drug Carrier Syst.* 2008, 25:1-61; Benoit et al., *Biomacromolecules.* 2011, 12:2708-2714; Zhao et al., *Expert Opin Drug Deliv.* 2008, 5:309-319; Akinc et al., *Mol Ther.* 2010, 18:1357-1364; Srinivasan et al., *Methods Mol Biol.* 2012, 820:105-116; Ben-Arie et al., *Methods Mol Biol.* 2012, 757:497-507; Peer *J Control Release.* 2010, 20:63-68; Peer et al., *Proc Natl Acad Sci USA.* 2007, 104:4095-4100; Kim et al., *Methods Mol Biol.* 2011, 721:339-353; Subramanya et al., *Mol Ther.* 2010, 18:2028-2037; Song et al., *Nat Biotechnol.* 2005, 23:709-717; Peer et al., *Science.* 2008, 319:627-630; Peer and Lieberman, *Gene Ther.* 2011, 18:1127-1133); the contents of each of which are incorporated herein by reference in their entirety).

In some embodiments, formulations comprising the antisense polynucleotide (e.g., ASO) compositions described herein are disease target specific.

In some embodiments, formulations comprising the polynucleotide (e.g., ASO) compositions described herein may also be constructed or altered such that their properties are suitable for different administration routes, such as parenteral (intravenously, intramuscularly or subcutaneously), oral, rectal, ophthalmic and/or topical administration. As non-limiting examples, the formulations described herein may be optimized for oral administration by including at least one cationic biopolymer such as, but not limited to, chitosan or a derivative thereof (see, U.S. Pub. No. US20120282343; the contents of which are herein incorporated by reference in their entirety).

In some embodiments, the antisense polynucleotide (e.g., ASO) compositions of the present disclosure can be formulated for controlled release and/or targeted delivery. As used herein, "controlled release" refers to a pharmaceutical composition or compound release profile that conforms to a particular pattern of release to affect a therapeutic outcome. As used herein, "sustained release" refers to a pharmaceutical composition or compound that conforms to a release rate over a specific period of time. The period of time may include, but is not limited to, hours, days, weeks, months and years. In some embodiments, the antisense polynucleotide (e.g., ASO) compositions may be encapsulated into a delivery agent described herein and/or known in the art for controlled release and/or targeted delivery. As used herein, the term "encapsulate" means to enclose, surround, or encase. As it relates to the formulation of the compositions of the disclosure, encapsulation may be substantial, complete or partial. The term "substantially encapsulated" means that at least greater than 50, 60, 70, 80, 85, 90, 95, 96, 97, 98, 99, 99.9, 99.9 or greater than 99.999% of the pharmaceutical composition of the disclosure may be enclosed, surrounded or encased within the delivery agent. "Partially encapsulated" means that less than 10, 10, 20, 30, 40 50 or less of the pharmaceutical composition or compound of the disclosure may be enclosed, surrounded or encased within the delivery agent. Advantageously, encapsulation may be determined by measuring the escape or the activity of the pharmaceutical composition of the disclosure using fluorescence and/or electron micrograph. For example, at least 1, 5, 10, 20, 30, 40, 50, 60, 70, 80, 85, 90, 95, 96, 97, 98, 99, 99.9, 99.99 or greater than 99.99% of the pharmaceutical composition of the disclosure are encapsulated in the delivery agent.

In some embodiments, the formulations comprising the antisense polynucleotide (e.g., ASO) compositions for controlled release and/or targeted delivery may also include at least one controlled release coating. Controlled release coatings include, but are not limited to, OPADRY®, polyvinylpyrrolidone/vinyl acetate copolymer, polyvinylpyrrolidone, hydroxypropyl methylcellulose, hydroxypropyl cellulose, hydroxyethyl cellulose, EUDRAGIT RL®, EUDRAGIT RS® and cellulose derivatives such as ethylcellulose aqueous dispersions (AQUACOAT® and SURELEASE®). In some embodiments, the controlled release and/or targeted delivery formulation may comprise at least one degradable polyester which may contain polycationic side chains.

In some embodiments, the formulations comprising the antisense polynucleotide (e.g., ASO) compositions may be formulated with a sustained release nanoparticle comprising a polymer as described in PCT Patent Application Publication No. WO2010075072 and US Pub Nos. US20100216804, US20110217377 and US20120201859; the contents of each of which are herein incorporated by reference in their entirety.

Excipients and Adjuvants

In some embodiments, pharmaceutical formulations may additionally comprise a pharmaceutically acceptable excipient, which, as used herein, includes, but are not limited to, any and all solvents, dispersion media, diluents, or other liquid vehicles, dispersion or suspension aids, surface active agents, isotonic agents, thickening or emulsifying agents, preservatives, solid binders, lubricants, flavoring agents, stabilizers, anti-oxidants, osmolality adjusting agents, pH adjusting agents and the like, as suited to the particular dosage form desired. Various excipients for formulating pharmaceutical compositions and techniques for preparing the composition are known in the art (see Remington: The Science and Practice of Pharmacy, 21" Edition, A. R. Gennaro (Lippincott, Williams & Wilkins, Baltimore, Md., 2006; incorporated herein by reference in its entirety). The use of a conventional excipient medium may be contemplated within the scope of the present disclosure, except insofar as any conventional excipient medium is incompatible with a substance or its derivatives, such as by producing any undesirable biological effect or otherwise interacting in a deleterious manner with any other component(s) of the pharmaceutical composition, its use is contemplated to be within the scope of this disclosure.

In some embodiments, a pharmaceutically acceptable excipient may be at least 95%, at least 96%, at least 97%, at least 98%, at least 99%, or 100% pure. In some embodiments, an excipient is approved for use for humans and for veterinary use. In some embodiments, an excipient may be approved by United States Food and Drug Administration. In some embodiments, an excipient may be of pharmaceutical grade. In some embodiments, an excipient may meet the standards of the United States Pharmacopoeia (USP), the European Pharmacopoeia (EP), the British Pharmacopoeia, and/or the International Pharmacopoeia. Pharmaceutically acceptable excipients used in the manufacture of pharmaceutical compositions include, but are not limited to, inert diluents, dispersing and/or granulating agents, surface active agents and/or emulsifiers, disintegrating agents, binding agents, preservatives, buffering agents, lubricating agents, and/or oils. Such excipients may optionally be included in pharmaceutical compositions. The composition may also include excipients such as cocoa butter and suppository waxes, coloring agents, coating agents, sweetening, flavoring, and/or perfuming agents.

Exemplary diluents include, but are not limited to, calcium carbonate, sodium carbonate, calcium phosphate, dicalcium phosphate, calcium sulfate, calcium hydrogen phosphate, sodium phosphate lactose, sucrose, cellulose, microcrystalline cellulose, kaolin, mannitol, sorbitol, inositol, sodium chloride, dry starch, cornstarch, powdered sugar, etc., and/or combinations thereof.

Exemplary granulating and/or dispersing agents include, but are not limited to, potato starch, corn starch, tapioca starch, sodium starch glycolate, clays, alginic acid, guar gum, citrus pulp, agar, bentonite, cellulose and wood products, natural sponge, cation-exchange resins, calcium carbonate, silicates, sodium carbonate, cross-linked polyvinylpyrrolidone) (crospovidone), sodium carboxymethyl starch (sodium starch glycolate), carboxymethyl cellulose, crosslinked sodium carboxymethyl cellulose (croscarmellose), methylcellulose, pregelatinized starch (starch 1500), microcrystalline starch, water insoluble starch, calcium carboxymethyl cellulose, magnesium aluminum silicate (VEEGUM®), sodium lauryl sulfate, quaternary ammonium compounds, etc., and/or combinations thereof.

Exemplary surface active agents and/or emulsifiers include, but are not limited to, natural emulsifiers (e.g., acacia, agar, alginic acid, sodium alginate, tragacanth, chondrux, cholesterol, xanthan, pectin, gelatin, egg yolk, casein, wool fat, cholesterol, wax, and lecithin), colloidal clays (e.g., bentonite (aluminum silicate) and VEEGUM® (magnesium aluminum silicate)), long chain amino acid derivatives, high molecular weight alcohols (e.g., stearyl alcohol, cetyl alcohol, oleyl alcohol, triacetin monostearate, ethylene glycol distearate, glyceryl monostearate, and propylene glycol monostearate, polyvinyl alcohol), carbomers (e.g., carboxy polymethylene, polyacrylic acid, acrylic acid polymer, and carboxyvinyl polymer), carrageenan, cellulosic derivatives (e.g., carboxymethylcellulose sodium, powdered cellulose, hydroxymethyl cellulose, hydroxypropyl cellulose, hydroxypropyl methylcellulose, methylcellulose), sorbitan fatty acid esters (e.g., polyoxyethylene sorbitan monolaurate (TWEEN® 20), polyoxyethylene sorbitan (TWEEN® 60), polyoxyethylene sorbitan monooleate (TWEEN® 80), sorbitan monopalmitate (SPAN® 40), sorbitan monostearate (SPAN® 60), sorbitan tristearate (SPAN® 65), glyceryl monooleate, sorbitan monooleate (SPAN® 80)), polyoxyethylene esters (e.g., polyoxyethylene monostearate (MYRJ® 45), polyoxyethylene hydrogenated castor oil, polyethoxylated castor oil, polyoxymethylene stearate, and SOLUTOL®), sucrose fatty acid esters, polyethylene glycol fatty acid esters (e.g., CREMOPHOR®), polyoxyethylene ethers, (e.g., polyoxyethylene lauryl ether (BRIJ® 30)), poly(vinyl-pyrrolidone), diethylene glycol monolaurate, triethanolamine oleate, sodium oleate, potassium oleate, ethyl oleate, oleic acid, ethyl laurate, sodium lauryl sulfate, PLUORINC® F 68, POLOXAMER® 188, cetrimonium bromide, cetylpyridinium chloride, benzalkonium chloride, docusate sodium, etc. and/or combinations thereof.

Exemplary preservatives may include, but are not limited to, antioxidants, chelating agents, antimicrobial preservatives, antifungal preservatives, alcohol preservatives, acidic preservatives, and/or other preservatives. Oxidation is a potential degradation pathway for mRNA, especially for liquid mRNA formulations. In order to prevent oxidation, antioxidants can be added to the formulation. Exemplary antioxidants include, but are not limited to, alpha tocopherol, ascorbic acid, acorbyl palmitate, benzyl alcohol, butylated hydroxyanisole, EDTA, m-cresol, methionine, butylated hydroxytoluene, monothioglycerol, potassium metabisulfite, propionic acid, propyl gallate, sodium ascorbate, sodium bisulfite, sodium metabisulfite, thioglycerol and/or sodium sulfite. Exemplary chelating agents include ethylenediaminetetraacetic acid (EDTA), citric acid monohydrate, disodium edetate, dipotassium edetate, edetic acid, fumaric acid, malic acid, phosphoric acid, sodium edetate, tartaric acid, and/or trisodium edetate. Exemplary antimicrobial preservatives include, but are not limited to, benzalkonium chloride, benzethonium chloride, benzyl alcohol, bronopol, cetrimide, cetylpyridinium chloride, chlorhexidine, chlorobutanol, chlorocresol, chloroxylenol, cresol, ethyl alcohol, glycerin, hexetidine, imidurea, phenol, phenoxyethanol, phenylethyl alcohol, phenylmercuric nitrate, propylene glycol, and/or thimerosal. Exemplary antifungal preservatives include, but are not limited to, butyl paraben, methyl paraben, ethyl paraben, propyl paraben, benzoic acid, hydroxybenzoic acid, potassium benzoate, potassium sorbate, sodium benzoate, sodium propionate, and/or sorbic acid. Exemplary alcohol preservatives include, but are not limited to, ethanol, polyethylene glycol, phenol, phenolic compounds, bisphenol, chlorobutanol, hydroxybenzoate, and/or phenyl ethyl alcohol. Exemplary acidic preservatives include, but are not limited to, vitamin A, vitamin C, vitamin E, beta-carotene, citric acid, acetic acid, dehydroacetic acid, ascorbic acid, sorbic acid, and/or phytic acid. Other preservatives include, but are not limited to, tocopherol, tocopherol acetate, deteroxime mesylate, cetrimide, butylated hydroxyanisol (BHA), butylated hydroxytoluened (BHT), ethylenediamine, sodium lauryl sulfate (SLS), sodium lauryl ether sulfate (SLES), sodium bisulfite, sodium metabisulfite, potassium sulfite, potassium metabisulfite, GLYDANT PLUS®, PHENONIP®, methylparaben, GERMALL® 115, GERMABEN® !!, NEOLONE™, KATHON™, and/or EUXYL®.

Exemplary binding agents include, but are not limited to, starch (e.g., cornstarch and starch paste); gelatin; sugars (e.g., sucrose, glucose, dextrose, dextrin, molasses, lactose, lactitol, mannitol); amino acids (e.g., glycine); natural and synthetic gums (e.g., acacia, sodium alginate, extract of Irish moss, panwar gum, ghatti gum, mucilage of isapol husks, carboxymethylcellulose, methylcellulose, ethylcellulose, hydroxyethylcellulose, hydroxypropyl cellulose, hydroxypropyl methylcellulose, microcrystalline cellulose, cellulose acetate, poly(vinyl-pyrrolidone), magnesium aluminum silicate (VEEGUM®), and larch arabogalactan); alginates; polyethylene oxide; polyethylene glycol; inorganic calcium salts; silicic acid; polymethacrylates; waxes; water; alcohol; etc.; and combinations thereof.

In some embodiments, the pH of the pharmaceutical solutions are maintained between pH 5 and pH 8 to improve stability. Exemplary buffers to control pH may include, but are not limited to sodium phosphate, sodium citrate, sodium succinate, histidine (or histidine-HCl), sodium carbonate, and/or sodium malate. In another embodiment, the exemplary buffers listed above may be used with additional monovalent counterions (including, but not limited to potassium). Divalent cations may also be used as buffer counterions; however, these are not preferred due to complex formation and/or mRNA degradation.

Exemplary buffering agents may also include, but are not limited to, citrate buffer solutions, acetate buffer solutions, phosphate buffer solutions, ammonium chloride, calcium carbonate, calcium chloride, calcium citrate, calcium glubionate, calcium gluceptate, calcium gluconate, D-gluconic acid, calcium glycerophosphate, calcium lactate, propanoic acid, calcium levulinate, pentanoic acid, dibasic calcium phosphate, phosphoric acid, tribasic calcium phosphate, calcium hydroxide phosphate, potassium acetate, potassium chloride, potassium gluconate, potassium mixtures, dibasic potassium phosphate, monobasic potassium phosphate, potassium phosphate mixtures, sodium acetate, sodium bicarbonate, sodium chloride, sodium citrate, sodium lactate, dibasic sodium phosphate, monobasic sodium phosphate, sodium phosphate mixtures, tromethamine, magnesium hydroxide, aluminum hydroxide, alginic acid, pyrogen-free water, isotonic saline, Ringer's solution, ethyl alcohol, etc., and/or combinations thereof.

Exemplary lubricating agents include, but are not limited to, magnesium stearate, calcium stearate, stearic acid, silica, talc, malt, glyceryl behanate, hydrogenated vegetable oils, polyethylene glycol, sodium benzoate, sodium acetate, sodium chloride, leucine, magnesium lauryl sulfate, sodium lauryl sulfate, etc., and combinations thereof.

Exemplary oils include, but are not limited to, almond, apricot kernel, avocado, babassu, bergamot, black current seed, borage, cade, camomile, canola, caraway, carnauba, castor, cinnamon, cocoa butter, coconut, cod liver, coffee, corn, cotton seed, emu, eucalyptus, evening primrose, fish, flaxseed, geraniol, gourd, grape seed, hazel nut, hyssop, isopropyl myristate, jojoba, kukui nut, lavandin, lavender, lemon, *Litsea cubeba*, macademia nut, mallow, mango seed, meadowfoam seed, mink, nutmeg, olive, orange, orange roughy, palm, palm kernel, peach kernel, peanut, poppy seed, pumpkin seed, rapeseed, rice bran, rosemary, safflower, sandalwood, sasquana, savoury, sea buckthorn, sesame, shea butter, silicone, soybean, sunflower, tea tree, thistle, tsubaki, vetiver, walnut, and wheat germ oils. Exemplary oils include, but are not limited to, butyl stearate, caprylic triglyceride, capric triglyceride, cyclomethicone, diethyl sebacate, dimethicone 360, isopropyl myristate, mineral oil, octyldodecanol, oleyl alcohol, silicone oil, and/or combinations thereof.

Excipients such as cocoa butter and suppository waxes, coloring agents, coating agents, sweetening, flavoring, and/ or perfuming agents can be present in the composition, according to the judgment of the formulator.

Exemplary additives include physiologically biocompatible buffers (e.g., trimethylamine hydrochloride), addition of chelants (such as, for example, DTPA or DTPA-bisamide) or calcium chelate complexes (as for example calcium DTPA, CaNaDTPA-bisamide), or, optionally, additions of calcium or sodium salts (for example, calcium chloride, calcium ascorbate, calcium gluconate or calcium lactate). In addition, antioxidants and suspending agents can be used.

In some embodiments, the polynucleotide (e.g., antisense polynucleotide) of the present disclosure that encodes an antigen may be formulated with adjuvants as nucleic acid vaccines. Adjuvants may be used to enhance the immunogenicity of the nucleic acid vaccine, modify the immune response, reduce the amount of nucleic acid vaccine needed for immunization, reduced the frequency of additional or "booster" immunizations needed or to create an improved immune response in those with weakened or immunocompromised immune systems or the elderly. Co-administration of the adjuvant may be any method known in the art or described herein such as, but not limited to, intravenous (IV), intramuscular (IM), subcutaneous (SC) or intradermal (ID).

Adjuvants may be selected for use with the nucleic acid vaccines by one of ordinary skill in the art. The adjuvants may be natural or synthetic. The adjuvants may also be organic or inorganic. In some embodiments, the adjuvant used with the polynucleotide vaccine is from a class of adjuvants such as, but not limited to carbohydrates, microorganisms, mineral salts (e.g., aluminum hydroxide, aluminum phosphate gel, or calcium phosphate gel), emulsions (e.g., oil emulsion, surfactant based emulsion, purified saponin, and oil-in water emulsion), inert vehicles, particulate adjuvants (e.g., unilamellar liposomal vehicles such as virosomes or a structured complex of saponions and lipids such as polylactide co-glycolide (PLG)), microbial derivatives, endogenous human immunomodulators, and tensoactive compounds. Listings of adjuvants which may be used with the nucleic acid vaccines described herein may be found on the web-based vaccine adjuvant database Vaxjo (see e.g., Sayers et al., *Journal of Biomedicine and Biotechnology;* 2012; 2012:831486; the contents of which are herein incorporated by reference in their entirety).

Other exemplary adjuvants may include but are not limited to, interferons, TNF-alpha, TNF-beta, chemokines (e.g., CCL21, eotaxin, HMGB1, SA100-8alpha, GCSF, GMCSF, granulysin, lactoferrin, ovalbumin, CD40L, CD28 agonists, PD1, soluble PD1, PDL1, PDL2) or interleukins (e.g., IL1, IL2, IL4, IL6, IL7, IL10, IL12, IL13, IL15, IL17, IL18, IL21, and IL23), Abisco-100 vaccine adjuvant, Adamantylamide Dipeptide Vaccine Adjuvant, Adjumer™, AF03, Albumin-heparin microparticles vaccine adjuvant, Algal Glucan, Algammulin, alhydrogel, aluminum hydroxide vaccine adjuvant, aluminum phosphate vaccine adjuvant, aluminum potassium sulfate adjuvant, Aluminum vaccine adjuvant, amorphous aluminum hydroxyphosphate sulfate adjuvant, Arlacel A, AS0, AS04, AS03, AS-2 vaccine adjuvant, Avridine®, B7-2 vaccine adjuvant, Bay R1005, *Bordetella pertussis* component Vaccine Adjuvant, Bupivacaine vaccine adjuvant, Calcium Phosphate Gel, Calcium phosphate vaccine adjuvant, Cationic Liposomal Vaccine Adjuvant, cationic liposome-DNA complex JVRS-100, Cholera toxin, Cholera toxin B subunit, *Corynebacterium*-derived P40 Vaccine Adjuvant, CpG DNA Vaccine Adjuvant, CRL1OO5, CTA1-DD gene fusion protein, DDA Adjuvant, DHEA vaccine adjuvant, DL-PGL (Polyester poly (DL-lactide-co-glycolide)) vaccine adjuvant, DOC/Alum Complex, *E. coli* heat-labile toxin, Etx B subunit Adjuvant, Flagellin, Freund's Complete Adjuvant, Freund's Incomplete Adjuvant, Gamma Inulin, Gerbu Adjuvant, GM-CSF, GMDP, Imiquimod, Immunoliposomes Containing Antibodies to Costimulatory Molecules, ISCOM(s)™, ISCOMATRIX®, Killed *Corynebacterium parvum* Vaccine Adjuvant, Lipopolysaccharide, Liposomes, Loxoribine, LTK63 Vaccine Mutant Adjuvant, LTK72 vaccine adjuvant, LTR192G Vaccine Adjuvant, Matrix-S, MF59, Montanide Incomplete Seppic Adjuvant, Montanide ISA 51, Montanide ISA 720 Adjuvant, MPL-SE vaccine adjuvant, MPL™ Adjuvant, MTP-PE Liposomes, Murametide, Muramyl Dipeptide Adjuvant, Murapalmitine, D-Murapalmitine, NAGO, nanoemulsion vaccine adjuvant, Non-Ionic Surfactant Vesicles, non-toxic mutant E112K of Cholera Toxin mCT-E112K, PMMA, Poly(LC), Polygen Vaccine Adjuvant, Protein Cochleates, QS-21, Quil-A vaccine adjuvant, RC529 vaccine adjuvant, Recombinant hIFN-gamma/Interferon-g, Rehydragel EV, Rehydragel HPA, Resiquimod, Ribi Vaccine Adjuvant, SAF-1, Saponin Vaccine Adjuvant, Sclavo peptide, Sendai Proteoliposomes, Sendai-containing Lipid Matrices, Specol, SPT (Antigen Formulation), Squalene-based Adjuvants, Stearyl Tyrosine, Theramide®, Threonyl muramyl dipeptide (TMDP), Titer-Max Gold Adjuvant, Ty Particles vaccine adjuvant, and VSA-3 Adjuvant.

Viral Vectors

The present invention also provides for a viral vector which encodes or delivers the antisense polynucleotides (e.g., ASO) of the invention. The viral vector may comprise or encode an ASO and/or guide RNA as described herein. In an embodiment, the ASO has an RNA backbone. The viral vector can be used to deliver the ASO and/or guide RNA to a target cell. The viral vector may improve the delivery of the ASO and/or guide RNA to a target cell (e.g., a neuronal cell).

In an embodiment, the viral vector comprises a sequence that expresses a nucleic acid comprising an ASO or a guide RNA as described herein.

Viral vectors can be designed to deliver and/or encode the ASO or guide RNA sequences using standards practices known in the art.

The viral vector may comprise an expression cassette wherein the expression cassette encodes a transcript comprising the ASO or guide RNA. In some embodiments, the viral vector comprises a sequence encoding the ASO or guide RNA described herein and one or more regions comprising inverted terminal repeat (ITR) sequences flanking the ASO or guide RNA sequence. In some embodiments, the sequence is operably linked to a promoter. In some embodiments, the promoter is a tissue-specific (e.g., CNS-specific) promoter.

In an embodiment, the viral vector is a retrovirus, lentivirus, adenovirus (AV), or adeno-associated virus (AAV), or a herpes simplex virus. The viral vectors may be derived from any suitable serotype or subgroup. The viral vector may be a human viral vector or a non-human viral vector.

III. Routes of Administration, Dosage and Delivery

The present disclosure encompasses the delivery of one or more antisense polynucleotide (e.g., ASO) compositions for any therapeutic, prophylactic, pharmaceutical, diagnostic or research use by any appropriate route taking into consideration likely advances in the sciences of drug delivery.

Delivery

The present disclosure provides for a method of delivering an antisense polynucleotide (ASO) to a cell, wherein the ASO modulates splicing of UNC13A to prevent inclusion of a cryptic exon in UNC13A RNA. This may prevent loss of the UNC13A translated protein and/or prevent loss of functional UNC13A protein. In an embodiment, this is an in vitro method. In an embodiment, the cell is a cell of the central nervous system. In an embodiment, the cell is a neuronal cell. In an embodiment, the ASO is delivered to the cell by a vector, for example, a viral vector, as may be described herein. The method may be an in vitro or an in vivo method. The in vitro method can be used to probe or modulate UNC13A function. The in vivo method may be used to treat a neurodegenerative disorder, as is otherwise described herein.

The antisense polynucleotides (e.g., ASO) and compositions comprising the antisense polynucleotides (e.g., ASO) of the present disclosure may be loaded to vehicles such as those formulation components discussed herein in order to be administered to target cells, tissues and/or organs. The formulations may contain antisense polynucleotide (e.g., ASO) compositions which may be modified and/or unmodified. The formulations may further include, but are not limited to, cell penetration agents, a pharmaceutically acceptable carrier, a delivery agent, a bioerodible or biocompatible polymer, a solvent, and a sustained-release delivery depot. The formulated antisense polynucleotide (e.g., ASO) compositions may be delivered to the cell using routes of administration known in the art and described herein Delivery may also be naked. The antisense polynucleotides (e.g., ASO) and compositions may be delivered to a cell naked. As used herein in, "naked" refers to delivering antisense polynucleotide (e.g., ASO) compositions free from agents which promote transfection. For example, the antisense polynucleotide (e.g., ASO) compositions delivered to the cell may contain no modifications. The naked antisense polynucleotide (e.g., ASO) compositions may be delivered to the cell using routes of administration known in the art and described herein.

Route of Administration

The antisense polynucleotides (e.g., ASO) or pharmaceutical composition when used as a medicament or used in a method of treatment as described herein may be administered to a subject by any suitable administration method, for example, by injection.

The antisense polynucleotide (e.g., ASO) compositions of the present disclosure may be administered by any route which results in a therapeutically effective outcome. These include, but are not limited to enteral, gastroenteral, epidural, oral, transdermal, epidural (peridural), intracerebral (into the cerebrum), intracerebroventricular (into the cerebral ventricles), epicutaneous (application onto the skin), intradermal, (into the skin itself), subcutaneous (under the skin), nasal administration (through the nose), intravenous (into a vein), intraarterial (into an artery), intramuscular (into a muscle), intracardiac (into the heart), intraosseous infusion (into the bone marrow), intrathecal (into the spinal canal), intraperitoneal, (infusion or injection into the peritoneum), intravesical infusion, intravitreal, (through the eye), intracavernous injection, (into the base of the penis), intravaginal administration, intrauterine, extra-amniotic administration, transdermal (diffusion through the intact skin for systemic distribution), transmucosal (diffusion through a mucous membrane), insufflation (snorting), sublingual, sublabial, enema, eye drops (onto the conjunctiva), or in ear drops. In specific embodiments, compositions may be administered in a way which allows them to cross the blood-brain barrier, vascular barrier, or other epithelial barrier.

Dosage

A pharmaceutical composition described herein can be formulated into a dosage form and for a route of administration as described herein.

The polynucleotides and/or pharmaceutical composition may be administered to a subject in a single dose, or a multiple dose. In an embodiment, the multiple dose comprises two, three, or four or more doses. In an embodiment, the ASO, guide RNA, viral vector or pharmaceutical composition is administered to the subject at regular intervals, for example, weekly, biweekly, monthly, every 2 months, every 3 months, every 4 months, every 5 months, every 6 months or yearly. In some embodiments, the first set of doses (e.g., two, three, four, five, six, seven, eight or ten doses) are administered monthly, with further doses administered less frequently (e.g., every 3 months, every 6 months or yearly).

IV. Methods of Use

The present disclosure provides methods for use of the antisense polynucleotides (e.g., ASOs), compositions and formulations comprising the antisense polynucleotides of the present disclosure.

The polynucleotides, compositions and formulations comprising the polynucleotides of the present disclosure may be used for regulating gene expression at multiple levels. Some aspects of the present disclosure provide methods for regulation of gene expression in a cell comprising administering to the cell the antisense polynucleotides (ASO compounds), compositions and formulations comprising the polynucleotide described herein.

In some embodiments, the gene expression is regulated at the transcription level, or post-transcription level, or translational level, or post-translational level.

Therapeutic Applications

The antisense polynucleotides (e.g., ASO(s), compositions and formulations comprising the polynucleotides of the present disclosure may be used as therapeutic agents for disease treatment. The therapeutic use of the antisense polynucleotide(s) (e.g., ASO), compositions and formulations comprising the antisense polynucleotide(s) (ASO) of the present disclosure may involve in modulation of endogenously existing RNAs to provide protection from the disease.

In some embodiments, the therapeutic use of the antisense polynucleotides, compositions and formulations comprising the antisense polynucleotides (e.g., ASO) of the present disclosure may relate to administration of in vitro engineered and produced polynucleotides. Synthetic antisense polynucleotides (e.g., ASO) described herein may be delivered into target cells for therapeutic functions.

The polynucleotides (e.g., ASO) or pharmaceutical composition described herein may be for use, or used, as a medicament, for example, in therapy.

Also disclosed herein is a method of treating a neurodegenerative disorder, the method comprising administering to a subject in need thereof a therapeutically effective amount of the ASO of the first or second aspect, the guide RNA of the third aspect, the viral vector of the fourth aspect or the pharmaceutical composition of the fifth aspect.

Also disclosed herein is a method of treating a condition associated with TDP-43 pathology, the method comprising administering to a subject in need thereof a therapeutically effective amount of the ASO of the first or second aspect, the guide RNA of the third aspect, the viral vector of the fourth aspect or the pharmaceutical composition of the fifth aspect The ASO, guide RNA, viral vector or pharmaceutical composition described in the methods of treatment herein can be used to prevent loss of and/or restore functionality of the UNC13A protein. In an example, the ASO, guide RNA, viral vector or pharmaceutical composition can be used to modulate splicing such that the UNC13A cryptic exon is not included in the UNC13A mRNA.

In an embodiment, the medicament is for use or used to modulate splicing of a UNC13A pre-mRNA. In an embodiment, the medicament is for use or used to prevent inclusion of the UNC13A cryptic exon in the UNC13A mature RNA, such that the functionality of the UNC13A protein is restored. In an embodiment, the medicament is for use or used in a method of treatment of a disease associated with TDP-43 pathology.

The ASO, guide RNA, viral vector or pharmaceutical composition described herein may be for use or used in a method of treating a neurodegenerative disorder. In an embodiment, the neurodegenerative disorder is associated with reduced nuclear TDP-43. In an embodiment, the neurodegenerative disorder is caused by nucleus-cytoplasmic mislocalization of TDP-43. In an embodiment, the neurodegenerative disorder is associated with TDP-43 pathology (e.g., pathological TDP-43).

In an embodiment, the method of treating comprises first diagnosing a subject with a neurodegenerative disorder associated with TDP-43 pathology ahead of the method of treating. In an embodiment, this is determined using a biomarker of TDP-43 pathology. In an embodiment, this may be determined by genetics, for example, a genetic mutation. In an embodiment, TDP-43 pathology associated with ALS may be determined if FUS and SOD1 mutations are not found in the subject. In an embodiment, TDP-pathology associated with FTD may be determined if C9orf72 or PGRN mutations are not found in the subject. In an embodiment, the biomarker of TDP-43 pathology may include mutant TDP-43. In some embodiments, TDP-43 pathology may be determined with TDP-43 phosphorylation. In some embodiments, TDP-43 pathology may be determined by expression of the STMN2 cryptic exon.

In an embodiment, the method of treating comprises first identifying in a subject whether they possess a SNP variant associated with rs12973192 and/or rs12608932 ahead of the method of treating. This may be determined by genomics.

In an embodiment, the neurodegenerative disorder may be selected from ALS, frontotemporal dementia, Alzheimer's disease, Parkinson's disease, FOSMNN (Facial onset sensory and motor neuronopathy), Perry Syndrome, or a combination thereof.

In an embodiment, the neurodegenerative disorder is ALS (amyotrophic lateral sclerosis). ALS is a chronic and fatal form of motor neuron disease (MND) and may otherwise be referred to as MND, Charcot disease or Lou Gehrig's disease. In some embodiments, the ALS may be ALS is familial ALS or sporadic (idiopathic) ALS. Familial ALS (FALS) is ALS that runs in the family, and accounts for about 10% of ALS cases. Sporadic ALS is non-familial ALS. In an embodiment, the ALS may not be a ALS-FUS and ALS-SOD1 which are genetically-defined forms of ALS. The ASOs, guide RNAs, viral vectors, or pharmaceutical compositions for use, or the method of treatment described herein, may ameliorate one or more symptoms associated with ALS. Symptoms of ALS may include fasciculation (muscle twitches); muscle cramps; tight and stiff muscles (spasticity), muscle weakness, slurred and nasal speech and a difficulty chewing or swallowing. ALS leads to progressive deterioration of muscle function and ultimately often leads to death due to respiratory failure.

In an embodiment, the neurodegenerative disorder is frontotemporal dementia (FTD). Frontotemporal dementia is a type of dementia that affects the frontal and temporal lobes of the brain. The ASOs, guide RNAs viral vectors, or pharmaceutical compositions for use, or the method of treatment described herein, may ameliorate one or more symptoms associated with FTD. Symptoms of FTD may include personality and behavior changes, language problems, problems with mental abilities, memory problems and physical problems (e.g., difficulties with movement). The FTD may be characterized by frontotemporal lobar degeneration (FTLD). The FTLD may be FTLD-TDP, which is an FTLD associated with TDP-43 pathology. This may be characterized by ubiquitin and TDP-43 positive, tau negative, FUS negative inclusion bodies. The FTLD-TDP may be of Type A, Type B, Type C or Type D. Type A is a type of FTLD-TDP that presents with small neurites and neuronal cytoplasmic inclusion bodies in the upper (superficial) cortical layers. Bar-like neuronal intranuclear inclusions may also be seen, although comparatively fewer in number. Type B is a type of FTLD-TDP that presents with neuronal and glial cytoplasmic inclusions in both the upper (superficial) and lower (deep) cortical layers, and lower motor neurons.

Neuronal intranuclear inclusions may be absent or are in comparatively small number. Type B may be associated with ALS and C9ORF92 mutations. Type C is a type of FTLD-TDP that presents long neuritic profiles found in the superficial cortical laminae. There may be comparatively few or no neuronal cytoplasmic inclusions, neuronal intranuclear inclusions or glial cytoplasmic inclusions. FTLD-TDP is often associated with semantic dementia. Type D is a type of FTLD-TDP that presents with neuronal intranuclear inclusion and dystrophic neurites. There may be no inclusions in the granule cell layer of the hippocampus. Type D may be associated with VCP mutations. In an embodiment, the FTLD may not be of type FTLD-FUS or FTLD-tau.

In an embodiment, the neurodegenerative disorder is Alzheimer's disease. Alzheimer's disease is a chronic neurodegenerative disease that starts slowly and gradually worsens over time and is the main cause of dementia. The ASOs, guide RNAs, viral vectors, or pharmaceutical compositions for use, or the method of treatment described herein, may ameliorate one or more symptoms associated with Alzheimer's disease. Symptoms of Alzheimer's may include memory problems, confusion and disorientation, problems with speech and language, problems with movement, personality changes and a combination thereof. The Alzheimer's disease may be associated with TDP pathology.

In an embodiment, the neurodegenerative disorder is Parkinson's disease. Parkinson's disease is progressive nervous system disorder that affects movement Parkinson's symptoms usually begin gradually and worsen over time. The ASOs, guide RNAs, viral vectors, or pharmaceutical compositions for use, or the method of treatment as described herein, may ameliorate one or more symptoms associated with Parkinson's disease. Symptoms may include a tremor, slowness of movement (bradykinesia) and muscle stiffness. The Parkinson's disease may be associated with TDP pathology.

In an embodiment, the neurodegenerative disorder is FOSMN (Facial onset sensory and motor neuronopathy). FOSMN is a rare and slowly progressive motor neuron disorder. The ASOs, guide RNAs, viral vectors, or pharmaceutical compositions for use, or the method of treatment described herein, may ameliorate one or more symptoms associated with FOSMN. Symptoms include sensory and motor loss in the face (e.g., facial tingling or numbness), which may further extend to sensory and motor loss in the scalp, neck, upper trunk and arms. The FOSMN may be associated with TDP pathology.

In an embodiment, the neurodegenerative disorder is Perry Syndrome. Perry syndrome is a progressive brain disease. The ASOs, guide RNAs, viral vectors, or pharmaceutical compositions for use, or the method of treatment as described herein, may ameliorate one or more symptoms associated with Perry Syndrome. Symptoms include parkinsonism (a pattern of movement abnormalities), psychiatric changes, weight loss, and hypoventilation. The Perry syndrome may be associated with TDP pathology.

In an embodiment, the neurodegenerative disorder is a hereditary motor neuropathy. The hereditary motor neuropathy may be associated with TDP-43. In an embodiment, the hereditary motor neuropathy may be hereditary motor and sensory neuropathy (HMSN), which may otherwise be known as Charcot-Marie-Tooth (CMT) disease or peroneal muscular atrophy (PMA). The ASOs, guide RNAs, viral vectors, or pharmaceutical compositions for use, or the method of treatment described herein, may ameliorate one or more symptoms associated with HMSN. Symptoms include muscle weakness in the feet, ankles, legs or hands; awkward gait and numbness in the feet arms and hands. pathology.

The ASO, guide RNA, viral vector or pharmaceutical composition when used as a medicament or used in a method of treatment as described herein may be administered to any suitable subject. In a preferred embodiment, the subject is human. In an embodiment, the subject possesses a SNP variant associated with rs12973192 and/or rs12608932. The human subject is any suitable age, for example, an infant (less than 1 year of age) a child (younger than 18 years of age) including adolescents (10 to 18 years of age inclusive), or adults (older than 18 years of age) including elderly subjects (older than 65 years of age).

Modulation of Splicing

Disclosed herein is a method of modulating UNC13A splicing, the method comprising administering to a cell or subject in need thereof an effective amount of the ASO of the first or second aspect, the guide RNA of the third aspect, the viral vector of the fourth aspect or the pharmaceutical composition of the fifth aspect. In an example, the ASO, guide RNA, viral vector or pharmaceutical composition can be used to prevent loss of and/or restore functionality of the UNC13A protein. In an example, the ASO, guide RNA, viral vector or pharmaceutical composition can be used to modulate splicing such that the UNC13A cryptic exon is not included in the UNC13A mRNA.

CRISPR Systems: Gene Therapy

The present invention also provides for a guide RNA comprising an ASO of the invention and a scaffold sequence for a Cas nuclease. In an embodiment the ASO has an RNA backbone. The guide RNA can be used in a CRISPR/Cas system to modulate UNC13A splicing. In a preferred embodiment, the guide RNA is a single guide RNA (sgRNA) comprising both the ASO and the scaffold sequence. In an embodiment, the sgRNA comprises the scaffold sequence upstream of the ASO.

Guide RNAs can be designed to include these sequences using standard practices known in the art. In this regard, the ASO serves the function of the crRNA, i.e., the part of the guide RNA that is complementary to the nucleic acid target, and the scaffold sequence is the tracr RNA, i.e., the part of the guide RNA that serves as a binding scaffold for the Cas nuclease.

The scaffold sequence will comprise a binding sequence for a Cas nuclease for use in a CRISPR/Cas system. Any suitable scaffold sequence specific to a Cas nuclease can be selected. The Cas nuclease may be any suitable Cas nuclease that can bind to RNA and is dead or inactivated (e.g., a dCas nuclease). In an embodiment, the Cas nuclease is a Cas 13 nuclease. The Cas 13 nuclease may be of any suitable sub-type. In an embodiment, the Cas13 nuclease is of 13a or 13d subtype.

The ASOs and/or guide RNAs (i.e., as part of a CRISPR/dCas system) are further used to mask crucial elements of the CE splicing (splice donors and acceptors sites), and/or the splice regulatory elements (SRE)s. These therapeutics prevent the splicing machinery from recognizing the CE and thereby preventing incorporation of the cryptic exon in the mature UNC13A RNA.

The disclosure also provides for a Cas system, comprising the guide RNA as described herein and a dCas nuclease. The Cas nuclease may be as described above.

The guide RNA and associated Cas systems described herein can be used to mask the crucial elements of the cryptic exon splicing, including splice sites (splice donors and acceptors), and/or splice regulatory elements.

VI. Definitions

To facilitate an understanding of the present invention, a number of terms and phrases are defined below.

About: As used herein, the term "about" is understood as within a range of normal tolerance in the art, for example within 2 standard deviations of the mean. About can be understood as within 50%, 45%, 40%, 35%, 30%, 25%, 20%, 15%, 10%, 9%, 8%, 7%, 6%, 5%, 4%, 3%, 2%, 1%, 0.5%, 0.1%, 0.05%, or 0.01% of the stated value. It is understood that, the term "about" when referring to a number or a numerical range means that the number or numerical range referred to is an approximation within experimental variability (or within statistical experimental error), and thus the number or numerical range may vary. Typical experimental variabilities may stem from, for example, changes and adjustments necessary during scale-up from laboratory experimental and manufacturing settings to large scale.

Analog: As used herein, the term "analog" is meant to include polypeptide variants which differ by one or more amino acid alterations, e.g., substitutions, additions or deletions of amino acid residues that still maintain one or more of the properties of the parent or starting polypeptide.

Animal: As used herein, the term "animal" refers to any member of the animal kingdom. In some embodiments, "animal" refers to humans at any stage of development. In some embodiments, "animal" refers to non-human animals at any stage of development. In certain embodiments, the non-human animal is a mammal (e.g., a rodent, a mouse, a rat, a rabbit, a monkey, a dog, a cat, a sheep, cattle, a primate, or a pig). In some embodiments, animals include, but are not limited to, mammals, birds, reptiles, amphibians, fish, and worms. In some embodiments, the animal is a transgenic animal, genetically engineered animal, or a clone.

Antisense polynucleotide: As used herein, an "antisense polynucleotide" or "antisense oligonucleotide" (ASO) has its normal meaning in the art and refers to a synthetic single stranded string of nucleosides joined by internucleoside linkages. The nucleosides may be linked with phosphate-based linkages, phosphodiester, phosphoramidite or phosphorothioate linkages or a combination thereof and the like as described herein. ASOs are used in the art as therapeutics, e.g., for targeting mRNA. Canonically, they bind complementarily ('antisense') through Watson-Crick base pairing to a region of a nucleotide sequence of the pre-messenger ribonucleic acid (pre-mRNA) or mature mRNA to modulate mRNA function or splicing. "Capable of binding" referred to herein refers to any sequence that is sufficiently complementary to the target sequence or crucial element to form an association with that target sequence or element thereof. In most cases, ASOs are synthetic in origin and therefore the term, in that instance, is intended to exclude any naturally occurring or transcribed RNA products.

The ASOs defined herein bind UNC13A pre-mRNA. The ASO sequences described herein are synthetic oligonucleotides and isolated from and distinguished from any genomic or transcriptome sequence. The ASOs may nevertheless form part of another longer synthetic sequence (e.g., a guide RNA as disclosed herein).

Associated: As used herein, the terms "associated with," "conjugated," "linked," "attached," and "tethered," when used with respect to two or more moieties, means that the moieties are physically associated or connected with one another, either directly or via one or more additional moieties that serves as a linking agent, to form a structure that is sufficiently stable so that the moieties remain physically associated under the conditions in which the structure is used, e.g., physiological conditions. An "association" need not be strictly through direct covalent chemical bonding. It may also suggest ionic or hydrogen bonding or a hybridization-based connectivity sufficiently stable such that the "associated" entities remain physically associated.

Co-Administered: As used herein, the term "co-administered" or "co-administering" means administering a first construct or system with one or more additional constructs or systems or other therapeutic agents or moieties sufficiently close in time such that the effect of the first construct or system or other therapeutic agents or moieties is enhanced.

Complementarity: As used herein, the term "complementarity" refers to Watson-Crick base pairing in RNA, e.g., wherein A binds with U (or modified variants thereof), and wherein C binds with G (or modified variants thereof). Strands of complementary sequence are referred to as sense and antisense, with the sense strand being the pre-mRNA that was generated after transcription, with the antisense sequence (e.g., ASO or therapeutic) being complementary to the sense sequence. In the ASOs disclosed herein "U" and "T" nucleosides, e.g., uracil or thymine, may be used interchangeably. Therefore "U" in any of SEQ ID NOS: 4-546 may be replaced by "T". Complementarity need not be 100% or "perfect" in order for there to be binding between two nucleic acid-based compounds. Complementarity may be 30%, 40%, 50%, 60%, 70%, 80%, 90%, 91%, 92%, 93%, 94%, 95%, 96%, 97%, 98%, 99%, or 100%, or any whole integer between 30-100%. Complementarity may be relative to the entire length of the polynucleotide or antisense polynucleotide or relative to the target sequence. As such complementarity may be any degree of 1-100% over the length of one nucleotide to the full-length of the antisense polynucleotide or target, or any length in between, e.g., 30%, 40%, 50%, 60%, 70%, 80%, 90%, 91%, 92%, 93%, 94%, 95%, 96%, 97%, 98%, 99%, or 100% of the whole.

Compound: As used herein, the term "compound" or "structure," is meant to include all stereoisomers, geometric isomers, tautomers, and isotopes of the structures depicted.

The compounds or structures described herein can be asymmetric (e.g., having one or more stereocenters). All stereoisomers, such as enantiomers and diastereomers, are intended unless otherwise indicated. Compounds of the present disclosure that contain asymmetrically substituted carbon atoms can be isolated in optically active or racemic forms. Methods on how to prepare optically active forms from optically active starting materials are known in the art, such as by resolution of racemic mixtures or by stereoselective synthesis. Many geometric isomers of olefins, C=N double bonds, and the like can also be present in the compounds described herein, and all such stable isomers are contemplated in the present disclosure. Cis and trans geometric isomers of the compounds of the present disclosure are described and may be isolated as a mixture of isomers or as separated isomeric forms. Compounds or structures of the present disclosure also include tautomeric forms. Tautomeric forms result from the swapping of a single bond with an adjacent double bond and the concomitant migration of a proton. Tautomeric forms include prototropic tautomers which are isomeric protonation states having the same empirical formula and total charge. Examples prototrophic tautomers include ketone—enol pairs, amide—imidic acid pairs, lactam—lactim pairs, amide—imidic acid pairs, enamine—imine pairs, and annular forms where a proton can occupy two or more positions of a heterocyclic system, such as, 1H- and 3H-imidazole, 1H-, 2H- and 4H-1,2,4-triazole, 1H- and 2H-isoindole, and 1H- and 2H-pyrazole. Tautomeric forms can be in equilibrium or sterically locked into one form by appropriate substitution. Compounds or structures of the present disclosure also include all of the isotopes of the atoms occurring in the intermediate or final compounds. "Isotopes" refers to atoms having the same atomic number but different mass numbers resulting from a different number of neutrons in the nuclei. For example, isotopes of hydrogen include tritium and deuterium. The compounds or structures and salts of the present disclosure can be prepared in combination with solvent or water molecules to form solvates and hydrates by routine methods.

Cryptic Exon: As used herein a "cryptic exon" refers to a splicing variant that are incorporated into a mature mRNA, introducing frameshifts or stop codons, among other changes in the resulting mRNA. Cryptic exons are absent in the normal form of mRNA, and are usually skipped by the spliceosome, but arise in an aberrant form. A cryptic exon may otherwise be referred to as "CE", "cryptic" or "cryptic event" herein or elsewhere in the art.

Delivery: As used herein, "delivery" refers to the act or manner of delivering a compound, substance, entity, moiety, cargo or payload.

DNA and RNA: As used herein, the term "RNA" or "RNA molecule" or "ribonucleic acid molecule" refers to a polymer of ribonucleotides; the term "DNA" or "DNA molecule" or "deoxyribonucleic acid molecule" refers to a polymer of deoxyribonucleotides. DNA and RNA can be synthesized naturally, e.g., by DNA replication and transcription of DNA, respectively; or be chemically synthesized. DNA and RNA can be single-stranded (i.e., ssRNA or ssDNA, respectively) or multi-stranded (e.g., double stranded, i.e., dsRNA and dsDNA, respectively). The term "mRNA" or "messenger RNA", as used herein, refers to a single stranded RNA that encodes the amino acid sequence of one or more polypeptide chains.

Effective amount or therapeutically effective amount: As used herein, the terms "effective amount or therapeutically effective amount" refers to the amount of the polynucleotides or pharmaceutical composition needed to bring about an acceptable outcome of the therapy as determined by reducing the likelihood of disease as measurable by clinical, biochemical or other indicators that are familiar to those trained in the art. The therapeutically effective amount may vary depending upon the condition, the severity of the condition, the subject, e.g., the weight and age of the subject and the mode of administration and the like, which can readily be determined by one of ordinary skill in the art.

Encapsulate: As used herein, the term "encapsulate" means to enclose, surround or encase.

Encode: As used herein the term "encode" refers broadly to any process whereby the information in a polymeric macromolecule is used to direct the production of a second molecule that is different from the first. The second molecule may have a chemical structure that is different from the chemical nature of the first molecule.

Enhance: As used herein, the terms "enhance" and "enhancement" refers to an increase of at least about 5%, 10%, 20%, 25%, 50%, 75%, 100%, 150%, 200%, 300%, 400%, 500% or more of a reference; the reference may be a biological function of a nucleic acid or protein and a gene expression level, etc.

Expression: As used herein, "expression" of a nucleic acid sequence refers to one or more of the following events: (1) production of an RNA template from a DNA sequence (e.g., by transcription); (2) processing of an RNA transcript (e.g., by splicing, editing, 5' cap formation, and/or 3' end processing); (3) translation of an RNA into a polypeptide or protein; and (4) post-translational modification of a polypeptide or protein.

Feature: As used herein, a "feature" refers to a characteristic, a property, or a distinctive element when referring to polypeptides are defined as distinct amino acid sequence-based components of a molecule. Features of the polypeptides encoded by the present polynucleotide, such as surface manifestations, local conformational shape, folds, loops, half-loops, domains, half-domains, sites, termini or any combination thereof.

Formulation: As used herein, a "formulation" includes at least one compound, substance, entity, moiety, cargo or payload and a delivery agent.

Fragment: A "fragment," as used herein, refers to a portion. For example, fragments of proteins may comprise polypeptides obtained by digesting full-length protein isolated from cultured cells.

Guide RNA: As used herein, the term "guide RNA" refers to one part of a CRISPR/Cas genome editing system, the other part being a CRISPR associated endonuclease (Cas protein). The guide RNA comprises a scaffold sequence for Cas-binding (e.g., known as tracr RNA) and a nucleotide sequence that is complementary to and recognises the target (crRNA).

Homology: As used herein, the term "homology" refers to the overall relatedness between polymeric molecules, e.g., between polynucleotide molecules (e.g., DNA molecules and/or RNA molecules) and/or between polypeptide molecules. In some embodiments, polymeric molecules are considered to be "homologous" to one another if their sequences are at least 25%, 30%, 35%, 40%, 45%, 50%, 55%, 60%, 65%, 70%, 75%, 80%, 85%, 90%, 95%, or 99% identical or similar. The term "homologous" necessarily refers to a comparison between at least two sequences (polynucleotide or polypeptide sequences). In accordance with the disclosure, two polynucleotide sequences are considered to be homologous if the polypeptides they encode are at least about 50%, 60%, 70%, 80%, 90%, 95%, or even 99% for at least one stretch of at least about 20 amino acids. In some embodiments, homologous polynucleotide sequences are characterized by the ability to encode a stretch of at least 4-5 uniquely specified amino acids. For polynucleotide sequences less than 60 nucleotides in length, homology is determined by the ability to encode a stretch of at least 4-5 uniquely specified amino acids. In accordance with the disclosure, two protein sequences are considered to be homologous if the proteins are at least about 50%, 60%, 70%, 80%, or 90% identical for at least one stretch of at least about 20 amino acids.

Inactive Ingredient: As used herein, the term "inactive ingredient" refers to one or more agents that do not contribute to the activity of the active ingredient of the pharmaceutical composition included in formulations. In some embodiments, all, none or some of the inactive ingredients which may be used in the formulations of the present disclosure may be approved by the US Food and Drug Administration (FDA).

Identity: As used herein, the term "identity" refers to the overall relatedness between polymeric molecules, e.g., between polynucleotide molecules (e.g., DNA molecules and/or RNA molecules) and/or between polypeptide molecules. Calculation of the percent identity of two polynucleotide sequences, for example, can be performed by aligning the two sequences for optimal comparison purposes (e.g., gaps can be introduced in one or both of a first and a second nucleic acid sequences for optimal alignment and non-identical sequences can be disregarded for comparison purposes). In certain embodiments, the length of a sequence aligned for comparison purposes is at least 30%, at least 40%, at least 50%, at least 60%, at least 70%, at least 80%, at least 90%, at least 95%, or 100% of the length of the reference sequence. The nucleotides at corresponding nucleotide positions are then compared. When a position in the first sequence is occupied by the same nucleotide as the corresponding position in the second sequence, then the molecules are identical at that position. The percent identity between the two sequences is a function of the number of identical positions shared by the sequences, taking into account the number of gaps, and the length of each gap, which needs to be introduced for optimal alignment of the two sequences. The comparison of sequences and determination of percent identity between two sequences can be accomplished using a mathematical algorithm. For example, the percent identity between two nucleotide sequences can be determined using methods such as those described in Computational Molecular Biology, Lesk, A. M., ed., Oxford University Press, New York, 1988; Biocomputing: Informatics and Genome Projects, Smith, D. W., ed., Academic Press, New York, 1993; Sequence Analysis in Molecular Biology, von Heinje, G., Academic Press, 1987; Computer Analysis of Sequence Data, Part I, Griffin, A. M., and Griffin, H. G., eds., Humana Press, New Jersey, 1994; and Sequence Analysis Primer, Gribskov, M. and Devereux, J., eds., M Stockton Press, New York, 1991; each of which is incorporated herein by reference. For example, the percent identity between two nucleotide sequences can be determined using the algorithm of Meyers and Miller (CABIOS, 1989, 4:11-17), which has been incorporated into the ALIGN program (version 2.0) using a PAM120 weight residue table, a gap length penalty of 12 and a gap penalty of 4. The percent identity between two nucleotide sequences can, alternatively, be determined using the GAP program in the GCG software package using an NWSgapdna.CMP matrix. Methods commonly employed to determine percent identity between sequences include, but are not limited to those disclosed in Carillo, H. and Lipman, D., SIAM J Applied Math., 48:1073 (1988); incorporated herein by reference. Techniques for determining identity are codified in publicly available computer programs. Exemplary computer software to determine homology between two sequences include, but are not limited to, GCG program package, Devereux, J., et al., Nucleic Acids Research, 12(1), 387 (1984)), BLASTP, BLASTN, and FASTA Altschul, S. F. et al., J. Molec. Biol., 215, 403 (1990)).

Ionizable Lipid: As used herein "ionizable lipid" refers to any of a number of lipid species that carry a net positive charge at a selected pH.

Lipid Nanoparticle: As used herein "lipid nanoparticle" or "LNP" refers to a delivery vehicle comprising one or more lipids (e.g., cationic lipids, non-cationic lipids, PEG-modified lipids).

Liposome: As used herein "liposome" generally refers to a vesicle composed of lipids (e.g., amphiphilic lipids) arranged in one or more spherical bilayers or bilayers.

Modified: As used herein "modified" or, as appropriate "modification" refers to a changed state or structure of a molecule. Molecules may be modified in many ways including chemically, structurally, and functionally. With respect to nucleic acid molecules (e.g., DNA and RNA), the modifications are A, G, C, U or T nucleotides. Generally, herein, these terms are not intended to refer to the ribonucleotide modifications in naturally occurring 5'-terminal mRNA cap moieties. With respect to polypeptides, the term "modification" refers to a modification as compared to the canonical set of 20 amino acids.

mRNA: As used herein, the term "messenger RNA" (mRNA) means a polynucleotide which encodes a polypeptide of interest and which is capable of being translated to produce the encoded polypeptide of interest in vitro, in vivo, in situ or ex vivo.

miRNA: As used herein, the term "miRNA" or "microRNA" refers to a class of small noncoding RNAs approximately 22 nucleotides long. They act as negative regulators of gene expression at the post-transcriptional level, by means of binding their target mRNAs through imperfect base pairing with the respective 3'-untranslated region (3'-UTR).

Non-Cationic Lipid: As used herein "non-cationic lipid" refers to any neutral, zwitterionic or anionic lipid.

Pharmaceutical Composition: As used herein the term "pharmaceutical composition" refers to compositions comprising at least one active ingredient and optionally one or more pharmaceutically acceptable excipients.

PEG: As used herein "PEG" means any polyethylene glycol or other polyalkylene ether polymer.

Prophylactic benefit: As used herein, "prophylactic benefit" refers to delaying or eliminating the appearance of a disease or condition, delaying or eliminating the onset of symptoms of a disease or condition, slowing, halting, or reversing the progression of a disease or condition, or any combination thereof. In the context of the present invention, the prophylactic benefit or effect may involve the prevention of the condition or disease. The polynucleotides or pharmaceutical composition may be administered to a subject at risk of developing a particular disease, or to a subject reporting one or more of the physiological symptoms of a disease, even though a diagnosis of this disease may not have been made.

Reduce: As used herein, the terms "reduce" and "reduction" refers to a decrease of at least about 25%, 35%, 50%, 75%, 80%, 85%, 90%, 95%, 97% or more of a reference; the reference may be a biological activity of a nucleic acid or protein, and a gene expression level, etc.

RNA-seq: As used herein, the term "RNA-seq" otherwise known as "RNA sequencing", refers to a next-generation sequencing technology which reveals the presence and quantity of RNA in a sample which can be used to analyze the cellular transcriptome.

Splicing: As used herein, the term "splicing" refers to the process wherein pre-mRNAs are transformed into mature mRNAs, wherein introns are removed and exons are joined together. Aberrant splicing with respect to UNC13A as referred to herein refers to a splicing event resulting in inclusion of the novel UNC13A cryptic exon in the mature mRNA. Modulated splicing or modulating splicing as referred to herein refers to preventing the aberrant splicing of UNC13A such that the novel UNC13A cryptic exon is not included in the mature UNC13A mRNA.

Sterol: As used herein "sterol" is a subgroup of steroids consisting of steroid alcohols.

Structural Lipid: As used herein "structural lipid" refers to sterols and lipids containing sterol moieties.

Subject: As used herein, the term "subject" refers to any suitable subject, including any animal, such as a mammal. In preferred embodiments described herein, the subject is a human.

TDP-43: As used herein, the term "TDP-43" refers to TAR DNA Binding protein 43 (Transactive response DNA binding protein 43 kDa), which in humans is a protein encoded by the TARDBP gene. TDP-43 has been shown to bind both DNA and RNA and have multiple functions in transcriptional repression, pre-mRNA splicing and translational regulation, among other functions. Pathological TDP-43 may refer to a TDP-43 protein that is associated with a disease state. Pathological TDP-43 may be a hyper-phosphorylated, ubiquitinated or cleaved form of TDP-43, a TDP-43 form with decreased solubility, or a misfolded form of TDP-43, a mutant form of TDP-43, or a TDP-43 with altered cellular location.

Transcription: As used herein the term "transcription" refers to the formation or synthesis of an RNA molecule by an RNA polymerase using a DNA molecule as a template.

Translation: As used herein the term "translation" refers to the formation of a polypeptide molecule by a ribosome based upon an RNA template.

Treat and Prevent: As used herein the terms "treat" or "prevent" as well as words stemming therefrom do not necessarily imply 100% or complete treatment or prevention. Rather there are varying degrees of treatment or prevention of which one of ordinary skill in the art recognizes as having a potential benefit or therapeutic effect. Also, "prevention" can encompass delaying the onset of the disease, symptom or condition thereof. The terms refer to an approach for obtaining beneficial or desired results in a subject, which includes a prophylactic benefit and a therapeutic benefit.

Therapeutic benefit: As used herein, "therapeutic benefit" refers to eradication, amelioration or slowing the progression of the underlying disorder being treated. Also, a therapeutic benefit is achieved with the eradication or amelioration of one or more of the physiological symptoms associated with the underlying disorder such that an improvement is observed in the subject, notwithstanding that the patient may still be afflicted with the underlying disorder.

UNC13A: As used herein, the term "UNC13A" refers to a gene that encodes for the UNC13A protein. UNC13 proteins play an important role in neurotransmitter release at synapses.

Unmodified: As used herein, "unmodified" refers to any substance, compound or molecule prior to being changed in any way. Unmodified may, but does not always, refer to the wild type or native form of a biomolecule. Molecules may undergo a series of modifications whereby each modified molecule may serve as the "unmodified" starting molecule for a subsequent modification.

Vector: As used herein, a "vector" is any molecule or moiety which transports, transduces or otherwise acts as a carrier of a heterologous molecule. Vectors of the present disclosure may be produced recombinantly and may be based on and/or may comprise viral parent or reference sequence.

Viral vector: As used herein, a "viral vector" refers to any virus vector that can be used to deliver the nucleic acid material of interest (e.g., ASO or guide RNA) into cells.

The details of one or more embodiments of the disclosure are set forth in the accompanying description below. Although any materials and methods similar or equivalent to those described herein can be used in the practice or testing of the present disclosure, the preferred materials and methods are now described. Other features, objects and advantages of the disclosure will be apparent from the description. In the description, the singular forms also include the plural unless the context clearly dictates otherwise. Unless defined otherwise, all technical and scientific terms used herein have the same meaning as commonly understood by one of ordinary skill in the art to which this disclosure belongs. In the case of conflict, the present description will control.

For any sequence described herein, the complementary sequence or reverse complement is also considered part of the disclosure.

EQUIVALENTS AND SCOPE

Those skilled in the art will recognize or be able to ascertain using no more than routine experimentation, many equivalents to the specific embodiments in accordance with the disclosure described herein. The scope of the present disclosure is not intended to be limited to the above Description, but rather is as set forth in the appended claims.

In the claims, articles such as "a," "an," and "the" may mean one or more than one unless indicated to the contrary or otherwise evident from the context. Claims or descriptions that include "or" between one or more members of a group are considered satisfied if one, more than one, or all of the group members are present in, employed in, or otherwise relevant to a given product or process unless indicated to the contrary or otherwise evident from the context. The disclosure includes embodiments in which exactly one member of the group is present in, employed in, or otherwise relevant to a given product or process. The disclosure includes embodiments in which more than one, or the entire group members are present in, employed in, or otherwise relevant to a given product or process.

It is also noted that the term "comprising" (and related terms such as "comprise" or "comprises" or "having" or "including") is intended to be open and permits but does not require the inclusion of additional elements or steps. When the term "comprising" is used herein, the term "consisting of" "consist of" or "consist essentially of" is thus also encompassed and disclosed. The term "comprises" or "comprising" can be used interchangeably with "includes".

Where ranges are given, endpoints are included. Furthermore, it is to be understood that unless otherwise indicated or otherwise evident from the context and understanding of one of ordinary skill in the art, values that are expressed as ranges can assume any specific value or subrange within the stated ranges in different embodiments of the disclosure, to the tenth of the unit of the lower limit of the range, unless the context clearly dictates otherwise.

In addition, it is to be understood that any particular embodiment of the present disclosure that falls within the prior art may be explicitly excluded from any one or more of the claims. Since such embodiments are deemed to be known to one of ordinary skill in the art, they may be excluded even if the exclusion is not set forth explicitly herein. Any particular embodiment of the compositions of the disclosure (e.g., any antibiotic, therapeutic or active ingredient; any method of production; any method of use; etc.) can be excluded from any one or more claims, for any reason, whether or not related to the existence of prior art.

It is to be understood that the words which have been used are words of description rather than limitation, and that changes may be made within the purview of the appended claims without departing from the true scope and spirit of the disclosure in its broader aspects.

Any genomic or chromosomal position described herein refers to the position on the human genome and associated transcriptome (hg38, e.g., hg38 assembly). And for any sequence described herein, the complementary sequence or reverse complement is also considered part of the disclosure.

While the present disclosure has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the disclosure. The present disclosure is further illustrated by the following non-limiting examples.

EXAMPLES

Example 1: Knockdown of TDP-43 Leads to Inclusion of a Cryptic Exon in UNC13A To discover novel splicing events caused by TDP-43 depletion on neurons, RNA-seq was performed on human induced pluripotent stem cell-derived (iPSC) i3N neurons stably expressing CRISPRi machinery. Expression of a sgRNA targeting TARDBP reduced TARDBP RNA and protein and was confirmed by RNA sequencing and tandem mass spectroscopy. Differential gene expression analysis revealed widespread transcriptome changes, with 4,844 genes significantly differentially expressed after TDP-43 knockdown (2,497 up regulated, 2,347 downregulated). To find genes affected by cryptic events, differential splicing analysis was performed, and focused on genes which were both differentially spliced and downregulated. 126 genes were both differentially spliced and downregulated, including genes which have previously described to contain cryptic events, such as PFKP, SETD5, and STMN2.

Of the genes which were changed, we noted that 2 members of the UNC13 family, UNC13A and UNC13B, were both affected by TDP-43 knockdown. These genes are of particular interest not only because they encode critical synaptic proteins, but also because previous studies have genetically linked UNC13A polymorphisms as both a risk factor and survival modifier in ALS and FTD.

Figure 2:
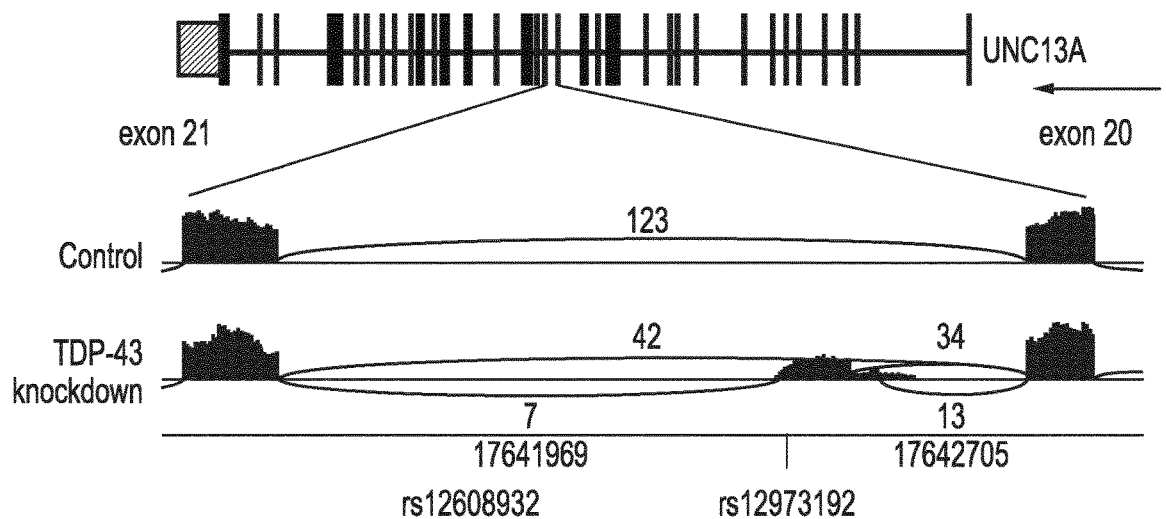
FIG. 2 shows that UNC13A transcripts may comprise a previously unreported novel cryptic cassette exon in TDP-43 depleted cells, as determined by differential splicing analysis between TDP knockdown and control cells.

Closer inspection of the significant splicing events in the UNC13A gene, revealed that UNC13A contained a previously unreported novel cryptic cassette exon (FIG. 1 and FIG. 2). The CE after TDP-43 knockdown had both a shorter (SEQ ID NO 2), and longer (SEQ ID NO 3) form, between exons 20 and 21, and increased intronic retention between exons 31 and 32. This cryptic exon has a single novel donor splice site and two novel acceptor splice sites, and iPSC neurons expressed both the shorter and longer form of the cryptic exon upon TDP-43 KD. To assess if TDP-43 binding could be directly linked to these splice changes, we downloaded publicly available TDP-43 individual nucleotide resolution Cross-Linking and ImmunoPrecipitation (iCLIP) data performed in neuronal-like SH-SY5Y and NSC human cell lines (Tollervey et al. 2011). As has been found with other cryptic exons regulated by TDP-43, multiple TDP-43 binding peaks were found both downstream and within the body of the cryptic cassette exon in UNC13A. It was also observed that the cryptic event in UNC13A caused by TDP-43 knockdown was in close proximity to 2 of the polymorphisms which have been previously linked to both ALS and FTD: rs12973192 and rs12608932.

Figure 3:
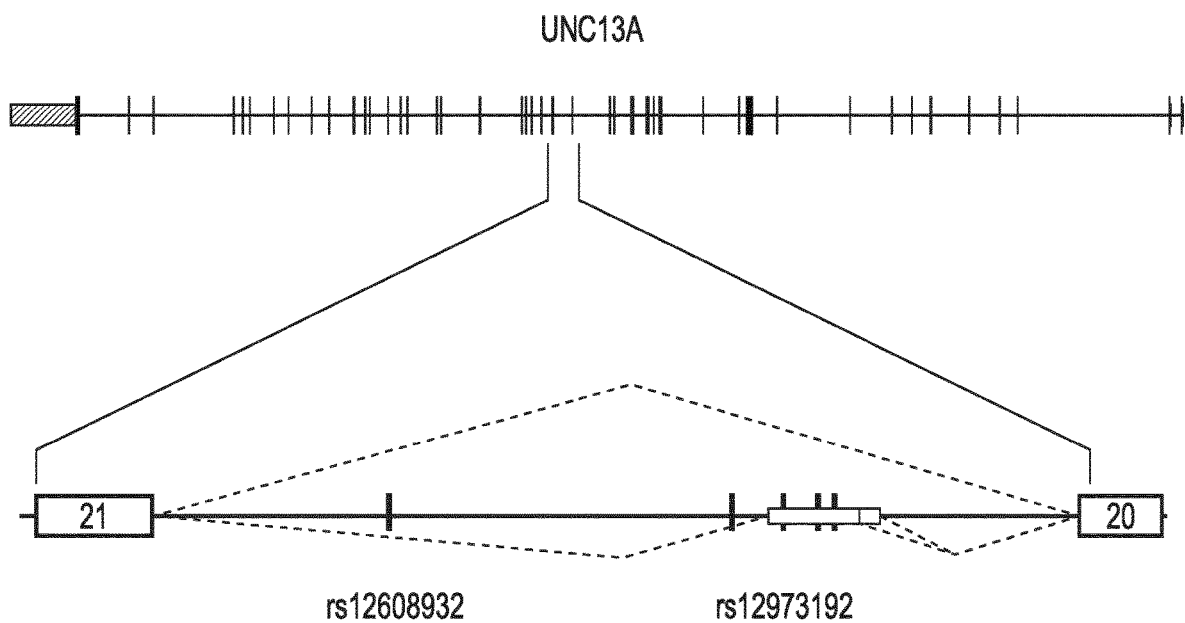
FIG. 3 shows that the UNC13A cryptic event caused by TDP-43 knockdown is in close proximity to 2 of the polymorphisms (SNPs) which have been which have been previously linked to both ALS and FTD: rs12973192 and rs12608932. One of the polymorphisms, rs12973192, lays 16 bp inside the cryptic event, and the other, rs12608932, is located 534 bp downstream of the 3' splice site of the cryptic event. Exons 20 and 21 are also shown.
Figure 4:
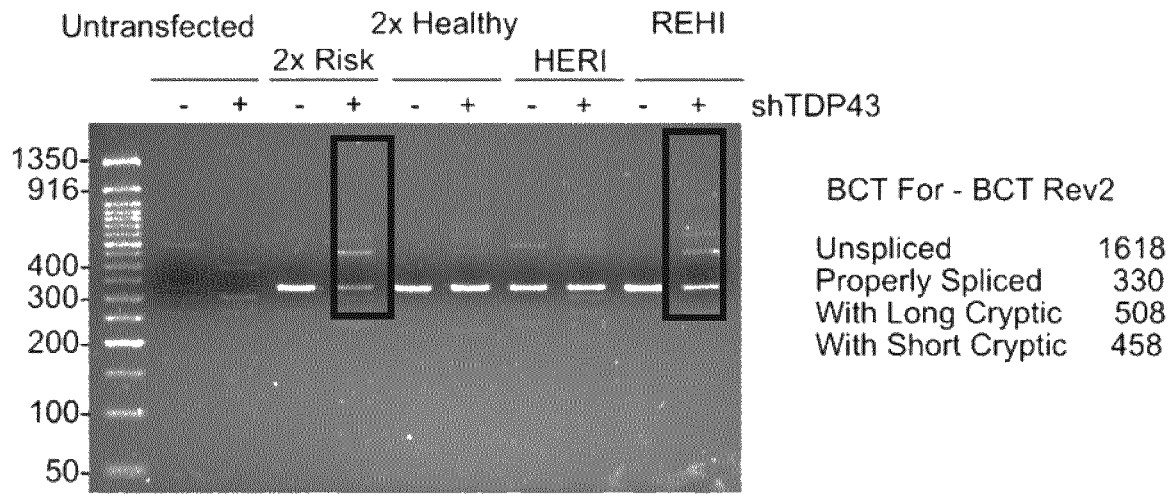
FIG. 4 shows that rs12973192 is the main SNP driving changes in UNC13A cryptic splicing associated to risk of aggressive disease progression. The impact of rs12973192 (exonic SNP) and rs12608932 (intronic SNP) on UNC13A was tested using minigenes carrying the four possible combinations of SNP alleles. Results show that the presence of the risk allele at rs12973192 is able, on its own, to drive an increase in UNC13A CE splicing when TDP-43 is depleted, (see boxes drawn on the gel, and the presence of the higher molecular weight bands for the 2× Risk and REHI combinations).
Figure 4:
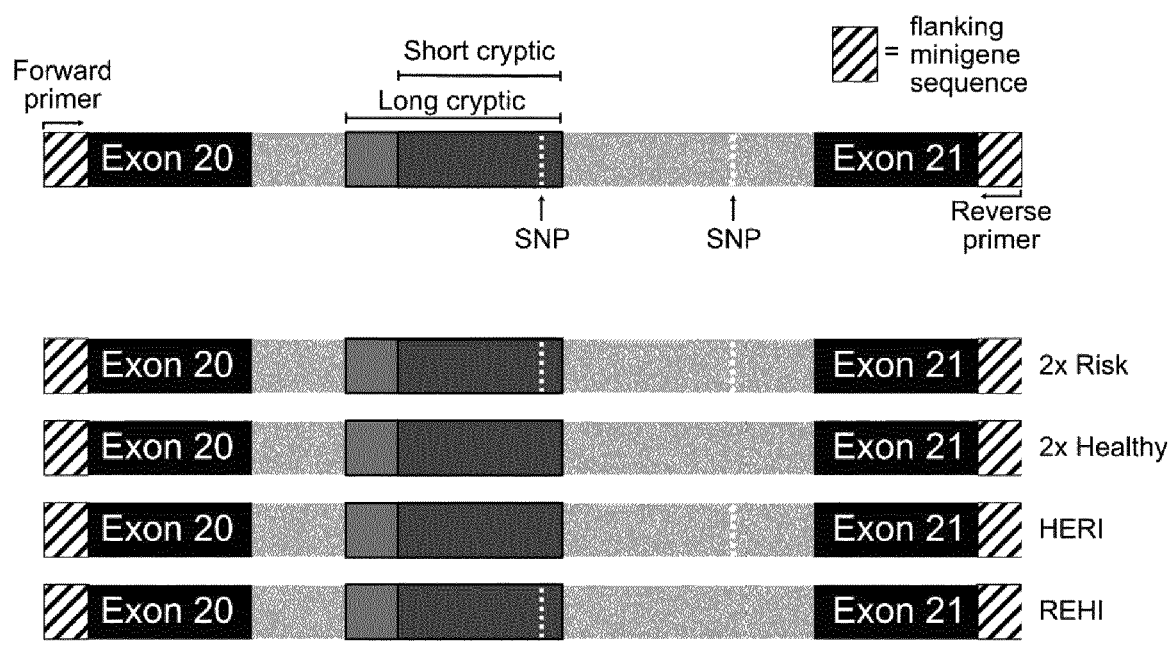

One of the polymorphisms, rs12973192, lays 16 bp inside the cryptic event, and the other, rs12608932, is located 534 bp downstream of the 3' splice site of the cryptic event (FIG. 3). While there are multiple polymorphisms along UNC13A that have been clinically linked to ALS, it was noted that all of the clinically relevant ones are in high linkage disequilibrium (LD) with the SNP inside the cryptic exon, rs12973192 (FIG. 4, showing that rs12973192 is the main SNP driving changes in UNC13A cryptic splicing associated to risk of aggressive disease progression).

Example 2: Neuronal Cell Expression of Cryptic Exon in UNC13A

It was next assessed whether this cryptic event could be reliably found across TDP-43 knockdowns in neuronal-like cells. Publicly available RNA-seq datasets were downloaded from induced human motor neurons (Klim, GEO series accession number GSE121569), as well as another high quality TDP-43 siRNA knockdown in a neuroblastoma (NB) cell line (Appocher, GEO series accession number GSE97262).

Figure 5:
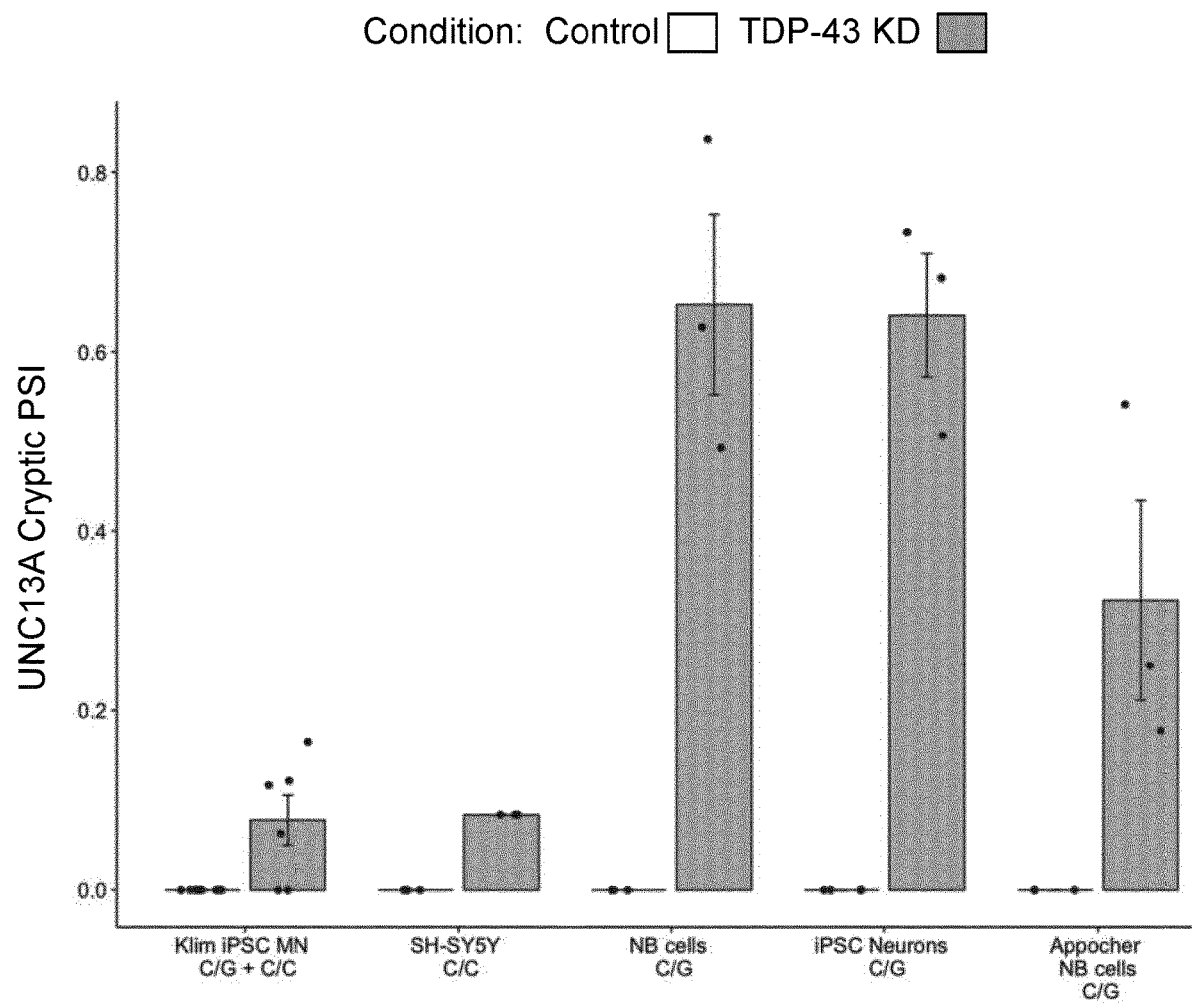
FIG. 5 shows that expression of the UNC13A cryptic exon was found across multiple datasets from TDP-43 knockdowns in neuronal-like cells.
Figure 6:
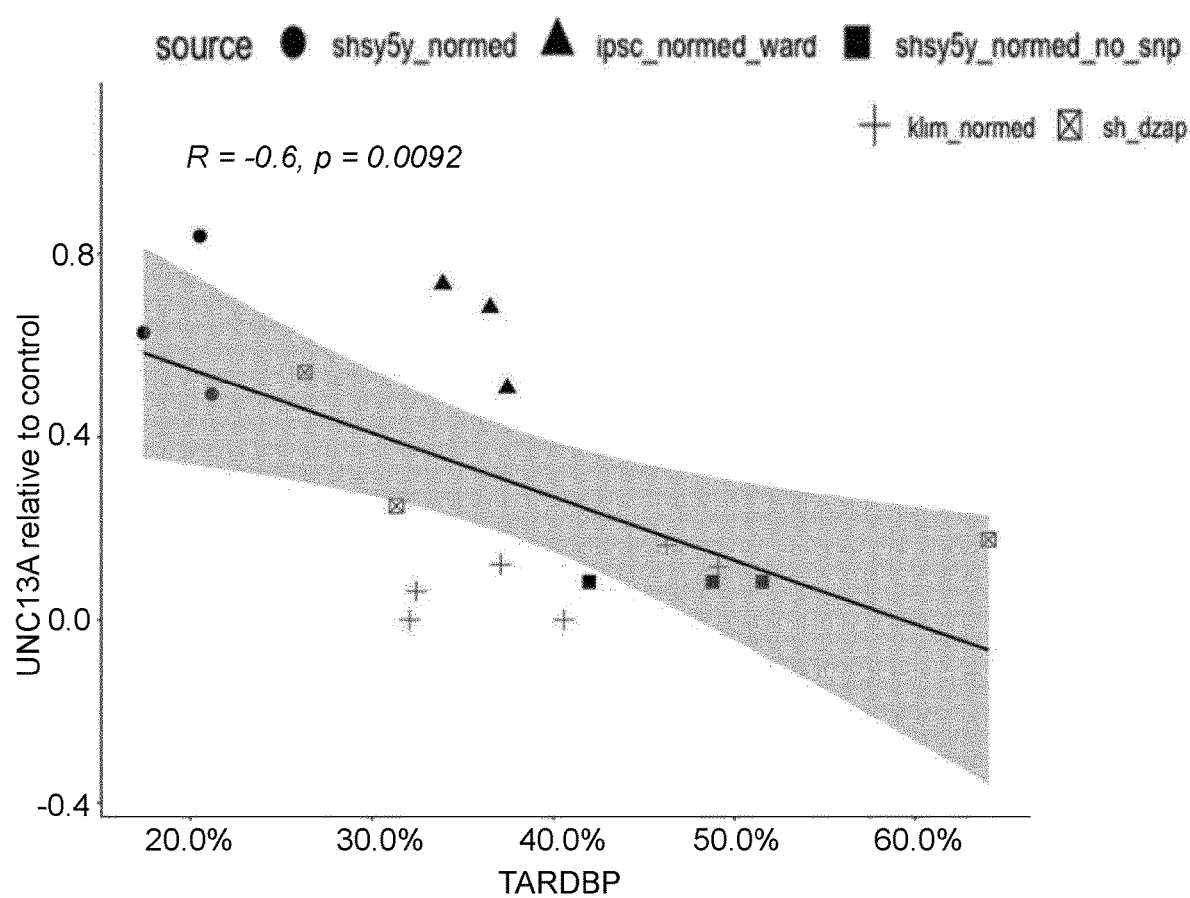
FIG. 6 shows the strong correlation between the efficiency of the TARDBP depletion, and the amount of UNC13A cryptic exon present, with samples with the greatest reduction in TARDBP RNA relative to control having the greatest inclusion of the UNC13A cryptic exon.
Figure 7:
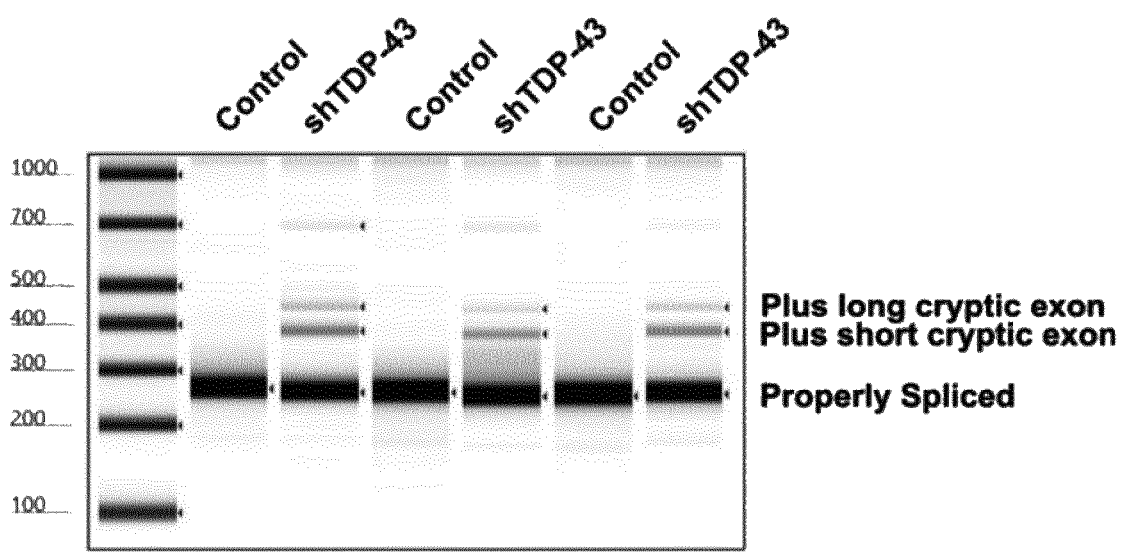
FIG. 7 shows validation by qPCR of the cryptic event in SH-SY5Y TDP-43 KD cells.
Figure 7:
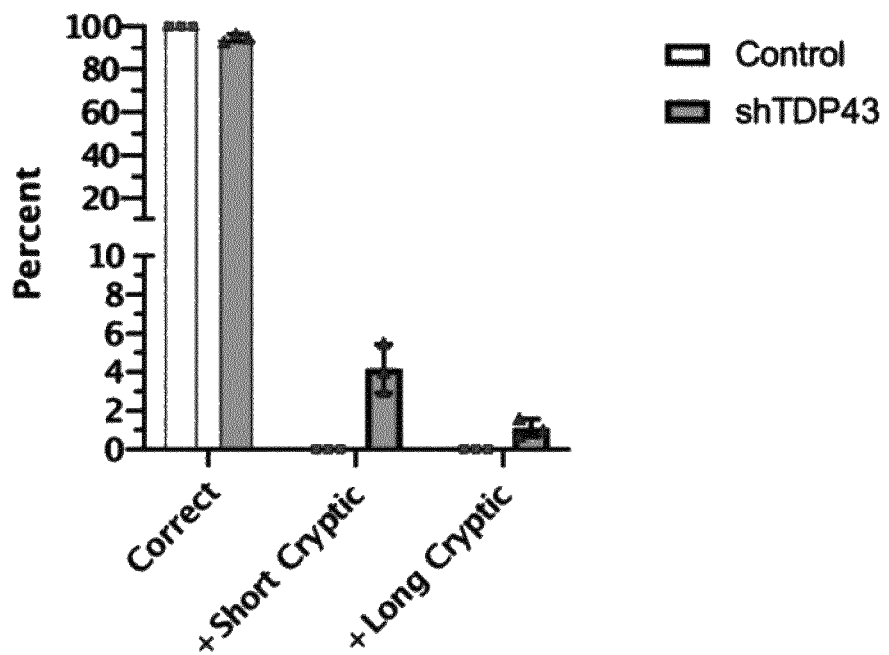

In addition to these public datasets, TDP-43 siRNA knockdown and RNA-sequencing was performed on the NB cell line, as well as an siRNA knockdown of TDP-43 in SH-SY5Y cells. Expression of the UNC13A cryptic exon was found across all datasets, with varying levels of inclusion (FIG. 5). Variation on the allelic expression of rs12973192 was observed within these datasets. For rs12973192 the major allele is C and the minor G allele is the risk allele which has been associated with FTLD and ALS. SH-SY5Y cells were homozygous for the major C allele, while the NB cells line and our iPSC neurons expressed both C and G allele in RNA. The hMN from Klim were variable, with 2 knockdowns expressing both C and G allele, while the other four either expressed the major C allele or had no coverage on rs12973192. It was noted that expression of the cryptic exon was lowest in the SH-SY5Y cell lines, which were homozygous on the C allele, although this could also be due to variable levels of knockdown efficiency. Across the five datasets, there was a strong correlation (R=−0.6, p=0.0092) between the efficiency of the TARDBP depletion, and the amount of UNC13A cryptic present, with those samples with the greatest reduction in TARDBP RNA relative to control having the greatest inclusion of the UNC13A cryptic (FIG. 6). The presence of the cryptic event was also validated by qPCR (FIG. 7) in SH-SY5Y TDP-43 KD.

Example 3: UNC13A is Downregulated in TDP-43 KD on Both RNA and Protein Level UNC13A is critical for synaptic transmission, with previous reports that UNC13A knockout loses 90% of synaptic transmission, with the remaining 10% coming from UNC13B, and with complete loss of both UNC13A and UNC13B there is no synaptic transmission.

Figure 8:
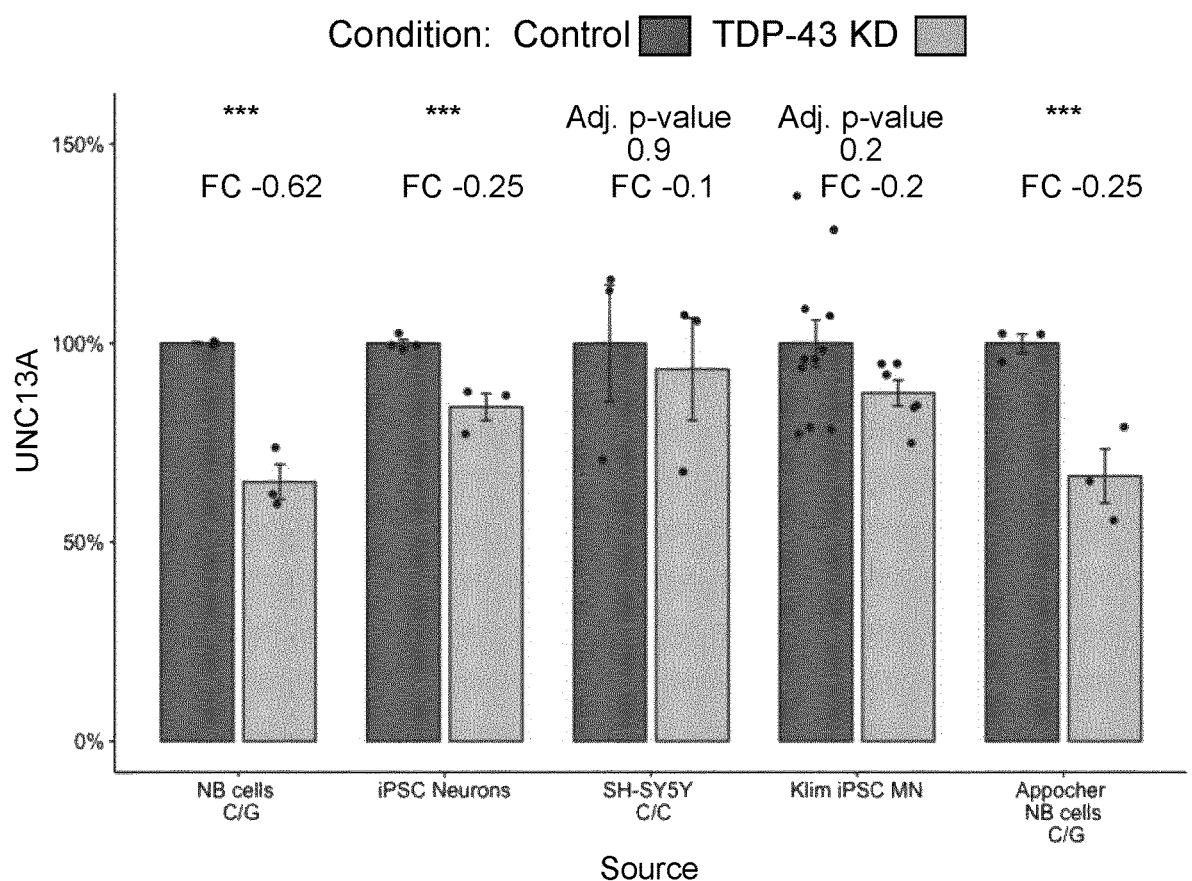
FIG. 8 shows how loss of TDP-43 leads to a reduction of UNC13A at the transcript level.
Figure 9:
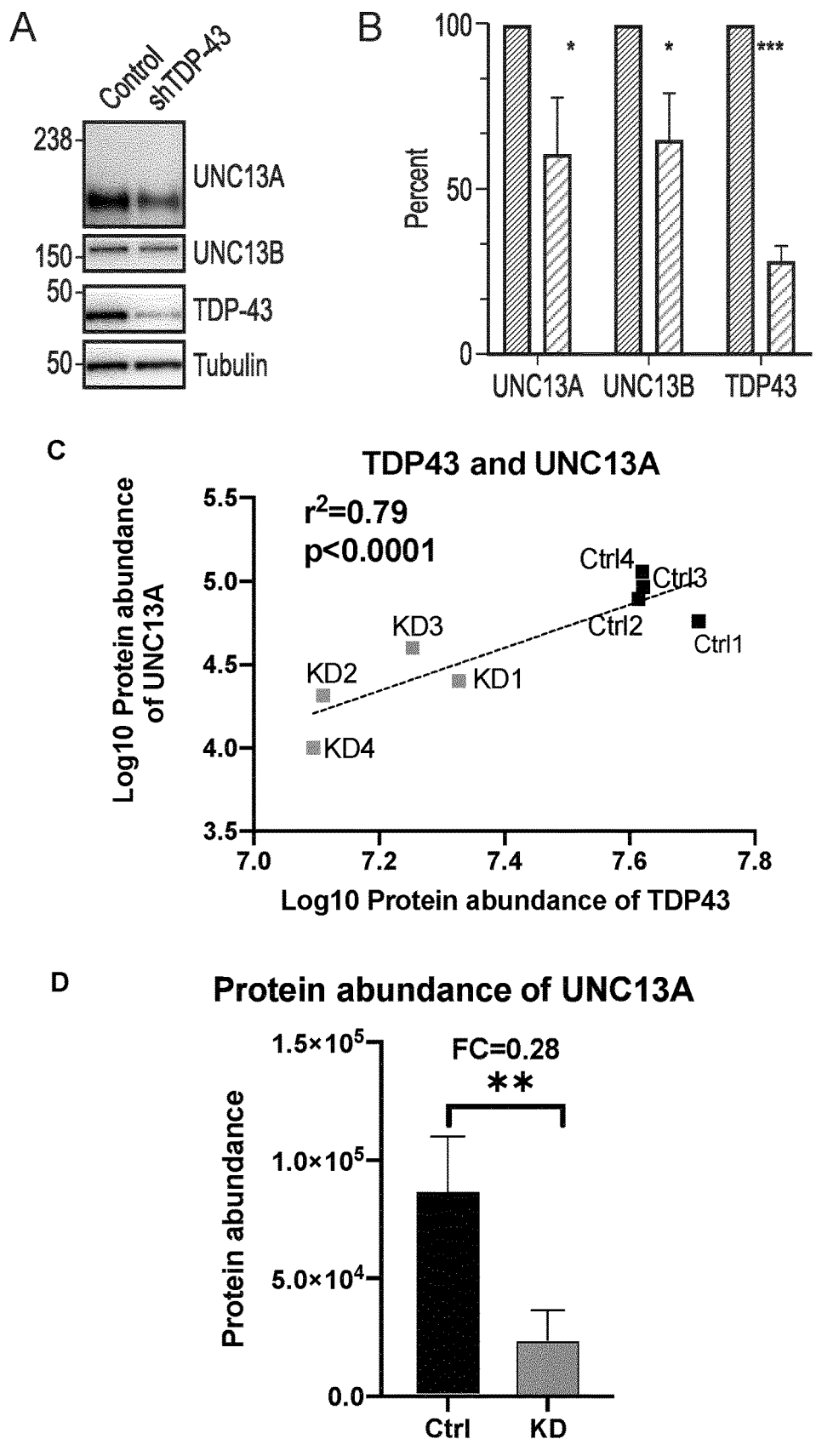
FIG. 9 shows how loss of TDP-43 leads to a reduction of UNC13A at the protein level (A-D).

Given that the cryptic event in UNC13A creates a frameshift in UNC13A transcript and contains multiple premature stop codons, it was assessed if TDP-43 KD would affect the levels of UNC13A. Differential gene expression analysis was performed on the five different TDP-43 knockdown experiments and confirmed that TARDBP RNA levels were reduced in all experiments. UNC13A RNA was significantly reduced in the iPSC neurons (−0.25-fold), the Appocher NB cells (−0.25-fold), and the additional TDP-43 siRNA on the same NB lines (−0.62 fold). In SH-SY5Y and Klim hMN, there was a very slight but nonsignificant decrease in UNC13A RNA (−0.1 and −0.2-fold respectively) (FIG. 8). The reduction RNA level of UNC13A after TDP-43 knockdown was confirmed by qPCR in SH SY5Y cells. FIG. 9 shows how loss of TDP-43 leads to a reduction of UNC13A at the protein level.

Example 4: UNC13A Cryptic Event Occurs in Patient Tissue Affect by TDP-43 Proteinopathy TDP-43 nuclear depletion and aggregation is a hallmark of ALS, as well certain subtypes of FTLD. It was therefore explored if the UNC13A cryptic event could be found in patient tissues affected by TDP-43 pathology. To assess the presence of the UNC13A cryptic, we quantified the number of spliced reads supporting its inclusion in the NYGC ALS Consortium RNA-Seq dataset. The NYCG ALS dataset contains 377 patients with 1349 neurological tissue samples, including non-neurological disease controls, FTLD, ALS, FTD with ALS (ALS-FTLD), or ALS with suspected Alzheimer's disease (ALS-AD). FTLD cases were further categorized based on neuropathological diagnosis, those with TDP-43 aggregates, FTLD-TDP-A, B, C or those with FUS or TAU aggregates. As the presence of TDP-43 proteinopathy has not been systematically assessed in the ALS cases, patients were separated into those with SOD1 or FUS mutations, which are presumed not to have TDP-43 proteinopathy, and all others.

Figure 10:
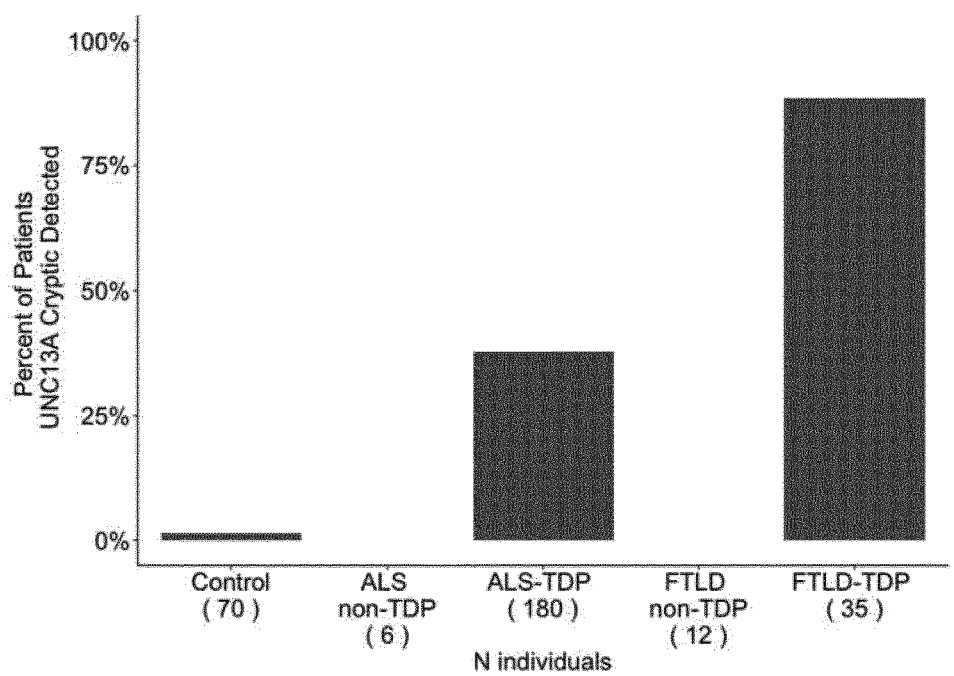
FIG. 10 shows that the UNC13A cryptic exon is present only in ALS and FTLD brains with TDP-43 pathology.
Figure 10:
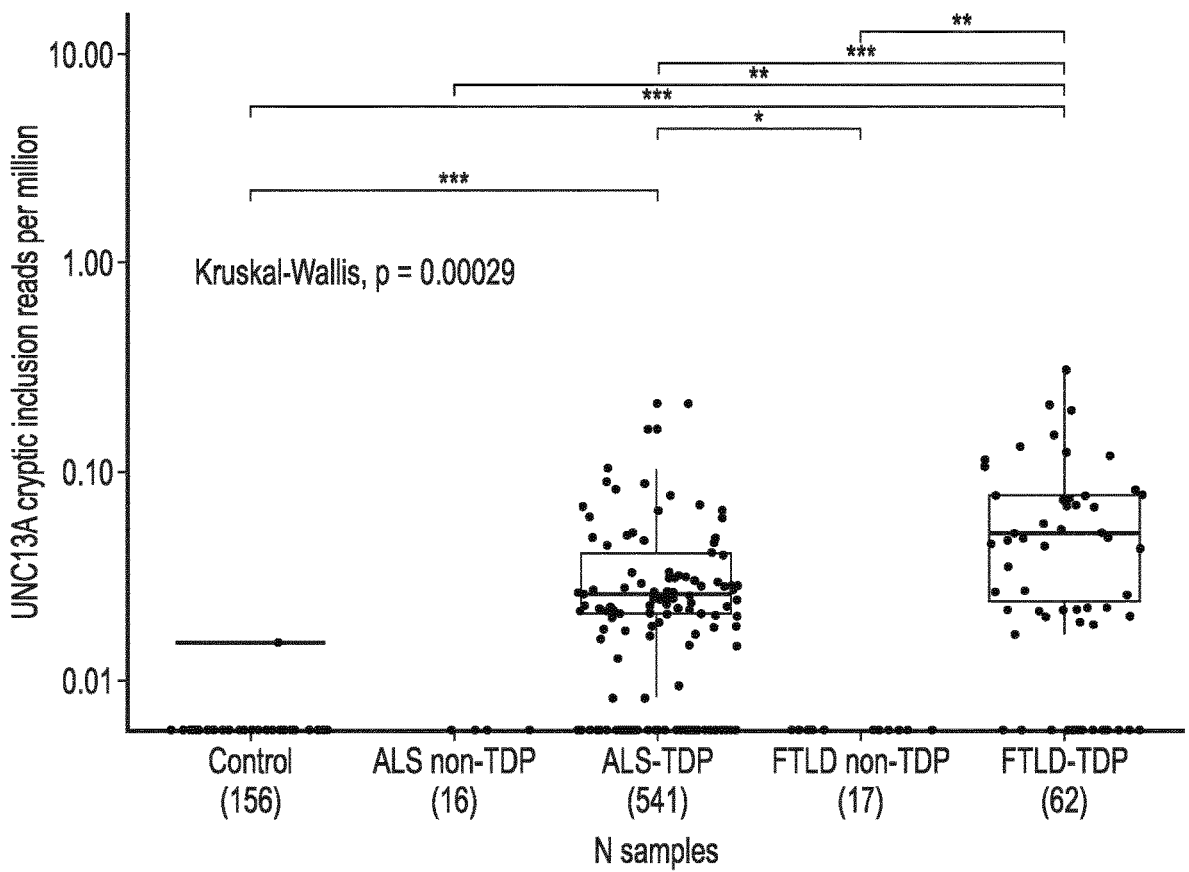

It was first explored the presence of the UNC13A cryptic in disease relevant tissues, specifically frontal and temporal cortices for FTLD, and lumbar, cervical, and thoracic spinal cord samples in ALS. We also looked for the presence of UNC13A cryptic in all six tissues in the non-neurological controls. Strikingly, the UNC13A cryptic was detected in 88% of the FTLD-TDP patients and 38% of ALS-TDP patients (FIG. 10, Panel A), and in none of the non-TDP FTLD or ALS patients, although there was a single non-neurological control with detection of the UNC13A cryptic. The level of the UNC13A cryptic was assessed with the number of inclusion reads supporting the cryptic. UNC13A cryptic was found at the highest rate in the FTLD-TDP samples, followed by the ALS-TDP group (FIG. 10, Panel B).

Example 5. Identification of UNC13A Cryptic Exon in Tissue

Using the NYCG dataset, patients with pathological diagnosis of TDP-43 proteinopathy were investigated. This included FTLD cases which had been assessed by pathologists with any of the FTD TDP-A-B-C subtypes (i.e., those known to be affected by TDP-43 protein aggregates in frontal and temporal areas), as well as FUS and TAU FTLD subtypes, which are not affected by TDP43 aggregates.

Figure 11:
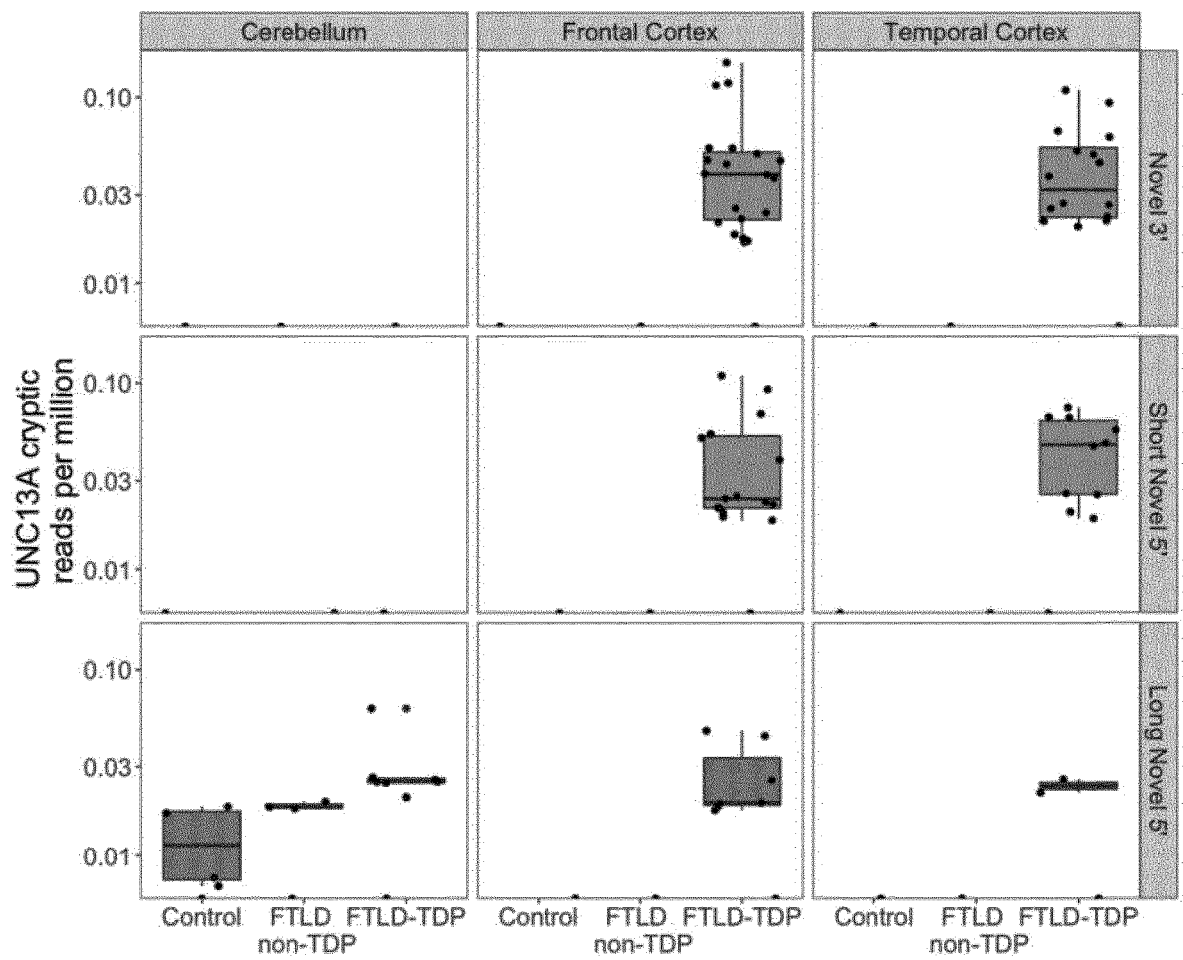
FIG. 11 shows that the UNC13A cryptic exon is present in FTLD brains with TDP-43 pathology in the cerebellum, frontal cortex and temporal cortex.
Figure 12:
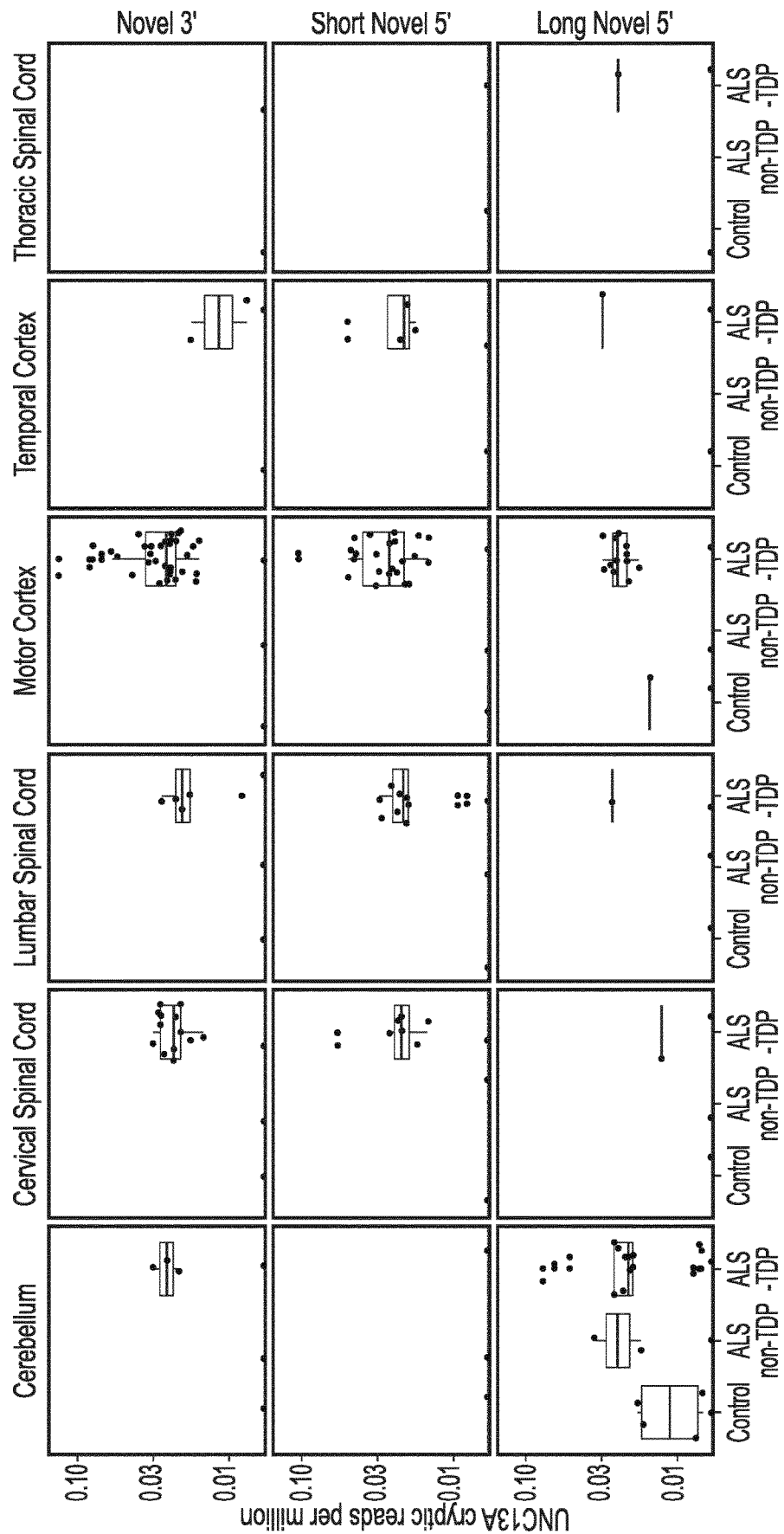
FIG. 12 shows that the UNC13A cryptic exon is present in ALS and FTLD brains with TDP-43 pathology in the cerebellum, cervical spinal cord, lumbar spinal cord, motor cortex, temporal cortex and thoracic spinal cord.

Strikingly, it was noted that UNC13A cryptic exon could be observed in tissue known to be affected by TDP-43 proteinopathy and that this effect was specific to these tissues, showing almost no presence in either controls patients or FTD non TDP subtypes (e.g., FUS and TAU), and no presence in the cerebellum of the TDP subtype patients, which is a tissue which is not affected by TDP-43 proteinopathy. (FIG. 11 and FIG. 12).

Figure 13:
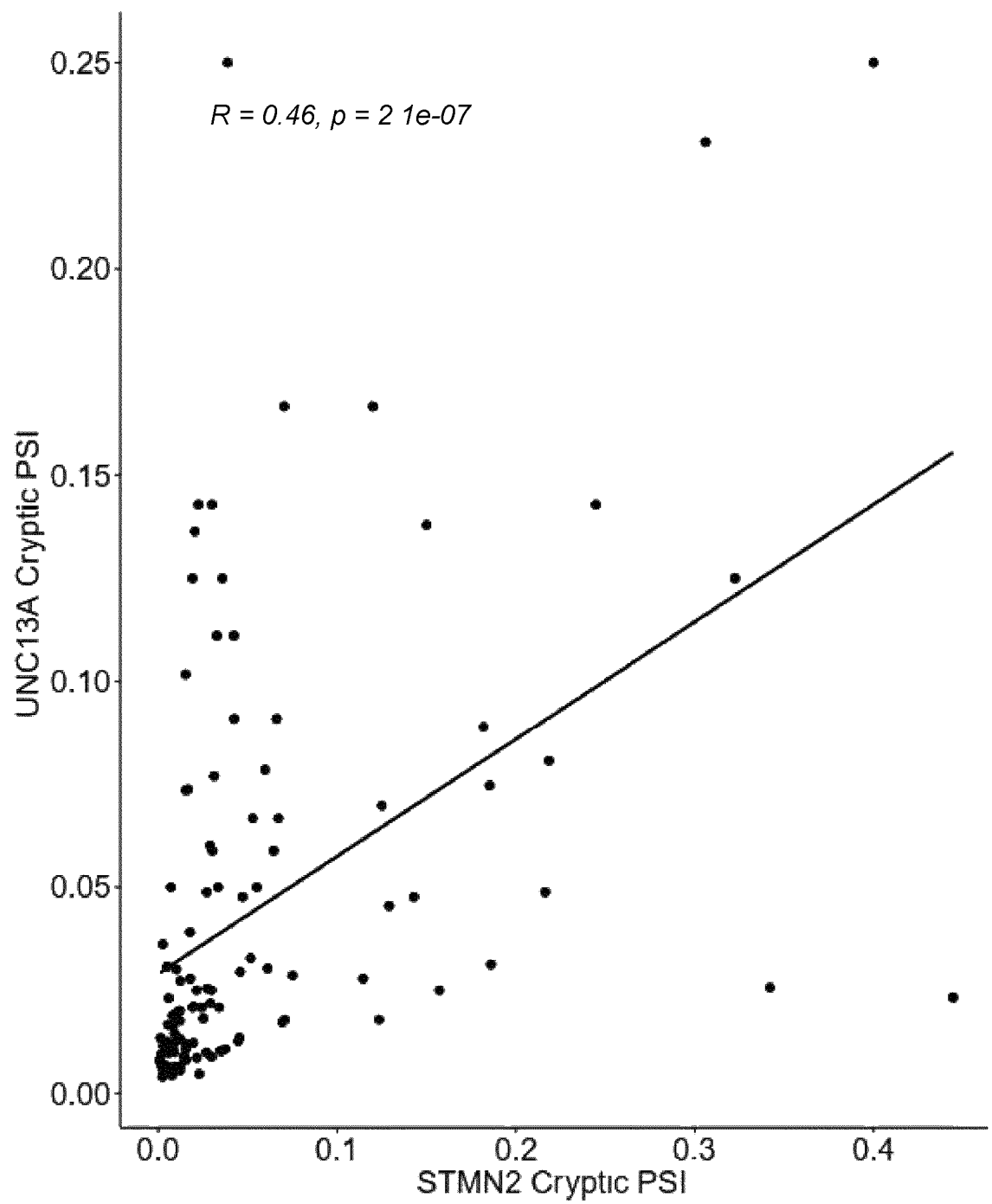
FIG. 13 shows the correlation of the UNC13A cryptic exon and the STMN2 cryptic site.

The search was expanded to include ALS cases to observe if UNC13A cryptic could be observed in tissues affected by TDP-43 proteinopathy. As direct staining information is not available for all samples in the database, the inclusion of truncated stathmin-2 (STMN2) was used as a marker for TDP-43 dysfunction. It has been previously demonstrated that the levels of truncated STMN2 correlate both with the burden of pTDP-43 and can serve as a proxy for the level of TDP-43 dysfunction (FIG. 13). UNC13A cryptic was detected in 92/277 of tissues affected by TDP-43 loss of function, as measured by truncated level of STMN2. The UNC13A cryptic was detected in 130/603 tissues in FTD/ALS TDP types, and 99/215 of patients with TDP-pathology in any of their tissue.

Example 6. UNC13A Sequences

The UNC13A cryptic exon (CE) variants, their location on chromosome 19, the single nucleotide polymorphisms (SNPs) and branchpoints are given in SEQ ID NO. 1 below, where the long variant is underlined, the shorter variant is in italics, the SNPs are bolded (rs12973192 cryptic exon is within the UNC13A CE sequence (emboldened G), and rs12608932 (emboldened U) is within the intronic region) and the branch points are highlighted. Lower case bases denote the bases immediately flanking the splice sites.

SEQ ID NO 1—Portion of UNC13A transcribed mRNA intronic sequence with cryptic exon—cords, chr19:17,641,557-17642844. SEQ ID NO 1 has the sequence:

```
GUGAGGGUCAUUGCUCGGCCCCUCCCAUGCCACUUCCACUCACCAUUCCUG

CCUGCCCAGCUCUUCCUCUUUCUGGCCACACCAUCCACACUCUCCUGGCCC

UCUGAGACUGCCCGCCAUGCCAUUCCCUUUACCUGGAAAACUCCUCCCUAU

CCAUCAAAGUCCAGAUUCAGGGUCACCUCCUCUGGGAAGCCCACCUUGGCC

UCCAGGUUGACUCUCACUACUCAUCAUCAGGUUCUUCCUUCUAUUCCagCCC

UAACCACUCAGGAUUGGGCCGUUUGUGUCUGGGUAUGUCUCUUCCagCUGC

CUGGGUUUCCUGGAAAGAACUCUUAUCCCCAGGAACUAGUUUGUUGAAUAAA

UGCUGGUGAAUGAAUGAAUGAUUGAACAGAUGAAUGAGUGAUGAGUAGAUAAA

AGGAUGGAUGGAGAGAUGGguGAGUACAUGGAUGGAUAGAUGGAUGAGUUG

GUGGGUAGAUUCGUGGCUAGAUGGAUGAUGGAUGGAUGGACAGAUGGAUG

GAUAUAUGAUUGAACUAUUGAAAGUAUAGAUGUAUGGAUGGGUGAAUUU
```

-continued

GGGGGUAAUUGUUAGAUGAUGGAUGAGUAUAGAUGAAUGAUGGAUGGAU

AACUUGAUGAGUGGAUAGAUAGAUUGCUGGAUAGAUGAUUGACUGGGUGG

AUAGAUGAAAUGUUGGAUGAGCAGAUUAAGUUGUAUUGGAUGGGAUGGA

UGGAAGUGUGGUUGAGUUAUUAGAAGGAAGAUUGAGUAGAUAGGUGAAU

UUGUUGAUAGUCAGAUGGGUAGAUAGGUAGAUGGAUGGAUGGAUGGAUG

GAUGUAUAGGCAGAUGGACAAAUGGAUGAAUGGGUGGGUGGAUGAAUGGA

AGGAUGUGUGGUUGAACUAUUGCAAGUAUUGAUAAUUGGGUUCAUAAUUU

CUGAAUAUUUAGAUGGAUGGUUGUGAGUGGCUGGUGGACAGACGAAAAAU

GGAUGGUUGGAUAAAUUGAUGGGUGGAUGGAUGGUUGGUUGUAUGAAAG

AAUGAAUGAUUGGGUAGGUGGAUUAAGUUGCGGAUCAAUGUAUGGGAUGG

AUGAAUGGAUGGAUGGAUGGAUGUGUGGUUGAAUUACUGAAAGGUUGGA

AGAGUGGAUGGGUGAAAUUUGGGGUAGUUAGAUGGGUGGGUGUGUGGAU

GGAUAAAAGAGUAGAUGAAUGAAUUAAUGAAUAAACAGGCAGAUGGAUGA

UGUAAGCUGCCCCAGACCCUGGGACCUCUGACCCCCGGCGACCCCUUGCAC

UCUCCAUGACACUUUCUCUCCCAUGGUGGCAG

The splice sites are defined as follows: Long cryptic acceptor is the phosphodiester bond between chr19: 17,642,591-17,642,592; the Short cryptic acceptor is the phosphodiester bond between chr19:17,642,541-17,642,542 and the Cryptic donor is the phosphodiester bond between chr19: 17,642,413-17,642,414.

SEQ ID NO: 1 may encompass the minor allele of the SNP (i.e., the risk variant) or the major allele at rs12973192 and/or rs12608932, therefore SEQ ID NO: 1 also encompasses the sequence wherein the emboldened G (at rs12973192) is replaced with a C, and the emboldened U (rs12608932) corresponding to the rs12608932 cryptic exon SNP may be replaced with a G.

SEQ ID NO 2 Shorter UNC13A cryptic exon sequence in transcribed UNC13A mRNA—cords chr19:17642414-17,642,541. SEQ ID NO 2 has the sequence: CUGCCUGG-GUUUCCUGGAAAGAACUCUUAUCCCCAGGAACU-AGUUUGUUGAAUAAAUGCUGGUGAAUGAAUGA-AUGAUUGAACAGAUGAAUGAGUGAUGAGUAGA-UAA AAGGAUGGAUGGAGAGAUGG). SEQ ID NO: 2 may encompass minor allele of the SNP (i.e., the risk variant), or the major allele at rs12973192, therefore SEQ TD NO: 2 also encompasses the sequence wherein the emboldened G (at rs12973192) is replaced with a C.

SEQ ID NO 3—Longer UNC13A cryptic exon sequence in transcribed UNC13A mRNA—cords chr19:17642414-17642591. SEQ ID NO 3 has the sequence (CCCUAAC-CACUCAGGAUGGGCCGUUUGUGUCUGGGUAU-GUCUCUUCCAGCUGC CUGGGUUUCCUGGAAAG-AACUCUUAUCCCCAGGAACUAGUUUGUUGAA-UAAAUG CUGGUGAAUGAAUGAAUGAUUGAAC-AGAUGAAUGAGUGAUGAGUAGAUAAAAGG AUG-GAUGGAGAGAUGG). SEQ ID NO: 3 may encompass the risk variant of the SNP (i.e., minor allele), or the major allele at rs2973192, therefore SEQ ID NO: 3 also encompasses the sequence wherein the emboldened G (at rs12973192) is replaced with a C.

The following Tables provides a list of ASO sequences or portions of ASO sequences that are capable of binding to crucial elements involved in UNC13A cryptic exon splicing.

TABLE 1

| SEQ ID NO | Name | Target/ crucial element | Portion of ASO sequence/ASO |
|---|---|---|---|
| SEQ ID NO: 4 | 285_maj | branchpoint | GGAGUUUUCCAGG |
| SEQ ID NO: 5 | 286_maj | branchpoint | AGGAGUUUUCCAG |
| SEQ ID NO: 6 | 287_maj | branchpoint | GAGGAGUUUUCCA |
| SEQ ID NO: 7 | 288_maj | branchpoint | GGAGGAGUUUUCC |
| SEQ ID NO: 8 | 289_maj | branchpoint | GGGAGGAGUUUUC |
| SEQ ID NO: 9 | 290_maj | branchpoint | AGGGAGGAGUUUU |
| SEQ ID NO: 10 | 291_maj | branchpoint | UAGGGAGGAGUUU |
| SEQ ID NO: 11 | 292_maj | branchpoint | AUAGGGAGGAGUU |
| SEQ ID NO: 12 | 293_maj | branchpoint | GAUAGGGAGGAGU |
| SEQ ID NO: 13 | 294_maj | branchpoint | GGAUAGGGAGGAG |
| SEQ ID NO: 14 | 295_maj | branchpoint | UGGAUAGGGAGGA |
| SEQ ID NO: 15 | 296_maj | branchpoint | AUGGAUAGGGAGG |
| SEQ ID NO: 16 | 297_maj | branchpoint | GAUGGAUAGGGAG |
| SEQ ID NO: 17 | 298_maj | branchpoint | UGAUGGAUAGGGA |
| SEQ ID NO: 18 | 299_maj | branchpoint | UUGAUGGAUAGGG |
| SEQ ID NO: 19 | 300_maj | branchpoint | UUUGAUGGAUAGG |
| SEQ ID NO: 20 | 301_maj | branchpoint | CUUUGAUGGAUAG |
| SEQ ID NO: 21 | 302_maj | branchpoint | ACUUUGAUGGAUA |
| SEQ ID NO: 22 | 303_maj | branchpoint | GACUUUGAUGGAU |
| SEQ ID NO: 23 | 304_maj | branchpoint | GGACUUUGAUGGA |

TABLE 1-continued

Branchpoint

| SEQ ID NO | Name | Target/crucial element | Portion of ASO sequence/ASO |
|---|---|---|---|
| SEQ ID NO: 24 | 305_maj | branchpoint | UGGACUUUGAUGG |
| SEQ ID NO: 25 | 306_maj | branchpoint | CUGGACUUUGAUG |
| SEQ ID NO: 26 | 307_maj | branchpoint | UCUGGACUUUGAU |
| SEQ ID NO: 27 | 308_maj | branchpoint | AUCUGGACUUUGA |
| SEQ ID NO: 28 | 309_maj | branchpoint | AAUCUGGACUUUG |
| SEQ ID NO: 29 | 310_maj | branchpoint | GAAUCUGGACUUU |
| SEQ ID NO: 30 | 311_maj | branchpoint | UGAAUCUGGACUU |
| SEQ ID NO: 31 | 312_maj | branchpoint | CUGAAUCUGGACU |
| SEQ ID NO: 32 | 313_maj | branchpoint | CCUGAAUCUGGAC |
| SEQ ID NO: 33 | 314_maj | branchpoint | CCCUGAAUCUGGA |
| SEQ ID NO: 34 | 315_maj | branchpoint | ACCCUGAAUCUGG |
| SEQ ID NO: 35 | 316_maj | branchpoint | GACCCUGAAUCUG |
| SEQ ID NO: 36 | 317_maj | branchpoint | UGACCCUGAAUCU |
| SEQ ID NO: 37 | 318_maj | branchpoint | GUGACCCUGAAUC |
| SEQ ID NO: 38 | 319_maj | branchpoint | GGUGACCCUGAAU |
| SEQ ID NO: 39 | 320_maj | branchpoint | AGGUGACCCUGAA |
| SEQ ID NO: 40 | 321_maj | branchpoint | GAGGUGACCCUGA |
| SEQ ID NO: 41 | 322_maj | branchpoint | GGAGGUGACCCUG |
| SEQ ID NO: 42 | 323_maj | branchpoint | AGGAGGUGACCCU |
| SEQ ID NO: 43 | 324_maj | branchpoint | GAGGAGGUGACCC |
| SEQ ID NO: 44 | 325_maj | branchpoint | AGAGGAGGUGACC |
| SEQ ID NO: 45 | 326_maj | branchpoint | CAGAGGAGGUGAC |
| SEQ ID NO: 46 | 327_maj | branchpoint | CCAGAGGAGGUGA |
| SEQ ID NO: 47 | 328_maj | branchpoint | CCCAGAGGAGGUG |
| SEQ ID NO: 48 | 329_maj | branchpoint | UCCCAGAGGAGGU |
| SEQ ID NO: 49 | 330_maj | branchpoint | UUCCCAGAGGAGG |
| SEQ ID NO: 50 | 331_maj | branchpoint | CUUCCCAGAGGAG |
| SEQ ID NO: 51 | 332_maj | branchpoint | GCUUCCCAGAGGA |
| SEQ ID NO: 52 | 333_maj | branchpoint | GGCUUCCCAGAGG |
| SEQ ID NO: 53 | 334_maj | branchpoint | GGGCUUCCCAGAG |
| SEQ ID NO: 54 | 335_maj | branchpoint | UGGGCUUCCCAGA |
| SEQ ID NO: 55 | 336_maj | branchpoint | GUGGGCUUCCCAG |
| SEQ ID NO: 56 | 337_maj | branchpoint | GGUGGGCUUCCCA |
| SEQ ID NO: 57 | 338_maj | branchpoint | AGGUGGGCUUCCC |
| SEQ ID NO: 58 | 339_maj | branchpoint | AAGGUGGGCUUCC |
| SEQ ID NO: 59 | 340_maj | branchpoint | CAAGGUGGGCUUC |
| SEQ ID NO: 60 | 341_maj | branchpoint | CCAAGGUGGGCUU |
| SEQ ID NO: 61 | 342_maj | branchpoint | GCCAAGGUGGGCU |
| SEQ ID NO: 62 | 343_maj | branchpoint | GGCCAAGGUGGGC |
| SEQ ID NO: 63 | 344_maj | branchpoint | AGGCCAAGGUGGG |
| SEQ ID NO: 64 | 345_maj | branchpoint | GAGGCCAAGGUGG |
| SEQ ID NO: 65 | 346_maj | branchpoint | GGAGGCCAAGGUG |
| SEQ ID NO: 66 | 347_maj | branchpoint | UGGAGGCCAAGGU |
| SEQ ID NO: 67 | 348_maj | branchpoint | CUGGAGGCCAAGG |
| SEQ ID NO: 68 | 349_maj | branchpoint | CCUGGAGGCCAAG |
| SEQ ID NO: 69 | 350_maj | branchpoint | ACCUGGAGGCCAA |
| SEQ ID NO: 70 | 351_maj | branchpoint | AACCUGGAGGCCA |
| SEQ ID NO: 71 | 352_maj | branchpoint | CAACCUGGAGGCC |
| SEQ ID NO: 72 | 353_maj | branchpoint | UCAACCUGGAGGC |
| SEQ ID NO: 73 | 354_maj | branchpoint | GUCAACCUGGAGG |
| SEQ ID NO: 74 | 355_maj | branchpoint | AGUCAACCUGGAG |
| SEQ ID NO: 75 | 356_maj | branchpoint | GAGUCAACCUGGA |
| SEQ ID NO: 76 | 357_maj | branchpoint | AGAGUCAACCUGG |
| SEQ ID NO: 77 | 358_maj | branchpoint | GAGAGUCAACCUG |
| SEQ ID NO: 78 | 359_maj | branchpoint | UGAGAGUCAACCU |
| SEQ ID NO: 79 | 360_maj | branchpoint | GUGAGAGUCAACC |
| SEQ ID NO: 80 | 361_maj | branchpoint | AGUGAGAGUCAAC |
| SEQ ID NO: 81 | 362_maj | branchpoint | UAGUGAGAGUCAA |
| SEQ ID NO: 82 | 363_maj | branchpoint | GUAGUGAGAGUCA |
| SEQ ID NO: 83 | 364_maj | branchpoint | AGUAGUGAGAGUC |
| SEQ ID NO: 84 | 365_maj | branchpoint | GAGUAGUGAGAGU |
| SEQ ID NO: 85 | 366_maj | branchpoint | UGAGUAGUGAGAG |
| SEQ ID NO: 86 | 367_maj | branchpoint | AUGAGUAGUGAGA |
| SEQ ID NO: 87 | 368_maj | branchpoint | GAUGAGUAGUGAG |
| SEQ ID NO: 88 | 369_maj | branchpoint | UGAUGAGUAGUGA |
| SEQ ID NO: 89 | 370_maj | branchpoint | AUGAUGAGUAGUG |
| SEQ ID NO: 90 | 371_maj | branchpoint | GAUGAUGAGUAGU |
| SEQ ID NO: 91 | 372_maj | branchpoint | UGAUGAUGAGUAG |
| SEQ ID NO: 92 | 373_maj | branchpoint | CUGAUGAUGAGUA |
| SEQ ID NO: 93 | 374_maj | branchpoint | CCUGAUGAUGAGU |
| SEQ ID NO: 94 | 375_maj | branchpoint | ACCUGAUGAUGAG |
| SEQ ID NO: 95 | 376_maj | branchpoint | AACCUGAUGAUGA |
| SEQ ID NO: 96 | 377_maj | branchpoint | GAACCUGAUGAUG |
| SEQ ID NO: 97 | 378_maj | branchpoint | AGAACCUGAUGAU |

TABLE 1-continued

| | | Branchpoint | |
|---|---|---|---|
| SEQ ID NO | Name | Target/crucial element | Portion of ASO sequence/ASO |
| SEQ ID NO: 98 | 379_maj | branchpoint | AAGAACCUGAUGA |
| SEQ ID NO: 99 | 380_maj | branchpoint | GAAGAACCUGAUG |
| SEQ ID NO: 100 | 381_maj | branchpoint | GGAAGAACCUGAU |
| SEQ ID NO: 101 | 382_maj | branchpoint | AGGAAGAACCUGA |
| SEQ ID NO: 102 | 383_maj | branchpoint | AAGGAAGAACCUG |
| SEQ ID NO: 103 | 384_maj | branchpoint | GAAGGAAGAACCU |
| SEQ ID NO: 104 | 385_maj | branchpoint | AGAAGGAAGAACC |

TABLE 2

| | | Splice sites | |
|---|---|---|---|
| SEQ ID NO | Name | Target/crucial element | Portion of ASO sequence/ASO |
| SEQ ID NO: 105 | 386_maj | 3'-splice site | UAGAAGGAAGAAC |
| SEQ ID NO: 106 | 387_maj | 3'-splice site | AUAGAAGGAAGAA |
| SEQ ID NO: 107 | 388_maj | 3'-splice site | AAUAGAAGGAAGA |
| SEQ ID NO: 108 | 389_maj | 3'-splice site | GAAUAGAAGGAAG |
| SEQ ID NO: 109 | 390_maj | 3'-splice site | GGAAUAGAAGGAA |
| SEQ ID NO: 110 | 391_maj | 3'-splice site | UGGAAUAGAAGGA |
| SEQ ID NO: 111 | 392_maj | 3'-splice site | CUGGAAUAGAAGG |
| SEQ ID NO: 112 | 393_maj | 3'-splice site | GCUGGAAUAGAAG |
| SEQ ID NO: 113 | 394_maj | 3'-splice site | GGCUGGAAUAGAA |
| SEQ ID NO: 114 | 395_maj | 3'-splice site | GGGCUGGAAUAGA |
| SEQ ID NO: 115 | 396_maj | 3'-splice site | AGGGCUGGAAUAG |
| SEQ ID NO: 116 | 397_maj | 3'-splice site | UAGGGCUGGAAUA |
| SEQ ID NO: 117 | 398_maj | 3'-splice site | UUAGGGCUGGAAU |
| SEQ ID NO: 118 | 399_maj | 3'-splice site | GUUAGGGCUGGAA |
| SEQ ID NO: 119 | 400_maj | 3'-splice site | GGUUAGGGCUGGA |
| SEQ ID NO: 120 | 401_maj | 3'-splice site | UGGUUAGGGCUGG |
| SEQ ID NO: 121 | 402_maj | 3'-splice site | GUGGUUAGGGCUG |
| SEQ ID NO: 122 | 403_maj | 3'-splice site | AGUGGUUAGGGCU |
| SEQ ID NO: 123 | 404_maj | 3'-splice site | GAGUGGUUAGGGC |
| SEQ ID NO: 124 | 405_maj | 3'-splice site | UGAGUGGUUAGGG |
| SEQ ID NO: 125 | 406_maj | 3'-splice site | CUGAGUGGUUAGG |
| SEQ ID NO: 126 | 407_maj | 3'-splice site | CCUGAGUGGUUAG |
| SEQ ID NO: 127 | 408_maj | 3'-splice site | UCCUGAGUGGUUA |
| SEQ ID NO: 128 | 409_maj | 3'-splice site | AUCCUGAGUGGUU |
| SEQ ID NO: 129 | 410_maj | 3'-splice site | AAUCCUGAGUGGU |
| SEQ ID NO: 130 | 411_maj | 3'-splice site | CAAUCCUGAGUGG |
| SEQ ID NO: 131 | 412_maj | 3'-splice site | CCAAUCCUGAGUG |
| SEQ ID NO: 132 | 413_maj | 3'-splice site | CCCAAUCCUGAGU |
| SEQ ID NO: 133 | 414_maj | 3'-splice site | GCCCAAUCCUGAG |

TABLE 2-continued

Splice sites

| SEQ ID NO | Name | Target/ crucial element | Portion of ASO sequence/ASO |
| --- | --- | --- | --- |
| SEQ ID NO: 134 | 415_maj | 3'-splice site | GGCCCAAUCCUGA |
| SEQ ID NO: 135 | 416_maj | 3'-splice site | CGGCCCAAUCCUG |
| SEQ ID NO: 136 | 417_maj | 3'-splice site | ACGGCCCAAUCCU |
| SEQ ID NO: 137 | 418_maj | 3'-splice site | AACGGCCCAAUCC |
| SEQ ID NO: 138 | 419_maj | 3'-splice site | AAACGGCCCAAUC |
| SEQ ID NO: 139 | 420_maj | 3'-splice site | CAAACGGCCCAAU |
| SEQ ID NO: 140 | 421_maj | 3'-splice site | ACAAACGGCCCAA |
| SEQ ID NO: 141 | 422_maj | 3'-splice site | CACAAACGGCCCA |
| SEQ ID NO: 142 | 423_maj | 3'-splice site | ACACAAACGGCCC |
| SEQ ID NO: 143 | 424_maj | 3'-splice site | GACACAAACGGCC |
| SEQ ID NO: 144 | 425_maj | 3'-splice site | AGACACAAACGGC |
| SEQ ID NO: 145 | 426_maj | 3'-splice site | CAGACACAAACGG |
| SEQ ID NO: 146 | 427_maj | 3'-splice site | CCAGACACAAACG |
| SEQ ID NO: 147 | 428_maj | 3'-splice site | CCCAGACACAAAC |
| SEQ ID NO: 148 | 429_maj | 3'-splice site | ACCCAGACACAAA |
| SEQ ID NO: 149 | 430_maj | 3'-splice site | UACCCAGACACAA |
| SEQ ID NO: 150 | 431_maj | 3'-splice site | AUACCCAGACACA |
| SEQ ID NO: 151 | 432_maj | 3'-splice site | CAUACCCAGACAC |
| SEQ ID NO: 152 | 433_maj | 3'-splice site | ACAUACCCAGACA |
| SEQ ID NO: 153 | 434_maj | 3'-splice site | GACAUACCCAGAC |
| SEQ ID NO: 154 | 435_maj | 3'-splice site | AGACAUACCCAGA |
| SEQ ID NO: 155 | 436_maj | 3'-splice site | GAGACAUACCCAG |
| SEQ ID NO: 156 | 437_maj | 3'-splice site | AGAGACAUACCCA |
| SEQ ID NO: 157 | 438_maj | 3'-splice site | AAGAGACAUACCC |
| SEQ ID NO: 158 | 439_maj | 3'-splice site | GAAGAGACAUACC |
| SEQ ID NO: 159 | 440_maj | 3'-splice site | GGAAGAGACAUAC |
| SEQ ID NO: 160 | 441_maj | 3'-splice site | UGGAAGAGACAUA |
| SEQ ID NO: 161 | 442_maj | 3'-splice site | CUGGAAGAGACAU |
| SEQ ID NO: 162 | 443_maj | 3'-splice site | GCUGGAAGAGACA |
| SEQ ID NO: 163 | 444_maj | 3'-splice site | AGCUGGAAGAGAC |
| SEQ ID NO: 164 | 445_maj | 3'-splice site | CAGCUGGAAGAGA |
| SEQ ID NO: 165 | 446_maj | 3'-splice site | GCAGCUGGAAGAG |
| SEQ ID NO: 166 | 447_maj | 3'-splice site | GGCAGCUGGAAGA |
| SEQ ID NO: 167 | 448_maj | 3'-splice site | AGGCAGCUGGAAG |
| SEQ ID NO: 168 | 449_maj | 3'-splice site | CAGGCAGCUGGAA |
| SEQ ID NO: 169 | 450_maj | 3'-splice site | CCAGGCAGCUGGA |
| SEQ ID NO: 170 | 451_maj | 3'-splice site | CCCAGGCAGCUGG |

TABLE 2-continued

Splice sites

| SEQ ID NO | Name | Target/ crucial element | Portion of ASO sequence/ASO |
|---|---|---|---|
| SEQ ID NO: 171 | 452_maj | 3'-splice site | ACCCAGGCAGCUG |
| SEQ ID NO: 172 | 453_maj | 3'-splice site | AACCCAGGCAGCU |
| SEQ ID NO: 173 | 454_maj | 3'-splice site | AAACCCAGGCAGC |
| SEQ ID NO: 174 | 455_maj | 3'-splice site | GAAACCCAGGCAG |
| SEQ ID NO: 175 | 456_maj | 3'-splice site | GGAAACCCAGGCA |
| SEQ ID NO: 176 | 457_maj | 3'-splice site | AGGAAACCCAGGC |
| SEQ ID NO: 177 | 458_maj | 3'-splice site | CAGGAAACCCAGG |
| SEQ ID NO: 178 | 459_maj | 3'-splice site | CCAGGAAACCCAG |
| SEQ ID NO: 179 | 460_maj | 3'-splice site | UCCAGGAAACCCA |
| SEQ ID NO: 180 | 461_maj | 3'-splice site | UUCCAGGAAACCC |
| SEQ ID NO: 181 | 462_maj | 3'-splice site | UUUCCAGGAAACC |
| SEQ ID NO: 182 | 463_maj | 3'-splice site | CUUUCCAGGAAAC |
| SEQ ID NO: 183 | 464_maj | 3'-splice site | UCUUUCCAGGAAA |
| SEQ ID NO: 184 | 465_maj | 3'-splice site | UUCUUUCCAGGAA |
| SEQ ID NO: 185 | 466_maj | 3'-splice site | GUUCUUUCCAGGA |
| SEQ ID NO: 186 | 467_maj | 3'-splice site | AGUUCUUUCCAGG |
| SEQ ID NO: 187 | 468_maj | 3'-splice site | GAGUUCUUUCCAG |
| SEQ ID NO: 188 | 469_maj | 3'-splice site | AGAGUUCUUUCCA |
| SEQ ID NO: 189 | 470_maj | 3'-splice site | AAGAGUUCUUUCC |
| SEQ ID NO: 270 | 551_maj | 5' splice-site | UUUAUCUACUCAU |
| SEQ ID NO: 271 | 552_maj | 5' splice-site | UUUUAUCUACUCA |
| SEQ ID NO: 272 | 553_maj | 5' splice-site | CUUUUAUCUACUC |
| SEQ ID NO: 273 | 554_maj | 5' splice-site | CCUUUUAUCUACU |
| SEQ ID NO: 274 | 554_min | 5' splice-site | GCUUUUAUCUACU |
| SEQ ID NO: 275 | 555_maj | 5' splice-site | UCCUUUUAUCUAC |
| SEQ ID NO: 276 | 555_min | 5' splice-site | UGCUUUUAUCUAC |
| SEQ ID NO: 277 | 556_maj | 5' splice-site | AUCCUUUUAUCUA |
| SEQ ID NO: 278 | 556_min | 5' splice-site | AUGCUUUUAUCUA |
| SEQ ID NO: 279 | 557_maj | 5' splice-site | CAUCCUUUUAUCU |
| SEQ ID NO: 280 | 557_min | 5' splice-site | CAUGCUUUUAUCU |
| SEQ ID NO: 281 | 558_maj | 5' splice-site | CCAUCCUUUUAUC |
| SEQ ID NO: 282 | 558_min | 5' splice-site | CCAUGCUUUUAUC |
| SEQ ID NO: 283 | 559_maj | 5' splice-site | UCCAUCCUUUUAU |
| SEQ ID NO: 284 | 559_min | 5' splice-site | UCCAUGCUUUUAU |
| SEQ ID NO: 285 | 560_maj | 5' splice-site | AUCCAUCCUUUUA |
| SEQ ID NO: 286 | 560_min | 5' splice-site | AUCCAUGCUUUUA |
| SEQ ID NO: 287 | 561_maj | 5' splice-site | CAUCCAUCCUUUU |
| SEQ ID NO: 288 | 561_min | 5' splice-site | CAUCCAUGCUUUU |

TABLE 2-continued

Splice sites

| SEQ ID NO | Name | Target/crucial element | Portion of ASO sequence/ASO |
|---|---|---|---|
| SEQ ID NO: 289 | 562_maj | 5' splice-site | CCAUCCAUCCUUU |
| SEQ ID NO: 290 | 562_min | 5' splice-site | CCAUCCAUGCUUU |
| SEQ ID NO: 291 | 563_maj | 5' splice-site | UCCAUCCAUCCUU |
| SEQ ID NO: 292 | 563_min | 5' splice-site | UCCAUCCAUGCUU |
| SEQ ID NO: 293 | 564_maj | 5' splice-site | CUCCAUCCAUCCU |
| SEQ ID NO: 294 | 564_min | 5' splice-site | CUCCAUCCAUGCU |
| SEQ ID NO: 295 | 565_maj | 5' splice-site | UCUCCAUCCAUCC |
| SEQ ID NO: 296 | 565_min | 5' splice-site | UCUCCAUCCAUGC |
| SEQ ID NO: 297 | 566_maj | 5' splice-site | CUCUCCAUCCAUC |
| SEQ ID NO: 298 | 566_min | 5' splice-site | CUCUCCAUCCAUG |
| SEQ ID NO: 299 | 567_maj | 5' splice-site | UCUCUCCAUCCAU |
| SEQ ID NO: 300 | 568_maj | 5' splice-site | AUCUCUCCAUCCA |
| SEQ ID NO: 301 | 569_maj | 5' splice-site | CAUCUCUCCAUCC |
| SEQ ID NO: 302 | 570_maj | 5' splice-site | CCAUCUCUCCAUC |
| SEQ ID NO: 303 | 571_maj | 5' splice-site | CCCAUCUCUCCAU |
| SEQ ID NO: 304 | 572_maj | 5' splice-site | ACCCAUCUCUCCA |
| SEQ ID NO: 305 | 573_maj | 5' splice-site | CACCCAUCUCUCC |
| SEQ ID NO: 306 | 574_maj | 5' splice-site | UCACCCAUCUCUC |
| SEQ ID NO: 307 | 575_maj | 5' splice-site | CUCACCCAUCUCU |
| SEQ ID NO: 308 | 576_maj | 5' splice-site | ACUCACCCAUCUC |
| SEQ ID NO: 309 | 577_maj | 5' splice-site | UACUCACCCAUCU |
| SEQ ID NO: 310 | 578_maj | 5' splice-site | GUACUCACCCAUC |
| SEQ ID NO: 311 | 579_maj | 5' splice-site | UGUACUCACCCAU |
| SEQ ID NO: 312 | 580_maj | 5' splice-site | AUGUACUCACCCA |
| SEQ ID NO: 313 | 581_maj | 5' splice-site | CAUGUACUCACCC |
| SEQ ID NO: 314 | 582_maj | 5' splice-site | CCAUGUACUCACC |
| SEQ ID NO: 315 | 583_maj | 5' splice-site | UCCAUGUACUCAC |
| SEQ ID NO: 316 | 584_maj | 5' splice-site | AUCCAUGUACUCA |
| SEQ ID NO: 317 | 585_maj | 5' splice-site | CAUCCAUGUACUC |
| SEQ ID NO: 318 | 586_maj | 5' splice-site | CCAUCCAUGUACU |
| SEQ ID NO: 319 | 587_maj | 5' splice-site | UCCAUCCAUGUAC |
| SEQ ID NO: 320 | 588_maj | 5' splice-site | AUCCAUCCAUGUA |
| SEQ ID NO: 321 | 589_maj | 5' splice-site | UAUCCAUCCAUGU |
| SEQ ID NO: 322 | 590_maj | 5' splice-site | CUAUCCAUCCAUG |
| SEQ ID NO: 323 | 591_maj | 5' splice-site | UCUAUCCAUCCAU |
| SEQ ID NO: 324 | 592_maj | 5' splice-site | AUCUAUCCAUCCA |
| SEQ ID NO: 325 | 593_maj | 5' splice-site | CAUCUAUCCAUCC |

TABLE 2-continued

Splice sites

| SEQ ID NO | Name | Target/ crucial element | Portion of ASO sequence/ASO |
|---|---|---|---|
| SEQ ID NO: 326 | 594_maj | 5' splice-site | CCAUCUAUCCAUC |
| SEQ ID NO: 327 | 595_maj | 5' splice-site | UCCAUCUAUCCAU |
| SEQ ID NO: 328 | 596_maj | 5' splice-site | AUCCAUCUAUCCA |
| SEQ ID NO: 329 | 597_maj | 5' splice-site | CAUCCAUCUAUCC |
| SEQ ID NO: 330 | 598_maj | 5' splice-site | UCAUCCAUCUAUC |
| SEQ ID NO: 331 | 599_maj | 5' splice-site | CUCAUCCAUCUAU |
| SEQ ID NO: 332 | 600_maj | 5' splice-site | ACUCAUCCAUCUA |
| SEQ ID NO: 333 | 601_maj | 5' splice-site | AACUCAUCCAUCU |
| SEQ ID NO: 334 | 602_maj | 5' splice-site | CAACUCAUCCAUC |
| SEQ ID NO: 335 | 603_maj | 5' splice-site | CCAACUCAUCCAU |
| SEQ ID NO: 336 | 604_maj | 5' splice-site | ACCAACUCAUCCA |
| SEQ ID NO: 337 | 605_maj | 5' splice-site | CACCAACUCAUCC |
| SEQ ID NO: 338 | 606_maj | 5' splice-site | CCACCAACUCAUC |
| SEQ ID NO: 339 | 607_maj | 5' splice-site | CCCACCAACUCAU |
| SEQ ID NO: 340 | 608_maj | 5' splice-site | ACCCACCAACUCA |
| SEQ ID NO: 341 | 609_maj | 5' splice-site | UACCCACCAACUC |
| SEQ ID NO: 342 | 610_maj | 5' splice-site | CUACCCACCAACU |
| SEQ ID NO: 343 | 611_maj | 5' splice-site | UCUACCCACCAAC |
| SEQ ID NO: 344 | 612_maj | 5' splice-site | AUCUACCCACCAA |
| SEQ ID NO: 345 | 613_maj | 5' splice-site | AAUCUACCCACCA |
| SEQ ID NO: 346 | 614_maj | 5' splice-site | GAAUCUACCCACC |
| SEQ ID NO: 347 | 615_maj | 5' splice-site | CGAAUCUACCCAC |
| SEQ ID NO: 348 | 616_maj | 5' splice-site | ACGAAUCUACCCA |
| SEQ ID NO: 349 | 617_maj | 5' splice-site | CACGAAUCUACCC |
| SEQ ID NO: 350 | 618_maj | 5' splice-site | CCACGAAUCUACC |
| SEQ ID NO: 351 | 619_maj | 5' splice-site | GCCACGAAUCUAC |
| SEQ ID NO: 352 | 620_maj | 5' splice-site | AGCCACGAAUCUA |

TABLE 3

Splice Regulatory Elements (SREs)

| SEQ ID NO | Name | Target/ crucial element | Portion of ASO sequence/ASO |
|---|---|---|---|
| SEQ ID NO: 190 | 471_maj | cryptic | UAAGAGUUCUUUC |
| SEQ ID NO: 191 | 472_maj | cryptic | AUAAGAGUUCUUU |
| SEQ ID NO: 192 | 473_maj | cryptic | GAUAAGAGUUCUU |
| SEQ ID NO: 193 | 474_maj | cryptic | GGAUAAGAGUUCU |
| SEQ ID NO: 194 | 475_maj | cryptic | GGGAUAAGAGUUC |
| SEQ ID NO: 195 | 476_maj | cryptic | GGGGAUAAGAGUU |

TABLE 3-continued

Splice Regulatory Elements (SREs)

| SEQ ID NO | Name | Target/ crucial element | Portion of ASO sequence/ASO |
|---|---|---|---|
| SEQ ID NO: 196 | 477_maj | cryptic | UGGGGAUAAGAGU |
| SEQ ID NO: 197 | 478_maj | cryptic | CUGGGGAUAAGAG |
| SEQ ID NO: 198 | 479_maj | cryptic | CCUGGGGAUAAGA |
| SEQ ID NO: 199 | 480_maj | cryptic | UCCUGGGGAUAAG |
| SEQ ID NO: 200 | 481_maj | cryptic | UUCCUGGGGAUAA |
| SEQ ID NO: 201 | 482_maj | cryptic | GUUCCUGGGGAUA |
| SEQ ID NO: 202 | 483_maj | cryptic | AGUUCCUGGGGAU |
| SEQ ID NO: 203 | 484_maj | cryptic | UAGUUCCUGGGGA |
| SEQ ID NO: 204 | 485_maj | cryptic | CUAGUUCCUGGGG |
| SEQ ID NO: 205 | 486_maj | cryptic | ACUAGUUCCUGGG |
| SEQ ID NO: 206 | 487_maj | cryptic | AACUAGUUCCUGG |
| SEQ ID NO: 207 | 488_maj | cryptic | AAACUAGUUCCUG |
| SEQ ID NO: 208 | 489_maj | cryptic | CAAACUAGUUCCU |
| SEQ ID NO: 209 | 490_maj | cryptic | ACAAACUAGUUCC |
| SEQ ID NO: 210 | 491_maj | cryptic | AACAAACUAGUUC |
| SEQ ID NO: 211 | 492_maj | cryptic | CAACAAACUAGUU |
| SEQ ID NO: 212 | 493_maj | cryptic | UCAACAAACUAGU |
| SEQ ID NO: 213 | 494_maj | cryptic | UUCAACAAACUAG |
| SEQ ID NO: 214 | 495_maj | cryptic | AUUCAACAAACUA |
| SEQ ID NO: 215 | 496_maj | cryptic | UAUUCAACAAACU |
| SEQ ID NO: 216 | 497_maj | cryptic | UUAUUCAACAAAC |
| SEQ ID NO: 217 | 498_maj | cryptic | UUUAUUCAACAAA |
| SEQ ID NO: 218 | 499_maj | cryptic | AUUUAUUCAACAA |
| SEQ ID NO: 219 | 500_maj | cryptic | CAUUUAUUCAACA |
| SEQ ID NO: 220 | 501_maj | cryptic | GCAUUUAUUCAAC |
| SEQ ID NO: 221 | 502_maj | cryptic | AGCAUUUAUUCAA |
| SEQ ID NO: 222 | 503_maj | cryptic | CAGCAUUUAUUCA |
| SEQ ID NO: 223 | 504_maj | cryptic | CCAGCAUUUAUUC |
| SEQ ID NO: 224 | 505_maj | cryptic | ACCAGCAUUUAUU |
| SEQ ID NO: 225 | 506_maj | cryptic | CACCAGCAUUUAU |
| SEQ ID NO: 226 | 507_maj | cryptic | UCACCAGCAUUUA |
| SEQ ID NO: 227 | 508_maj | cryptic | UUCACCAGCAUUU |
| SEQ ID NO: 228 | 509_maj | cryptic | AUUCACCAGCAUU |
| SEQ ID NO: 229 | 510_maj | cryptic | CAUUCACCAGCAU |
| SEQ ID NO: 230 | 511_maj | cryptic | UCAUUCACCAGCA |
| SEQ ID NO: 231 | 512_maj | cryptic | UUCAUUCACCAGC |
| SEQ ID NO: 232 | 513_maj | cryptic | AUUCAUUCACCAG |

TABLE 3-continued

Splice Regulatory Elements (SREs)

| SEQ ID NO | Name | Target/ crucial element | Portion of ASO sequence/ASO |
|---|---|---|---|
| SEQ ID NO: 233 | 514_maj | cryptic | CAUUCAUUCACCA |
| SEQ ID NO: 234 | 515_maj | cryptic | UCAUUCAUUCACC |
| SEQ ID NO: 235 | 516_maj | cryptic | UUCAUUCAUUCAC |
| SEQ ID NO: 236 | 517_maj | cryptic | AUUCAUUCAUUCA |
| SEQ ID NO: 237 | 518_maj | cryptic | CAUUCAUUCAUUC |
| SEQ ID NO: 238 | 519_maj | cryptic | UCAUUCAUUCAUU |
| SEQ ID NO: 239 | 520_maj | cryptic | AUCAUUCAUUCAU |
| SEQ ID NO: 240 | 521_maj | cryptic | AAUCAUUCAUUCA |
| SEQ ID NO: 241 | 522_maj | cryptic | CAAUCAUUCAUUC |
| SEQ ID NO: 242 | 523_maj | cryptic | UCAAUCAUUCAUU |
| SEQ ID NO: 243 | 524_maj | cryptic | UUCAAUCAUUCAU |
| SEQ ID NO: 244 | 525_maj | cryptic | GUUCAAUCAUUCA |
| SEQ ID NO: 245 | 526_maj | cryptic | UGUUCAAUCAUUC |
| SEQ ID NO: 246 | 527_maj | cryptic | CUGUUCAAUCAUU |
| SEQ ID NO: 247 | 528_maj | cryptic | UCUGUUCAAUCAU |
| SEQ ID NO: 248 | 529_maj | cryptic | AUCUGUUCAAUCA |
| SEQ ID NO: 249 | 530_maj | cryptic | CAUCUGUUCAAUC |
| SEQ ID NO: 250 | 531_maj | cryptic | UCAUCUGUUCAAU |
| SEQ ID NO: 251 | 532_maj | cryptic | UUCAUCUGUUCAA |
| SEQ ID NO: 252 | 533_maj | cryptic | AUUCAUCUGUUCA |
| SEQ ID NO: 253 | 534_maj | cryptic | CAUUCAUCUGUUC |
| SEQ ID NO: 254 | 535_maj | cryptic | UCAUUCAUCUGUU |
| SEQ ID NO: 255 | 536_maj | cryptic | CUCAUUCAUCUGU |
| SEQ ID NO: 256 | 537_maj | cryptic | ACUCAUUCAUCUG |
| SEQ ID NO: 257 | 538_maj | cryptic | CACUCAUUCAUCU |
| SEQ ID NO: 258 | 539_maj | cryptic | UCACUCAUUCAUC |
| SEQ ID NO: 259 | 540_maj | cryptic | AUCACUCAUUCAU |
| SEQ ID NO: 260 | 541_maj | cryptic | CAUCACUCAUUCA |
| SEQ ID NO: 261 | 542_maj | cryptic | UCAUCACUCAUUC |
| SEQ ID NO: 262 | 543_maj | cryptic | CUCAUCACUCAUU |
| SEQ ID NO: 263 | 544_maj | cryptic | ACUCAUCACUCAU |
| SEQ ID NO: 264 | 545_maj | cryptic | UACUCAUCACUCA |
| SEQ ID NO: 265 | 546_maj | cryptic | CUACUCAUCACUC |
| SEQ ID NO: 266 | 547_maj | cryptic | UCUACUCAUCACU |
| SEQ ID NO: 267 | 548_maj | cryptic | AUCUACUCAUCAC |
| SEQ ID NO: 268 | 549_maj | cryptic | UAUCUACUCAUCA |
| SEQ ID NO: 269 | 550_maj | cryptic | UUAUCUACUCAUC |
| SEQ ID NO: 353 | 1080_maj | intron SNP | CAGCCACUCACAA |

TABLE 3-continued

Splice Regulatory Elements (SREs)

| SEQ ID NO | Name | Target/crucial element | Portion of ASO sequence/ASO |
|---|---|---|---|
| SEQ ID NO: 354 | 1081_maj | intron SNP | CCAGCCACUCACA |
| SEQ ID NO: 355 | 1082_maj | intron SNP | ACCAGCCACUCAC |
| SEQ ID NO: 356 | 1083_maj | intron SNP | CACCAGCCACUCA |
| SEQ ID NO: 357 | 1084_maj | intron SNP | CCACCAGCCACUC |
| SEQ ID NO: 358 | 1085_maj | intron SNP | UCCACCAGCCACU |
| SEQ ID NO: 359 | 1086_maj | intron SNP | GUCCACCAGCCAC |
| SEQ ID NO: 360 | 1087_maj | intron SNP | UGUCCACCAGCCA |
| SEQ ID NO: 361 | 1088_maj | intron SNP | CUGUCCACCAGCC |
| SEQ ID NO: 362 | 1089_maj | intron SNP | UCUGUCCACCAGC |
| SEQ ID NO: 363 | 1090_maj | intron SNP | GUCUGUCCACCAG |
| SEQ ID NO: 364 | 1091_maj | intron SNP | CGUCUGUCCACCA |
| SEQ ID NO: 365 | 1092_maj | intron SNP | UCGUCUGUCCACC |
| SEQ ID NO: 366 | 1093_maj | intron SNP | UUCGUCUGUCCAC |
| SEQ ID NO: 367 | 1094_maj | intron SNP | UUUCGUCUGUCCA |
| SEQ ID NO: 368 | 1095_maj | intron SNP | UUUUCGUCUGUCC |
| SEQ ID NO: 369 | 1096_maj | intron SNP | UUUUUCGUCUGUC |
| SEQ ID NO: 370 | 1097_maj | intron SNP | AUUUUUCGUCUGU |
| SEQ ID NO: 371 | 1098_maj | intron SNP | CAUUUUUCGUCUG |
| SEQ ID NO: 372 | 1099_maj | intron SNP | CCAUUUUUCGUCU |
| SEQ ID NO: 373 | 1100_maj | intron SNP | UCCAUUUUUCGUC |
| SEQ ID NO: 374 | 1101_maj | intron SNP | AUCCAUUUUUCGU |
| SEQ ID NO: 375 | 1102_maj | intron SNP | CAUCCAUUUUUCG |
| SEQ ID NO: 376 | 1103_maj | intron SNP | CCAUCCAUUUUUC |
| SEQ ID NO: 377 | 1104_maj | intron SNP | ACCAUCCAUUUUU |
| SEQ ID NO: 378 | 1104_min | intron SNP | CCCAUCCAUUUUU |
| SEQ ID NO: 379 | 1105_maj | intron SNP | AACCAUCCAUUUU |
| SEQ ID NO: 380 | 1105_min | intron SNP | ACCCAUCCAUUUU |
| SEQ ID NO: 381 | 1106_maj | intron SNP | CAACCAUCCAUUU |
| SEQ ID NO: 382 | 1106_min | intron SNP | CACCCAUCCAUUU |
| SEQ ID NO: 383 | 1107_maj | intron SNP | CCAACCAUCCAUU |
| SEQ ID NO: 384 | 1107_min | intron SNP | CCACCCAUCCAUU |
| SEQ ID NO: 385 | 1108_maj | intron SNP | UCCAACCAUCCAU |
| SEQ ID NO: 386 | 1108_min | intron SNP | UCCACCCAUCCAU |
| SEQ ID NO: 387 | 1109_maj | intron SNP | AUCCAACCAUCCA |
| SEQ ID NO: 388 | 1109_min | intron SNP | AUCCACCCAUCCA |
| SEQ ID NO: 389 | 1110_maj | intron SNP | UAUCCAACCAUCC |
| SEQ ID NO: 390 | 1110_min | intron SNP | UAUCCACCCAUCC |

TABLE 3-continued

Splice Regulatory Elements (SREs)

| SEQ ID NO | Name | Target/ crucial element | Portion of ASO sequence/ASO |
|---|---|---|---|
| SEQ ID NO: 391 | 1111_maj | intron SNP | UUAUCCAACCAUC |
| SEQ ID NO: 392 | 1111_min | intron SNP | UUAUCCACCCAUC |
| SEQ ID NO: 393 | 1112_maj | intron SNP | UUUAUCCAACCAU |
| SEQ ID NO: 394 | 1112_min | intron SNP | UUUAUCCACCCAU |
| SEQ ID NO: 395 | 1113_maj | intron SNP | AUUUAUCCAACCA |
| SEQ ID NO: 396 | 1113_min | intron SNP | AUUUAUCCACCCA |
| SEQ ID NO: 397 | 1114_maj | intron SNP | AAUUUAUCCAACC |
| SEQ ID NO: 398 | 1114_min | intron SNP | AAUUUAUCCACCC |
| SEQ ID NO: 399 | 1115_maj | intron SNP | CAAUUUAUCCAAC |
| SEQ ID NO: 400 | 1115_min | intron SNP | CAAUUUAUCCACC |
| SEQ ID NO: 401 | 1116_maj | intron SNP | UCAAUUUAUCCAA |
| SEQ ID NO: 402 | 1116_min | intron SNP | UCAAUUUAUCCAC |
| SEQ ID NO: 403 | 1117_maj | intron SNP | AUCAAUUUAUCCA |
| SEQ ID NO: 404 | 1118_maj | intron SNP | CAUCAAUUUAUCC |
| SEQ ID NO: 405 | 1119_maj | intron SNP | CCAUCAAUUUAUC |
| SEQ ID NO: 406 | 1120_maj | intron SNP | CCCAUCAAUUUAU |
| SEQ ID NO: 407 | 1121_maj | intron SNP | ACCCAUCAAUUUA |
| SEQ ID NO: 408 | 1122_maj | intron SNP | CACCCAUCAAUUU |
| SEQ ID NO: 409 | 1123_maj | intron SNP | CCACCCAUCAAUU |
| SEQ ID NO: 410 | 1124_maj | intron SNP | UCCACCCAUCAAU |
| SEQ ID NO: 411 | 1125_maj | intron SNP | AUCCACCCAUCAA |
| SEQ ID NO: 412 | 1126_maj | intron SNP | CAUCCACCCAUCA |
| SEQ ID NO: 413 | 1127_maj | intron SNP | CCAUCCACCCAUC |
| SEQ ID NO: 414 | 1128_maj | intron SNP | UCCAUCCACCCAU |
| SEQ ID NO: 415 | 1129_maj | intron SNP | AUCCAUCCACCCA |
| SEQ ID NO: 416 | 1130_maj | intron SNP | CAUCCAUCCACCC |
| SEQ ID NO: 417 | 1131_maj | intron SNP | CCAUCCAUCCACC |
| SEQ ID NO: 418 | 1132_maj | intron SNP | ACCAUCCAUCCAC |
| SEQ ID NO: 419 | 1133_maj | intron SNP | AACCAUCCAUCCA |
| SEQ ID NO: 420 | 1134_maj | intron SNP | CAACCAUCCAUCC |
| SEQ ID NO: 421 | 1135_maj | intron SNP | CCAACCAUCCAUC |
| SEQ ID NO: 422 | 1136_maj | intron SNP | ACCAACCAUCCAU |
| SEQ ID NO: 423 | 1137_maj | intron SNP | AACCAACCAUCCA |
| SEQ ID NO: 424 | 1138_maj | intron SNP | CAACCAACCAUCC |
| SEQ ID NO: 425 | 1139_maj | intron SNP | ACAACCAACCAUC |
| SEQ ID NO: 426 | 1140_maj | intron SNP | UACAACCAACCAU |
| SEQ ID NO: 427 | 1180_maj | downstream TDP-43 binding site | UCCGCAACUUAAU |

TABLE 3-continued

Splice Regulatory Elements (SREs)

| SEQ ID NO | Name | Target/ crucial element | Portion of ASO sequence/ASO |
|---|---|---|---|
| SEQ ID NO: 428 | 1181_maj | downstream TDP-43 binding site | AUCCGCAACUUAA |
| SEQ ID NO: 429 | 1182_maj | downstream TDP-43 binding site | GAUCCGCAACUUA |
| SEQ ID NO: 430 | 1183_maj | downstream TDP-43 binding site | UGAUCCGCAACUU |
| SEQ ID NO: 431 | 1184_maj | downstream TDP-43 binding site | UUGAUCCGCAACU |
| SEQ ID NO: 432 | 1185_maj | downstream TDP-43 binding site | AUUGAUCCGCAAC |
| SEQ ID NO: 433 | 1186_maj | downstream TDP-43 binding site | CAUUGAUCCGCAA |
| SEQ ID NO: 434 | 1187_maj | downstream TDP-43 binding site | ACAUUGAUCCGCA |
| SEQ ID NO: 435 | 1188_maj | downstream TDP-43 binding site | UACAUUGAUCCGC |
| SEQ ID NO: 436 | 1189_maj | downstream TDP-43 binding site | AUACAUUGAUCCG |
| SEQ ID NO: 437 | 1190_maj | downstream TDP-43 binding site | CAUACAUUGAUCC |
| SEQ ID NO: 438 | 1191_maj | downstream TDP-43 binding site | CCAUACAUUGAUC |
| SEQ ID NO: 439 | 1192_maj | downstream TDP-43 binding site | CCCAUACAUUGAU |
| SEQ ID NO: 440 | 1193_maj | downstream TDP-43 binding site | UCCCAUACAUUGA |
| SEQ ID NO: 441 | 1194_maj | downstream TDP-43 binding site | AUCCCAUACAUUG |
| SEQ ID NO: 442 | 1195_maj | downstream TDP-43 binding site | CAUCCCAUACAUU |
| SEQ ID NO: 443 | 1196_maj | downstream TDP-43 binding site | CCAUCCCAUACAU |
| SEQ ID NO: 444 | 1197_maj | downstream TDP-43 binding site | UCCAUCCCAUACA |
| SEQ ID NO: 445 | 1198_maj | downstream TDP-43 binding site | AUCCAUCCCAUAC |
| SEQ ID NO: 446 | 1199_maj | downstream TDP-43 binding site | CAUCCAUCCCAUA |
| SEQ ID NO: 447 | 1200_maj | downstream TDP-43 binding site | UCAUCCAUCCCAU |
| SEQ ID NO: 448 | 1201_maj | downstream TDP-43 binding site | UUCAUCCAUCCCA |
| SEQ ID NO: 449 | 1202_maj | downstream TDP-43 binding site | AUUCAUCCAUCCC |
| SEQ ID NO: 450 | 1203_maj | downstream TDP-43 binding site | CAUUCAUCCAUCC |
| SEQ ID NO: 451 | 1204_maj | downstream TDP-43 binding site | CCAUUCAUCCAUC |
| SEQ ID NO: 452 | 1205_maj | downstream TDP-43 binding site | UCCAUUCAUCCAU |

TABLE 3-continued

Splice Regulatory Elements (SREs)

| SEQ ID NO | Name | Target/ crucial element | Portion of ASO sequence/ASO |
|---|---|---|---|
| SEQ ID NO: 453 | 1206_maj | downstream TDP-43 binding site | AUCCAUUCAUCCA |
| SEQ ID NO: 454 | 1207_maj | downstream TDP-43 binding site | CAUCCAUUCAUCC |
| SEQ ID NO: 455 | 1208_maj | downstream TDP-43 binding site | CCAUCCAUUCAUC |
| SEQ ID NO: 456 | 1209_maj | downstream TDP-43 binding site | UCCAUCCAUUCAU |
| SEQ ID NO: 457 | 1210_maj | downstream TDP-43 binding site | AUCCAUCCAUUCA |
| SEQ ID NO: 458 | 1211_maj | downstream TDP-43 binding site | CAUCCAUCCAUUC |
| SEQ ID NO: 459 | 1212_maj | downstream TDP-43 binding site | CCAUCCAUCCAUU |
| SEQ ID NO: 460 | 1213_maj | downstream TDP-43 binding site | UCCAUCCAUCCAU |
| SEQ ID NO: 461 | 1214_maj | downstream TDP-43 binding site | AUCCAUCCAUCCA |
| SEQ ID NO: 462 | 1215_maj | downstream TDP-43 binding site | CAUCCAUCCAUCC |
| SEQ ID NO: 463 | 1216_maj | downstream TDP-43 binding site | CCAUCCAUCCAUC |
| SEQ ID NO: 464 | 1220_maj | downstream TDP-43 binding site | ACAUCCAUCCAUC |
| SEQ ID NO: 465 | 1221_maj | downstream TDP-43 binding site | CACAUCCAUCCAU |
| SEQ ID NO: 466 | 1222_maj | downstream TDP-43 binding site | ACACAUCCAUCCA |
| SEQ ID NO: 467 | 1223_maj | downstream TDP-43 binding site | CACACAUCCAUCC |
| SEQ ID NO: 468 | 1224_maj | downstream TDP-43 binding site | CCACACAUCCAUC |
| SEQ ID NO: 469 | 1225_maj | downstream TDP-43 binding site | ACCACACAUCCAU |
| SEQ ID NO: 470 | 1226_maj | downstream TDP-43 binding site | AACCACACAUCCA |
| SEQ ID NO: 471 | 1227_maj | downstream TDP-43 binding site | CAACCACACAUCC |
| SEQ ID NO: 472 | 1228_maj | downstream TDP-43 binding site | UCAACCACACAUC |
| SEQ ID NO: 473 | 1229_maj | downstream TDP-43 binding site | UUCAACCACACAU |
| SEQ ID NO: 474 | 1230_maj | downstream TDP-43 binding site | AUUCAACCACACA |
| SEQ ID NO: 475 | 785_maj | enhancer | UCUAUCCAGCAAU |
| SEQ ID NO: 476 | 786_maj | enhancer | AUCUAUCCAGCAA |
| SEQ ID NO: 477 | 787_maj | enhancer | CAUCUAUCCAGCA |
| SEQ ID NO: 478 | 788_maj | enhancer | UCAUCUAUCCAGC |
| SEQ ID NO: 479 | 789_maj | enhancer | AUCAUCUAUCCAG |

TABLE 3-continued

Splice Regulatory Elements (SREs)

| SEQ ID NO | Name | Target/crucial element | Portion of ASO sequence/ASO |
|---|---|---|---|
| SEQ ID NO: 480 | 790_maj | enhancer | AAUCAUCUAUCCA |
| SEQ ID NO: 481 | 791_maj | enhancer | CAAUCAUCUAUCC |
| SEQ ID NO: 482 | 792_maj | enhancer | UCAAUCAUCUAUC |
| SEQ ID NO: 483 | 793_maj | enhancer | GUCAAUCAUCUAU |
| SEQ ID NO: 484 | 794_maj | enhancer | AGUCAAUCAUCUA |
| SEQ ID NO: 485 | 795_maj | enhancer | CAGUCAAUCAUCU |
| SEQ ID NO: 486 | 796_maj | enhancer | CCAGUCAAUCAUC |
| SEQ ID NO: 487 | 797_maj | enhancer | CCCAGUCAAUCAU |
| SEQ ID NO: 488 | 798_maj | enhancer | ACCCAGUCAAUCA |
| SEQ ID NO: 489 | 799_maj | enhancer | CACCCAGUCAAUC |
| SEQ ID NO: 490 | 800_maj | enhancer | CCACCCAGUCAAU |
| SEQ ID NO: 491 | 801_maj | enhancer | UCCACCCAGUCAA |
| SEQ ID NO: 492 | 802_maj | enhancer | AUCCACCCAGUCA |
| SEQ ID NO: 493 | 803_maj | enhancer | UAUCCACCCAGUC |
| SEQ ID NO: 494 | 804_maj | enhancer | CUAUCCACCCAGU |
| SEQ ID NO: 495 | 805_maj | enhancer | UCUAUCCACCCAG |
| SEQ ID NO: 496 | 806_maj | enhancer | AUCUAUCCACCCA |
| SEQ ID NO: 497 | 807_maj | enhancer | CAUCUAUCCACCC |
| SEQ ID NO: 498 | 808_maj | enhancer | UCAUCUAUCCACC |
| SEQ ID NO: 499 | 809_maj | enhancer | UUCAUCUAUCCAC |
| SEQ ID NO: 500 | 810_maj | enhancer | UUUCAUCUAUCCA |
| SEQ ID NO: 501 | 811_maj | enhancer | AUUUCAUCUAUCC |
| SEQ ID NO: 502 | 812_maj | enhancer | CAUUUCAUCUAUC |
| SEQ ID NO: 503 | 813_maj | enhancer | ACAUUUCAUCUAU |
| SEQ ID NO: 504 | 814_maj | enhancer | AACAUUUCAUCUA |
| SEQ ID NO: 505 | 815_maj | enhancer | CAACAUUUCAUCU |
| SEQ ID NO: 506 | 1360_maj | enhancer | UCUGGGGCAGCUU |
| SEQ ID NO: 507 | 1361_maj | enhancer | GUCUGGGGCAGCU |
| SEQ ID NO: 508 | 1362_maj | enhancer | GGUCUGGGGCAGC |
| SEQ ID NO: 509 | 1363_maj | enhancer | GGGUCUGGGGCAG |
| SEQ ID NO: 510 | 1364_maj | enhancer | AGGGUCUGGGGCA |
| SEQ ID NO: 511 | 1365_maj | enhancer | CAGGGUCUGGGGC |
| SEQ ID NO: 512 | 1366_maj | enhancer | CCAGGGUCUGGGG |
| SEQ ID NO: 513 | 1367_maj | enhancer | CCCAGGGUCUGGG |
| SEQ ID NO: 514 | 1368_maj | enhancer | UCCCAGGGUCUGG |
| SEQ ID NO: 515 | 1369_maj | enhancer | GUCCCAGGGUCUG |
| SEQ ID NO: 516 | 1370_maj | enhancer | GGUCCCAGGGUCU |

TABLE 3-continued

Splice Regulatory Elements (SREs)

| SEQ ID NO | Name | Target/ crucial element | Portion of ASO sequence/ASO |
|---|---|---|---|
| SEQ ID NO: 517 | 1371_maj | enhancer | AGGUCCCAGGGUC |
| SEQ ID NO: 518 | 1372_maj | enhancer | GAGGUCCCAGGGU |
| SEQ ID NO: 519 | 1373_maj | enhancer | AGAGGUCCCAGGG |
| SEQ ID NO: 520 | 1374_maj | enhancer | CAGAGGUCCCAGG |
| SEQ ID NO: 521 | 1375_maj | enhancer | UCAGAGGUCCCAG |
| SEQ ID NO: 522 | 1376_maj | enhancer | GUCAGAGGUCCCA |
| SEQ ID NO: 523 | 1377_maj | enhancer | GGUCAGAGGUCCC |
| SEQ ID NO: 524 | 1378_maj | enhancer | GGGUCAGAGGUCC |
| SEQ ID NO: 525 | 1379_maj | enhancer | GGGGUCAGAGGUC |
| SEQ ID NO: 526 | 1380_maj | enhancer | GGGGGUCAGAGGU |
| SEQ ID NO: 527 | 1381_maj | enhancer | CGGGGGUCAGAGG |
| SEQ ID NO: 528 | 1382_maj | enhancer | CCGGGGGUCAGAG |
| SEQ ID NO: 529 | 1383_maj | enhancer | GCCGGGGGUCAGA |
| SEQ ID NO: 530 | 1384_maj | enhancer | CGCCGGGGGUCAG |
| SEQ ID NO: 531 | 1385_maj | enhancer | UCGCCGGGGGUCA |
| SEQ ID NO: 532 | 1386_maj | enhancer | GUCGCCGGGGGUC |
| SEQ ID NO: 533 | 1387_maj | enhancer | GGUCGCCGGGGGU |
| SEQ ID NO: 534 | 1388_maj | enhancer | GGGUCGCCGGGGG |
| SEQ ID NO: 535 | 1389_maj | enhancer | GGGGUCGCCGGGG |
| SEQ ID NO: 536 | 1390_maj | enhancer | AGGGGUCGCCGGG |
| SEQ ID NO: 537 | 1391_maj | enhancer | AAGGGGUCGCCGG |
| SEQ ID NO: 538 | 1392_maj | enhancer | CAAGGGGUCGCCG |
| SEQ ID NO: 539 | 1393_maj | enhancer | GCAAGGGGUCGCC |
| SEQ ID NO: 540 | 1394_maj | enhancer | UGCAAGGGGUCGC |
| SEQ ID NO: 541 | 1395_maj | enhancer | GUGCAAGGGGUCG |
| SEQ ID NO: 542 | 1396_maj | enhancer | AGUGCAAGGGGUC |
| SEQ ID NO: 543 | 1397_maj | enhancer | GAGUGCAAGGGGU |
| SEQ ID NO: 544 | 1398_maj | enhancer | AGAGUGCAAGGGG |
| SEQ ID NO: 545 | 1399_maj | enhancer | GAGAGUGCAAGGG |
| SEQ ID NO: 546 | 1400_maj | enhancer | GGAGAGUGCAAGG |

TABLE 4

Target sites for UNC13A ASOs

| SEQ ID | Sequence | Target site |
|---|---|---|
| SEQ ID NO: 547 | AUGAGUAGAUAAAAGGAUGGAUGGAGAGAUGGGUGAGUACAUGGAUGGAUAGAUGGAUGAGUUGGUGGGUAGAUUCGUGC | donor splice site |

TABLE 4-continued

Target sites for UNC13A ASOs

| SEQ ID | Sequence | Target site |
| --- | --- | --- |
| SEQ ID NO: 548 | AUGAGUAGAUAAAAGCAUGGAUGGA GAGUGGGUGAGUACAUGGAUGGAUA GAUGGAUGAGUUGGUGGGUAGAUUC GUGC | donor splice site |
| SEQ ID NO: 549 | GGAUGGAUGGAGAGAUGGGUGAGUA CAUGGAUGGAUAGAU | donor splice site |
| SEQ ID NO: 550 | GCAUGGAUGGAGAGAUGGGUGAGUA CAUGGAUGGAUAGAU | donor splice site |
| SEQ ID NO: 551 | AUGGAGAGAUGGGUGAGUACAUGGA UGGA | donor splice site |
| SEQ ID NO: 552 | GUUCUUCCUUCUAUUCCAGCCCUAAC CACUCAGGAUUGGGCCGUUUGUGUC UGGGUAUGUCUCUUCCAGCUGCCUG GGUUUCCUGGAAAGAACUCUU | acceptor splice site |
| SEQ ID NO: 553 | GUGUCUGGGUAUGUCUCUUCCAGCU GCCUGGGUUUCCUGGAAA | acceptor splice site |
| SEQ ID NO: 554 | UCAUCAGGUUCUUCCUUCUAUUCCA GCCCUAACCACUCAGGAUUGG | acceptor splice site |

In the ASOs disclosed herein "U" and "T" nucleosides, i.e., uracil or thymine, may be used interchangeably. Therefore "U" in an RNA in any of SEQ ID NOS: 4-546 may be replaced by "T" in the DNA form.

It has been demonstrated that TDP-43 pathology and its nuclear loss induces a reduction of UNC13A. This has been identified to happen through the inclusion of a toxic CE within UNC13A. Furthermore, it was found that common genetic variation in UNC13A can facilitate the occurrence of this CE and make the disease more rapid and aggressive.

ASOs can be used as therapeutics to prevent the inclusion of this novel UNC13A cryptic exon. These therapeutics can modulate UNC13A splicing and prevent inclusion of the toxic cryptic exon within UNC13A, thereby preventing decreased levels of UNC13A.

The present inventors have identified two splice acceptors (chr19:17,642,541 or chr19:17642591) and one splice donor site (chr19:17642414) for the UNC13A cryptic event. Targeting the splice sites makes them less available for splicing. ASOs (i.e., or portions thereof) that target splice sites correspond to SEQ ID NO: 105-189 and SEQ ID NO: 270-352.

The present inventors have also identified a branchpoint (chr19:17642800). Targeting the branchpoint makes splicing less efficient. ASOs (or portions thereof) that target these sites correspond to SEQ ID NO 4-104.

The present inventors also identified splicing regulatory elements (SREs) within the CE itself and the intronic sequences flanking it up- and down-stream. These were determined by in silico methods. TDP-43 binding sites were determined using publicly available TDP-43 iCLIP datasets (as described above). Enhancer sites were determined using ESEfinder 3.0, www.krainer01.cshl.edu/cgibin/tools/ESE3/esefinder.cgi?process=home. Targeting SREs limits the binding of RNA binding proteins, for example, those that modulate or enhance the inclusion of the CE.

ASOs (or portions thereof) that target sequences within the UNC13A cryptic exon correspond to SEQ ID NO: 190-269.

ASOs (or portions thereof) that target splice enhancers, as identified by ESEfinder, correspond to SEQ ID NO: 475-576.

ASOs (or portions thereof) that target downstream TDP-43 binding sites correspond to SEQ TD NO: 427-474.

ASOs (or portions thereof) that target a SNP in the intronic flanking region of the UNC13A CE correspond to SEQ TD NO: 353-426.

Example 7. Rescue in SK-N-DZ Cells

The following ASO sequences were tested for a rescue effect against the UNC13A cryptic exon where "*" is a phosphorothioate, "+" is an LNA and "m" is a 2'-O-methyl RNA.

TABLE 5

Sequences tested for rescue effect

| SEQ ID NO: | Name | Sequence | Target | Chemistry |
| --- | --- | --- | --- | --- |
| 555 | 21 nt_SNP & DonMix1 | +C*A*C*+C*C*A*+T*C*T*+C*T*C*+C*A*T*+C*C *A*+T*G*C | Donor and CE SNP | LNA |
| 556 | 21 nt_SNP & DonMix2 | +C*A*C*+C*C*A*+T*C*T*+C*T*C*+C*A*T*+C*C *A*+T*C*C | Donor and CE SNP | LNA |

TABLE 5-continued

Sequences tested for rescue effect

| SEQ ID NO: | Name | Sequence | Target | Chemistry |
|---|---|---|---|---|
| 557 | 21 nt_Don1 | +C*T*C*+A*C*C*+C*A*T*+C*T*C*+T*C*C*+A*T*C*+C*A*+T | Donor | LNA |
| 558 | 21 nt_Don2 | +T*G*T*+A*C*T*+C*A*C*+C*C*A*+T*C*T*+C*T*C*+C*A*+T | Donor | LNA |
| 559 | 21 nt_Don3 | +T*C*C*+A*T*G*+T*A*C*+T*C*A*+C*C*C*+A*T*C*+T*C*+T | Donor | LNA |
| 560 | 21 nt_Don4 | +T*C*C*+A*T*C*+C*A*T*+G*T*A*+C*T*C*+A*C*C*+C*A*+T | Donor | LNA |
| 561 | 21 nt_Don5 | +A*T*C*+T*A*T*+C*C*A*+T*C*C*+A*T*G*+T*A*C*+T*C*+A | Donor | LNA |
| 562 | 17 nt_Don1 | +T*C*A*+C*C*C*+A*T*C*+T*C*T*+C*C*A*+T*+C | Donor | LNA |
| 563 | 17 nt_Don2 | +T*C*+A*C*+C*C*+A*T*+C*T*+C*T*+C*C*+A*T*+C | Donor | LNA |
| 564 | 17 nt_Don3 | +G*T*A*+C*T*C*+A*C*C*+C*A*T*+C*T*C*+T*+C | Donor | LNA |
| 565 | 17 nt_Don4 | +G*T*+A*C*+T*C*+A*C*+C*C*+A*T*+C*T*+C*T*+C | Donor | LNA |
| 566 | 13 nt_Don1 | C*+A*C*+C*C*+A*T*+C*T*+C*T*+C*C | Donor | LNA |
| 567 | OMe_25 nt_Don | mC*mA*mU*mG*mU*mA*mC*mU*mC*mA*mC*mC*mC*mA*mU*mC*mU*mC*mU*mC*mC*mA*mU*mC*mC | Donor | 2-OMe RNA |
| 568 | OMe_30 nt_Don | mA*mU*mC*mC*mA*mU*mG*mU*mA*mC*mU*mC*mA*mC*mC*mC*mA*mU*mC*mU*mC*mU*mC*mC*mA*mU*mC*mC*mA*mU | Donor | 2-OMe RNA |
| 569 | 21 nt_Short Acc2 | +C*A*G*+G*C*A*+G*C*T*+G*G*A*+A*G*A*+G*A*C*+A*T*+A | Acceptor | LNA |
| 570 | 21 nt_Short Acc3 | +A*A*C*+C*C*A*+G*G*C*+A*G*C*+T*G*G*+A*A*G*+A*G*+A | Acceptor | LNA |
| 571 | 21 nt_Short Acc4 | +G*G*A*+A*A*C*+C*C*A*+G*G*C*+A*G*C*+T*G*G*+A*A*+G | Acceptor | LNA |
| 572 | Scrambled Control | A*+G*T*+T*T*+T*C*+A*A*+T*T*+C*C | Control | LNA |
| 579 | 21 nt_LongAcc1 | +T*A*G*+G*G*C*+T*G*G*+A*A*T*+A*G*A*+A*G*+A*A*+G | Acceptor | LNA |
| 580 | 21 nt_LongAcc2 | +T*G*A*+G*T*G*+G*T*T*+A*G*G*+G*C*T*+G*G*A*+A*T*+A | Acceptor | LNA |

To assess the ability of different ASOs to induce the correct splicing event in disease-state cells, we transfected ASOs into SK-N-DZ cells with doxycycline inducible TDP-43 knockdown and assessed endogenous UNC13A splicing via reverse transcription PCR (RT-PCR). These human, neuron-like cells have previously been demonstrated to replicate numerous aberrant splicing events found in ALS/FTD patients and are thus a suitable model for this study.

It was found that ASOs targeting regions near the cryptic donor splice site and, to a lesser extent, the two cryptic acceptor splice sites, were able to significantly increase the ratio of correctly spliced to incorrectly spliced UNC13A. Most effective were 21 nucleotide ASOs featuring a full phosphorothioate (PS) backbone and 3350 locked nucleic acid (LNA) modified constructs, targeting regions near the donor splice site. These ASOs were able to increase the ratio to ~90% correctly spliced, versus near-0% for doxycycline-treated cells without ASO transfection or cells treated with a scrambled control ASO (FIGS. 14A and 14B).

Figure 14A:
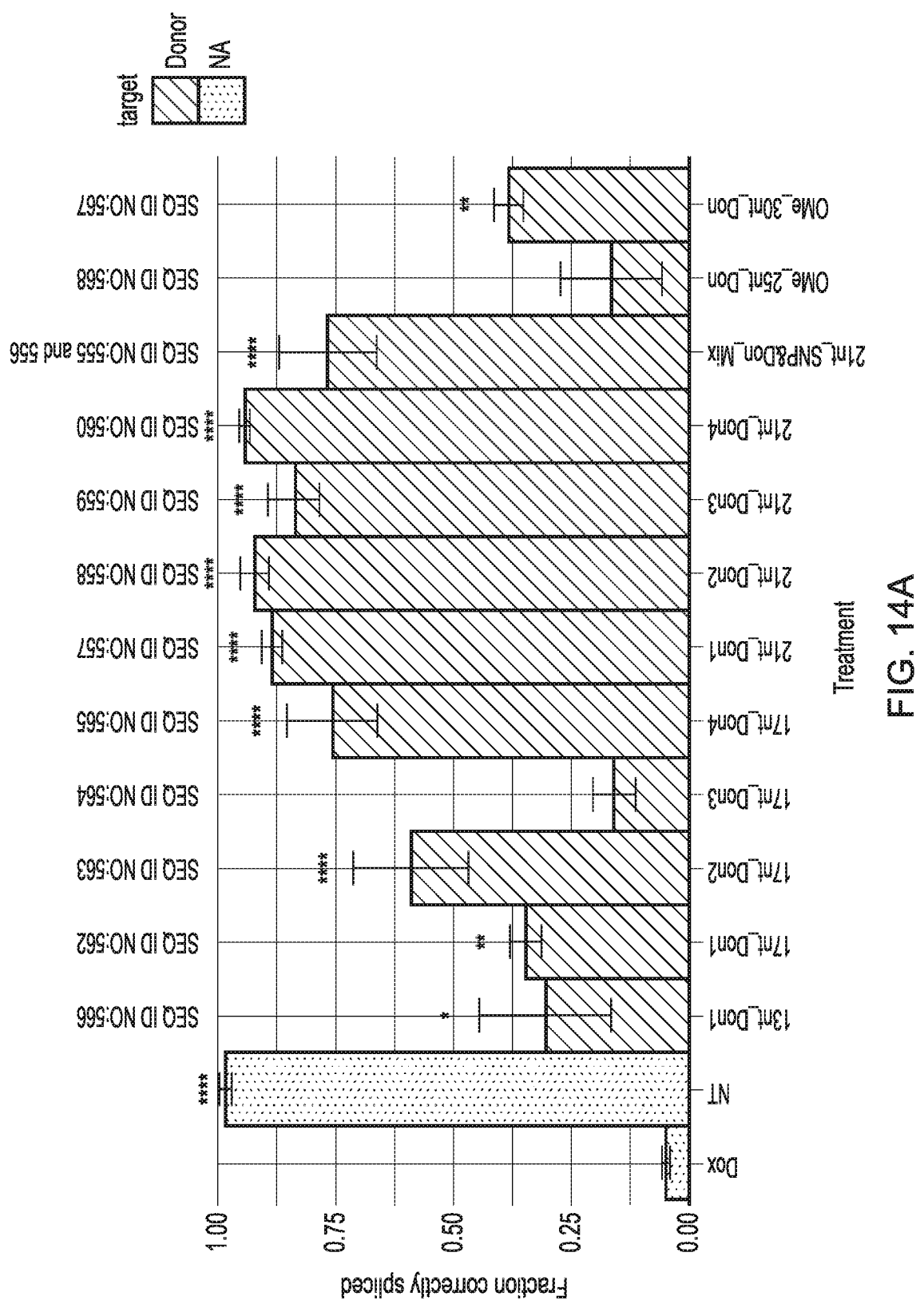
FIGS. 14A-14B shows the results of experiments in which a number of different ASOs were transfected into SK-N-DZ cells and the number or fraction which were correctly spliced when treated with the identified antisense polynucleotides. All cells were treated with doxycycline except for NT (Not treated). All ASOs featured LNA-modified bases, except for OMe_sequence(s). Error bars show standard deviation across three replicates. *=p-adjusted<0.05, =p-adjusted<0.01, *=p-adjusted<0.001, ****=p-adjusted<0.0001; Tukey Test; significance is calculated relative to Dox.
Figure 14B:
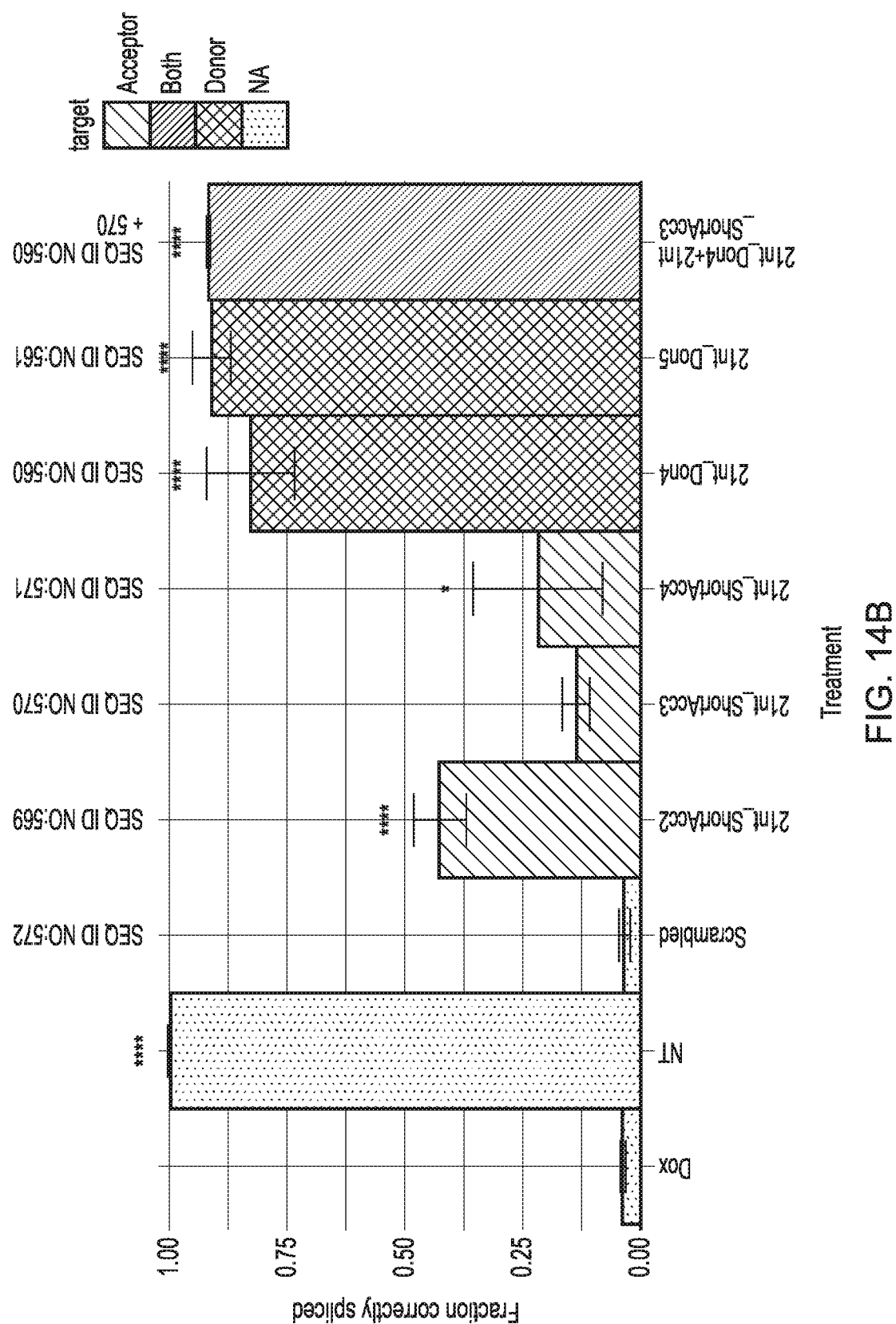

It was also found that ASOs targeting regions near the two cryptic acceptor splice sites (both long and short), ASOs of shorter length (minimum of 13 nucleotides), and ASOs of differing chemistries (100% 2'-O-methyl modified ASOs with full phosphorothioate backbones) were also able to significantly rescue this splicing event (see FIG. 14A and FIG. 14B). Thus, the design of ASOs that can rescue this splicing event is not limited to a single chemistry or binding site.

Of note, one ASO (21nt_Don_5; SEQ ID. NO. 561) was able to greatly increase the level of correct splicing despite not directly overlapping with a cryptic donor splice site, instead binding to an intronic flanking region of the donor splice site. This demonstrates that ASOs which interfere with the binding of splicing factors or regulators can inhibit the cryptic splicing event, without needing to directly mask the cryptic splice sites.

Figure 15:
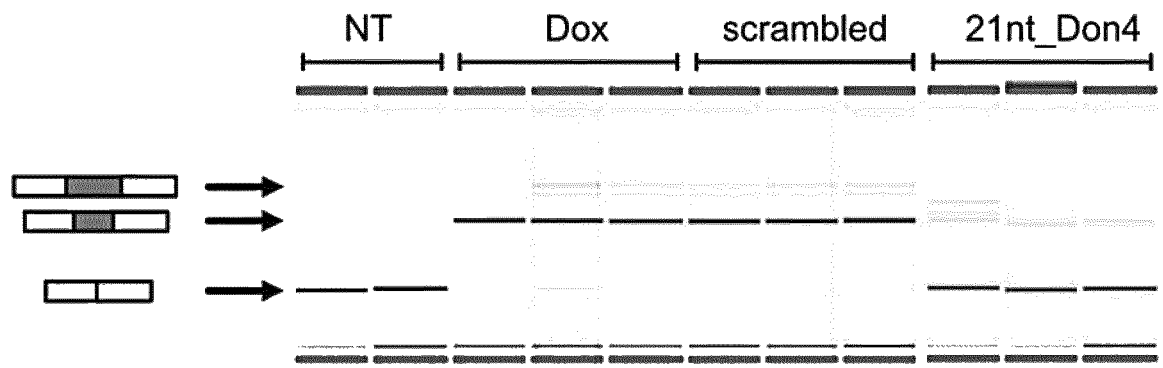
FIG. 15 shows an example of RT-PCR results showing splicing pattern with and without UNC13A cryptic exon. The bottom band is derived from the correctly spliced product. As expected, it is abundant in the NT (not treated sample) but rare in the Dox-treated sample. 21nt_Don4 (SEQ ID NO. 560) rescues the level of this correctly spliced band, but a scrambled control does not.

Additionally, we also found that mixtures of ASOs targeting different regions can result in efficient rescue of the correct splicing event (FIG. 14B). The fraction of correctly spliced mature RNA was determined and compared to the fraction in the Dox-treated control by RT-PCR. An example electrophoresis result is shown in FIG. 15.

Figure 16:
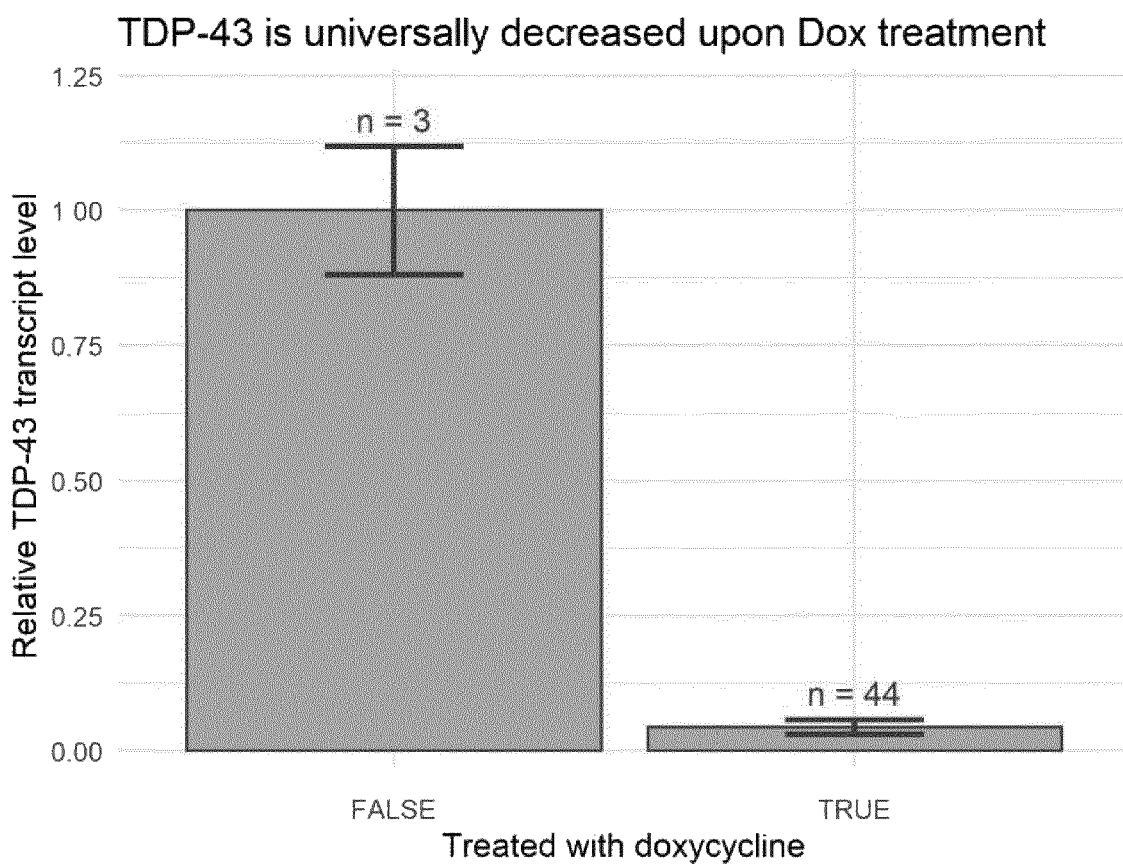
FIG. 16 shows qPCR validation of TDP-43 knockdown for the samples in FIG. 14A. Error bars show standard deviation. TDP-43 Ct values were normalized to GAPDH Ct values to account for variation in cDNA quantity. Values are normalized to 1 for the mean TDP-43 abundance in untreated cells.

To also ensure that the detected rescues were not simply due to inefficient TDP-43 knockdown, we assessed remaining TDP-43 transcript levels after doxycycline treatment via quantitative PCR for all samples (qPCR). We found that TDP-43 levels were universally decreased in all samples treated with doxycycline (including those transfected with ASOs), with very little variance between samples (FIG. 16). Therefore, changes in the correct:incorrect splicing ratio reflect genuine rescue of the correct splicing event, rather than inefficient TDP-43 knockdown.

Figure 17:
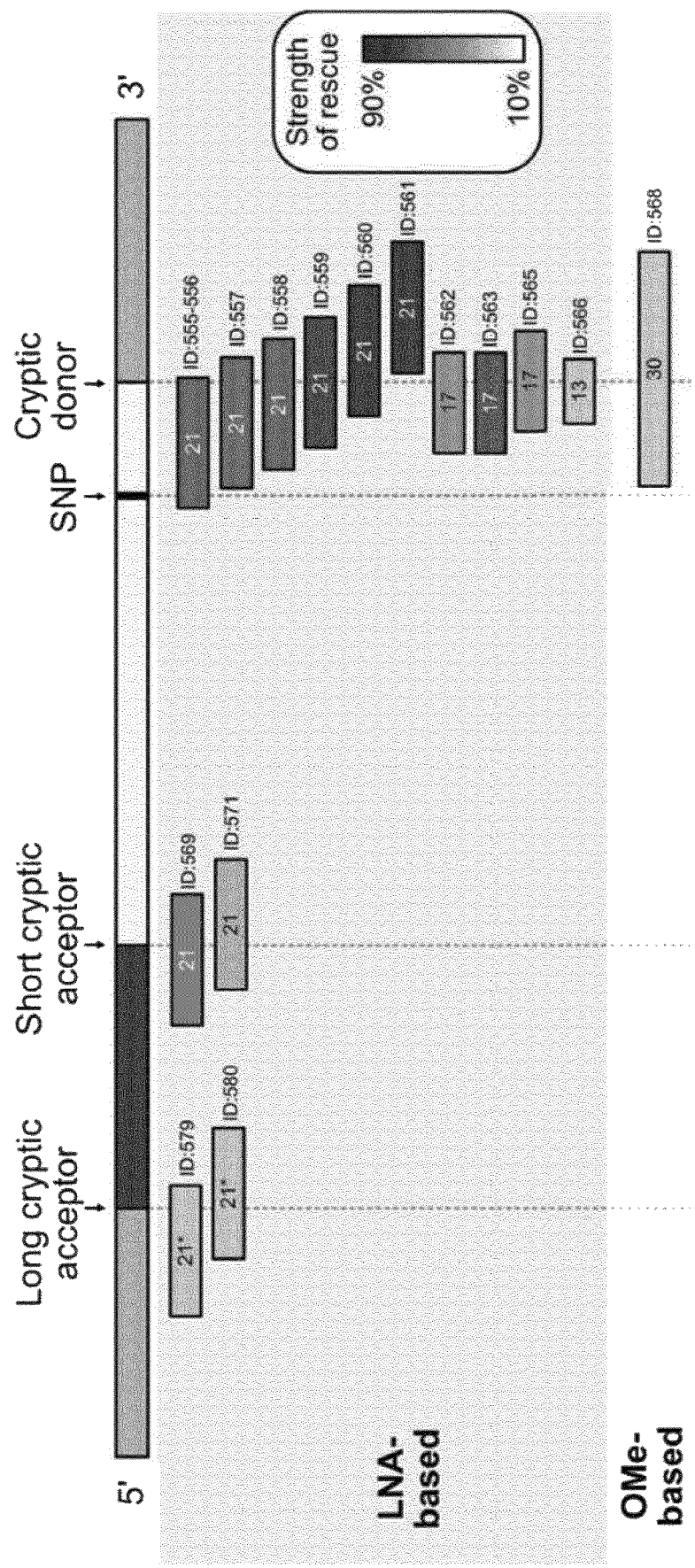
FIG. 17 shows a schematic diagram showing the binding sites of the example ASOs and the extent of rescue. The shading of the bars indicates the strength of rescue. The number on the bars represents the nucleotide length of the ASO.
Figure 18:
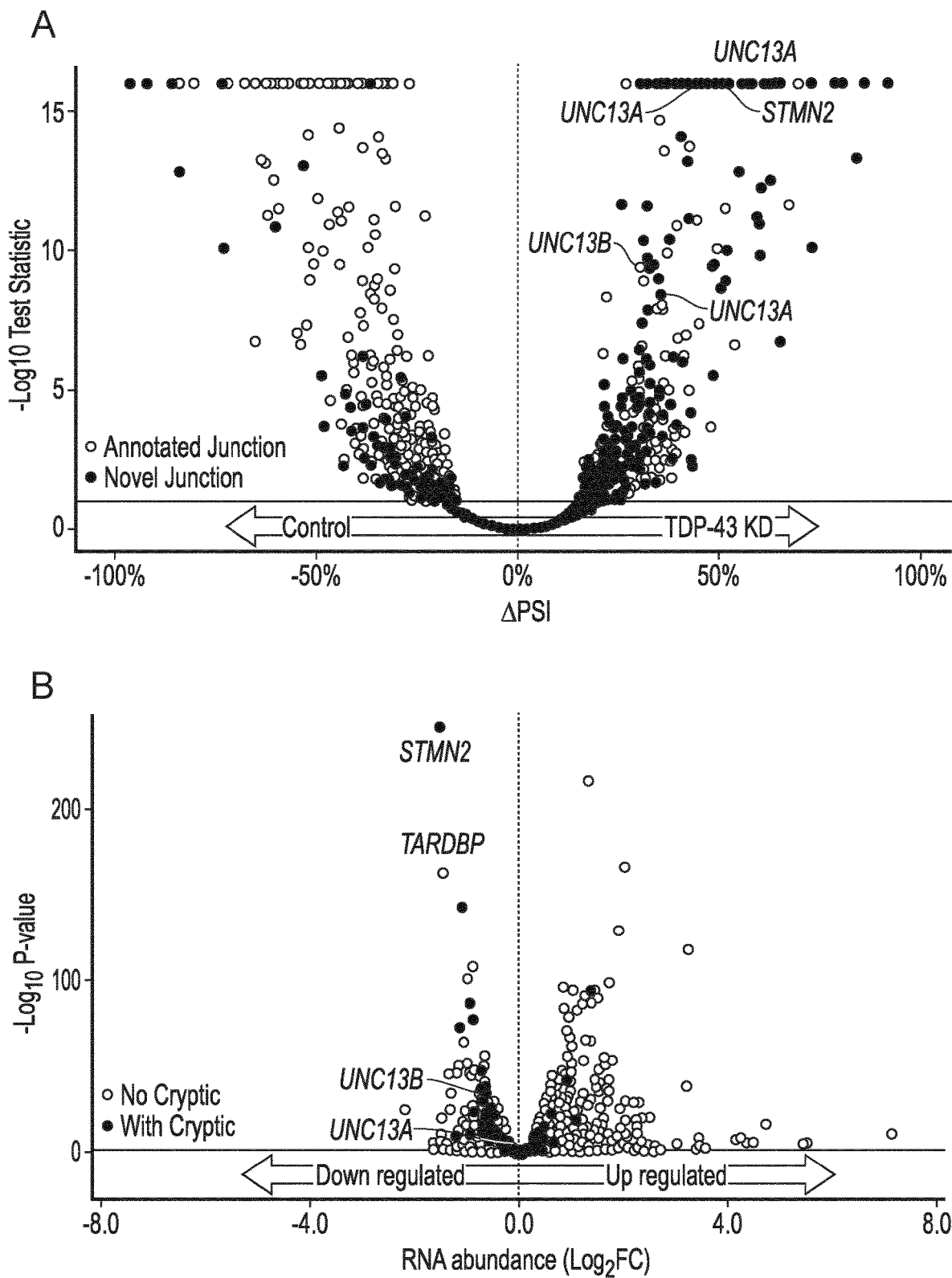
FIG. 18 shows that TDP-43 depletion in neurons leads to altered splicing in synaptic genes UNC13A and UNC13B. (A) Differential splicing using MAJIQ and (B) differential expression in control (N=4) and CRISPRi TDP-43 depleted (N=3) iPSC-derived cortical-like i3Neurons. Each point denotes a splice junction (A) or gene (B). (C) Representative sashimi plots showing cryptic exon (CE) inclusion between exons 20 and 21 of UNC13A upon TDP-43 knockdown (KD). (D, F) Schematics showing intron retention (IR, lower schematic, orange), TDP-43 binding region, and two ALS/FTLD associated SNPs. (E) Representative sashimi plot of UNC13B showing inclusion of the frameshifting exon (fsE) upon TDP-43 KD. (G) LocusZoom plot of the UNC13A locus in the latest ALS GWAS[17]. Lead SNP rs12973192 plotted as a diamond, other SNPs colored by linkage disequilibrium with rs12973192 in European individuals from 1000 Genomes. (H) BaseScope detection of UNC13A CE in control (top) TDP-43 KD (bottom) i3Neurons co-stained for TDP-43, neuronal processes (TUBB3), and nuclei. (I) Representative image of RT-PCR products using iPSC-derived neurons made from an independent iPSC line, NCRM5, with a non-targeting control sgRNA (sgTARDBP−), an intermediate TDP-43 KD (sgTARDBP+) or stronger TDP-43 KD (sgTARDBP++) (J) Quantification of (I) plotted as means±S.E.M=sgControl (n=6), sgTARDBP+(n=5), sgTARDBP++ (n=6). One-way ANOVA with multiple comparisons. Significance levels reported as * (p<0.05)  (p<0.01) * (p<0.001) **** (p<0.0001). Error bars displaying standard error of the mean. (K) Schematic of nanopore long reads quantified (L) Percentage of targeted UNC13A long reads with TDP-43 regulated splice events that contain either both, CE, or IR in TDP-43 KD SH-SY5Y cells.
Figure 18:
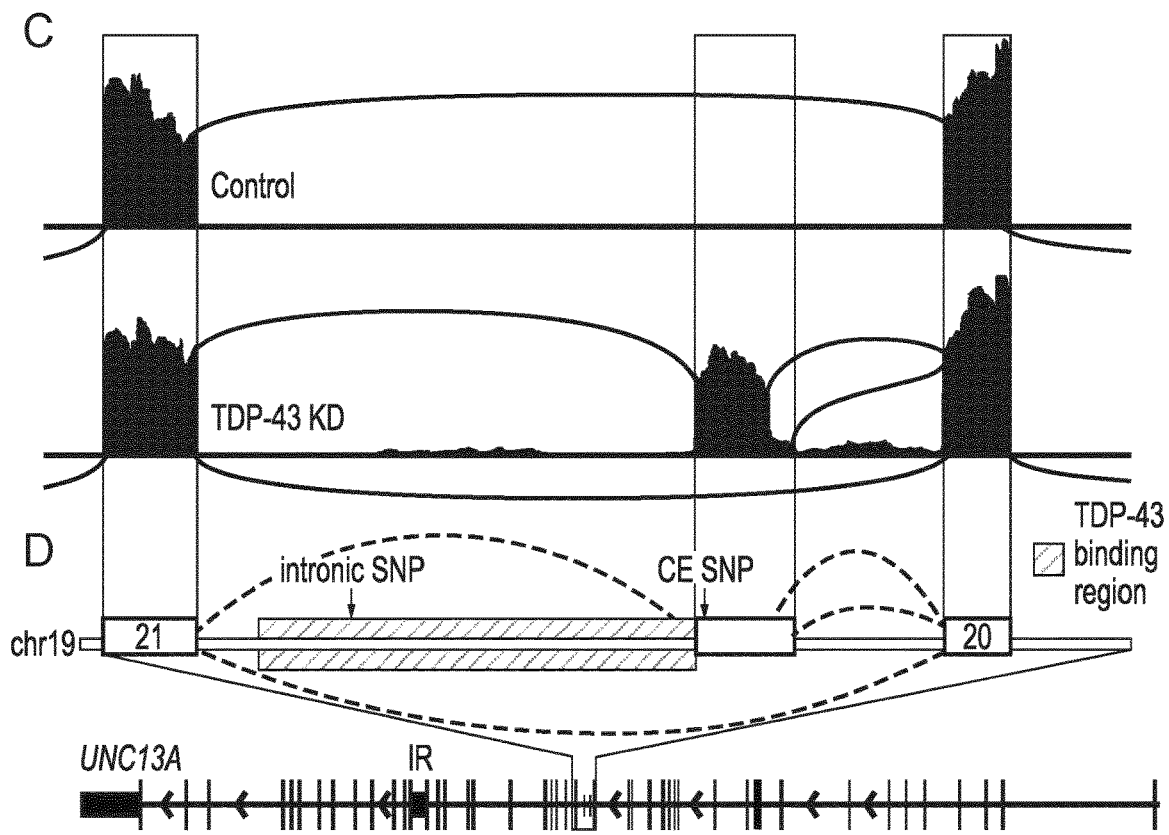
Figure 18:
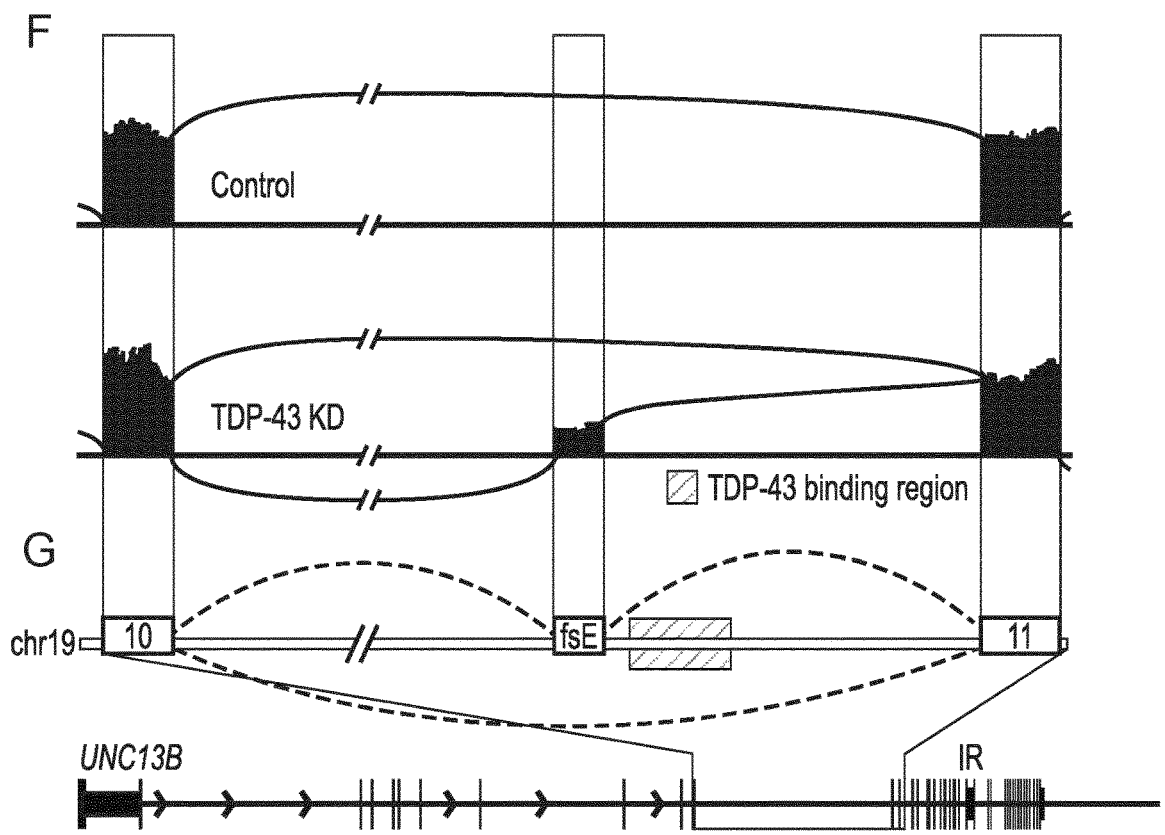
Figure 18:
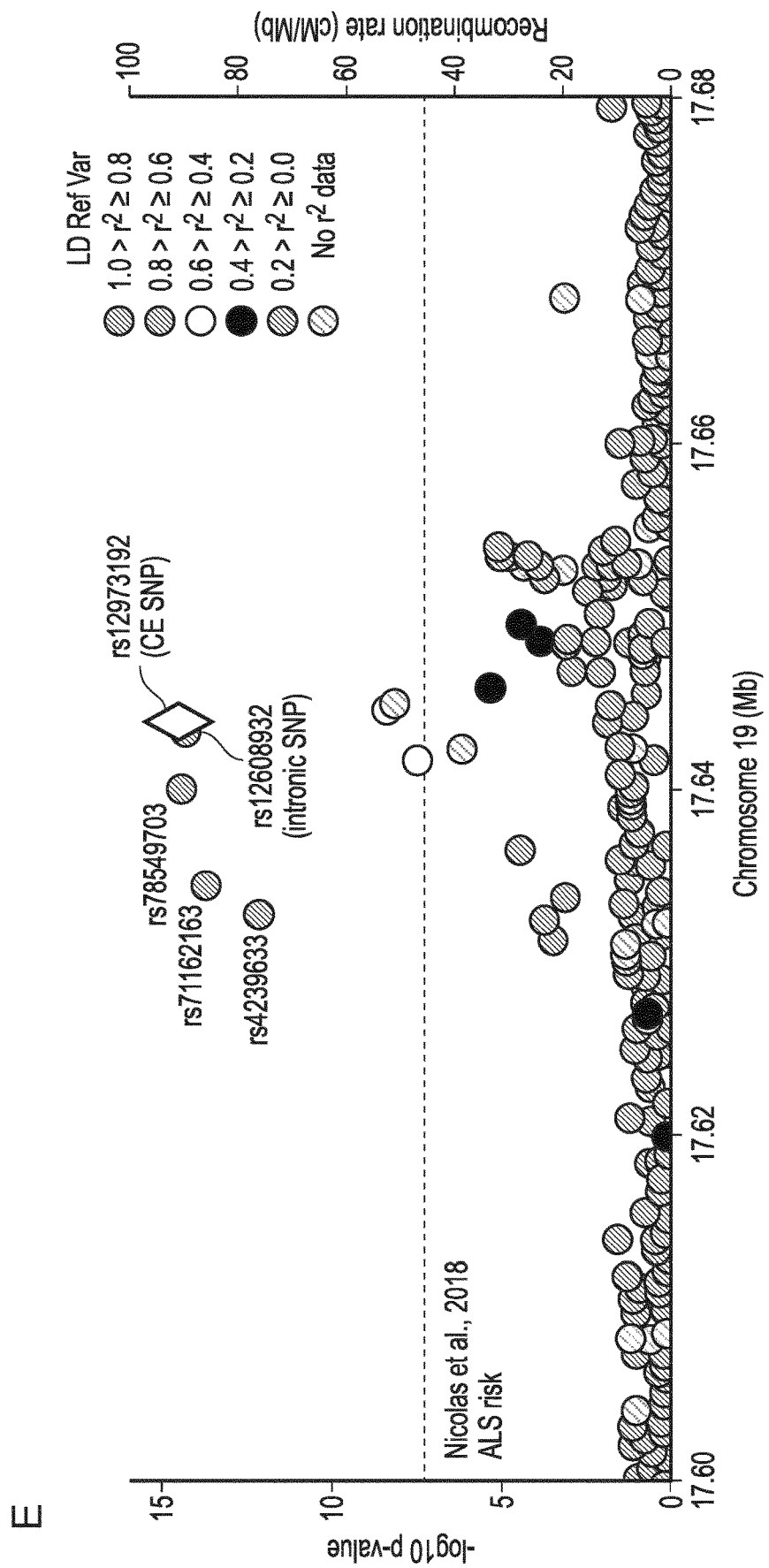
Figure 18:
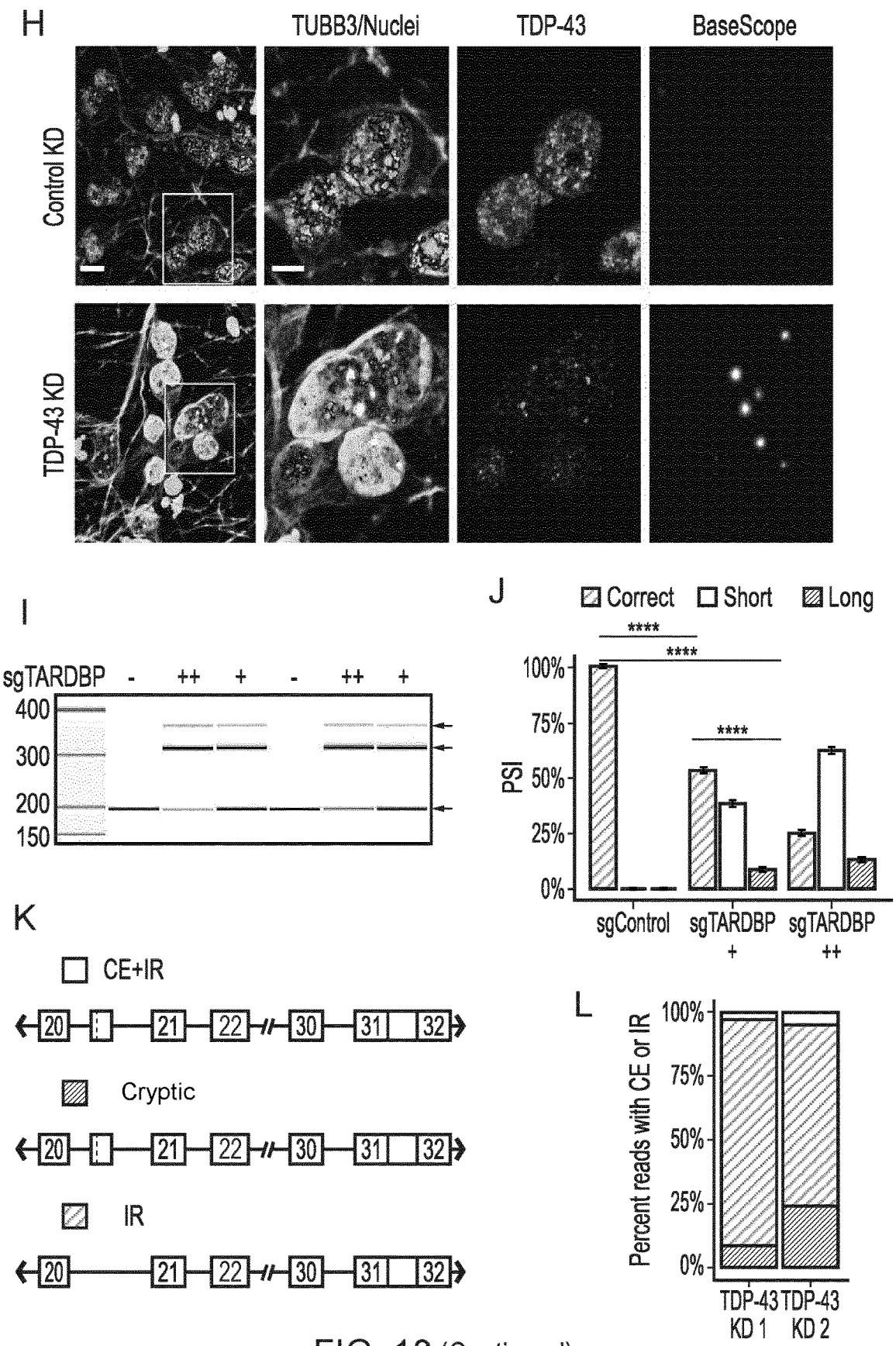
Figure 19:
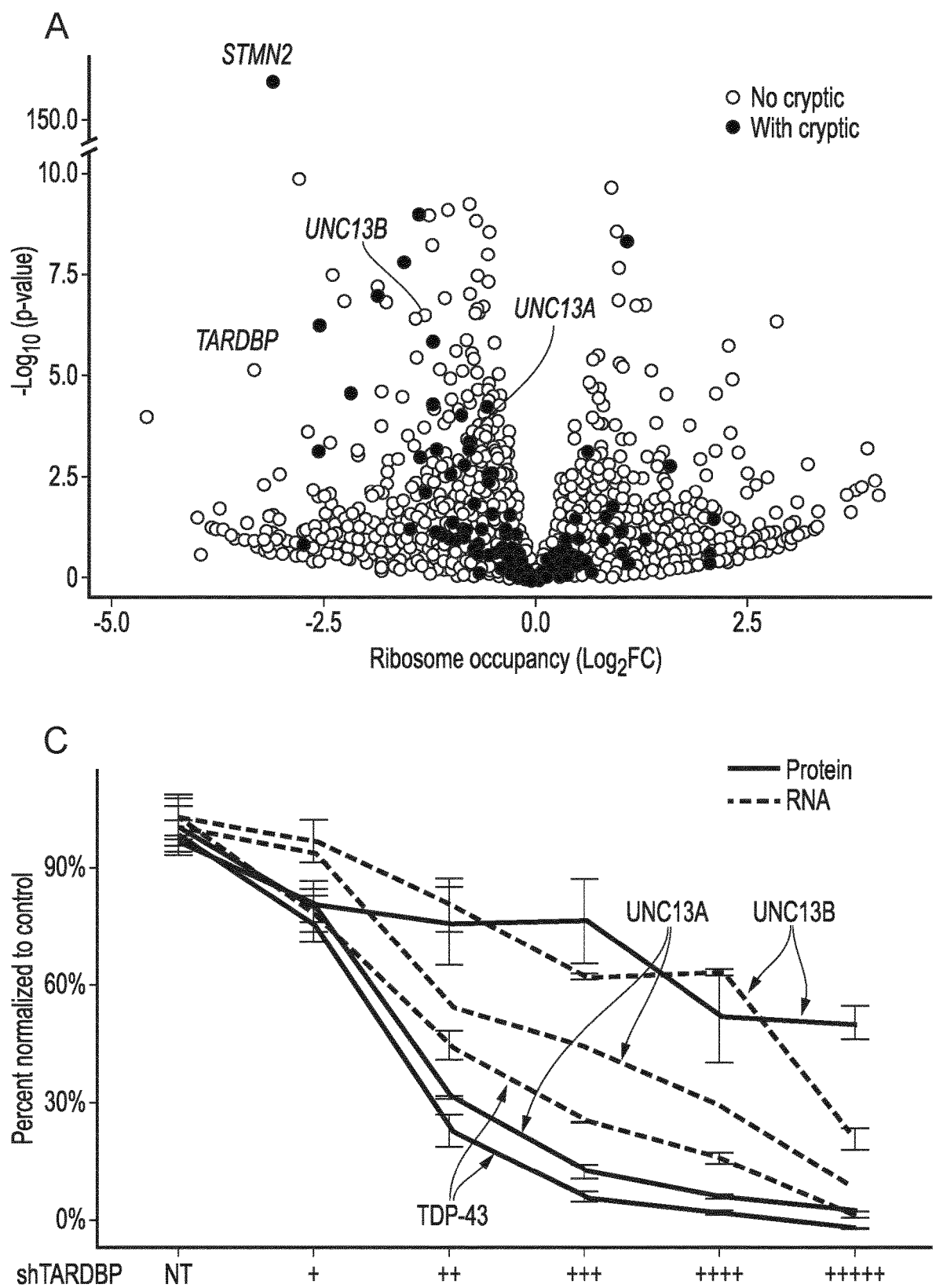
FIG. 19 shows UNC13A and UNC13B are downregulated after TDP-43 knockdown due to the production of NMD-sensitive transcripts. (A) Ribosome profiling of TDP-43 knockdown i3Neurons shows reduction in ribosome occupancy of STMN2, UNC13A and UNC13B transcripts. (B) Mass spectrometry-based proteomic analysis shows dose-dependent reduction in protein abundance of UNC13A and TDP-43 upon TDP-43 knockdown in i3Neurons. Two-sample t-test. (C) Protein and RNA quantification of TDP-43, UNC13A, and UNC13B in SH-SY5Y with varying levels of DOX-inducible TDP-43 knockdown (D) Transcript expression upon CHX treatment suggests UNC13A and UNC13B, but not STMN2, are sensitive to nonsense-mediated decay. HNRNPL (heterogeneous nuclear ribonucleoprotein L) is a positive control. Shaded bar indicates UNC13B was performed in separate experiment. One-sample t-test. Significance levels reported as * (p<0.05)  (p<0.01) * (p<0.001) **** (p<0.0001). Error bars displaying standard error of the mean.
Figure 19:
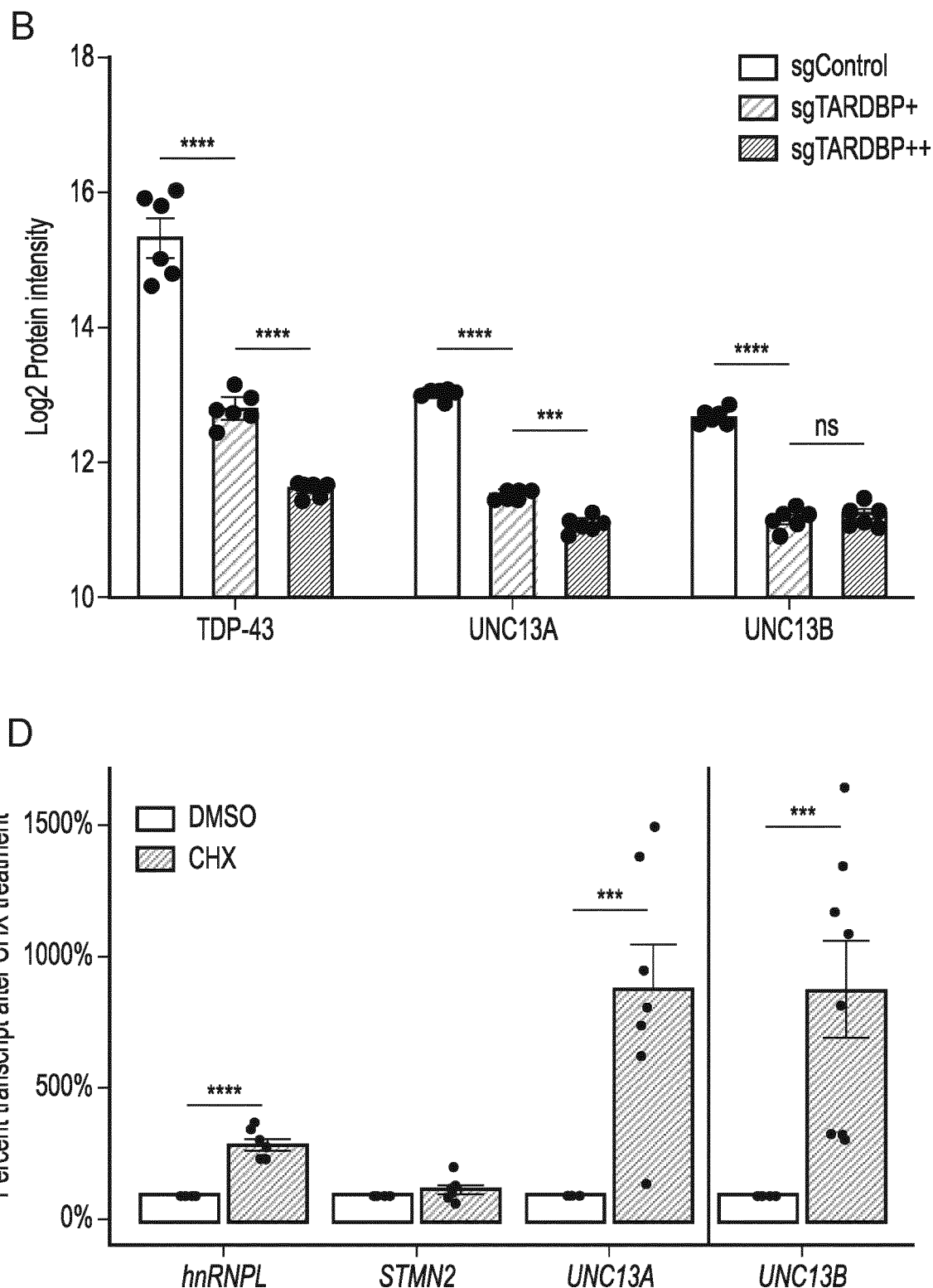
Figure 20:
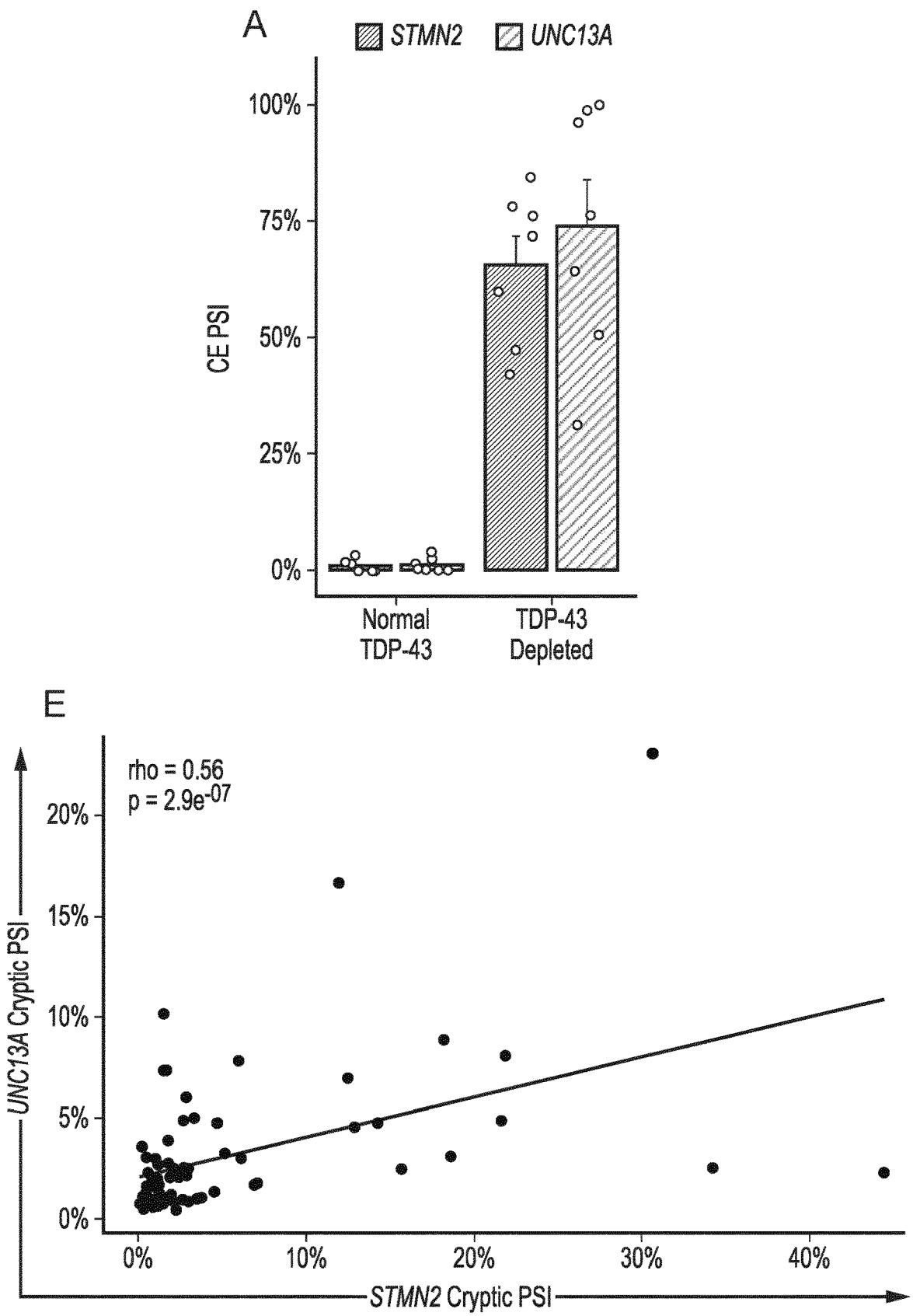
FIG. 20 shows UNC13A CE is highly expressed in ALS/FTLD patient tissue and correlates with known markers of TDP-43 loss of function. (A) UNC13A and STMN2 CE expression from a published dataset of ALS/FTLD patient frontal cortex neuronal nuclei sorted according to the expression of TDP-43[27]. (B) UNC13A CE expression in bulk RNA-seq from NYGC ALS Consortium normalized by library size across disease and tissue samples. ALS cases stratified by mutation status, FTLD cases stratified by pathological subtype. (C) CE expression throughout ALS/FTLD-TDP cases across tissue, number of tissue samples in brackets (D) BaseScope detection of UNC13A CE (foci) in FTLD-TDP (n=9) but not control (n=5) or FTLD-Tau (n=4) frontal cortex samples and quantification of background corrected foci frequency between groups. Scale bar 10 μm. Error bars displaying standard error of the mean. (E) Correlation in ALS/FTLD-TDP cortex between UNC13A and STMN2 CE PSI in patients with at least 30 spliced reads across the CE locus. (B, C) Wilcoxon test. Significance levels reported as * (p<0.05)  (p<0.01) * (p<0.001) **** (p<0.0001).
Figure 20:
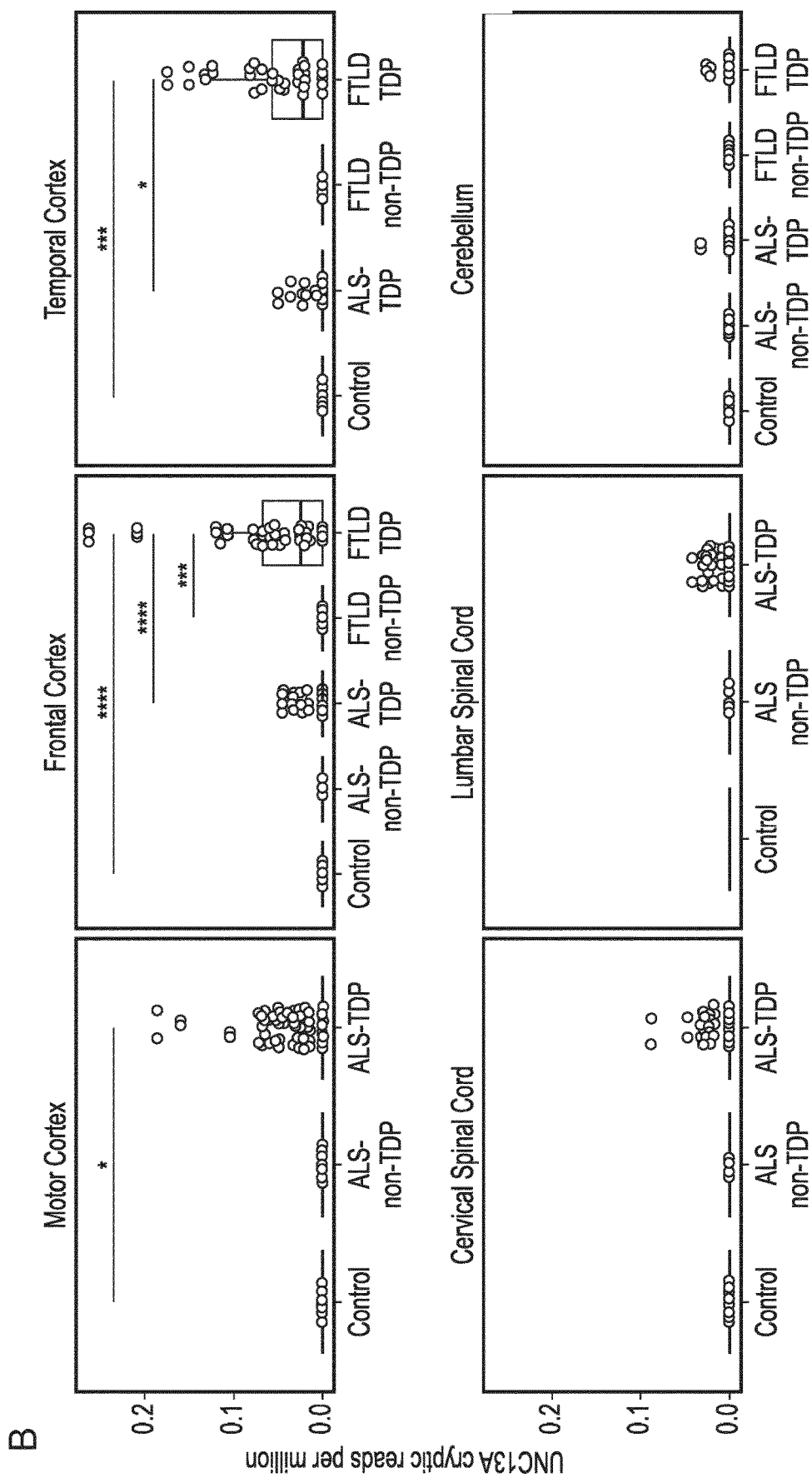
Figure 20:
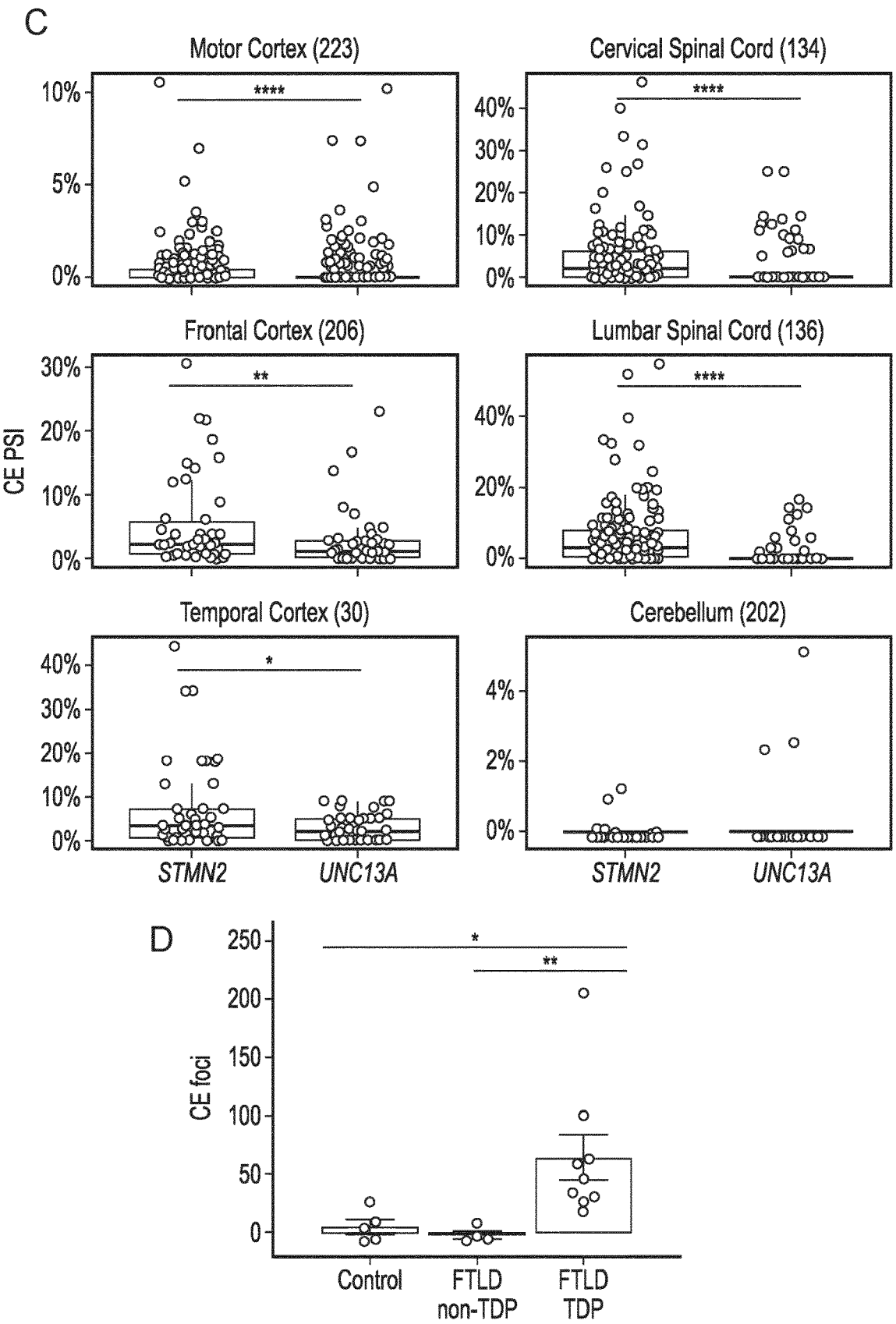
Figure 20:
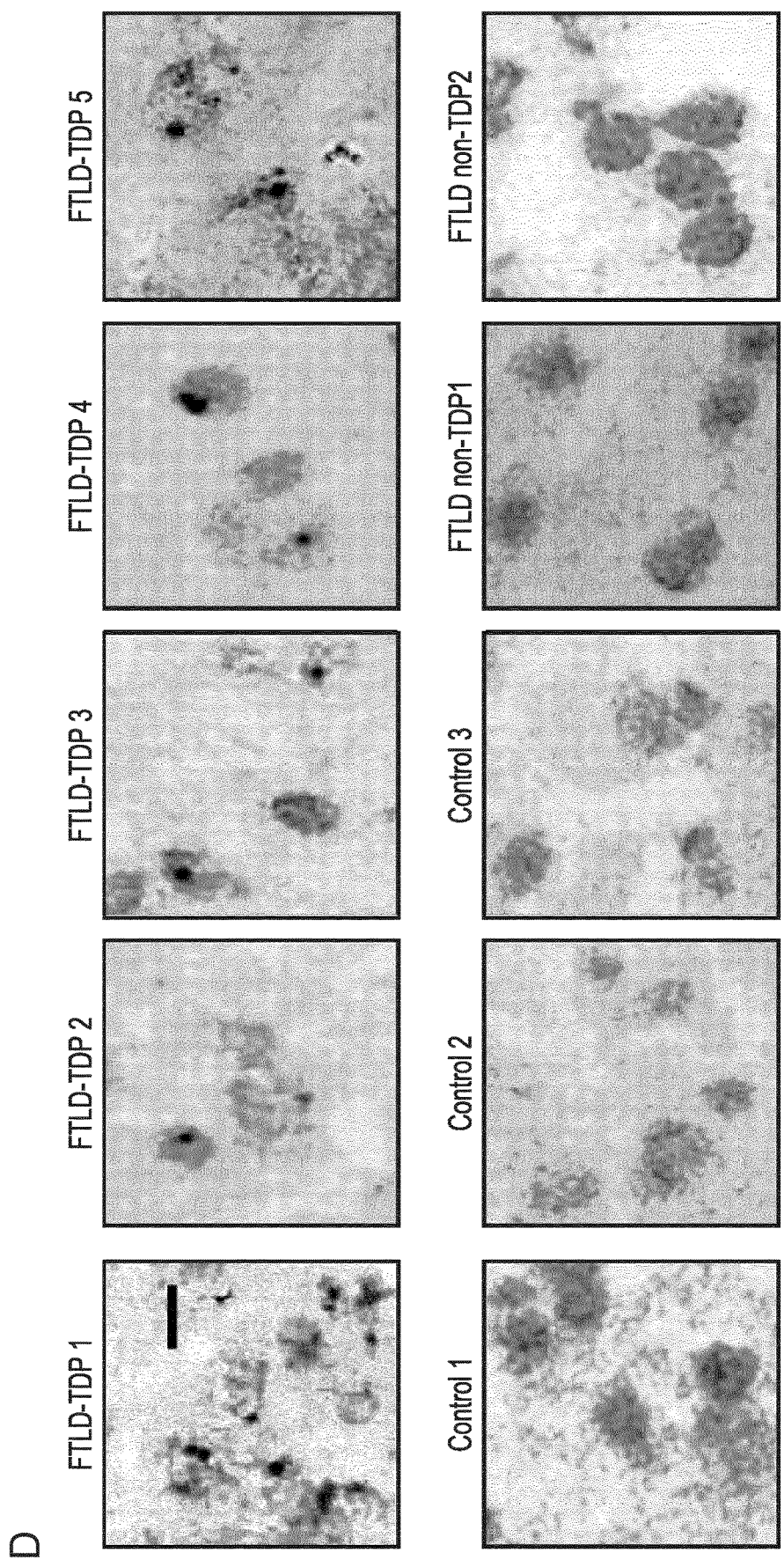
Figure 21:
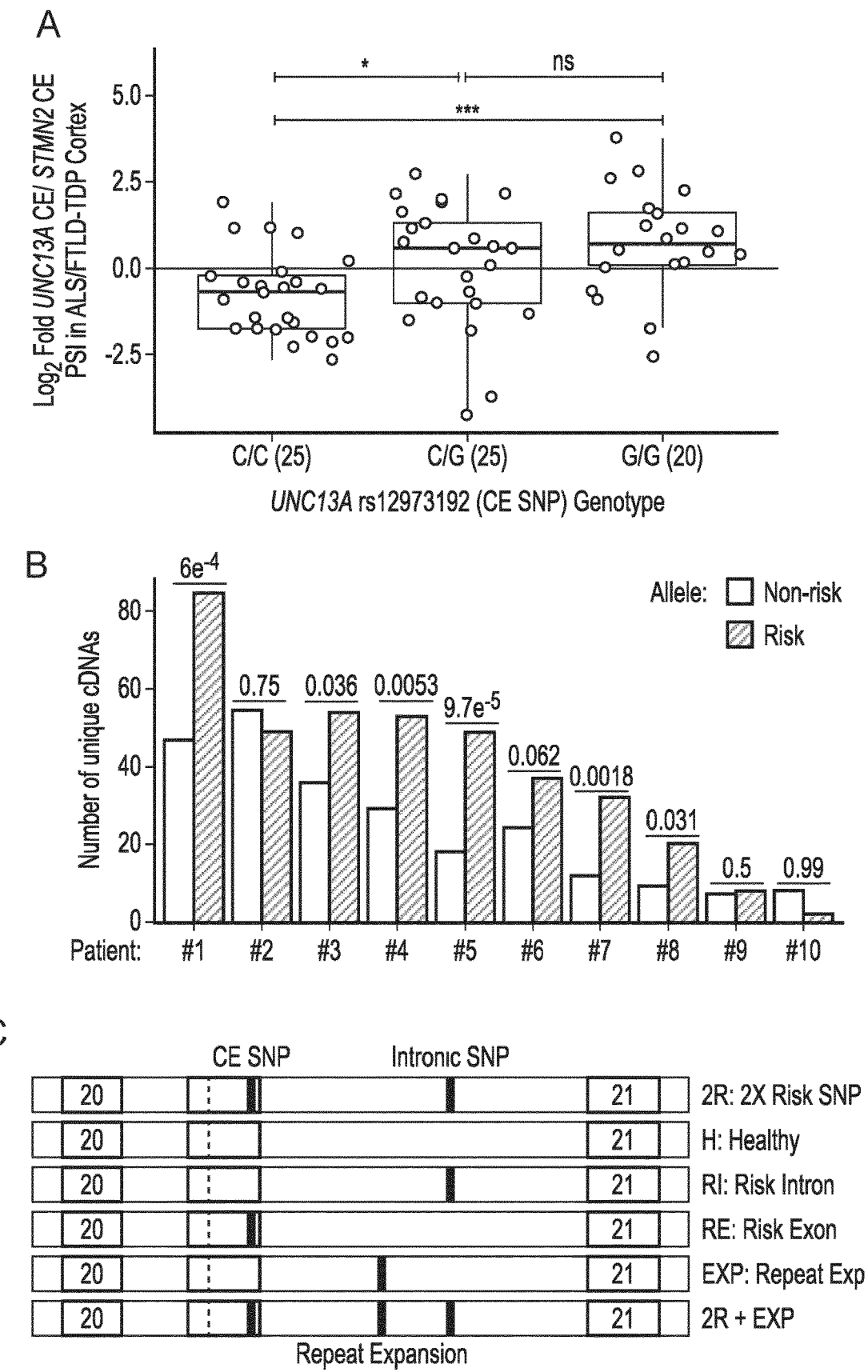
FIG. 21 shows UNC13A ALS/FTD risk variants enhance UNC13A CE splicing in patients and in vitro by altering TDP-43 pre-mRNA binding. (A) Ratio UNC13A/STMN2 CE PSI, split by genotype for UNC13A risk alleles. (B) Unique cDNAs from targeted RNA-seq in ten CE SNP heterozygous FTLD-TDP patients. p-values from single-tailed binomial tests. FTD1, 5, and 7 are C9orf72 hexanucleotide repeat carriers (C) Diagram of UNC13A minigenes containing exon 20, intron 20, and exon 21 and combinations of UNC13A alleles (D) Representative image of RT-PCR products from UNC13A minigenes in SH-SY5Y±TDP-43 KD. (E) Quantification of (D) plotted as means±S.E. Each variant was compared with the healthy minigene it was co-transfected with and results compared with an unpaired t-test (N=3); (F) TDP-43 iCLIP of SH-SY5Y containing 2R and 2H minigenes: Top—average crosslink density; Middle—average density change 2R-2H (rolling window=20 nt, units=crosslinks per 1,000). Bottom diagram of predicted TDP-43 binding footprints (UGNNUG motif). (G) Average change in E-value (measure of binding enrichment) across proteins for heptamers containing risk/healthy CE SNP allele; TDP-43 is indicated. (H) Binding affinities between TDP-43 and 14-nt RNA containing the CE (n=4) or intronic (n=3) healthy or risk sequences measured by ITC; two-sample t-test. (I) Representative image of RT-PCR products from UNC13A minigenes with mutated UGNNUG TDP-43 binding motifs shown in (F) (J) Quantification of (I) plotted as means±S.E. N=3, Analysis as in D and E; Significance levels reported as * (p<0.05)  (p<0.01) * (p<0.001) **** (p<0.0001)
Figure 21:
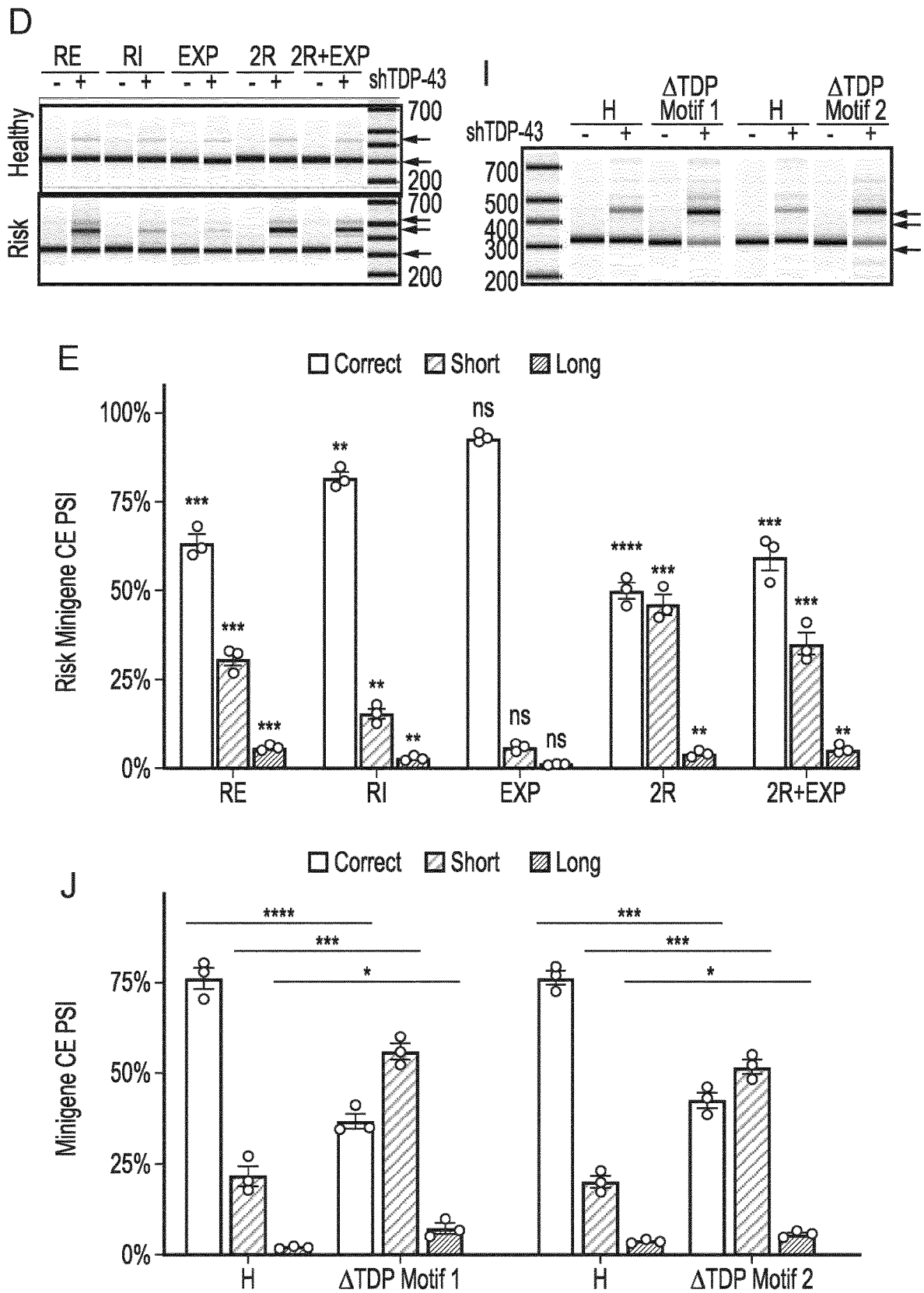
Figure 21:
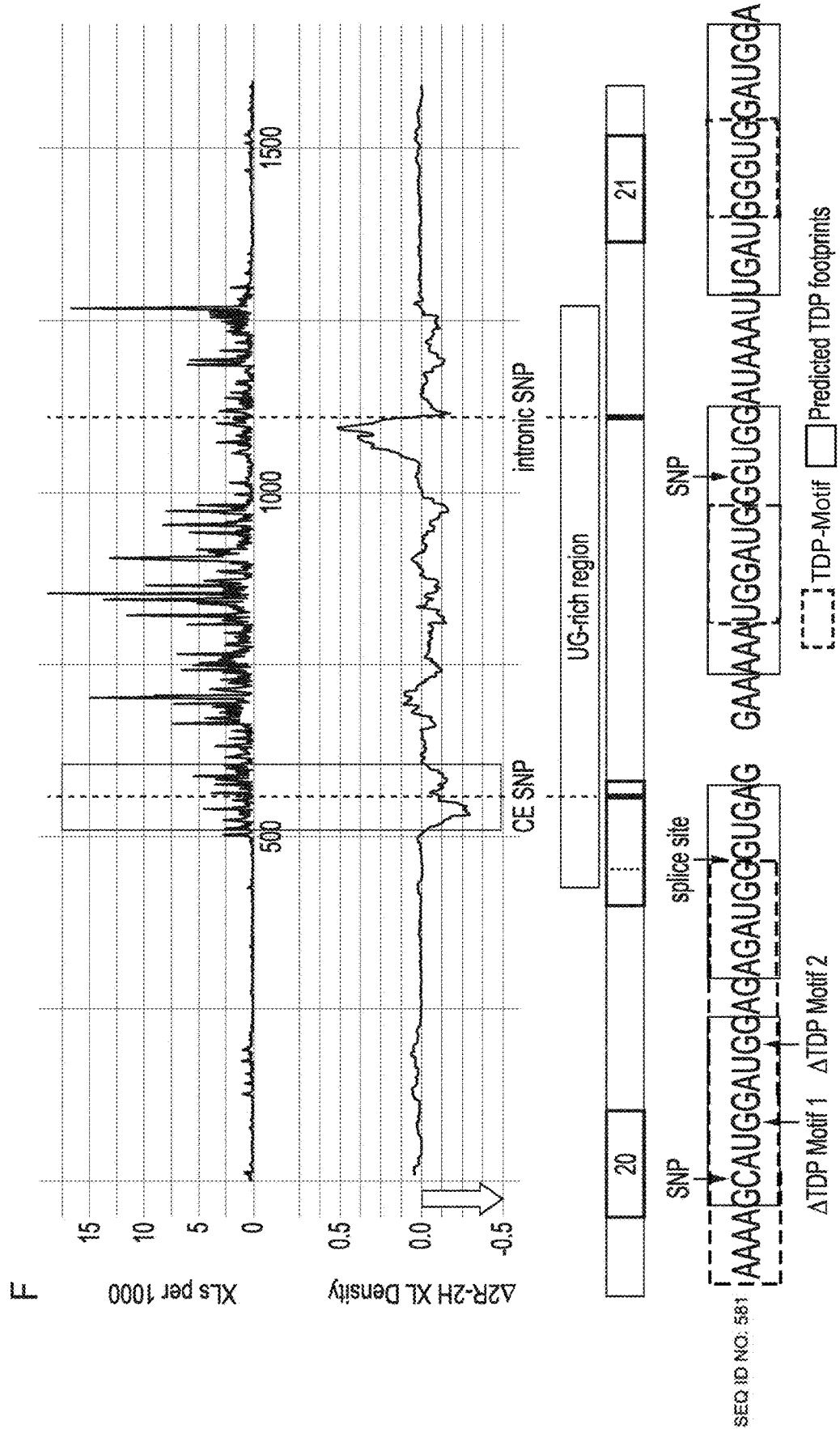
Figure 21:
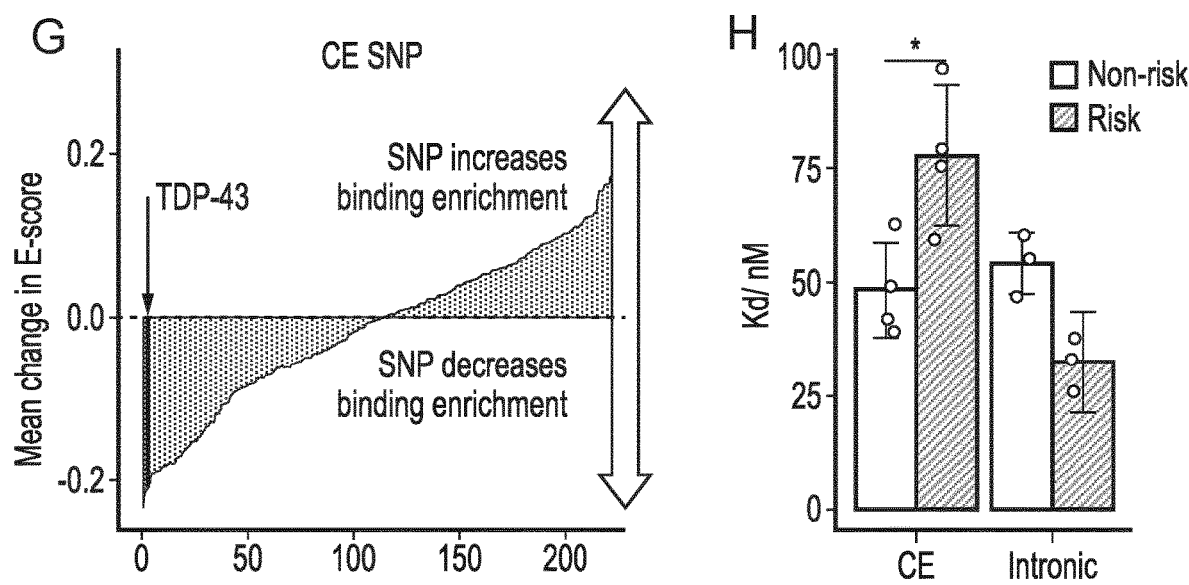
Figure 22:
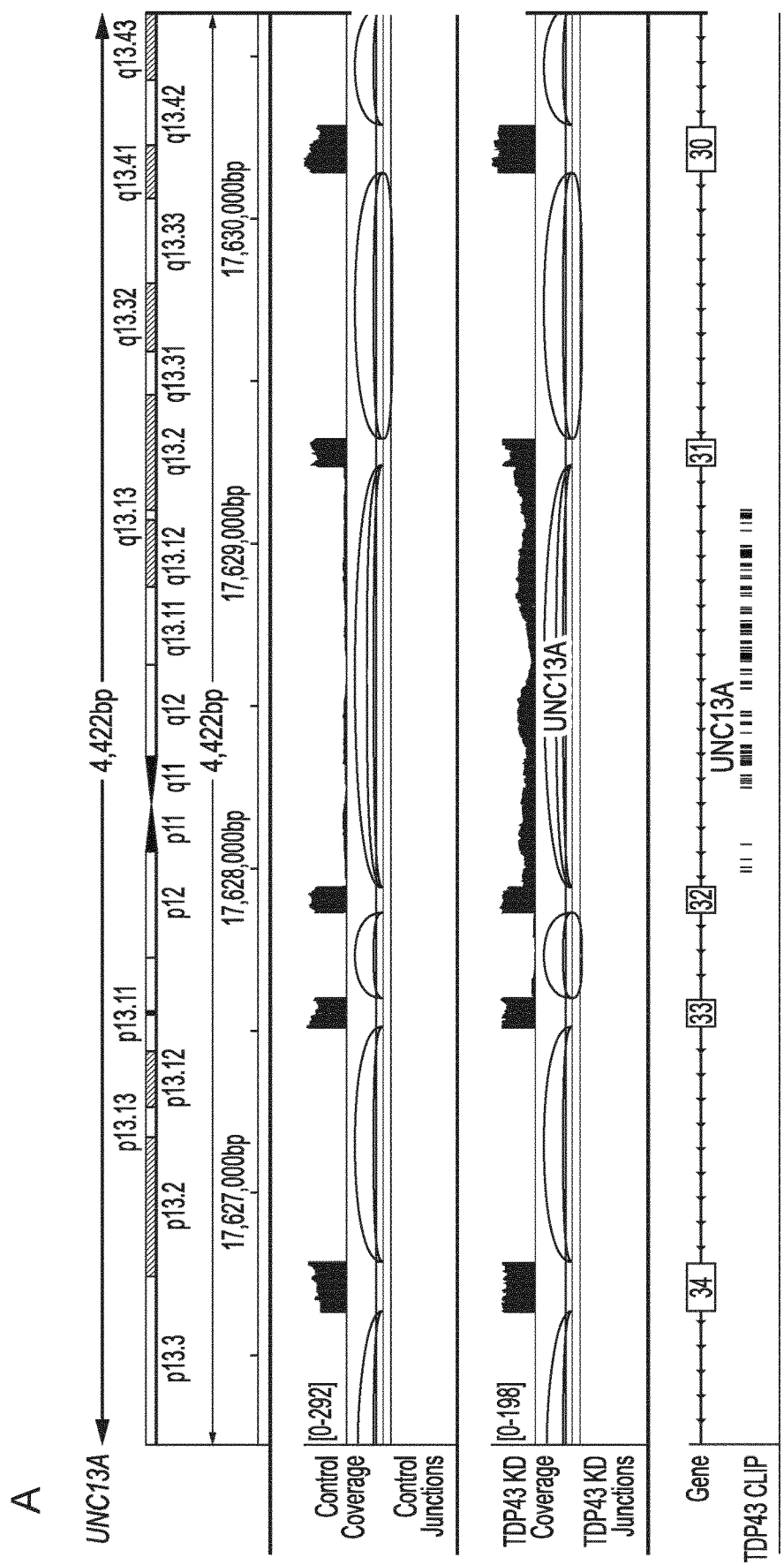
FIG. 22 shows further evidence that UNC13A is misspliced after TDP-43 knockdown across neuronal lines. (A, B) RNA-seq traces from IGV70 of representative samples from control (top) and TARDBP KD (bottom) in i3Neurons showing intron retention in UNC13A (A) (mean 4.50±1.50 increased IR in KD) and UNC13B (mean 1.86±0.63 increased IR in KD) (B) overlaid with published TDP-43 iCLIP peaks26; (C) Histogram showing number of basescope cryptic foci per nuclei in control and TDP-43 KD (grey) in WTC11-derived i3Neurons, p<0.0001 unpaired t-test. (D,E) RNA levels of TARDBP and UNC13A with a non-targeting control sgRNA (sgTARDBP−), an intermediate TDP-43 KD (sgTARDBP+) or a higher TDP-43 KD (sgTARDBP++) in WTC11-derived (D) and NCRM-5-derived i3Neurons (D) (F) Representative image of UNC13A CE RT-PCR products (G) Quantification of (F) plotted as means±S.E.M=sgControl (n=6), sgTARDBP+ (n=6), sgTARDBP++ (n=6). One-way ANOVA with multiple comparisons. (H-K) Expression of TDP-43 regulated splicing in UNC13A (H, I) and UNC13B (J, K) across published neuronal datasets in control and TDP-43 KD. Intron retention (IR) (I, K) and CE and fsE PSI (H, J) significantly increase after TDP-43 depletion in most experiments, Wilcoxon test (L) Relative gene expression levels for TARDBP across neuronal datasets11,25. Normalized RNA counts are shown as relative to control mean. Numbers show log 2 fold change calculated by DESeq2. Significance shown as adjusted p-values from DESeq2. Significance levels reported as * (p<0.05)  (p<0.01) * (p<0.001) **** (p<0.0001).
Figure 22:
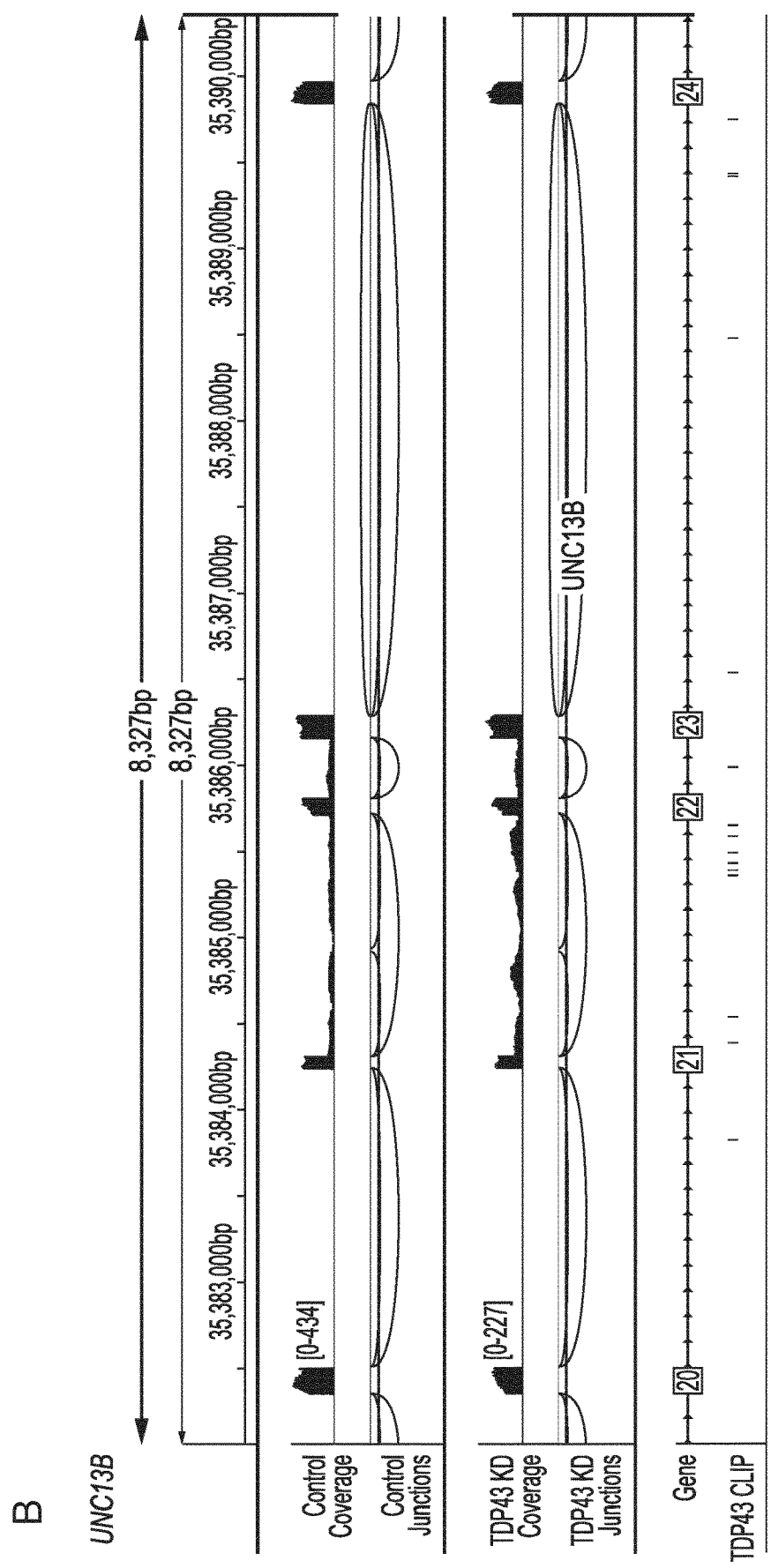
Figure 22:
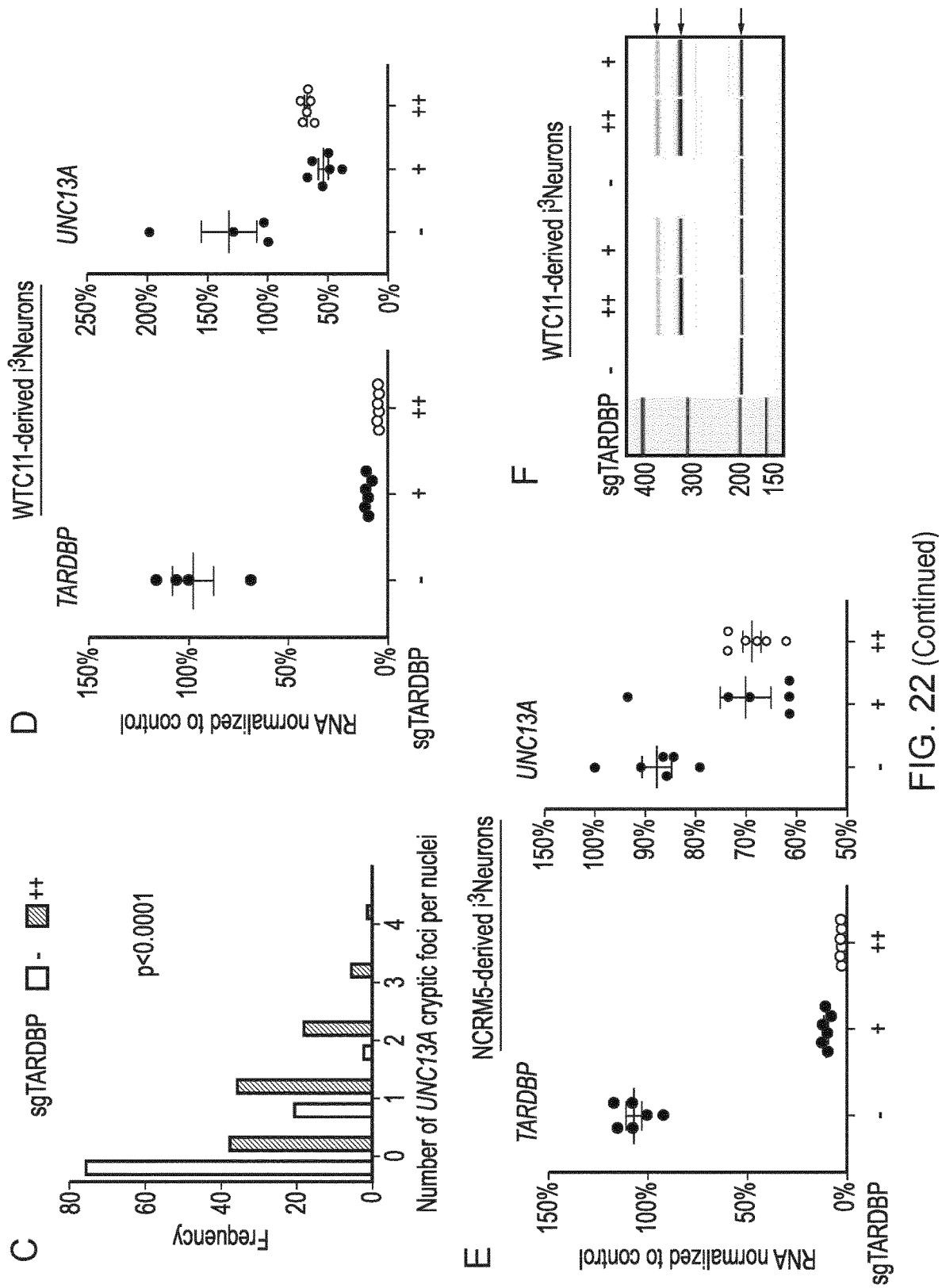
Figure 22:
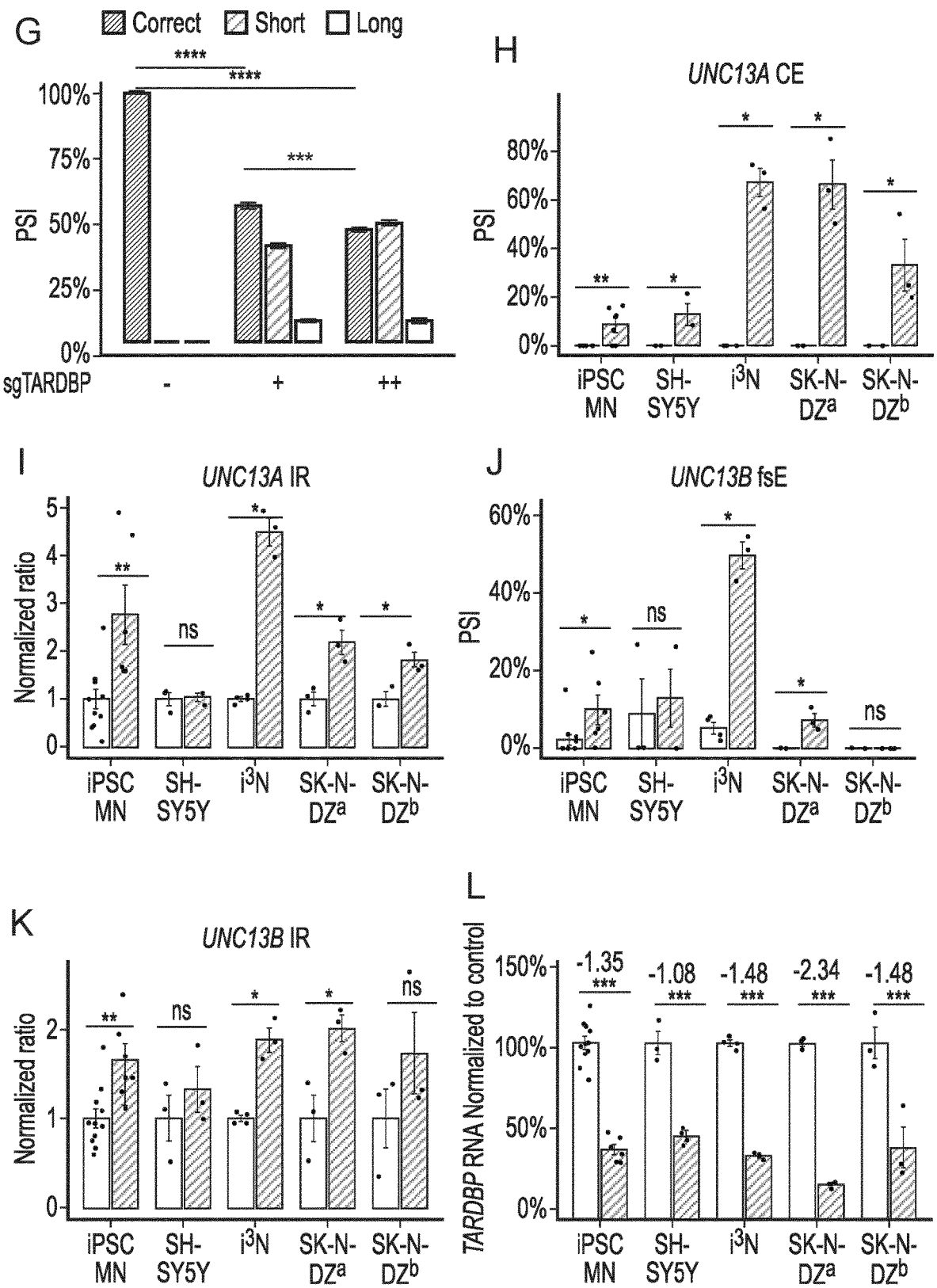
Figure 23:
FIG. 23 shows the validation of UNC13A and UNC13B misplicing after TDP-43 KD across multiple neuronal cell lines. (A) Sanger sequencing of cryptic bands in both SH-SY5Y and SK-N-DZ cells confirm the CE splice junctions. (B, C) Crosslink density across UNC13A (chr19) (B) and UNC13B (chr9) (C) genomic loci from novel iCLIP on endogenous TDP-43 in SH-SHY5Y cells. Crosslink densities for both genes show peaks at the CE/fsE (left dotted line) and retained introns (right dotted line). Coordinates shown in hg38 percentage of all targeted UNC13A long reads in SH-SY5Y cells containing either neither CE nor IR, both, or either cryptic exon or intronic retention as determined by Sanger sequencing. Most reads in both control and TDP-43 KD contain neither event, and while IR event is present in controls, CE is only detected in TDP-43 KD. (Bottom) Targeted nanopore sequencing reveals UNC13A CE and IR events occur largely independently in-vitro. (A) Percentage of all targeted UNC13A long reads in SH-SY5Y cells containing either neither CE nor IR, both, or either CE or IR. Most reads in both control and TDP-43 KD contain neither event, and while IR event is present in controls, CE is only detected in TDP-43 KD
Figure 23:
Figure 23:
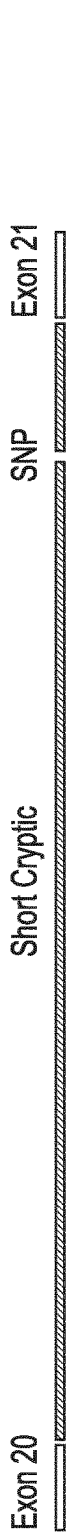
Figure 23:
Figure 23:
Figure 23:
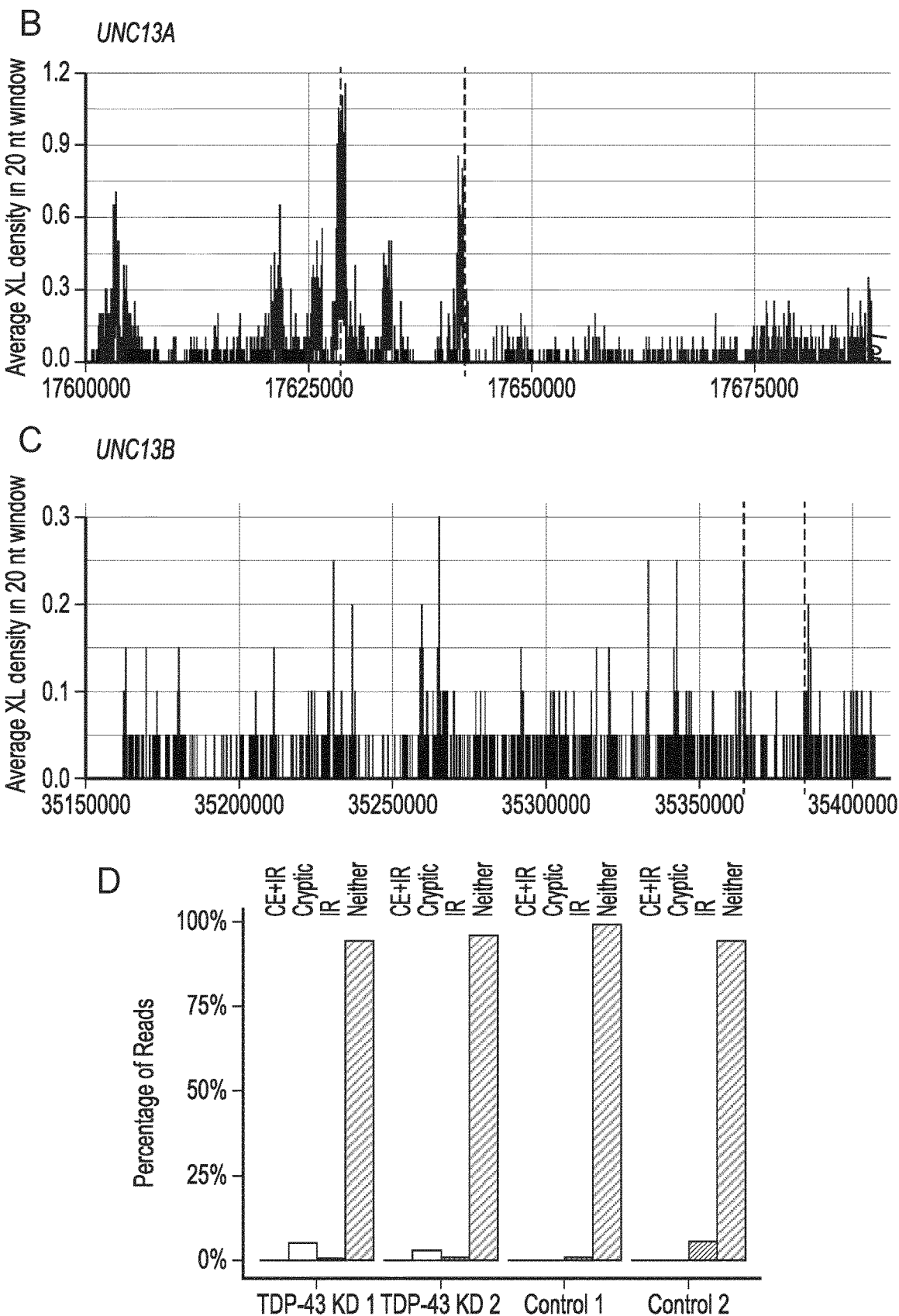
Figure 24:
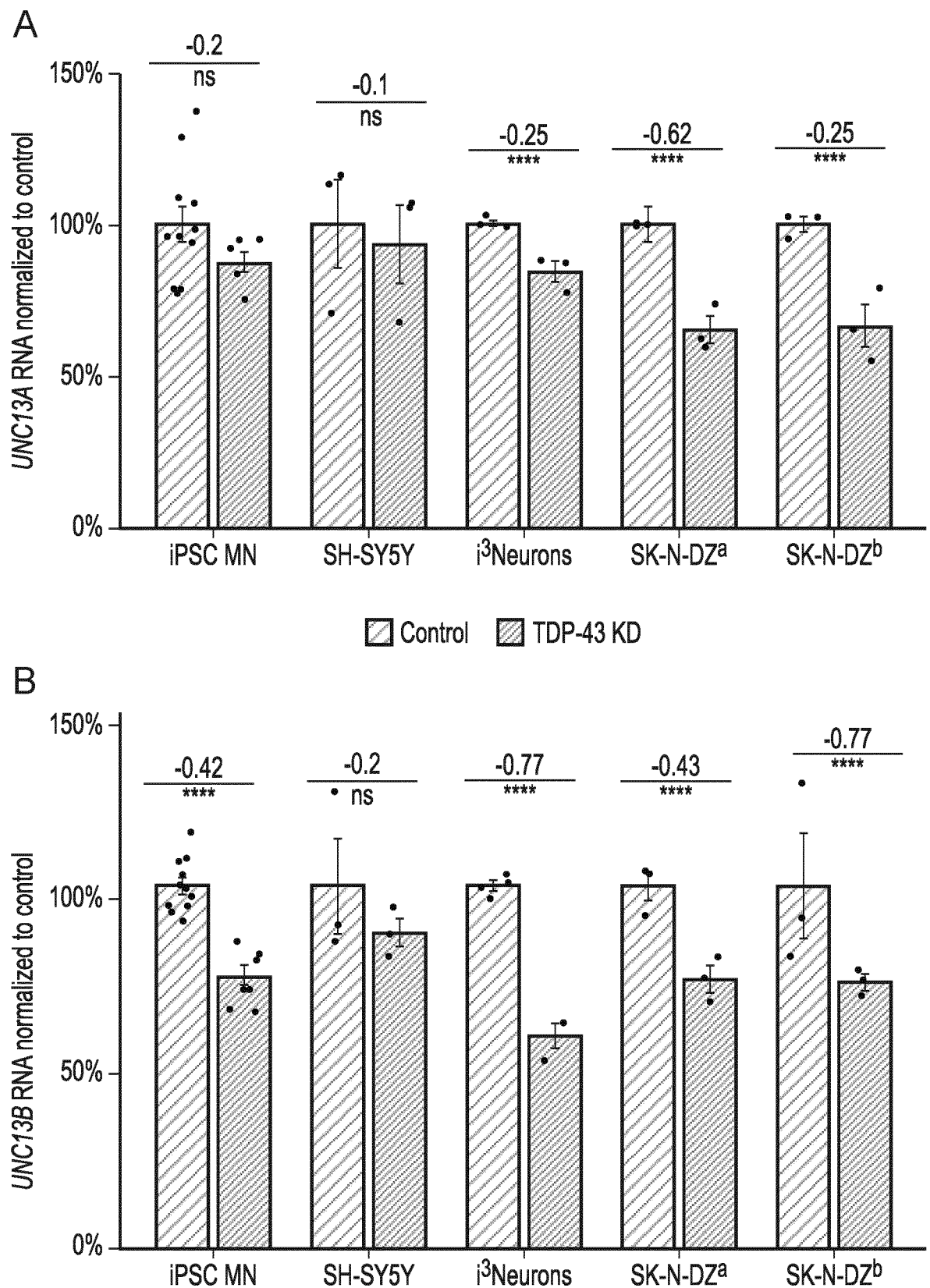
FIG. 24 shows that the reduction of UNC13A and UNC13B after TDP-43 knockdown correlates with TDP-43 levels and is caused by nonsense-mediated decay. Relative gene expression levels for UNC13A (A) and UNC13B (B) after TDP-43 knockdown across neuronal cell lines 11,25. Normalized RNA counts are shown as relative to control mean. Numbers show log fold change calculated by DESeq2. Significance shown as adjusted p-values from DESeq2. (C, D) RT-qPCR analysis shows TDP-43, UNC13A and UNC13B gene expression is reduced by TARDBP shRNA knockdown in both SH-SY5Y and SK-N-DZ human cell lines. Graphs represent the means±S.E., N=6, one sample t-test. (E) The 5' ends of 29 nt reads relative to the annotated start codon from a representative ribosome profiling dataset (TDP-43 KD replicate B). As expected, we detected strong three-nucleotide periodicity, and a strong enrichment of reads across the annotated coding sequence relative to the upstream untranslated region. (F) UNC13A, UNC13B, and TDP-43 protein levels, measured by Western Blot, with varying levels of DOX-inducible TDP-43 knockdown in SH-SY5Y cells. Tubulin is used as endogenous control, N=3. (G) Quantification of RT-PCR products from the transcripts containing UNC13A CE, UNC13A intron retention, UNC13B fsE, and UNC13B intron retention, with varying levels of DOX-inducible TDP-43 knockdown in SH-SY5Y cells. Error bars displaying standard error of the mean, N=3. (H) UPF1 siRNA knock-down led to the rescue of hnRNPL (positive control), UNC13A, and UNC13B transcripts, but not STMN2. Error bars displaying standard error of the mean, N=4, one-sample t-test. (I) UNC13A CE containing-transcript PSI is increased after UPF1 knockdown in i3Neurons. Error bars displaying standard error of the mean, N=6. (J) RT-PCR products from UNC13A in the setting of mild TDP-43 knockdown with the addition of either DMSO (control) or CHX (NMD inhibition). (K) Quantification of (J) plotted as means±S.E, N=4. Significance levels reported as * (p<0.05)  (p<0.01) * (p<0.001) **** (p<0.0001).
Figure 24:
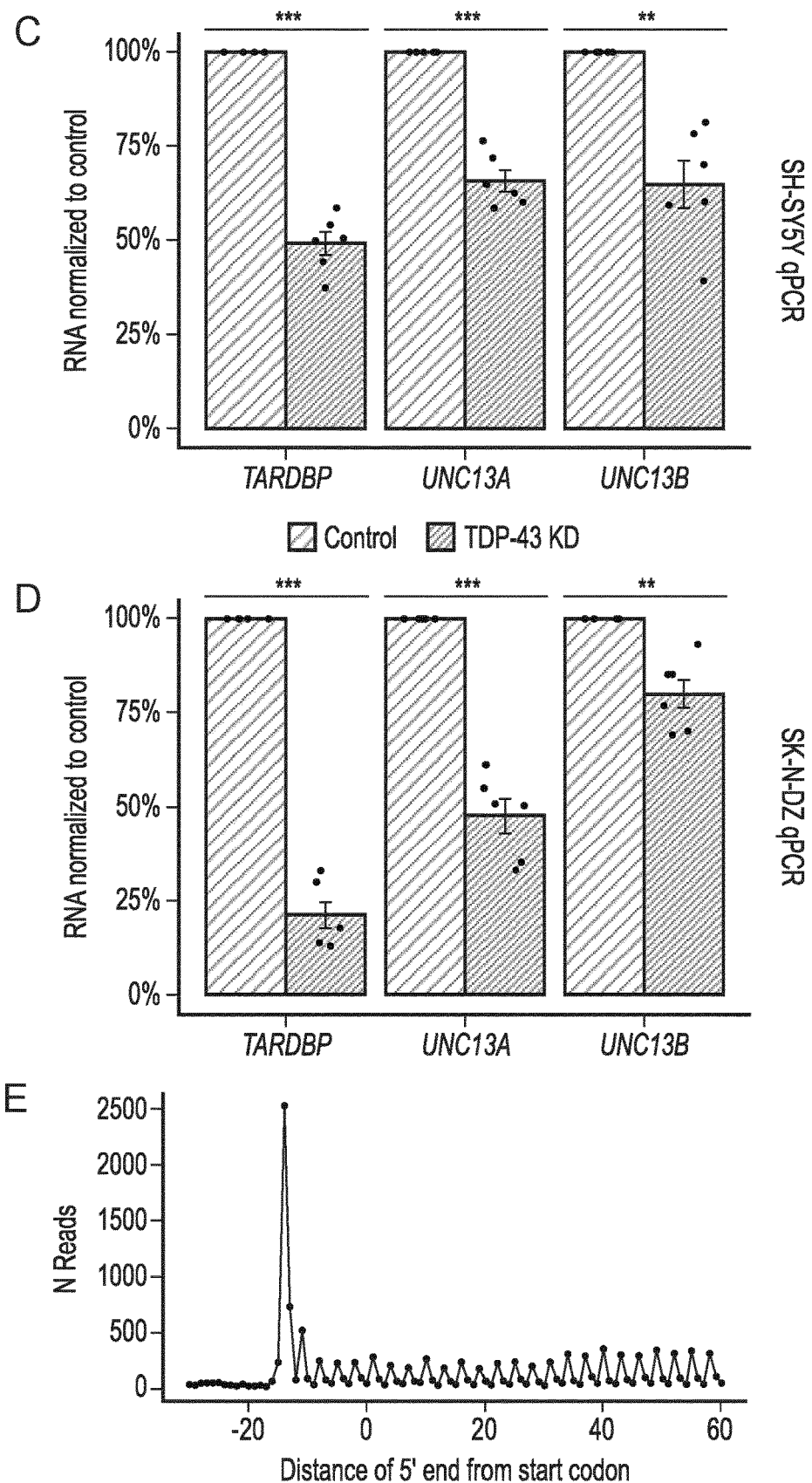
Figure 24:
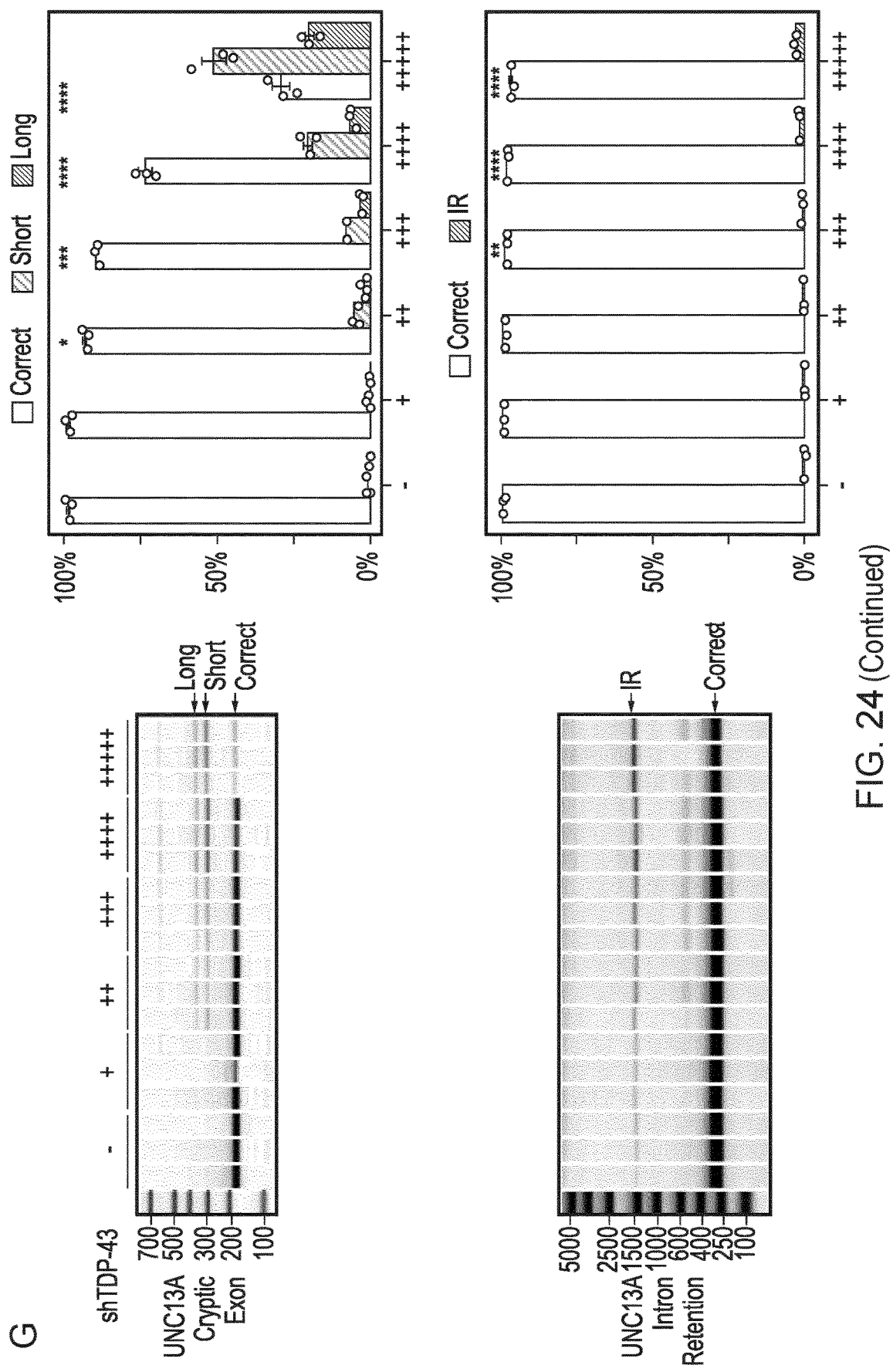
Figure 24:
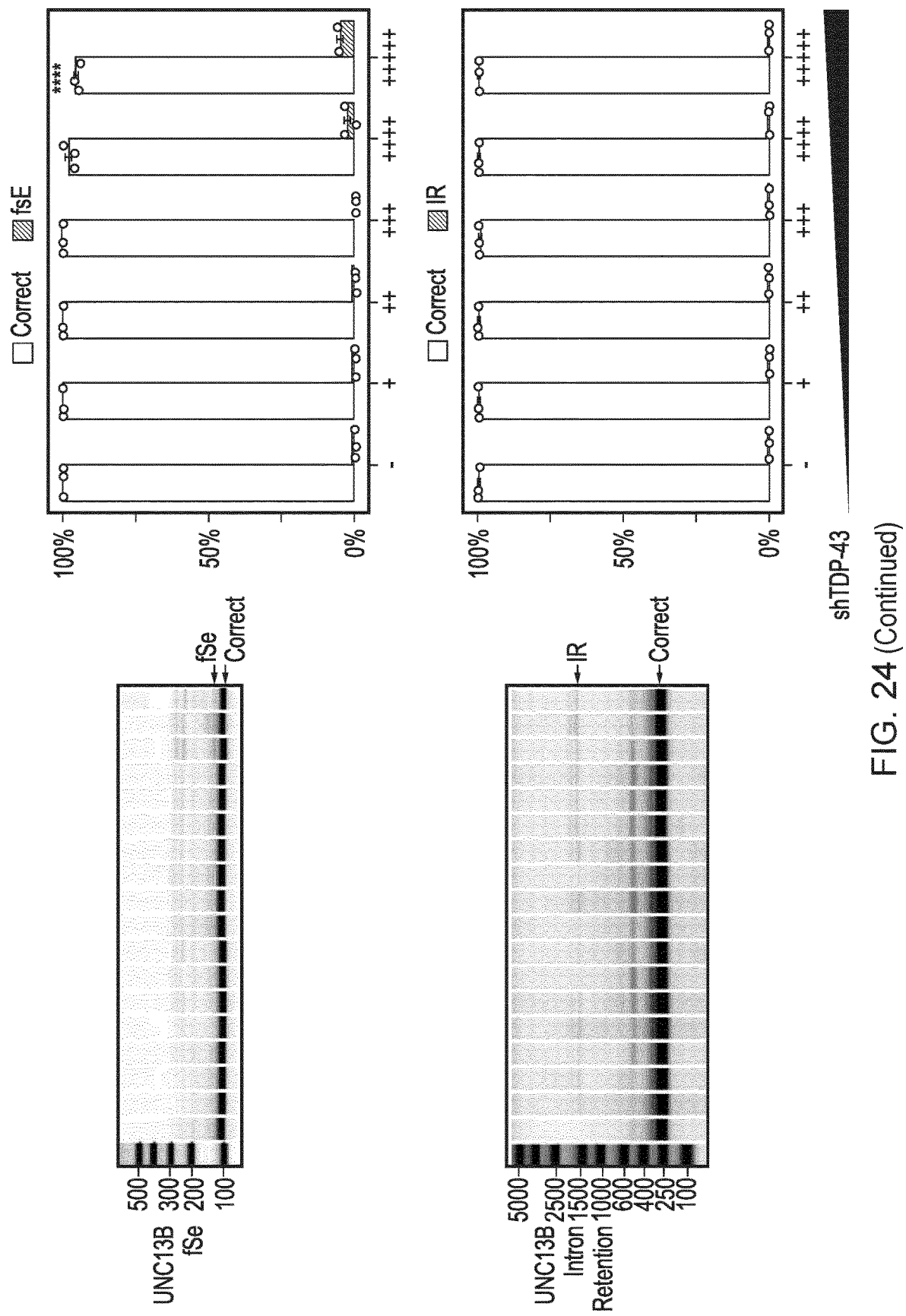
Figure 24:
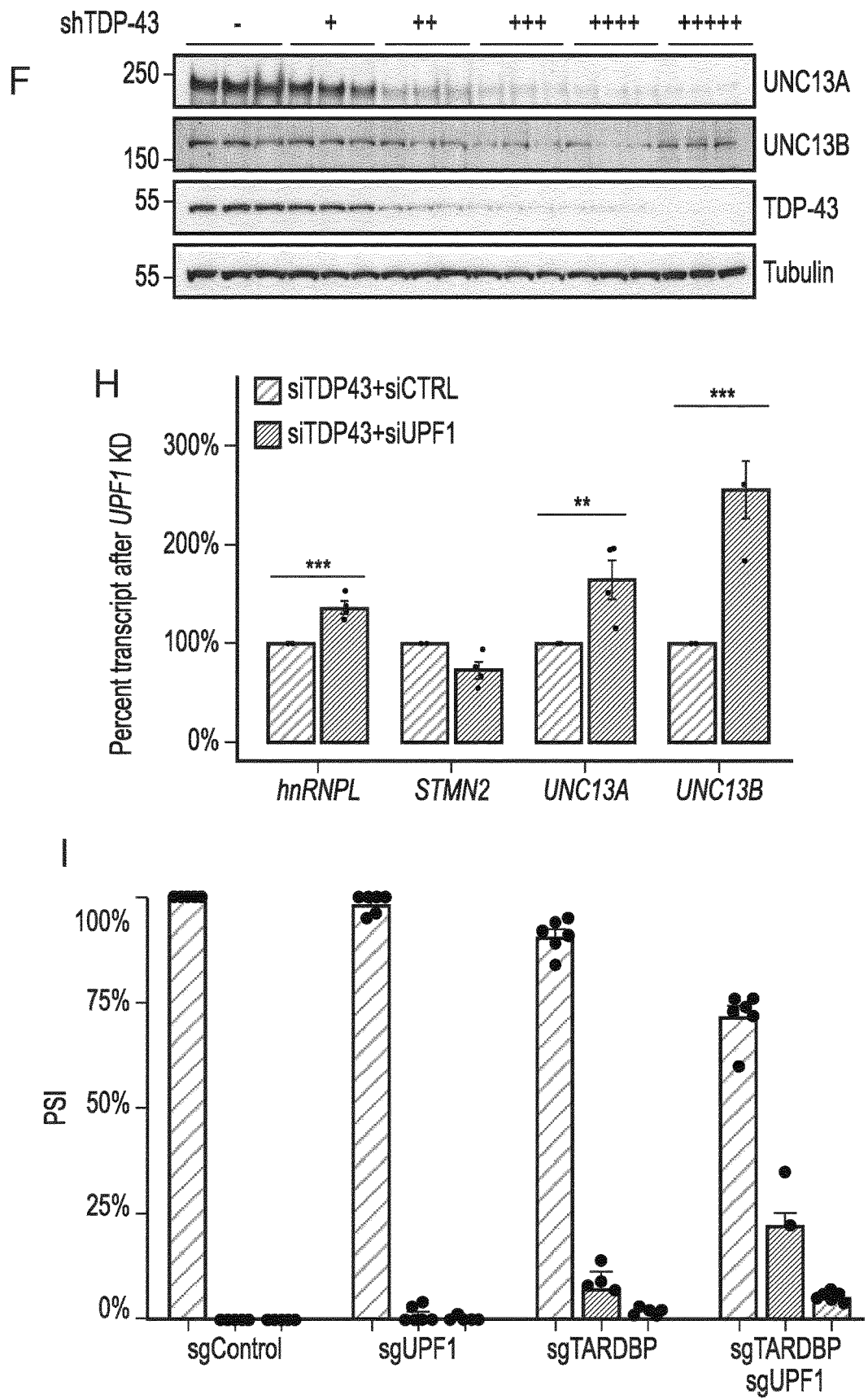
Figure 24:
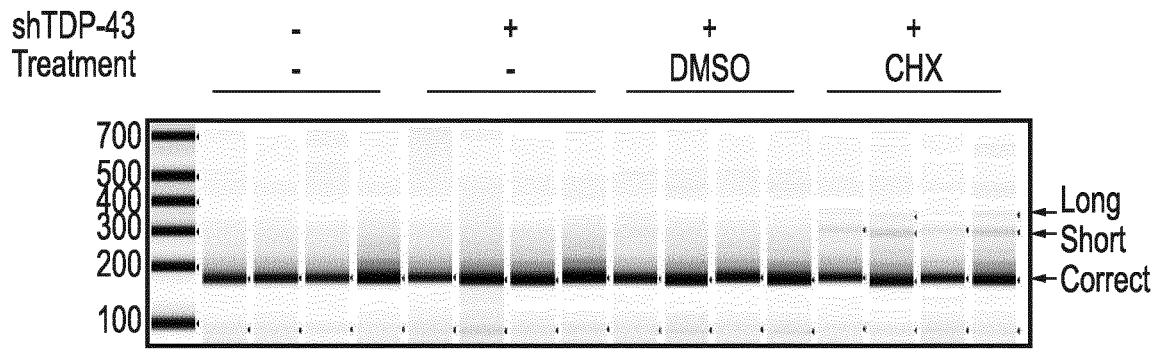
Figure 24:
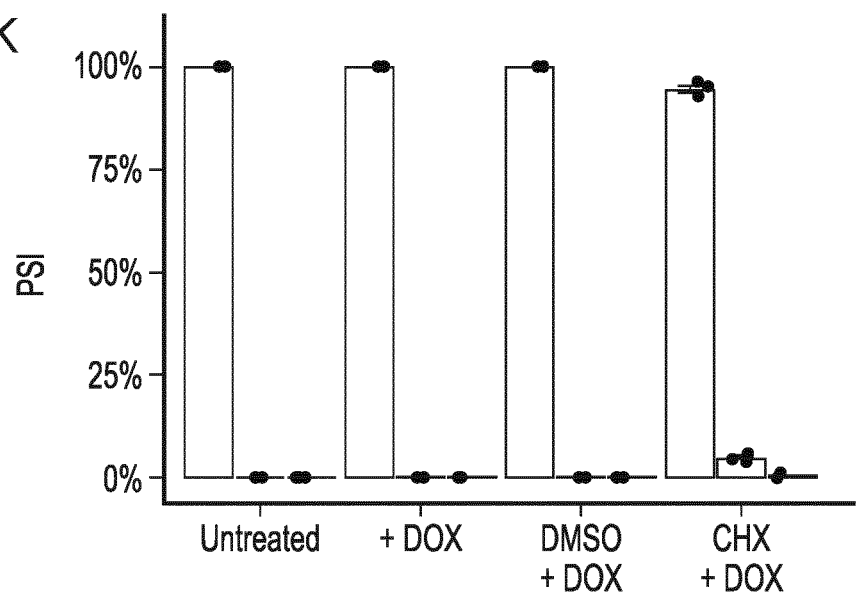
Figure 25:
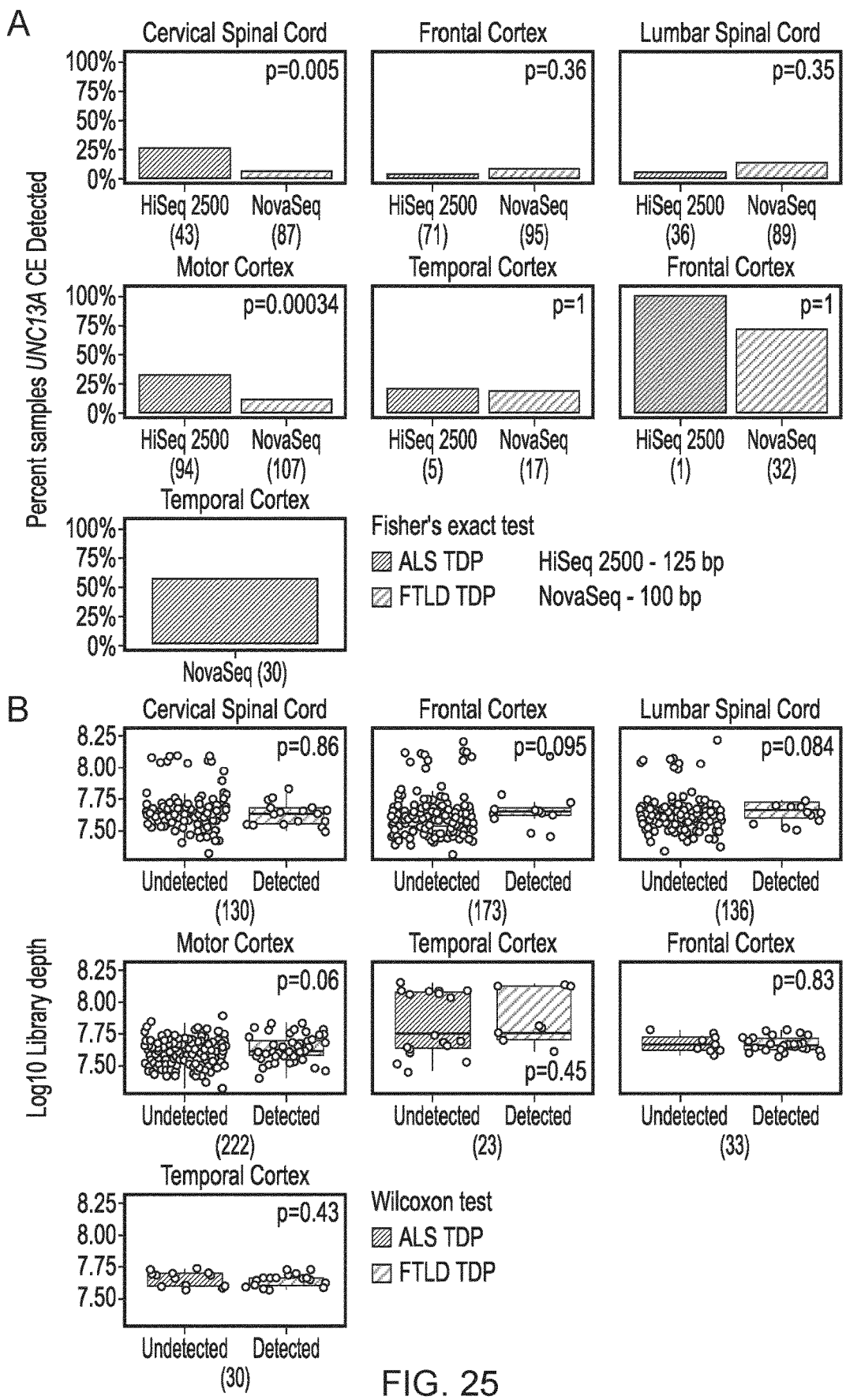
FIG. 25 shows the differences in sample technical factors where UNC13A CE was detected and undetected vary between cortical and spinal tissues. (A) Detection rate of UNC13A CE across tissues by RNA sequencing platform and read length. UNC13A CE was more likely to be detected in cervical spinal cord and motor cortex when sequenced on machines with 125 bp compared to 100 bp. (B) No significant differences in total RNA-seq library size (log 10scaled). (C) RNA integrity score (RIN) was significantly lower in motor and temporal cortices in samples where UNC13A was detected. (D) Cell type decomposition revealed that samples with UNC13A CE detected had a higher proportion of neurons in cervical and lumbar spinal cord, whereas in frontal, temporal, and motor cortex samples with UNC13A CE detected had a lower proportion of neurons, and in motor and temporal cortex samples with UNC13A CE detected had a higher proportion of astrocytes. Astrocy.—Astrocytes, Endothi.—Endothelial, Microgl—Microglia. Neur.—Neurons, Oligiodendr.—Oligodendrycytes. P-values shown are from Fisher's exact test (A) or Wilcoxon test (B-D). N tissue samples show below in brackets.
Figure 25:
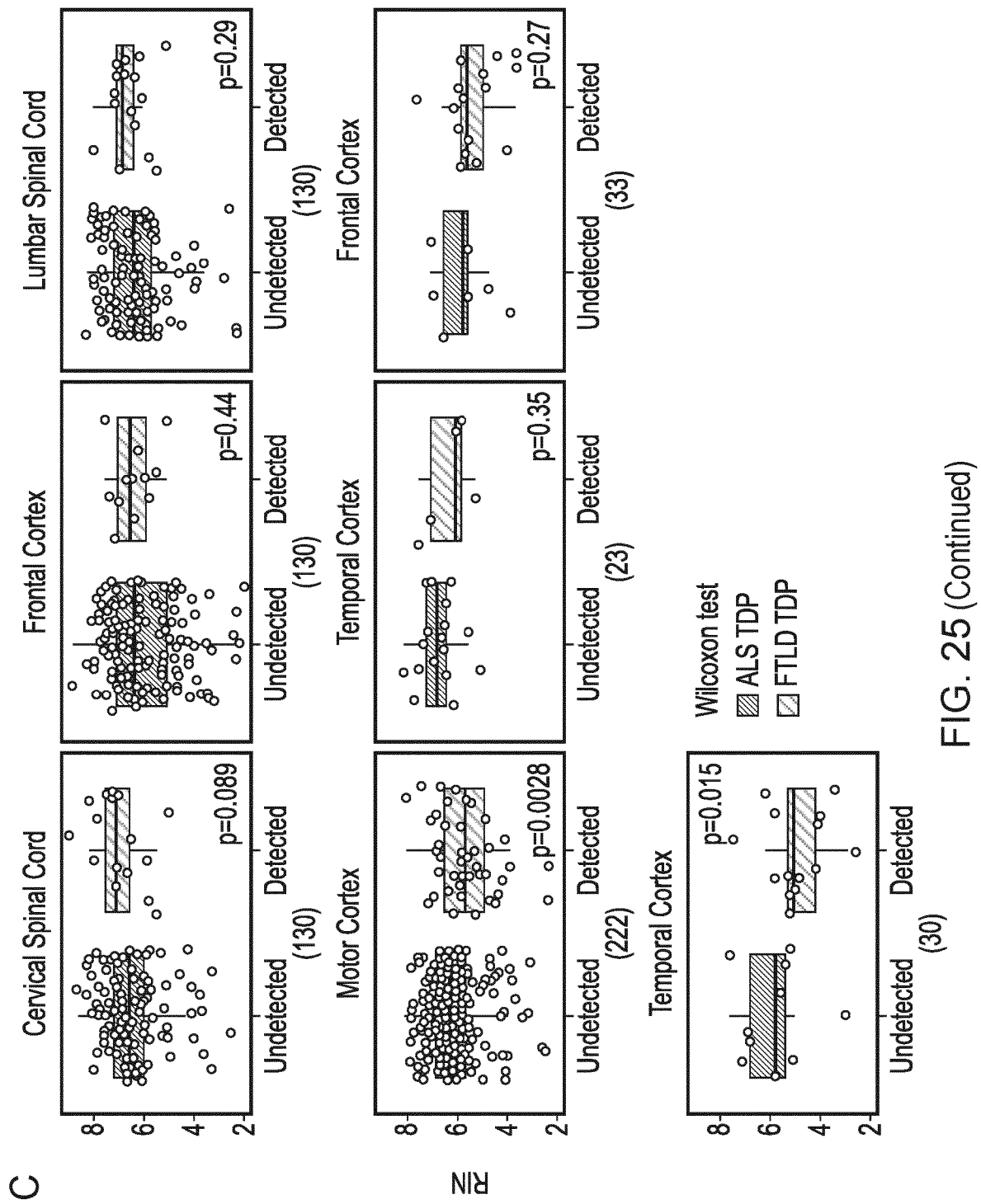
Figure 25:
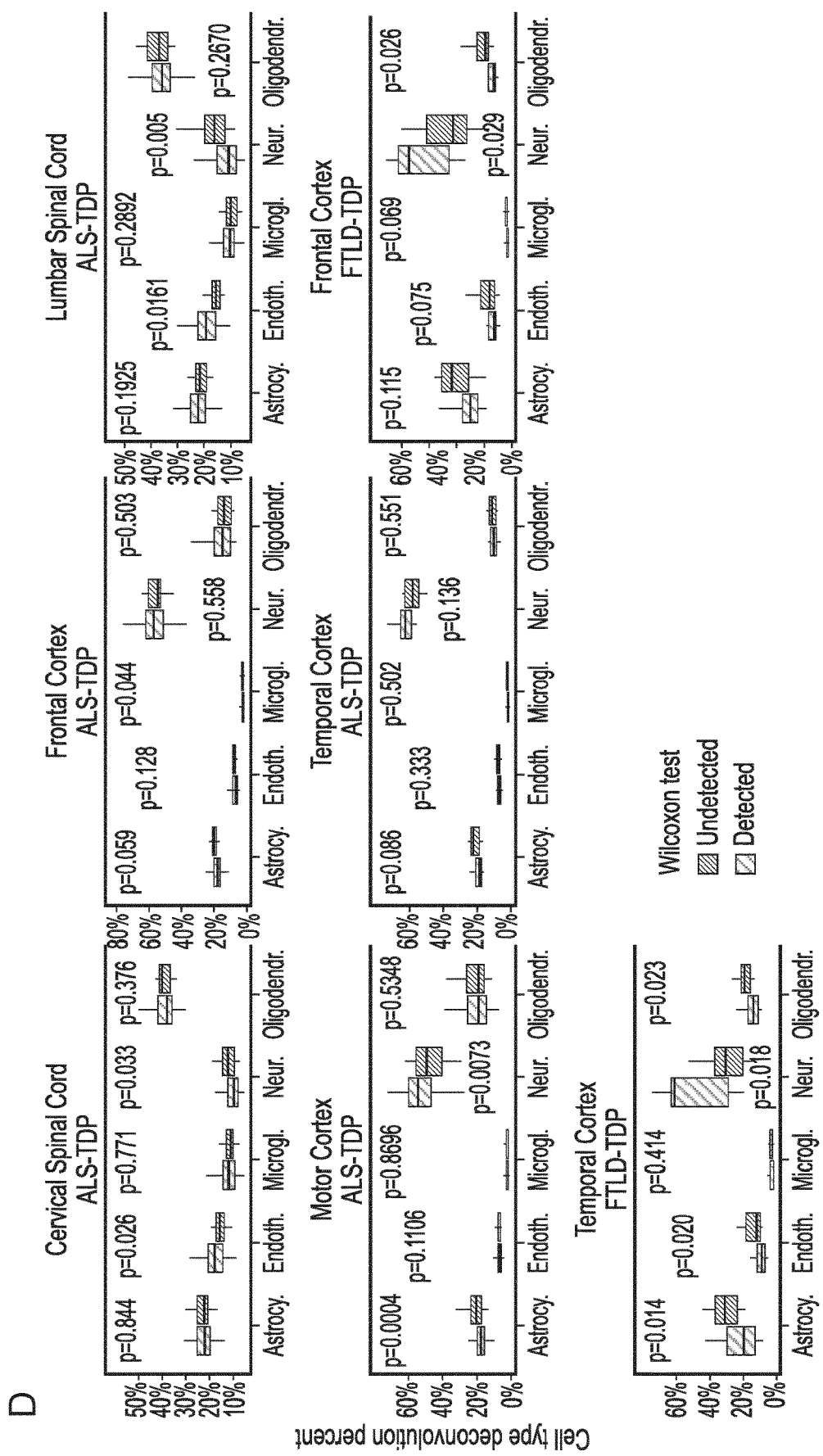
Figure 26:
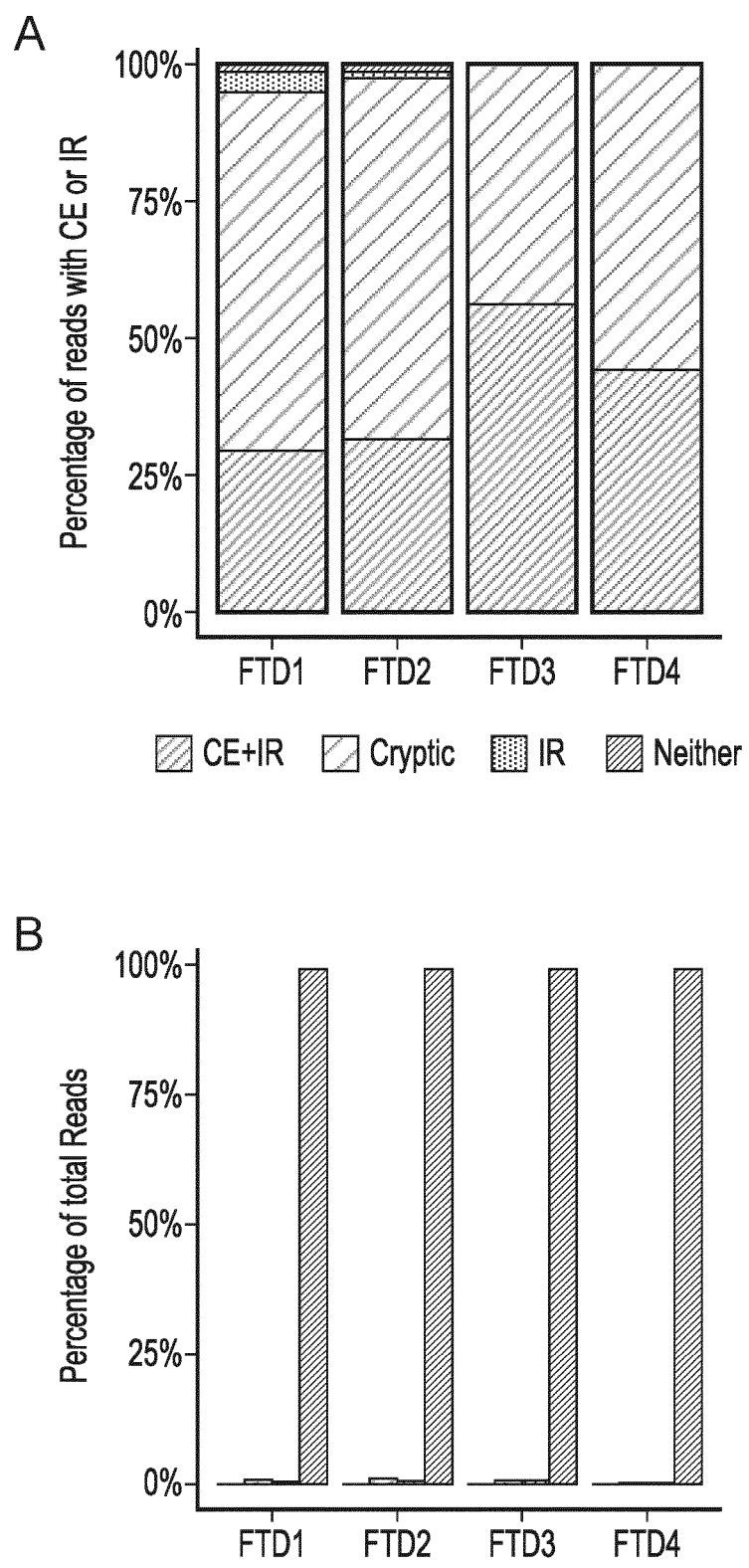
FIG. 26 shows the targeted long reads in FTLD frontal cortex show that UNC13A CE and IR occur independently in-vivo. (A) Percentage of targeted UNC13A long reads with TDP-43 regulated splice events that contain either both, CE, or IR in four in FTLD frontal cortices. (B) Percentage of all targeted UNC13A long reads in (A) containing either neither CE nor IR, both, or either CE or IR
Figure 27:
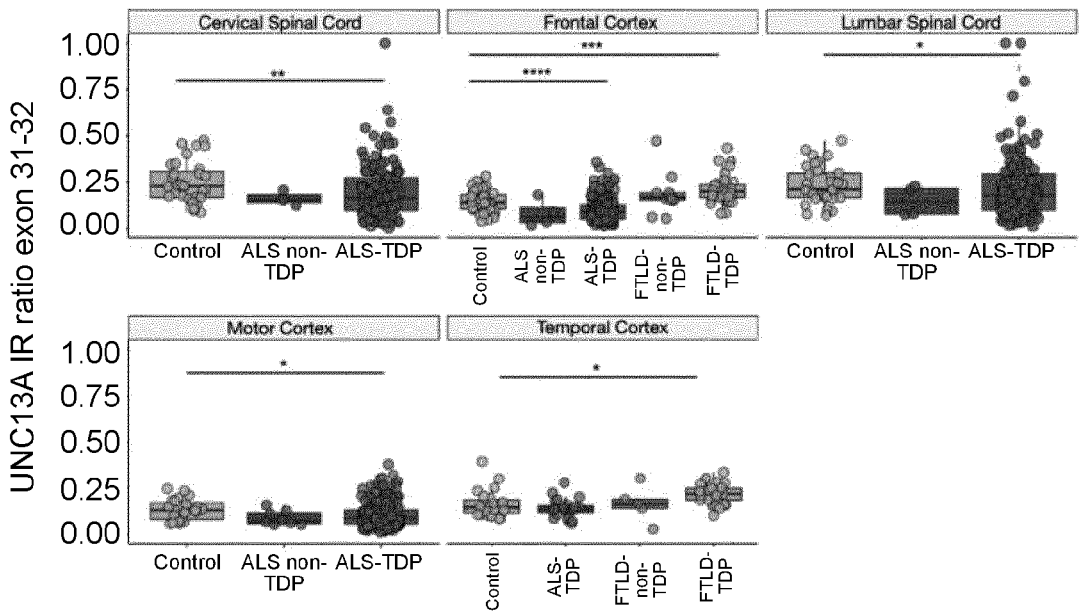
FIG. 27 shows that TDP-43 regulated UNC13A and UNC13B introns are expressed across human neuronal tissues in NYGC tissue samples. IR ratio in UNC13A exon 31-32 (A) and UNC13B exon 21-22 (B) across NYGC tissue samples. UNC13A IR was lower in ALS-TDP cases than in controls in cervical spinal, frontal and motor cortices, and higher in FTLD-TDP cases than controls in frontal and temporal cortices. This is believed to reflect differences in the effects of cell type composition in disease state. Wilcoxon test, significance levels reported as * ($p<0.05$)  ($p<0.01$) * ($p<0.001$) **** ($p<0.0001$).
Figure 27:
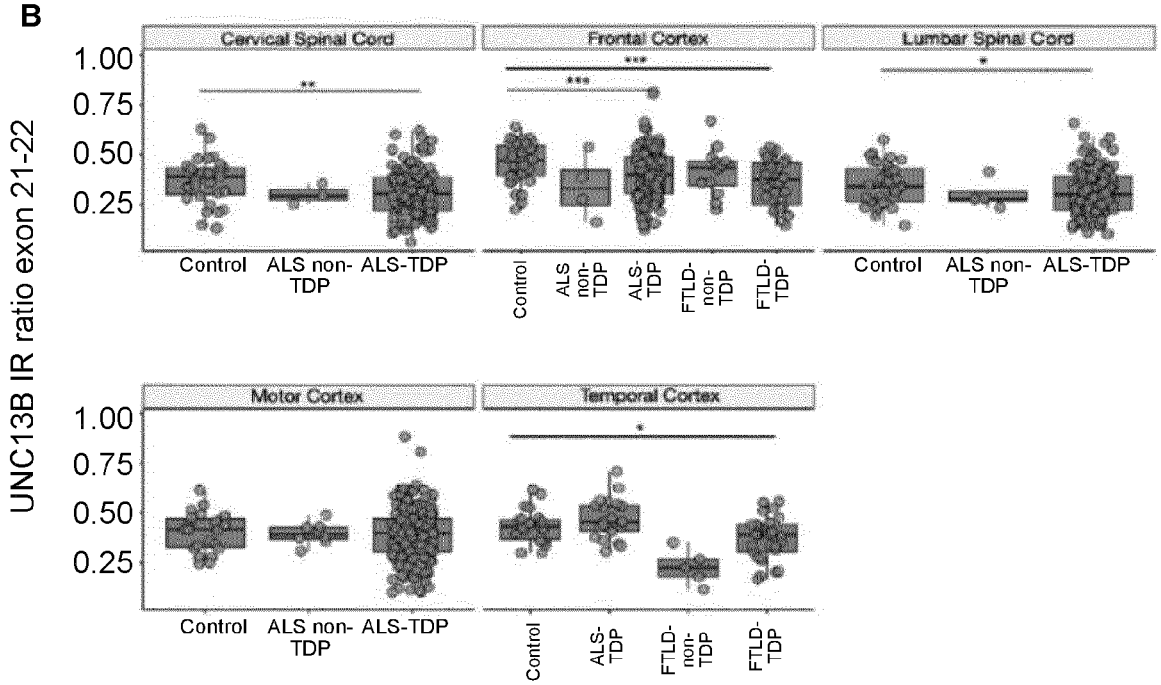
Figure 28:
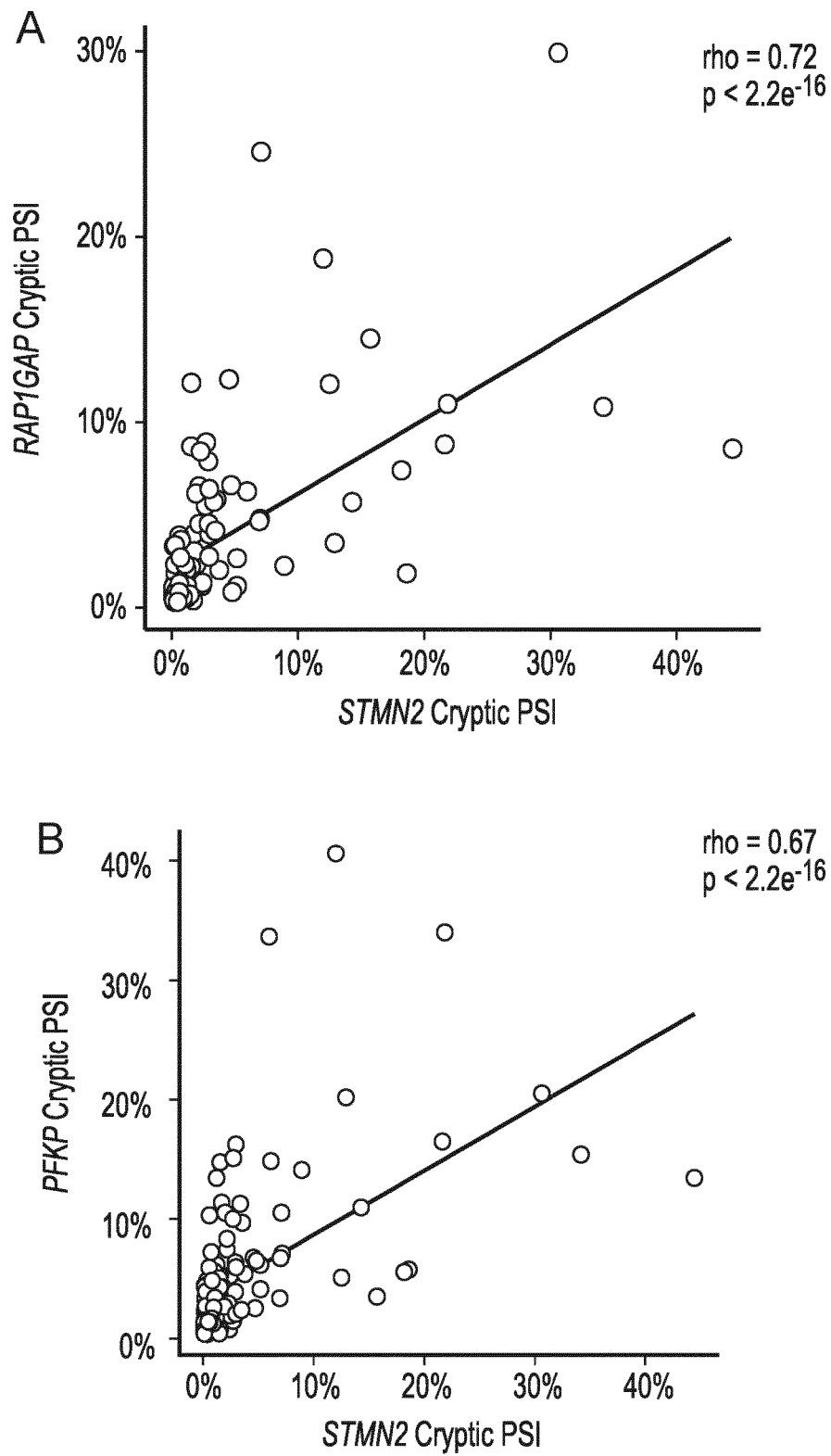
FIG. 28 shows STMN2 CE PSI correlates with TDP-43 regulated cryptics across NYGC RNA-seq dataset. (A, B) Previously described CE in RAP1GAP and PFKP regulated by TDP-439-11 correlate with STMN2 CE, suggesting the STMN2 CE PSI could act as a readout of TDP-43 function. Only samples with at least 30 spliced reads across each CE locus are included in correlations. Spearman's correlation.
Figure 29:
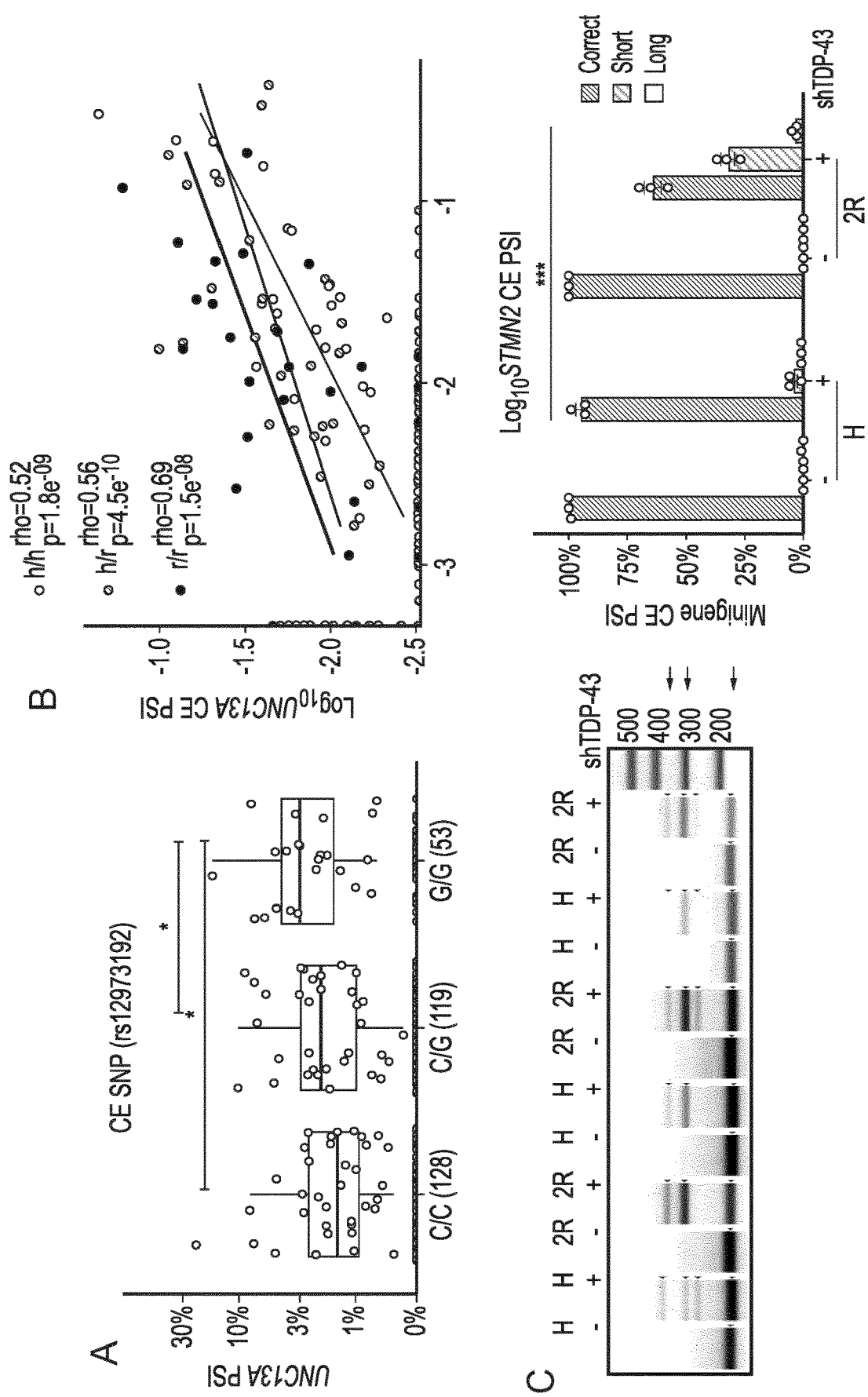
FIG. 29 shows UNC13A risk alleles increase UNC13A CE expression after TDP-43 depletion by altering TDP-43 binding affinity across the UNC13A CE-containing intron. (A) UNC13A CE PSI by genotype (Wilcoxon test) (B) Effect of CE or intronic SNP on the correlation between STMN2 and UNC13A CE PSI in ALS/FTD cortex in samples with at least 30 junction reads across the CE locus. Spearman's correlation. (C) Raw tape station gel images of UNC13A CE products in 2H and 2R minigenes and quantification of the PCR products (n=3); Two-way ANOVA (D) Raw tape station gel images corresponding to FIG. 4E. Two sets of primers were used to amplify either control (top row) or mutant minigene (bottom row). Left panel: single transfections were performed to ensure primer specificity. Right panel: three replicates of the double transfections; (E) Fractional changes at iCLIP peaks for 2R versus 2H minigene (mean and 75% confidence interval shown). Peaks that are within 50 nt of each SNP are highlighted. (F) Mean crosslink density around the exonic (top) and intronic (bottom) SNPs in the 2H and 2R minigenes, relative to the 5' end of minigene (error bars=standard deviation; dashed lines show SNP positions). (G, H) Individual TDP-43 E-scores for the CE (G) and intronic (H) heptamers for which there was data30 (I) Average change in E-value (measure of binding enrichment) across proteins for heptamers containing risk/healthy intronic SNP allele; TDP-43 is indicated. Significance levels reported as * ($p<0.05$)  ($p<0.01$)* ($p<0.001$) **** ($p<0.0001$).
Figure 29:
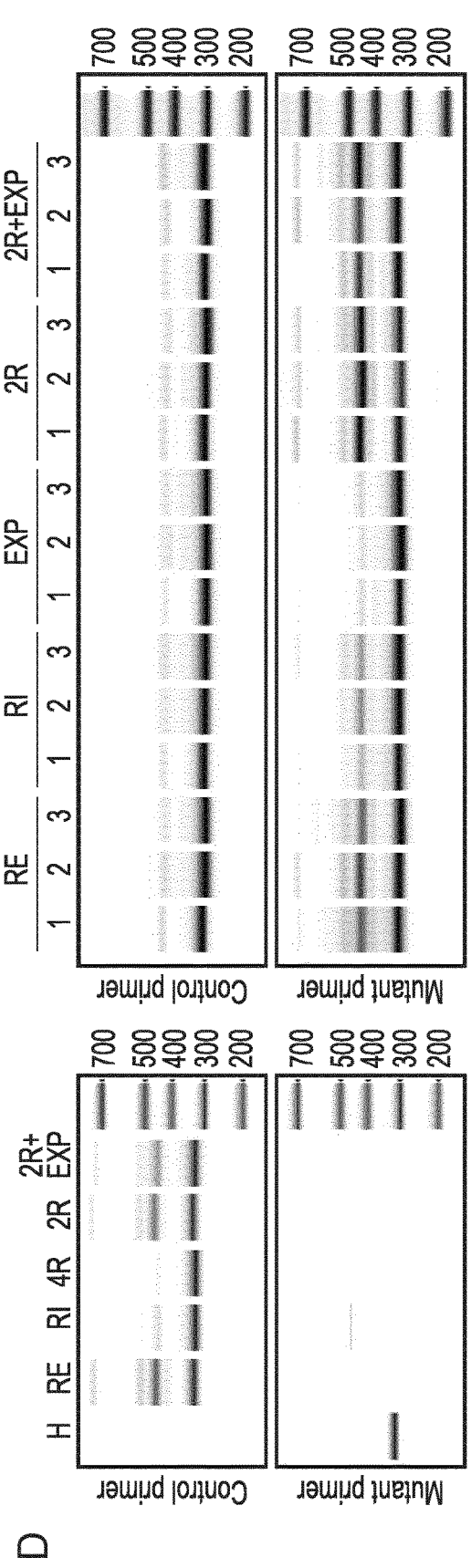
Figure 29:
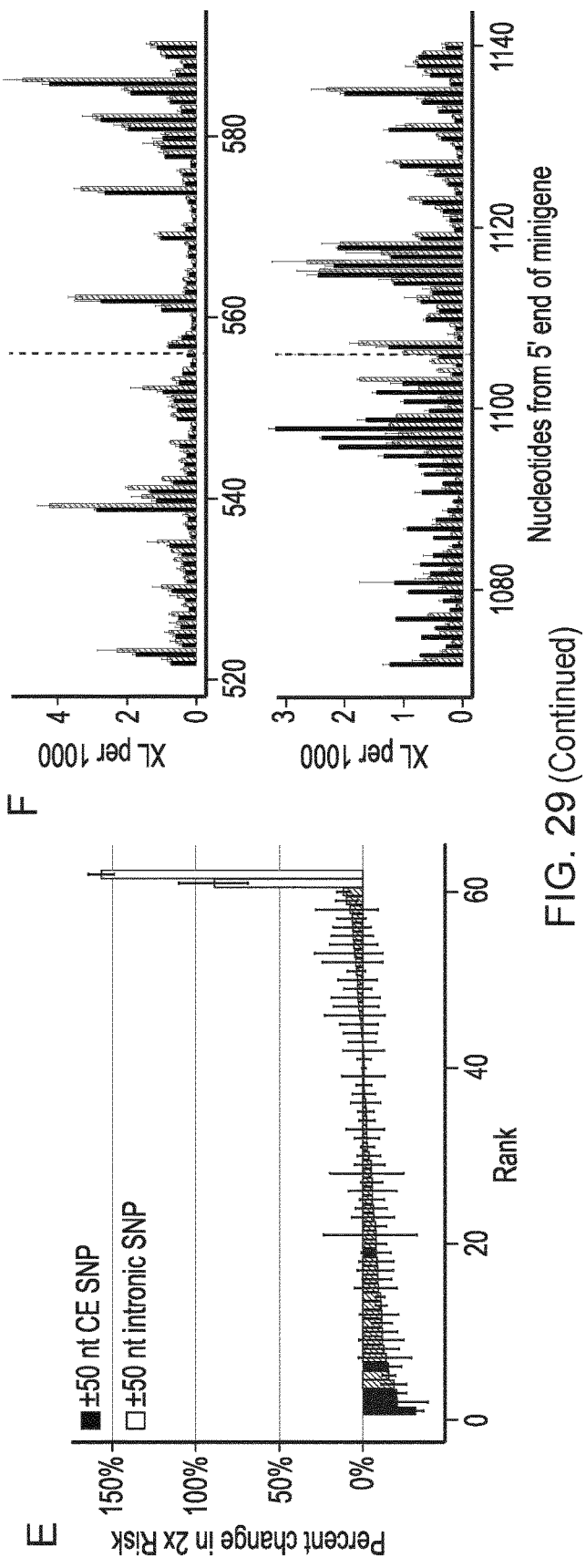
Figure 29:
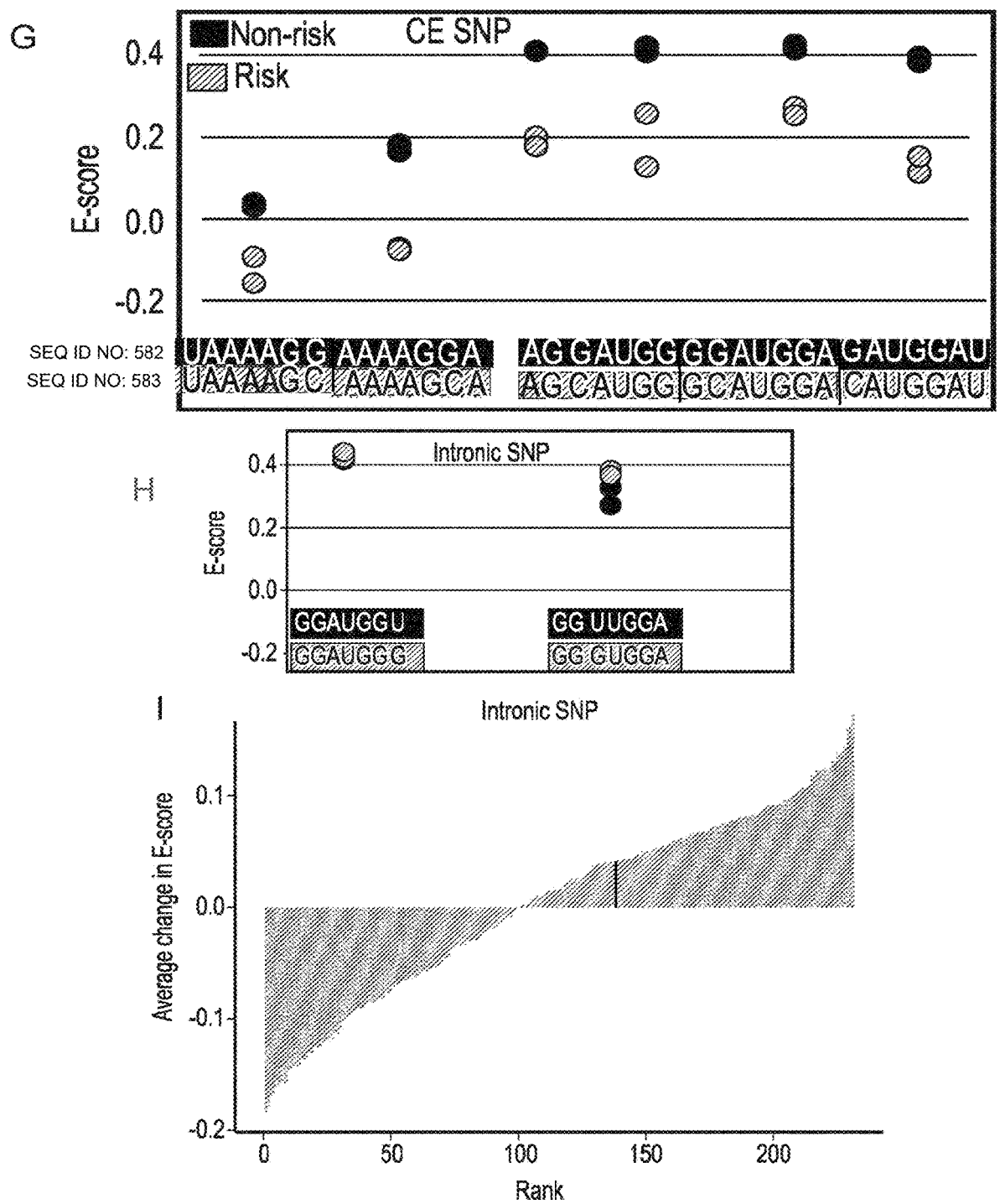
Figure 30:
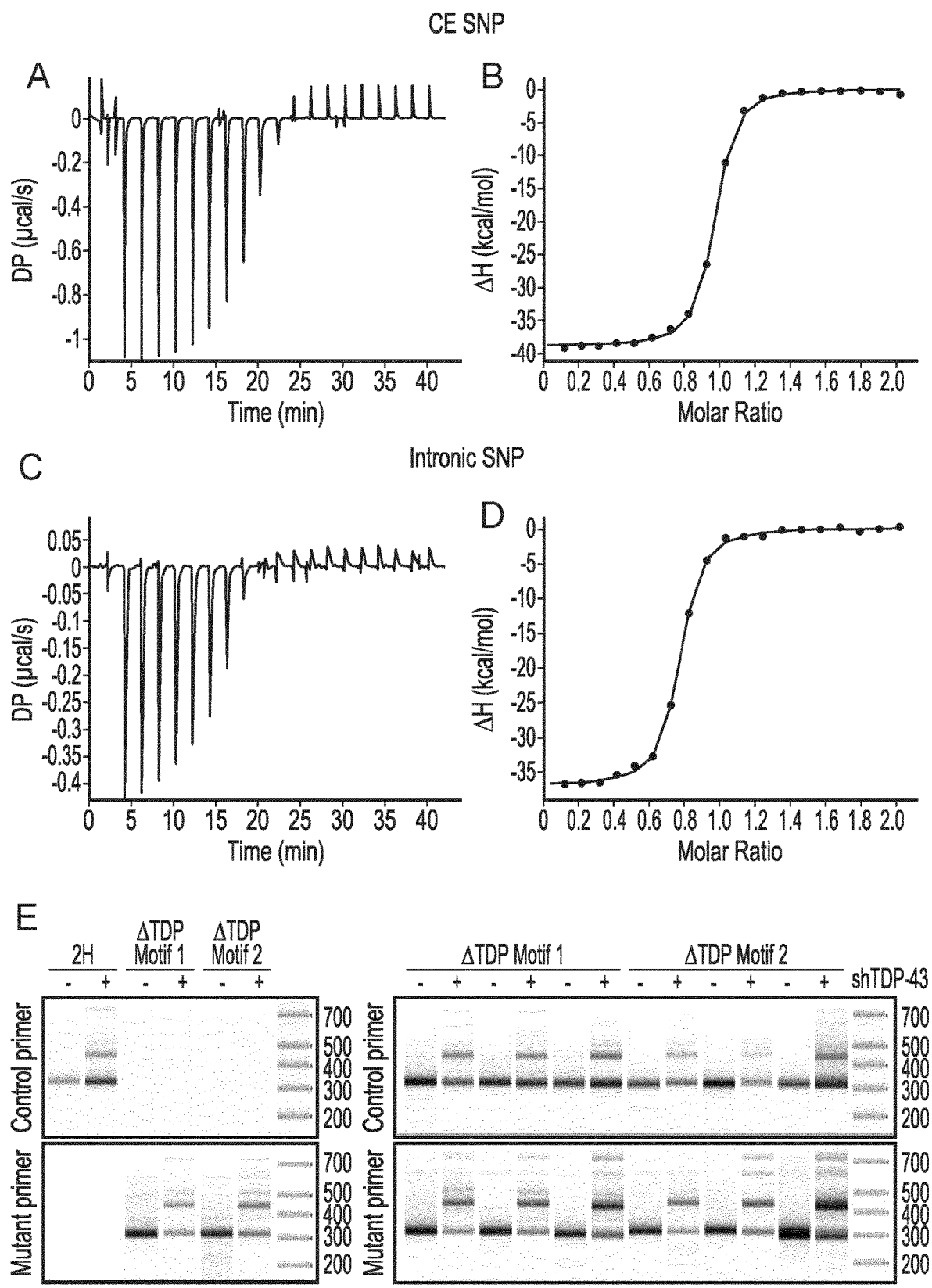
FIG. 30 shows binding of TDP-43 to SNP-containing intronic RNA. (A-D) ITC measurement of the interaction of TDP-43 with 14-nt RNA containing the CE SNP (A, B) and intronic SNP (C, D) healthy sequence. A representative data set is reported, with raw data (A, C) and integrated heat plot (B, D). Circles indicate the integrated heat, the curve represents the best fit. (E) Raw Tapestation gel images corresponding to FIG. 4J. For each experiment, two RT-PCRs were performed with a different primer set which either amplified a control minigene (top row; minigene 2H) or a mutant minigene (bottom row). Left: single transfections to ensure specificity of primers for either the control or the mutant minigene. Right: Three replicates of double transfections with control minigene 2H and either mutant minigene.
Figure 31:
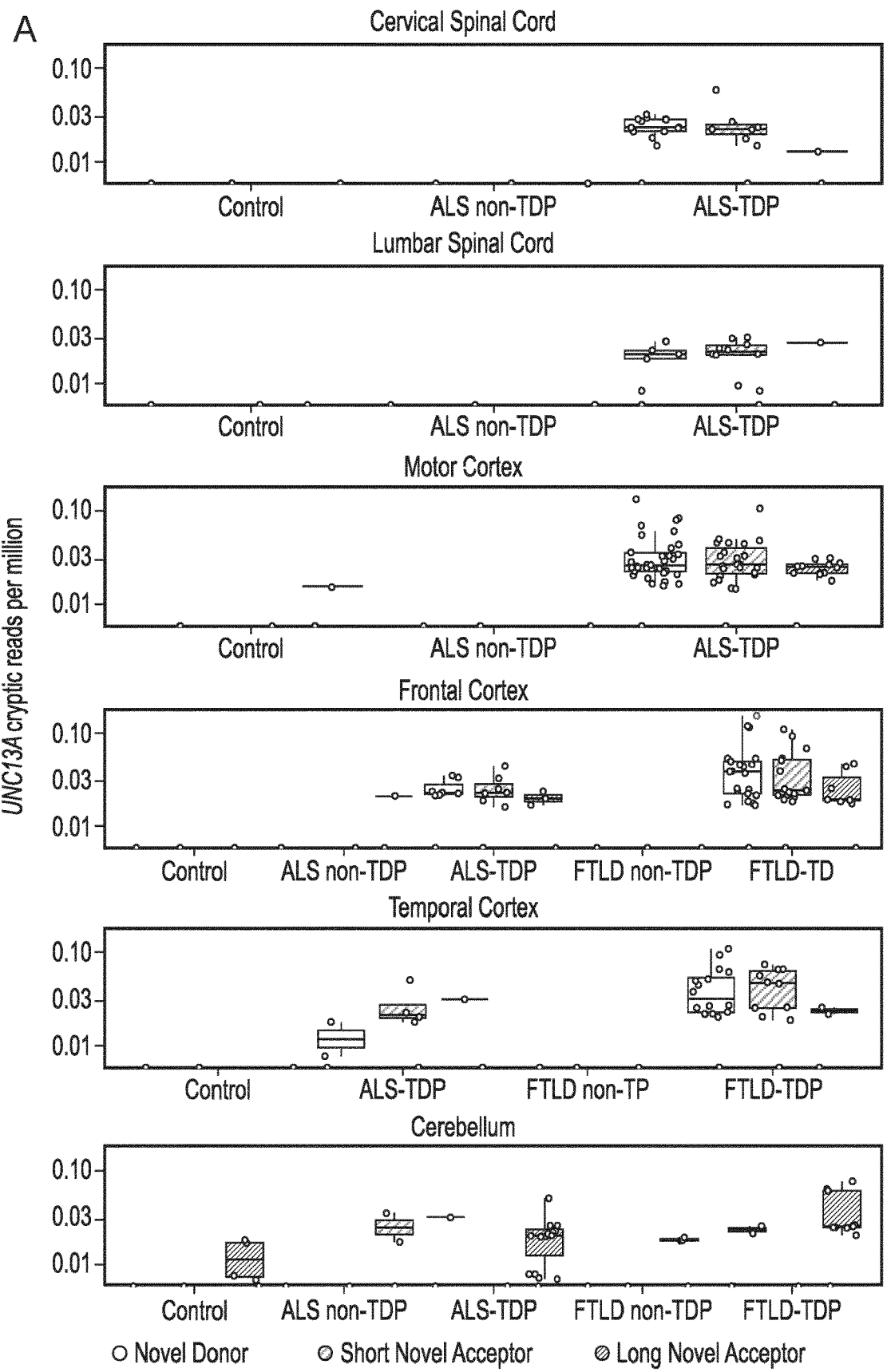
FIG. 31 shows one of the splice junctions for UNC13A CE overlaps with an unannotated exon expressed in control cerebellum (A) Expression of splice junction reads supporting the UNC13A CE across tissues and disease subtypes. Junction counts are normalized by library size in millions (junctions per million). The long novel acceptor junction is expressed across all disease subtypes in the cerebellum. (B) Example RNA-seq traces from IGV showing UNC13A cerebellar exon which shares the long novel acceptor junction as the UNC13A CE.
Figure 31:
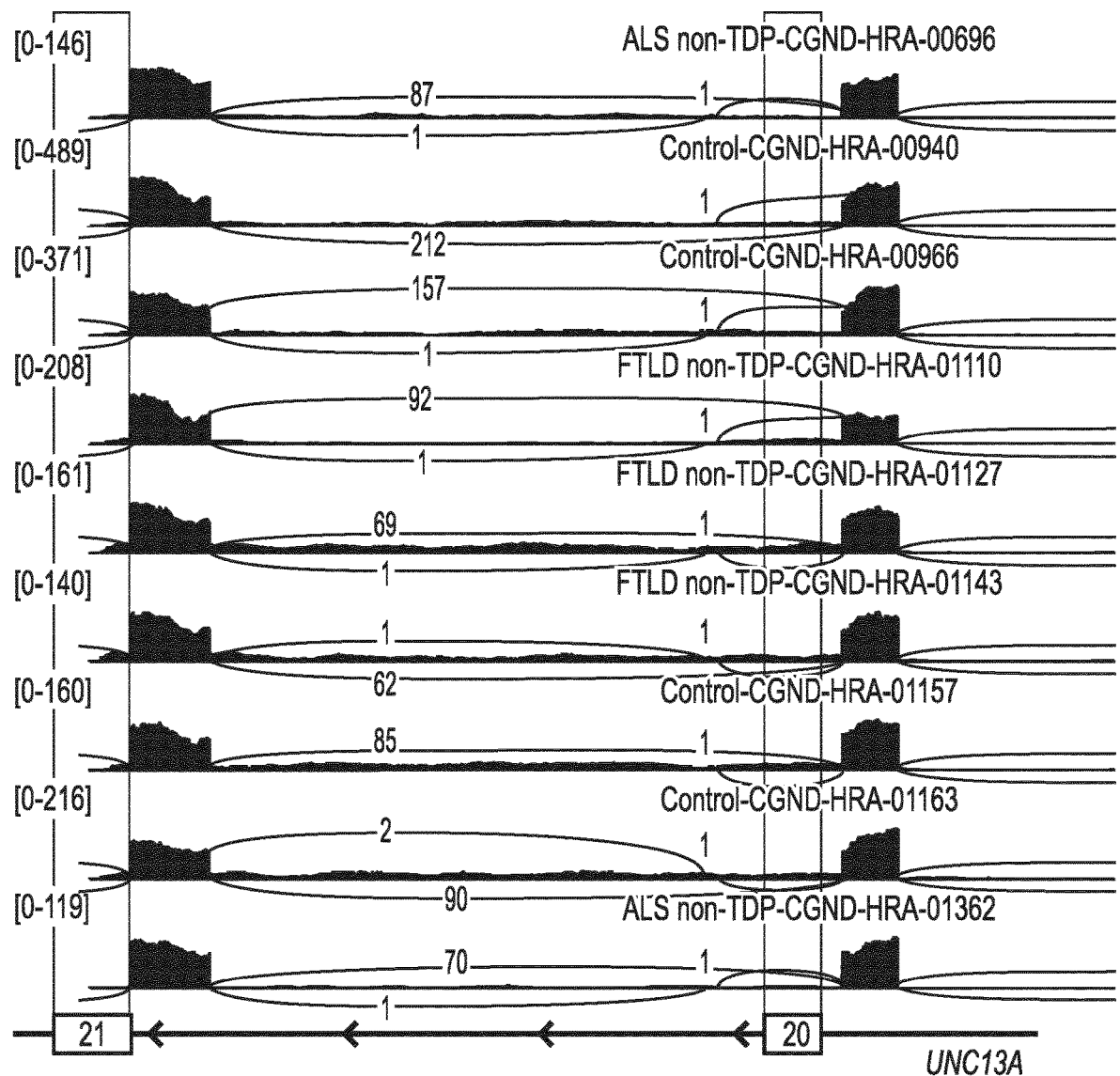

A schematic is provided in FIG. 17, which summarizes the strength of rescue of various ASOs which bind to the UNC13A cryptic exon and flanking intronic regions. The correct splicing event was rescued when ASOs with an asterisk (*) where used in combination with ASOs targeting the short acceptor or donor.

Furthermore, the rescue effect was effective both against target sequences featuring either variant of the rs12973192 SNP: the cell line used for these experiments expresses both alleles, and thus the large (50% to more than 90%) rescue observed would only be possible if ASOs block cryptic exon inclusion for transcripts with both variants From these data it has been determined that through a cryptic exon, TDP-43 depletion in cells and patient brains induces a reduction of UNC13A transcripts and proteins, which are important players in synaptic function. Further, the UNC13A CE discovered is directly overlaps with one SNP and is in the same annotated intron as a second SNP, both of which have been identified in ALS and FTD GWAS: the risk variants of these SNPs increase the level of cryptic exon inclusion in vitro and in patients, thus implying that the CE directly contributes to ALS/FTD. These variants are associated with a more aggressive disease progression, supporting that increased inclusion of this CE and therefore a larger decrease in UNC13A protein, makes disease more aggressive. Novel therapeutics have been designed that target the UNC13A CE in order to inhibit inclusion of the UNC13A cryptic exon in the mature mRNA.

Figure 32:
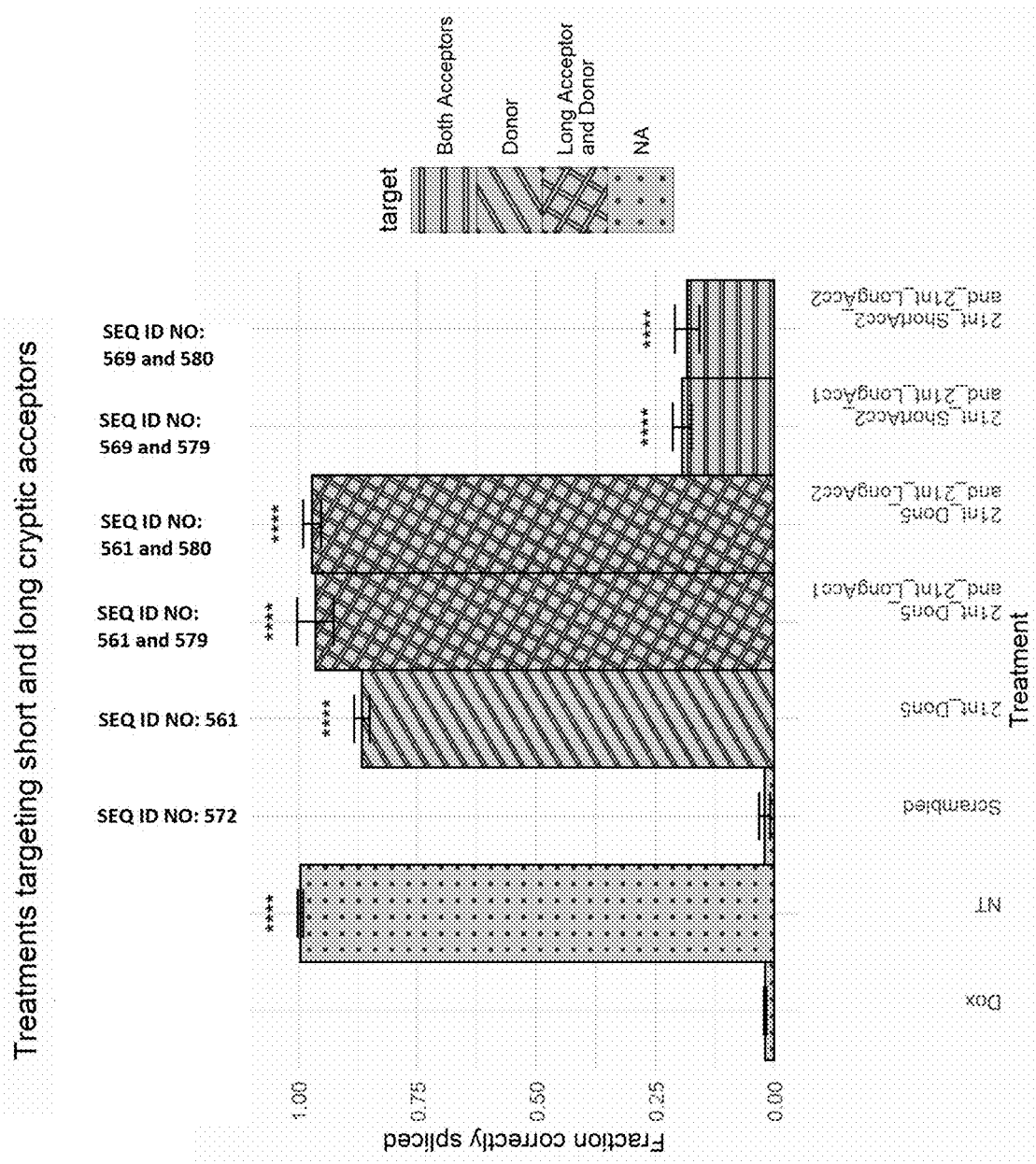
FIG. 32 shows ASO treatments targeting short and long cryptic acceptors.

Combining ASOs targeting the acceptor splice site of the long CE with ASOs targeting either the acceptor splice site of the short CE, or the donor splice site of the CE, each at half of the normal concentration, also showed rescue (see FIG. 32).

These data suggest that targeting the acceptor splice site of the long CE together in combination with targeting the donor splice site or acceptor splice site of the short CE has a synergistic effect on positive rescue.

TABLE 6

Combinatorial targeting

| Treatment | Cell line | Seq IDs of donor targeting ASO | Seq IDs of long acceptor targeting ASO | Seq IDs of short acceptor targeting ASO |
|---|---|---|---|---|
| 21mer LNA donor + 21mer LNA long acceptor | SK-N-DZ | SEQ ID NO: 561 | SEQ ID NO: 579 or SEQ ID NO: 580 | n/a |
| 21mer LNA donor + 21mer LNA short acceptor | SK-N-DZ | SEQ ID NO: 560 | n/a | SEQ ID NO: 570 |
| 21mer LNA short acceptor + 21mer LNA long acceptor | SK-N-DZ | n/a | SEQ ID NO: 579 or SEQ ID NO: 580 | SEQ ID NO: 569 |

Example 8: Rescue in SHSY5Y Cells by Donor and Acceptor Targeting ASOs

To assess the ability of different ASOs to induce the correct splicing event in disease-state cells, we transfected ASOs into SHSY5Y cells with doxycycline inducible TDP-43 knockdown and assessed endogenous UNC13A splicing via reverse transcription PCR (RT-PCR). These human neuroblastoma cells have served as a model for neurodegenerative disorders are thus a suitable model for this study.

Figure 33:
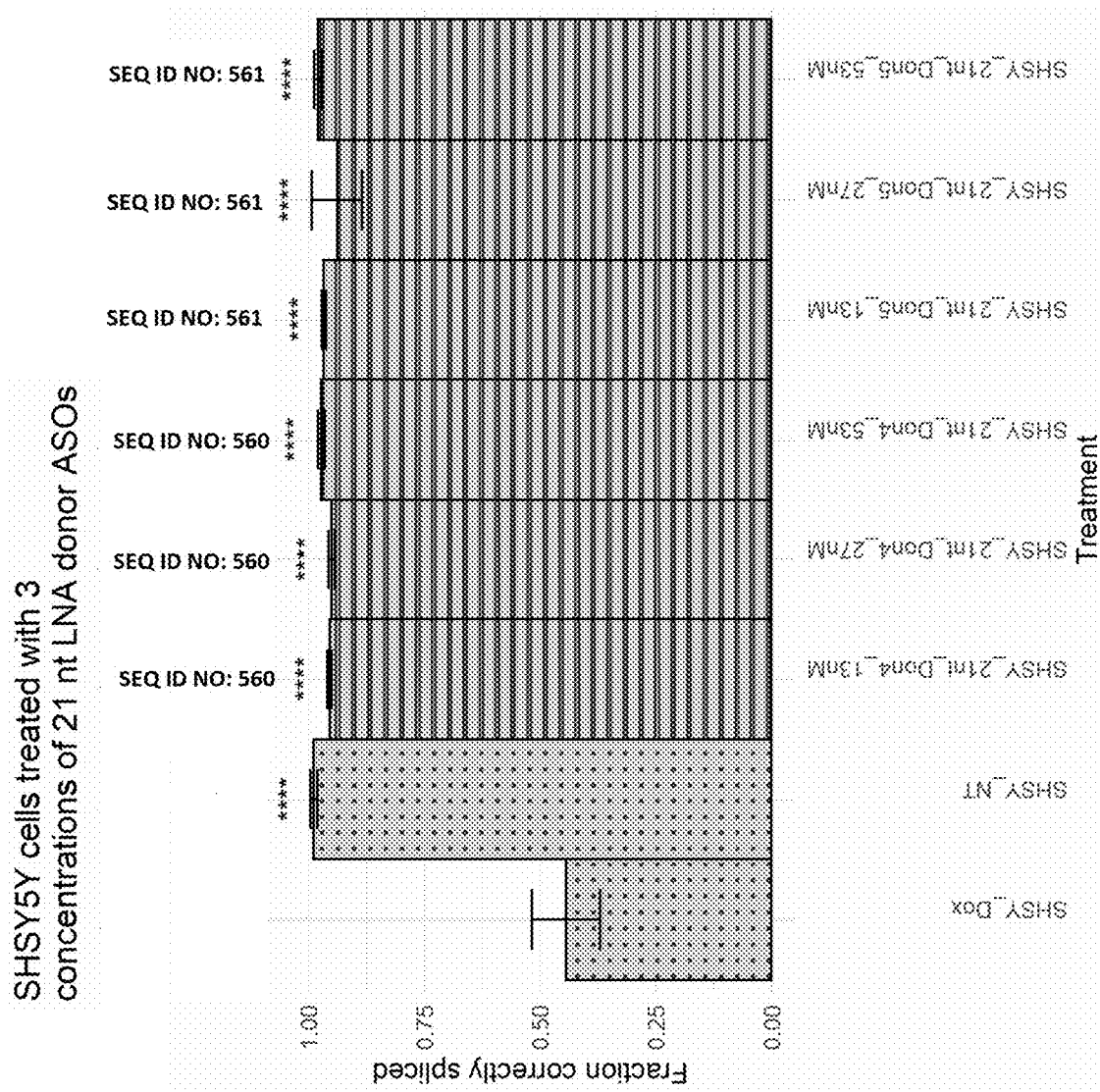
FIG. 33 shows SHSY5Y cells treated with 3 concentrations of 21 nt LNA donor ASOs as described herein.

We found that ASOs targeting donor splice site can rescue the splicing in SHSY5Y cells (see FIG. 33).

Example 9: Cell Culture and Differentiation of Human Induced Pluripotent Stem Cells into Neurons Human induced pluripotent stem cell (hiPSC) line, WTC11 harboring an inducible neurogenin 2 transgene (Ngn2), and its TDP43 knockdown counterparts (n=4), were fully differentiated to glutamatergic "cortical-like" i3Neurons.

Example 10: Quantification of TARDBP, UNC13A, and UNC13B Using Quantitative Proteomics SP3 protein extraction was performed to extract intercellular proteins 1. Briefly, we harvested and lysed 2 million neurons per biological replicate in a very stringent buffer (50 mM HEPES, 50 mM NaCl, 5 mM EDTA 1% SDS, 1% Triton X-100, 1% NP-40, 1% Tween 20, 1% deoxycholate and 1% glycerol) supplemental with complete protease inhibitor cocktail at 1 tablet/10 ml ratio. The cell lysate was reduced by 10 mM dithiothreitol (30 min, 60° C.) and alkylated using 20 mM iodoacetamide (30 min, dark, room temperature). The denatured proteins were captured by hydrophilic magnetic beads, and tryptic on-beads digestion was conducted for 16 hours at 37° C. We injected 1 μg resulting peptides to a nano liquid chromatography (LC) for separation, and subsequently those tryptic peptides were analyzed on an Orbitrap Eclipse mass spectrometer (MS) coupled with a FAIMS interface using data dependent acquisition (DDA) and data-independent acquisition (DIA). The peptides were separated on a 120-minute LC gradient with 2-35% solvent B (0.1% FA, 5% DSMO in acetonitrile), and FAIMS's compensation voltages were set to −50, −65 and −80. The DDA and DIA MS raw files were searched against Uniprot-Human-Proteome_UP000005640 database with 1% FDR using Proteome Discoverer (v2.4)2 and Spectronaut (v14.1)3, respectively. The raw intensity of quantified peptides was normalized by total peptides intensity identified in the same sample. The DDA quantified TARDBP- and UNC13A-derived unique and sharing peptides were parsed out and used for protein quantification. Specifically, we visualized and quantified the unique peptides of UNC13A using their MS/MS fragment ion intensity acquired by DIA.

Example 11: RNA-Sequencing, Differential Gene Expression and Splicing Analysis

Public data for Klim was downloaded through Gene Expression Omnibus (GEO) series accession number: GSE121569, Appocher: GEO series accession number: GSE97262.

Samples were quality trimmed using Fastp with the parameter "qualified_quality_phred: 10" and aligned to the GRCh38 genome build using STAR (v2.7.0f) with gene models from GENCODE v31. Gene expression was quantified using FeatureCounts using gene models from GENCODE v31. Any gene which did not have an expression of at least 0.5 counts per million (CPM) in more than 2 samples was removed. For differential gene expression analysis, all samples were run in the same manner using the standard DESeq2 workflow without additional covariates, with the exception of the Klim hMN dataset, where we included the day of differentiation. Differential expression was defined at a Benjamini-Hochberg false discovery rate <0.1 Alignment pipeline available here: www.github.com/frattalab/rna_seq_snakemake.

Differential splicing was performed using MAJIQ (v2.1) using the GRCh38 reference genome. A threshold of 0.1 ΔPSI was used for calling the probability of significant change between groups. The results of the deltaPSI module were then parsed using custom R scripts to obtain a PSI and probability of change for each junction. Splicing pipeline available here: www.github.com/frattalab/splicing.

Example 12: ALS GWAS Data

Harmonized summary statistics for the latest ALS GWAS (Nicolas, 2018, accession GCST005647) were downloaded from the NHGRI-EBI GWAS Catalog (Buniello, MacArthur et al., 2019). Locus plots were created using LocusZoom.

Example 13: Analysis of New York Genome Center ALS Consortium Dataset

Patients with FTD were classified according to a pathologist's diagnosis of FTD with TDP-43 inclusions (FTLD-TDP), tau inclusions (FTLD-tau), or FUS inclusions (FTLD-FUS). ALS samples were divided into the following subcategories using the available Consortium metadata: ALS with or without reported SOD1 mutations (ALS-TDP and ALS-SOD1); ALS with frontotemporal dementia (ALS-FTLD); and ALS with AD (ALS-AD). All non-SOD1 ALS samples were grouped as "ALS-TDP" in this work for simplicity, although reporting of postmortem TDP-43 inclusions was not systematic and therefore not integrated into the metadata. Confirmed TDP-43 pathology postmortem was reported for all FTLD-TDP samples.

The NYGC ALS dataset contains 377 patients with 1349 neurological tissue samples, including non-neurological disease controls, FTLD, ALS, FTD with ALS (ALS-FTLD), or ALS with suspected Alzheimer's disease (ALS-AD). FTLD cases were further categorized based on neuropathological diagnosis, those with TDP-43 aggregates, FTLD-TDP-A, B, C or those with FUS or TAU aggregates. As the presence of TDP-43 proteinopathy has not been systematically assessed in the ALS cases, we separated patients into those with SOD1 or FUS mutations, which are presumed not to have TDP-43 proteinopathy, and all others.

Sample processing, library preparation, and RNA-seq quality control are known in the art have been extensively described in previous papers. In brief, RNA was extracted from flash-frozen postmortem tissue using TRIzol (Thermo Fisher Scientific) chloroform, and RNA-Seq libraries were prepared from 500 ng total RNA using the KAPA Stranded RNA-Seq Kit with RiboErase (KAPA Biosystems) for rRNA depletion. Pooled libraries (average insert size: 375 bp) passing the quality criteria were sequenced either on an Illumina HiSeq 2500 (125 bp paired end) or an Illumina NovaSeq (100 bp paired end). The samples had a median sequencing depth of 42 million read pairs, with a range between 16 and 167 million read pairs.

Samples were uniformly processed, including adapter trimming with Trimmomatic and alignment to the hg38 genome build using STAR (2.7.2a) with indexes from GENCODE v30. Extensive quality control was performed using SAMtools and Picard Tools to confirm sex and tissue of origin.

Uniquely mapped reads within the UNC13A locus were extracted from each sample using SAMtools. Any read marked as a PCR duplicate by Picard Tools was discarded. Splice junction reads were then extracted with RegTools using a minimum of 8 bp as an anchor on each side of the junction and a maximum intron size of 500 kb. Junctions from each sample were then clustered together using LeafCutter with relaxed junction filtering (minimum total reads per junction=30, minimum fraction of total cluster reads=0.0001). This produced a matrix of junction counts across all samples.

Example 14: Generation of Stable TDP-43 Knockdown Cell Line

SK-N-DZ cells with doxycycline-inducible TDP-43 knockdown were generated by transducing SK-N-DZ cells with a SmartVector lentivirus (V3IHSHEG_6494503) containing a doxycycline-inducible shRNA cassette for TDP-43. Transduced cells were then selected with puromycin (1 μg/mL) for one week. Pooled TDP-43 knockdown SK-N-DZ cells were then plated as single cells and expanded to obtain a clonal population, to then select only the clone showing the strongest TDP-43 knockdown for subsequent stages.

Example 15: Depletion of TDP-43 from Immortalized Human Cell Lines

SK-N-DZ cells were grown in DMEM/F12 containing Glutamax (Thermo) supplemented with 10% FBS (Thermo) and 1% PenStrep (Thermo). To induce shRNA against TDP-43, cells were treated with 5 μg/mL Doxycycline Hyclate (Sigma D9891). Antisense oligonucleotide treatment was performed after 3 days and, after a further 3 days, cells were harvested for RNA.

Example 16: ASO Synthesis

ASO synthesis ASOs were ordered from Integrated DNA Technologies. Each featured a 100% phosphorothioate modified backbone, and either partial LNA substitutions (33-50%) or 100% 2'-O-methyl sugar substitutions.

Example 17: ASO Treatment

In some embodiments as described, prior to transfection, 70-90% confluent cells were plated on 12-wells plates, with 3 replicates per condition. For each well, 6 µL of Lipofectamine RNAiMax (Thermo Fisher Scientific) and 4 µL of 10 µM ASO were diluted in 150 µL Optimem (Thermo Fisher Scientific) and, after 5 minutes incubation at room temperature, the mix was transferred into the well followed by 600 µL of growing medium (DMEM/F12+Glutamax) with 5 ug/mL doxycycline. For treatments in which a mixture of ASOs was used, 2 µL of each 10 µM ASO was used (4 µL total). For SHSY5Y cells, 4 µL of 2.5 µM, 5 µM or 10 µM ASO were diluted for a final concentration of 13, 27 or 53 nM.

Example 18: RNA Extraction and Reverse Transcription

RNA extraction from SK-N-DZ cells was performed using the RNeasy kit (Qiagen) following the manufacturer's protocol including the on-column DNA digestion step. After measuring RNA concentrations by Nanodrop, 1000 ng of RNA was used for reverse transcription. First strand cDNA synthesis was performed with RevertAid (Thermo K1622) following the manufacturer's protocol with random hexamer primers.

Example 19: PCR

The UNC13A transcript was amplified either via a nested approach or with a single primer set. For the nested approach, the cDNA was first amplified for 12 cycles using primers: SEQ ID NO: 573 Nest1_F: GACATCAAATCCCGCGTGAA; and SEQ ID NO: 574 Nest1_R: CATTGATGTTGGCGAGCAGG. This was followed by 24 cycles with primers: SEQ ID NO: 575 Nest2_F: CAGACGATCATTGAGGTGCG; and SEQ ID NO: 576 Nest2_R: ATACTTGGAGGAGAGGCAGG. For the single primer approach, cDNAs were amplified using primers: SEQ ID NO: 577 Single_F: CAAGCGAACTGACAAATC; and SEQ ID NO: 578 Single_R: CTGGGATCTTCACGACC. In both cases, PCR was performed using Phusion HF 2× Master Mix (Thermo Fisher Scientific), using an annealing temperature of 64 degrees Celsius. PCR results were analyzed and quantified using a QIAxcel (Qiagen) with the DNA screening cassette, using a 30 s injection time.

The invention claimed is:

1. A method of reducing expression of a UNC13A cryptic exon splice variant of UNC13A mature mRNA in a cell comprising directly contacting the cell with an antisense oligonucleotide thereby reducing expression of the UNC13A cryptic exon splice variant of UNC13A mature mRNA in the cell, wherein the antisense oligonucleotide is complementary to at least 13 contiguous nucleotides of SEQ ID NO: 1.

2. The method of claim 1, wherein the antisense oligonucleotide is complementary to at least 13 contiguous nucleotides of SEQ ID NO: 2 that comprise a cryptic exon splice site in SEQ ID NO: 2.

3. The method of claim 2, wherein the cryptic exon splice site is a donor splice site.

4. The method of claim 2, wherein the cryptic exon splice site is an acceptor splice site.

5. The method of claim 1, wherein the antisense oligonucleotide is complementary to at least 13 contiguous nucleotides of SEQ ID NO: 3 that comprise a cryptic exon splice site in SEQ ID NO: 3.

6. The method of claim 5, wherein the cryptic exon splice site is a donor splice site.

7. The method of claim 5, wherein the cryptic exon splice site is an acceptor splice site.

8. The method of claim 1, wherein the antisense oligonucleotide is 13-30 nucleotides in length.

9. A method of modulating splicing of UNC13A in a neuronal cell comprising directly delivering an antisense oligonucleotide is complementary to at least 13 contiguous nucleotides of SEQ ID NO:1 to the neuronal cell, thereby modulating splicing of UNC13A in the neuronal cell.

10. The method of claim 9, wherein the method results in reduced expression of the UNC13A cryptic exon splice variant of UNC13A mature mRNA in the cell.

11. The method of claim 9, wherein the method results in increased expression of UNC13A mature mRNA in the cell.

12. The method of claim 9, wherein the antisense oligonucleotide is complementary to at least 13 contiguous nucleotides of SEQ ID NO: 2 that comprise a cryptic exon splice site in SEQ ID NO: 2.

13. The method of claim 12, wherein the cryptic exon splice site is a donor splice site.

14. The method of claim 12, wherein the cryptic exon splice site is an acceptor splice site.

15. The method of claim 9, wherein the antisense oligonucleotide is complementary to at least 13 contiguous nucleotides of SEQ ID NO: 3 that comprise a cryptic exon splice site in SEQ ID NO: 3.

16. The method of claim 9, wherein the antisense oligonucleotide is 13-30 nucleotides in length.

17. The method of claim 9, wherein the antisense oligonucleotide is delivered by injection.

18. The method of claim 9, wherein the antisense oligonucleotide is delivered by intrathecal injection or intracerebroventricular injection.

19. A method of reducing expression of UNC13A cryptic exon splice variant of UNC13A mature mRNA in a neuronal cell of the central nervous system in vivo comprising delivering an antisense oligonucleotide that is complementary to at least 13 contiguous nucleotides of SEQ ID NO:1 directly to the central nervous system, thereby reducing expression of UNC13A cryptic exon splice variant of UNC13A mature mRNA in the neuronal cell.

20. The method of claim 19, wherein the antisense oligonucleotide is delivered by injection.

21. The method of claim 19, wherein the antisense oligonucleotide is delivered by intrathecal injection or intracerebroventricular injection.

\* \* \* \* \*

SEQUENCE LISTING

```
Sequence total quantity: 583
SEQ ID NO: 1              moltype = RNA  length = 1288
FEATURE                   Location/Qualifiers
misc_feature              414
                          note = G can be replaced with C at this position
misc_feature              964
                          note = U can be replaced with G at this position
source                    1..1288
                          mol_type = other RNA
                          organism = Homo sapiens
SEQUENCE: 1
gtgagggtca ttgctcggcc cctcccatgc cacttccact caccattcct gcctgcccag   60
ctcttcctct ttctggccac accatccaca ctctcctggc cctctgagac tgcccgccat  120
gccattccct ttacctggaa aactcctccc tatccatcaa agtccagatt cagggtcacc  180
tcctctggga agcccacctt ggcctccagg ttgactctca ctactcatca tcaggttctt  240
ccttctattc cagccctaac cactcaggat tgggccgttt gtgtctgggt atgtctcttc  300
cagctgcctg ggtttcctgg aaagaactct tatccccagg aactagtttg ttgaataaat  360
gctggtgaat gaatgaatga ttgaacagat gaatgagtga tgagtagata aaaggatgga  420
tggagagatg ggtgagtaca tggatggata gatggatgag ttggtgggta gattcgtggc  480
tagatggatg atggatggat ggacagatgg atggatatat gattgaacta ttgaaagtat  540
agatgtatgg atgggtgaat ttgggggtaa ttgttagatg atggatgagt atagatgaat  600
gatggatgga taacttgatg agtggataga tagattgctg gatagatgat tgactgggtg  660
gatagatgaa atgttggatg agcagattaa gttgtattgg atgggatgga tggaagtgtg  720
gttgagttat tagaaggaag attgagtaag taggtgaatt tgttgatagt cagatgggta  780
gataggtaga tggatggatg gatggatgga tgtataggca gatggacaaa tggatgaatg  840
ggtggtgga tgaatgaag gatgtgtggt tgaactattg caagtattga taattgggtt   900
cataatttct gaatatttag atggatggtt gtgagtggct ggtggacaga cgaaaaatgg  960
atggttggat aaattgatgg gtggatggat ggttggttgt atgaaagaat gaatgattgg 1020
gtaggtggat taagttgcgg atcaatgtat gggatggatg aatggatgga tggatggatg 1080
tgtggttgaa ttactgaaag gttggaagag tggatgggtg aaatttgggg tagttagatg 1140
ggtgggtgtg tggatggata aaagagtaga tgaatgaatt aatgaataaa caggcagatg 1200
gatgatgtaa gctgccccag accctgggac ctctgacccc cggcgacccc ttgcactctc 1260
catgacactt tctctcccat ggtggcag                                     1288

SEQ ID NO: 2              moltype = RNA  length = 128
FEATURE                   Location/Qualifiers
misc_feature              112
                          note = G can be replaced with C at this position
source                    1..128
                          mol_type = other RNA
                          organism = Homo sapiens
SEQUENCE: 2
ctgcctgggt ttcctggaaa gaactcttat ccccaggaac tagtttgttg aataaatgct   60
ggtgaatgaa tgaatgattg aacagatgaa tgagtgatga gtagataaaa ggatggatgg  120
agagatgg                                                           128
```

```
SEQ ID NO: 3              moltype = RNA   length = 178
FEATURE                   Location/Qualifiers
misc_feature              162
                          note = G at this position can be replaced with C
source                    1..178
                          mol_type = other RNA
                          organism = Homo sapiens
SEQUENCE: 3
ccctaaccac tcaggattgg gccgtttgtg tctgggtatg tctcttccag ctgcctgggt   60
ttcctggaaa gaactcttat ccccaggaac tagtttgttg aataaatgct ggtgaatgaa  120
tgaatgattg aacagatgaa tgagtgatga gtagataaaa ggatggatgg agagatgg    178

SEQ ID NO: 4              moltype = RNA   length = 13
FEATURE                   Location/Qualifiers
misc_feature              1..13
                          note = Synthetic sequence
misc_feature              1..13
                          note = U can be replaced with T
misc_feature              1..13
                          note = U can be replaced by T. Any base can be replaced
                           with a modified base.
source                    1..13
                          mol_type = other RNA
                          organism = synthetic construct
SEQUENCE: 4
ggagttttcc agg                                                      13

SEQ ID NO: 5              moltype = RNA   length = 13
FEATURE                   Location/Qualifiers
misc_feature              1..13
                          note = Synthetic sequence
misc_feature              1..13
                          note = U can be replaced by T. Any base can be replaced
                           with a modified base.
source                    1..13
                          mol_type = other RNA
                          organism = synthetic construct
SEQUENCE: 5
aggagttttc cag                                                      13

SEQ ID NO: 6              moltype = RNA   length = 13
FEATURE                   Location/Qualifiers
misc_feature              1..13
                          note = Synthetic sequence
misc_feature              1..13
                          note = U can be replaced by T. Any base can be replaced
                           with a modified base.
source                    1..13
                          mol_type = other RNA
                          organism = synthetic construct
SEQUENCE: 6
gaggagtttt cca                                                      13

SEQ ID NO: 7              moltype = RNA   length = 13
FEATURE                   Location/Qualifiers
misc_feature              1..13
                          note = Synthetic sequence
misc_feature              1..13
                          note = U can be replaced by T. Any base can be replaced
                           with a modified base.
source                    1..13
                          mol_type = other RNA
                          organism = synthetic construct
SEQUENCE: 7
ggaggagttt tcc                                                      13

SEQ ID NO: 8              moltype = RNA   length = 13
FEATURE                   Location/Qualifiers
misc_feature              1..13
                          note = Synthetic sequence
misc_feature              1..13
                          note = U can be replaced by T. Any base can be replaced
                           with a modified base.
source                    1..13
                          mol_type = other RNA
                          organism = synthetic construct
SEQUENCE: 8
gggaggagtt tcc                                                      13
```

```
SEQ ID NO: 9            moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 9
agggaggagt ttt                                                             13

SEQ ID NO: 10           moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 10
tagggaggag ttt                                                             13

SEQ ID NO: 11           moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 11
atagggagga gtt                                                             13

SEQ ID NO: 12           moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 12
gatagggagg agt                                                             13

SEQ ID NO: 13           moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 13
ggatagggag gag                                                             13

SEQ ID NO: 14           moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 14
tggataggga gga                                                             13

SEQ ID NO: 15           moltype = RNA   length = 13
```

-continued

```
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 15
atggatarggg agg                                                              13

SEQ ID NO: 16           moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 16
gatggatagg gag                                                               13

SEQ ID NO: 17           moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 17
tgatggatag gga                                                               13

SEQ ID NO: 18           moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 18
ttgatggata ggg                                                               13

SEQ ID NO: 19           moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 19
tttgatggat agg                                                               13

SEQ ID NO: 20           moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 20
ctttgatgga tag                                                               13

SEQ ID NO: 21           moltype = RNA  length = 13
FEATURE                 Location/Qualifiers
```

```
misc_feature               1..13
                           note = Synthetic sequence
misc_feature               1..13
                           note = U can be replaced by T. Any base can be replaced
                            with a modified base.
source                     1..13
                           mol_type = other RNA
                           organism = synthetic construct
SEQUENCE: 21
actttgatgg ata                                                                13

SEQ ID NO: 22              moltype = RNA   length = 13
FEATURE                    Location/Qualifiers
misc_feature               1..13
                           note = Synthetic sequence
misc_feature               1..13
                           note = U can be replaced by T. Any base can be replaced
                            with a modified base.
source                     1..13
                           mol_type = other RNA
                           organism = synthetic construct
SEQUENCE: 22
gactttgatg gat                                                                13

SEQ ID NO: 23              moltype = RNA   length = 13
FEATURE                    Location/Qualifiers
misc_feature               1..13
                           note = Synthetic sequence
misc_feature               1..13
                           note = U can be replaced by T. Any base can be replaced
                            with a modified base.
source                     1..13
                           mol_type = other RNA
                           organism = synthetic construct
SEQUENCE: 23
ggactttgat gga                                                                13

SEQ ID NO: 24              moltype = RNA   length = 13
FEATURE                    Location/Qualifiers
misc_feature               1..13
                           note = Synthetic sequence
misc_feature               1..13
                           note = U can be replaced by T. Any base can be replaced
                            with a modified base.
source                     1..13
                           mol_type = other RNA
                           organism = synthetic construct
SEQUENCE: 24
tggactttga tgg                                                                13

SEQ ID NO: 25              moltype = RNA   length = 13
FEATURE                    Location/Qualifiers
misc_feature               1..13
                           note = Synthetic sequence
misc_feature               1..13
                           note = U can be replaced by T. Any base can be replaced
                            with a modified base.
source                     1..13
                           mol_type = other RNA
                           organism = synthetic construct
SEQUENCE: 25
ctggactttg atg                                                                13

SEQ ID NO: 26              moltype = RNA   length = 13
FEATURE                    Location/Qualifiers
misc_feature               1..13
                           note = Synthetic sequence
misc_feature               1..13
                           note = U can be replaced by T. Any base can be replaced
                            with a modified base.
source                     1..13
                           mol_type = other RNA
                           organism = synthetic construct
SEQUENCE: 26
tctggacttt gat                                                                13

SEQ ID NO: 27              moltype = RNA   length = 13
FEATURE                    Location/Qualifiers
misc_feature               1..13
```

```
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 27
atctggactt tga                                                            13

SEQ ID NO: 28           moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 28
aatctggact ttg                                                            13

SEQ ID NO: 29           moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 29
gaatctggac ttt                                                            13

SEQ ID NO: 30           moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 30
tgaatctgga ctt                                                            13

SEQ ID NO: 31           moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 31
ctgaatctgg act                                                            13

SEQ ID NO: 32           moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 32
cctgaatctg gac                                                            13

SEQ ID NO: 33           moltype = RNA   length = 13
FEATURE                 Location/Qualifiers
misc_feature            1..13
                        note = Synthetic sequence
```

| | | |
|---|---|---|
| misc_feature | 1..13<br>note = U can be replaced by T. Any base can be replaced<br>with a modified base. | |
| source | 1..13<br>mol_type = other RNA<br>organism = synthetic construct | |
| SEQUENCE: 33<br>ccctgaatct gga | | 13 |
| SEQ ID NO: 34<br>FEATURE<br>misc_feature | moltype = RNA  length = 13<br>Location/Qualifiers<br>1..13<br>note = Synthetic sequence | |
| misc_feature | 1..13<br>note = U can be replaced by T. Any base can be replaced<br>with a modified base. | |
| source | 1..13<br>mol_type = other RNA<br>organism = synthetic construct | |
| SEQUENCE: 34<br>accctgaatc tgg | | 13 |
| SEQ ID NO: 35<br>FEATURE<br>misc_feature | moltype = RNA  length = 13<br>Location/Qualifiers<br>1..13<br>note = Synthetic sequence | |
| misc_feature | 1..13<br>note = U can be replaced by T. Any base can be replaced<br>with a modified base. | |
| source | 1..13<br>mol_type = other RNA<br>organism = synthetic construct | |
| SEQUENCE: 35<br>gaccctgaat ctg | | 13 |
| SEQ ID NO: 36<br>FEATURE<br>misc_feature | moltype = RNA  length = 13<br>Location/Qualifiers<br>1..13<br>note = Synthetic sequence | |
| misc_feature | 1..13<br>note = U can be replaced by T. Any base can be replaced<br>with a modified base. | |
| source | 1..13<br>mol_type = other RNA<br>organism = synthetic construct | |
| SEQUENCE: 36<br>tgaccctgaa tct | | 13 |
| SEQ ID NO: 37<br>FEATURE<br>misc_feature | moltype = RNA  length = 13<br>Location/Qualifiers<br>1..13<br>note = Synthetic sequence | |
| misc_feature | 1..13<br>note = U can be replaced by T. Any base can be replaced<br>with a modified base. | |
| source | 1..13<br>mol_type = other RNA<br>organism = synthetic construct | |
| SEQUENCE: 37<br>gtgaccctga atc | | 13 |
| SEQ ID NO: 38<br>FEATURE<br>misc_feature | moltype = RNA  length = 13<br>Location/Qualifiers<br>1..13<br>note = Synthetic sequence | |
| misc_feature | 1..13<br>note = U can be replaced by T. Any base can be replaced<br>with a modified base. | |
| source | 1..13<br>mol_type = other RNA<br>organism = synthetic construct | |
| SEQUENCE: 38<br>ggtgaccctg aat | | 13 |
| SEQ ID NO: 39<br>FEATURE<br>misc_feature | moltype = RNA  length = 13<br>Location/Qualifiers<br>1..13<br>note = Synthetic sequence | |
| misc_feature | 1..13 | |

```
                        note = U can be replaced by T. Any base can be replaced
                         with a modified base.
source                  1..13
                        mol_type = other RNA
                        organism = synthetic construct
SEQUENCE: 39
aggtgaccct gaa                                                              13

SEQ ID NO: 40           moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 40
gaggtgaccc tga                                                              13

SEQ ID NO: 41           moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 41
ggaggtgacc ctg                                                              13

SEQ ID NO: 42           moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 42
aggaggtgac cct                                                              13

SEQ ID NO: 43           moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 43
gaggaggtga ccc                                                              13

SEQ ID NO: 44           moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 44
agaggaggtg acc                                                              13

SEQ ID NO: 45           moltype = RNA   length = 13
FEATURE                 Location/Qualifiers
misc_feature            1..13
                        note = Synthetic sequence
misc_feature            1..13
                        note = U can be replaced by T. Any base can be replaced
```

|   |   |   |
|---|---|---|
| | | with a modified base. |
| source | 1..13 | |
| | mol_type = other RNA | |
| | organism = synthetic construct | |
| SEQUENCE: 45 | | |
| cagaggaggt gac | | 13 |
| | | |
| SEQ ID NO: 46 | moltype = RNA  length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 46 | | |
| ccagaggagg tga | | 13 |
| | | |
| SEQ ID NO: 47 | moltype = RNA  length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 47 | | |
| cccagaggag gtg | | 13 |
| | | |
| SEQ ID NO: 48 | moltype = RNA  length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 48 | | |
| tcccagagga ggt | | 13 |
| | | |
| SEQ ID NO: 49 | moltype = RNA  length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 49 | | |
| ttcccagagg agg | | 13 |
| | | |
| SEQ ID NO: 50 | moltype = RNA  length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 50 | | |
| cttcccagag gag | | 13 |
| | | |
| SEQ ID NO: 51 | moltype = RNA  length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |

```
source                  1..13
                        mol_type = other RNA
                        organism = synthetic construct
SEQUENCE: 51
gcttcccaga gga                                                             13

SEQ ID NO: 52           moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 52
ggcttcccag agg                                                             13

SEQ ID NO: 53           moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 53
gggcttccca gag                                                             13

SEQ ID NO: 54           moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 54
tgggcttccc aga                                                             13

SEQ ID NO: 55           moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 55
gtgggcttcc cag                                                             13

SEQ ID NO: 56           moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 56
ggtgggcttc cca                                                             13

SEQ ID NO: 57           moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
```

```
                            mol_type = other RNA
                            organism = synthetic construct
SEQUENCE: 57
aggtgggctt ccc                                                             13

SEQ ID NO: 58               moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 58
aaggtgggct tcc                                                             13

SEQ ID NO: 59               moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 59
caaggtgggc ttc                                                             13

SEQ ID NO: 60               moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 60
ccaaggtggg ctt                                                             13

SEQ ID NO: 61               moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 61
gccaaggtgg gct                                                             13

SEQ ID NO: 62               moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 62
ggccaaggtg ggc                                                             13

SEQ ID NO: 63               moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
```

```
                        organism = synthetic construct
SEQUENCE: 63
aggccaaggt ggg                                                               13

SEQ ID NO: 64           moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 64
gaggccaagg tgg                                                               13

SEQ ID NO: 65           moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 65
ggaggccaag gtg                                                               13

SEQ ID NO: 66           moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 66
tggaggccaa ggt                                                               13

SEQ ID NO: 67           moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 67
ctggaggcca agg                                                               13

SEQ ID NO: 68           moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 68
cctggaggcc aag                                                               13

SEQ ID NO: 69           moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
```

```
SEQUENCE: 69
acctggaggc caa                                                          13

SEQ ID NO: 70           moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 70
aacctggagg cca                                                          13

SEQ ID NO: 71           moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 71
caacctggag gcc                                                          13

SEQ ID NO: 72           moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 72
tcaacctgga ggc                                                          13

SEQ ID NO: 73           moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 73
gtcaacctgg agg                                                          13

SEQ ID NO: 74           moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 74
agtcaacctg gag                                                          13

SEQ ID NO: 75           moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 75
```

```
gagtcaacct gga                                                          13

SEQ ID NO: 76          moltype = RNA   length = 13
FEATURE                Location/Qualifiers
misc_feature           1..13
                       note = Synthetic sequence
misc_feature           1..13
                       note = U can be replaced by T. Any base can be replaced
                        with a modified base.
source                 1..13
                       mol_type = other RNA
                       organism = synthetic construct
SEQUENCE: 76
agagtcaacc tgg                                                          13

SEQ ID NO: 77          moltype = RNA   length = 13
FEATURE                Location/Qualifiers
misc_feature           1..13
                       note = Synthetic sequence
misc_feature           1..13
                       note = U can be replaced by T. Any base can be replaced
                        with a modified base.
source                 1..13
                       mol_type = other RNA
                       organism = synthetic construct
SEQUENCE: 77
gagagtcaac ctg                                                          13

SEQ ID NO: 78          moltype = RNA   length = 13
FEATURE                Location/Qualifiers
misc_feature           1..13
                       note = Synthetic sequence
misc_feature           1..13
                       note = U can be replaced by T. Any base can be replaced
                        with a modified base.
source                 1..13
                       mol_type = other RNA
                       organism = synthetic construct
SEQUENCE: 78
tgagagtcaa cct                                                          13

SEQ ID NO: 79          moltype = RNA   length = 13
FEATURE                Location/Qualifiers
misc_feature           1..13
                       note = Synthetic sequence
misc_feature           1..13
                       note = U can be replaced by T. Any base can be replaced
                        with a modified base.
source                 1..13
                       mol_type = other RNA
                       organism = synthetic construct
SEQUENCE: 79
gtgagagtca acc                                                          13

SEQ ID NO: 80          moltype = RNA   length = 13
FEATURE                Location/Qualifiers
misc_feature           1..13
                       note = Synthetic sequence
misc_feature           1..13
                       note = U can be replaced by T. Any base can be replaced
                        with a modified base.
source                 1..13
                       mol_type = other RNA
                       organism = synthetic construct
SEQUENCE: 80
agtgagagtc aac                                                          13

SEQ ID NO: 81          moltype = RNA   length = 13
FEATURE                Location/Qualifiers
misc_feature           1..13
                       note = Synthetic sequence
misc_feature           1..13
                       note = U can be replaced by T. Any base can be replaced
                        with a modified base.
source                 1..13
                       mol_type = other RNA
                       organism = synthetic construct
SEQUENCE: 81
tagtgagagt caa                                                          13
```

```
SEQ ID NO: 82            moltype = RNA   length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 82
gtagtgagag tca                                                            13

SEQ ID NO: 83            moltype = RNA   length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 83
agtagtgaga gtc                                                            13

SEQ ID NO: 84            moltype = RNA   length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 84
gagtagtgag agt                                                            13

SEQ ID NO: 85            moltype = RNA   length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 85
tgagtagtga gag                                                            13

SEQ ID NO: 86            moltype = RNA   length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 86
atgagtagtg aga                                                            13

SEQ ID NO: 87            moltype = RNA   length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 87
gatgagtagt gag                                                            13
```

-continued

```
SEQ ID NO: 88              moltype = RNA   length = 13
FEATURE                    Location/Qualifiers
misc_feature               1..13
                           note = Synthetic sequence
misc_feature               1..13
                           note = U can be replaced by T. Any base can be replaced
                           with a modified base.
source                     1..13
                           mol_type = other RNA
                           organism = synthetic construct
SEQUENCE: 88
tgatgagtag tga                                                            13

SEQ ID NO: 89              moltype = RNA   length = 13
FEATURE                    Location/Qualifiers
misc_feature               1..13
                           note = Synthetic sequence
misc_feature               1..13
                           note = U can be replaced by T. Any base can be replaced
                           with a modified base.
source                     1..13
                           mol_type = other RNA
                           organism = synthetic construct
SEQUENCE: 89
atgatgagta gtg                                                            13

SEQ ID NO: 90              moltype = RNA   length = 13
FEATURE                    Location/Qualifiers
misc_feature               1..13
                           note = Synthetic sequence
misc_feature               1..13
                           note = U can be replaced by T. Any base can be replaced
                           with a modified base.
source                     1..13
                           mol_type = other RNA
                           organism = synthetic construct
SEQUENCE: 90
gatgatgagt agt                                                            13

SEQ ID NO: 91              moltype = RNA   length = 13
FEATURE                    Location/Qualifiers
misc_feature               1..13
                           note = Synthetic sequence
misc_feature               1..13
                           note = U can be replaced by T. Any base can be replaced
                           with a modified base.
source                     1..13
                           mol_type = other RNA
                           organism = synthetic construct
SEQUENCE: 91
tgatgatgag tag                                                            13

SEQ ID NO: 92              moltype = RNA   length = 13
FEATURE                    Location/Qualifiers
misc_feature               1..13
                           note = Synthetic sequence
misc_feature               1..13
                           note = U can be replaced by T. Any base can be replaced
                           with a modified base.
source                     1..13
                           mol_type = other RNA
                           organism = synthetic construct
SEQUENCE: 92
ctgatgatga gta                                                            13

SEQ ID NO: 93              moltype = RNA   length = 13
FEATURE                    Location/Qualifiers
misc_feature               1..13
                           note = Synthetic sequence
misc_feature               1..13
                           note = U can be replaced by T. Any base can be replaced
                           with a modified base.
source                     1..13
                           mol_type = other RNA
                           organism = synthetic construct
SEQUENCE: 93
cctgatgatg agt                                                            13

SEQ ID NO: 94              moltype = RNA   length = 13
```

| | |
|---|---|
| FEATURE | Location/Qualifiers |
| misc_feature | 1..13 |
| | note = Synthetic sequence |
| misc_feature | 1..13 |
| | note = U can be replaced by T. Any base can be replaced with a modified base. |
| source | 1..13 |
| | mol_type = other RNA |
| | organism = synthetic construct |
| SEQUENCE: 94 | |
| acctgatgat gag | 13 |
| | |
| SEQ ID NO: 95 | moltype = RNA  length = 13 |
| FEATURE | Location/Qualifiers |
| misc_feature | 1..13 |
| | note = Synthetic sequence |
| misc_feature | 1..13 |
| | note = U can be replaced by T. Any base can be replaced with a modified base. |
| source | 1..13 |
| | mol_type = other RNA |
| | organism = synthetic construct |
| SEQUENCE: 95 | |
| aacctgatga tga | 13 |
| | |
| SEQ ID NO: 96 | moltype = RNA  length = 13 |
| FEATURE | Location/Qualifiers |
| misc_feature | 1..13 |
| | note = Synthetic sequence |
| misc_feature | 1..13 |
| | note = U can be replaced by T. Any base can be replaced with a modified base. |
| source | 1..13 |
| | mol_type = other RNA |
| | organism = synthetic construct |
| SEQUENCE: 96 | |
| gaacctgatg atg | 13 |
| | |
| SEQ ID NO: 97 | moltype = RNA  length = 13 |
| FEATURE | Location/Qualifiers |
| misc_feature | 1..13 |
| | note = Synthetic sequence |
| misc_feature | 1..13 |
| | note = U can be replaced by T. Any base can be replaced with a modified base. |
| source | 1..13 |
| | mol_type = other RNA |
| | organism = synthetic construct |
| SEQUENCE: 97 | |
| agaacctgat gat | 13 |
| | |
| SEQ ID NO: 98 | moltype = RNA  length = 13 |
| FEATURE | Location/Qualifiers |
| misc_feature | 1..13 |
| | note = Synthetic sequence |
| misc_feature | 1..13 |
| | note = U can be replaced by T. Any base can be replaced with a modified base. |
| source | 1..13 |
| | mol_type = other RNA |
| | organism = synthetic construct |
| SEQUENCE: 98 | |
| aagaacctga tga | 13 |
| | |
| SEQ ID NO: 99 | moltype = RNA  length = 13 |
| FEATURE | Location/Qualifiers |
| misc_feature | 1..13 |
| | note = Synthetic sequence |
| misc_feature | 1..13 |
| | note = U can be replaced by T. Any base can be replaced with a modified base. |
| source | 1..13 |
| | mol_type = other RNA |
| | organism = synthetic construct |
| SEQUENCE: 99 | |
| gaagaacctg atg | 13 |
| | |
| SEQ ID NO: 100 | moltype = RNA  length = 13 |
| FEATURE | Location/Qualifiers |

```
misc_feature        1..13
                    note = Synthetic sequence
misc_feature        1..13
                    note = U can be replaced by T. Any base can be replaced
                     with a modified base.
source              1..13
                    mol_type = other RNA
                    organism = synthetic construct
SEQUENCE: 100
ggaagaacct gat                                                          13

SEQ ID NO: 101      moltype = RNA   length = 13
FEATURE             Location/Qualifiers
misc_feature        1..13
                    note = Synthetic sequence
misc_feature        1..13
                    note = U can be replaced by T. Any base can be replaced
                     with a modified base.
source              1..13
                    mol_type = other RNA
                    organism = synthetic construct
SEQUENCE: 101
aggaagaacc tga                                                          13

SEQ ID NO: 102      moltype = RNA   length = 13
FEATURE             Location/Qualifiers
misc_feature        1..13
                    note = Synthetic sequence
misc_feature        1..13
                    note = U can be replaced by T. Any base can be replaced
                     with a modified base.
source              1..13
                    mol_type = other RNA
                    organism = synthetic construct
SEQUENCE: 102
aaggaagaac ctg                                                          13

SEQ ID NO: 103      moltype = RNA   length = 13
FEATURE             Location/Qualifiers
misc_feature        1..13
                    note = Synthetic sequence
misc_feature        1..13
                    note = U can be replaced by T. Any base can be replaced
                     with a modified base.
source              1..13
                    mol_type = other RNA
                    organism = synthetic construct
SEQUENCE: 103
gaaggaagaa cct                                                          13

SEQ ID NO: 104      moltype = RNA   length = 13
FEATURE             Location/Qualifiers
misc_feature        1..13
                    note = Synthetic sequence
misc_feature        1..13
                    note = U can be replaced by T. Any base can be replaced
                     with a modified base.
source              1..13
                    mol_type = other RNA
                    organism = synthetic construct
SEQUENCE: 104
agaaggaaga acc                                                          13

SEQ ID NO: 105      moltype = RNA   length = 13
FEATURE             Location/Qualifiers
misc_feature        1..13
                    note = Synthetic sequence
misc_feature        1..13
                    note = U can be replaced by T. Any base can be replaced
                     with a modified base.
source              1..13
                    mol_type = other RNA
                    organism = synthetic construct
SEQUENCE: 105
tagaaggaag aac                                                          13

SEQ ID NO: 106      moltype = RNA   length = 13
FEATURE             Location/Qualifiers
misc_feature        1..13
```

|   |   |   |
|---|---|---|
| misc_feature | note = Synthetic sequence<br>1..13 | |
| source | note = U can be replaced by T. Any base can be replaced with a modified base.<br>1..13<br>mol_type = other RNA<br>organism = synthetic construct | |
| SEQUENCE: 106<br>atagaaggaa gaa | | 13 |
| SEQ ID NO: 107<br>FEATURE<br>misc_feature | moltype = RNA   length = 13<br>Location/Qualifiers<br>1..13<br>note = Synthetic sequence | |
| misc_feature | 1..13<br>note = U can be replaced by T. Any base can be replaced with a modified base. | |
| source | 1..13<br>mol_type = other RNA<br>organism = synthetic construct | |
| SEQUENCE: 107<br>aatagaagga aga | | 13 |
| SEQ ID NO: 108<br>FEATURE<br>misc_feature | moltype = RNA   length = 13<br>Location/Qualifiers<br>1..13<br>note = Synthetic sequence | |
| misc_feature | 1..13<br>note = U can be replaced by T. Any base can be replaced with a modified base. | |
| source | 1..13<br>mol_type = other RNA<br>organism = synthetic construct | |
| SEQUENCE: 108<br>gaatagaagg aag | | 13 |
| SEQ ID NO: 109<br>FEATURE<br>misc_feature | moltype = RNA   length = 13<br>Location/Qualifiers<br>1..13<br>note = Synthetic sequence | |
| misc_feature | 1..13<br>note = U can be replaced by T. Any base can be replaced with a modified base. | |
| source | 1..13<br>mol_type = other RNA<br>organism = synthetic construct | |
| SEQUENCE: 109<br>ggaatagaag gaa | | 13 |
| SEQ ID NO: 110<br>FEATURE<br>misc_feature | moltype = RNA   length = 13<br>Location/Qualifiers<br>1..13<br>note = Synthetic sequence | |
| misc_feature | 1..13<br>note = U can be replaced by T. Any base can be replaced with a modified base. | |
| source | 1..13<br>mol_type = other RNA<br>organism = synthetic construct | |
| SEQUENCE: 110<br>tggaatagaa gga | | 13 |
| SEQ ID NO: 111<br>FEATURE<br>misc_feature | moltype = RNA   length = 13<br>Location/Qualifiers<br>1..13<br>note = Synthetic sequence | |
| misc_feature | 1..13<br>note = U can be replaced by T. Any base can be replaced with a modified base. | |
| source | 1..13<br>mol_type = other RNA<br>organism = synthetic construct | |
| SEQUENCE: 111<br>ctggaataga agg | | 13 |
| SEQ ID NO: 112<br>FEATURE<br>misc_feature | moltype = RNA   length = 13<br>Location/Qualifiers<br>1..13<br>note = Synthetic sequence | |

```
                           misc_feature                 1..13
                                                        note = U can be replaced by T. Any base can be replaced
                                                         with a modified base.
                           source                       1..13
                                                        mol_type = other RNA
                                                        organism = synthetic construct
SEQUENCE: 112
gctggaatag aag                                                                                              13

SEQ ID NO: 113               moltype = RNA   length = 13
                           FEATURE                     Location/Qualifiers
                           misc_feature                 1..13
                                                        note = Synthetic sequence
                           misc_feature                 1..13
                                                        note = U can be replaced by T. Any base can be replaced
                                                         with a modified base.
                           source                       1..13
                                                        mol_type = other RNA
                                                        organism = synthetic construct
SEQUENCE: 113
ggctggaata gaa                                                                                              13

SEQ ID NO: 114               moltype = RNA   length = 13
                           FEATURE                     Location/Qualifiers
                           misc_feature                 1..13
                                                        note = Synthetic sequence
                           misc_feature                 1..13
                                                        note = U can be replaced by T. Any base can be replaced
                                                         with a modified base.
                           source                       1..13
                                                        mol_type = other RNA
                                                        organism = synthetic construct
SEQUENCE: 114
gggctggaat aga                                                                                              13

SEQ ID NO: 115               moltype = RNA   length = 13
                           FEATURE                     Location/Qualifiers
                           misc_feature                 1..13
                                                        note = Synthetic sequence
                           misc_feature                 1..13
                                                        note = U can be replaced by T. Any base can be replaced
                                                         with a modified base.
                           source                       1..13
                                                        mol_type = other RNA
                                                        organism = synthetic construct
SEQUENCE: 115
agggctggaa tag                                                                                              13

SEQ ID NO: 116               moltype = RNA   length = 13
                           FEATURE                     Location/Qualifiers
                           misc_feature                 1..13
                                                        note = Synthetic sequence
                           misc_feature                 1..13
                                                        note = U can be replaced by T. Any base can be replaced
                                                         with a modified base.
                           source                       1..13
                                                        mol_type = other RNA
                                                        organism = synthetic construct
SEQUENCE: 116
tagggctgga ata                                                                                              13

SEQ ID NO: 117               moltype = RNA   length = 13
                           FEATURE                     Location/Qualifiers
                           misc_feature                 1..13
                                                        note = Synthetic sequence
                           misc_feature                 1..13
                                                        note = U can be replaced by T. Any base can be replaced
                                                         with a modified base.
                           source                       1..13
                                                        mol_type = other RNA
                                                        organism = synthetic construct
SEQUENCE: 117
ttagggctgg aat                                                                                              13

SEQ ID NO: 118               moltype = RNA   length = 13
                           FEATURE                     Location/Qualifiers
                           misc_feature                 1..13
                                                        note = Synthetic sequence
                           misc_feature                 1..13
```

```
                             note = U can be replaced by T. Any base can be replaced
                              with a modified base.
source                       1..13
                             mol_type = other RNA
                             organism = synthetic construct
SEQUENCE: 118
gttagggctg gaa                                                                  13

SEQ ID NO: 119               moltype = RNA   length = 13
FEATURE                      Location/Qualifiers
misc_feature                 1..13
                             note = Synthetic sequence
misc_feature                 1..13
                             note = U can be replaced by T. Any base can be replaced
                              with a modified base.
source                       1..13
                             mol_type = other RNA
                             organism = synthetic construct
SEQUENCE: 119
ggttagggct gga                                                                  13

SEQ ID NO: 120               moltype = RNA   length = 13
FEATURE                      Location/Qualifiers
misc_feature                 1..13
                             note = Synthetic sequence
misc_feature                 1..13
                             note = U can be replaced by T. Any base can be replaced
                              with a modified base.
source                       1..13
                             mol_type = other RNA
                             organism = synthetic construct
SEQUENCE: 120
tggttagggc tgg                                                                  13

SEQ ID NO: 121               moltype = RNA   length = 13
FEATURE                      Location/Qualifiers
misc_feature                 1..13
                             note = Synthetic sequence
misc_feature                 1..13
                             note = U can be replaced by T. Any base can be replaced
                              with a modified base.
source                       1..13
                             mol_type = other RNA
                             organism = synthetic construct
SEQUENCE: 121
gtggttaggg ctg                                                                  13

SEQ ID NO: 122               moltype = RNA   length = 13
FEATURE                      Location/Qualifiers
misc_feature                 1..13
                             note = Synthetic sequence
misc_feature                 1..13
                             note = U can be replaced by T. Any base can be replaced
                              with a modified base.
source                       1..13
                             mol_type = other RNA
                             organism = synthetic construct
SEQUENCE: 122
agtggttagg gct                                                                  13

SEQ ID NO: 123               moltype = RNA   length = 13
FEATURE                      Location/Qualifiers
misc_feature                 1..13
                             note = Synthetic sequence
misc_feature                 1..13
                             note = U can be replaced by T. Any base can be replaced
                              with a modified base.
source                       1..13
                             mol_type = other RNA
                             organism = synthetic construct
SEQUENCE: 123
gagtggttag ggc                                                                  13

SEQ ID NO: 124               moltype = RNA   length = 13
FEATURE                      Location/Qualifiers
misc_feature                 1..13
                             note = Synthetic sequence
misc_feature                 1..13
                             note = U can be replaced by T. Any base can be replaced
```

```
                          with a modified base.
source                    1..13
                          mol_type = other RNA
                          organism = synthetic construct
SEQUENCE: 124
tgagtggtta ggg                                                          13

SEQ ID NO: 125            moltype = RNA   length = 13
FEATURE                   Location/Qualifiers
misc_feature              1..13
                          note = Synthetic sequence
misc_feature              1..13
                          note = U can be replaced by T. Any base can be replaced
                          with a modified base.
source                    1..13
                          mol_type = other RNA
                          organism = synthetic construct
SEQUENCE: 125
ctgagtggtt agg                                                          13

SEQ ID NO: 126            moltype = RNA   length = 13
FEATURE                   Location/Qualifiers
misc_feature              1..13
                          note = Synthetic sequence
misc_feature              1..13
                          note = U can be replaced by T. Any base can be replaced
                          with a modified base.
source                    1..13
                          mol_type = other RNA
                          organism = synthetic construct
SEQUENCE: 126
cctgagtggt tag                                                          13

SEQ ID NO: 127            moltype = RNA   length = 13
FEATURE                   Location/Qualifiers
misc_feature              1..13
                          note = Synthetic sequence
misc_feature              1..13
                          note = U can be replaced by T. Any base can be replaced
                          with a modified base.
source                    1..13
                          mol_type = other RNA
                          organism = synthetic construct
SEQUENCE: 127
tcctgagtgg tta                                                          13

SEQ ID NO: 128            moltype = RNA   length = 13
FEATURE                   Location/Qualifiers
misc_feature              1..13
                          note = Synthetic sequence
misc_feature              1..13
                          note = U can be replaced by T. Any base can be replaced
                          with a modified base.
source                    1..13
                          mol_type = other RNA
                          organism = synthetic construct
SEQUENCE: 128
atcctgagtg gtt                                                          13

SEQ ID NO: 129            moltype = RNA   length = 13
FEATURE                   Location/Qualifiers
misc_feature              1..13
                          note = Synthetic sequence
misc_feature              1..13
                          note = U can be replaced by T. Any base can be replaced
                          with a modified base.
source                    1..13
                          mol_type = other RNA
                          organism = synthetic construct
SEQUENCE: 129
aatcctgagt ggt                                                          13

SEQ ID NO: 130            moltype = RNA   length = 13
FEATURE                   Location/Qualifiers
misc_feature              1..13
                          note = Synthetic sequence
misc_feature              1..13
                          note = U can be replaced by T. Any base can be replaced
                          with a modified base.
```

```
source                      1..13
                            mol_type = other RNA
                            organism = synthetic construct
SEQUENCE: 130
caatcctgag tgg                                                              13

SEQ ID NO: 131              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 131
ccaatcctga gtg                                                              13

SEQ ID NO: 132              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 132
cccaatcctg agt                                                              13

SEQ ID NO: 133              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 133
gcccaatcct gag                                                              13

SEQ ID NO: 134              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 134
ggcccaatcc tga                                                              13

SEQ ID NO: 135              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 135
cggcccaatc ctg                                                              13

SEQ ID NO: 136              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
```

```
                              mol_type = other RNA
                              organism = synthetic construct
SEQUENCE: 136
acggcccaat cct                                                            13

SEQ ID NO: 137                moltype = RNA   length = 13
FEATURE                       Location/Qualifiers
misc_feature                  1..13
                              note = Synthetic sequence
misc_feature                  1..13
                              note = U can be replaced by T. Any base can be replaced
                              with a modified base.
source                        1..13
                              mol_type = other RNA
                              organism = synthetic construct
SEQUENCE: 137
aacggcccaa tcc                                                            13

SEQ ID NO: 138                moltype = RNA   length = 13
FEATURE                       Location/Qualifiers
misc_feature                  1..13
                              note = Synthetic sequence
misc_feature                  1..13
                              note = U can be replaced by T. Any base can be replaced
                              with a modified base.
source                        1..13
                              mol_type = other RNA
                              organism = synthetic construct
SEQUENCE: 138
aaacggccca atc                                                            13

SEQ ID NO: 139                moltype = RNA   length = 13
FEATURE                       Location/Qualifiers
misc_feature                  1..13
                              note = Synthetic sequence
misc_feature                  1..13
                              note = U can be replaced by T. Any base can be replaced
                              with a modified base.
source                        1..13
                              mol_type = other RNA
                              organism = synthetic construct
SEQUENCE: 139
caaacggccc aat                                                            13

SEQ ID NO: 140                moltype = RNA   length = 13
FEATURE                       Location/Qualifiers
misc_feature                  1..13
                              note = Synthetic sequence
misc_feature                  1..13
                              note = U can be replaced by T. Any base can be replaced
                              with a modified base.
source                        1..13
                              mol_type = other RNA
                              organism = synthetic construct
SEQUENCE: 140
acaaacggcc caa                                                            13

SEQ ID NO: 141                moltype = RNA   length = 13
FEATURE                       Location/Qualifiers
misc_feature                  1..13
                              note = Synthetic sequence
misc_feature                  1..13
                              note = U can be replaced by T. Any base can be replaced
                              with a modified base.
source                        1..13
                              mol_type = other RNA
                              organism = synthetic construct
SEQUENCE: 141
cacaaacggc cca                                                            13

SEQ ID NO: 142                moltype = RNA   length = 13
FEATURE                       Location/Qualifiers
misc_feature                  1..13
                              note = Synthetic sequence
misc_feature                  1..13
                              note = U can be replaced by T. Any base can be replaced
                              with a modified base.
source                        1..13
                              mol_type = other RNA
```

```
                        organism = synthetic construct
SEQUENCE: 142
acacaaacgg ccc                                                          13

SEQ ID NO: 143          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 143
gacacaaacg gcc                                                          13

SEQ ID NO: 144          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 144
agacacaaac ggc                                                          13

SEQ ID NO: 145          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 145
cagacacaaa cgg                                                          13

SEQ ID NO: 146          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 146
ccagacacaa acg                                                          13

SEQ ID NO: 147          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 147
cccagacaca aac                                                          13

SEQ ID NO: 148          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
```

```
SEQUENCE: 148
acccagacac aaa                                                              13

SEQ ID NO: 149            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 149
tacccagaca caa                                                              13

SEQ ID NO: 150            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 150
atacccagac aca                                                              13

SEQ ID NO: 151            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 151
catacccaga cac                                                              13

SEQ ID NO: 152            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 152
acatacccag aca                                                              13

SEQ ID NO: 153            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 153
gacataccca gac                                                              13

SEQ ID NO: 154            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 154
```

```
agacataccc aga                                                       13

SEQ ID NO: 155         moltype = RNA   length = 13
FEATURE                Location/Qualifiers
misc_feature           1..13
                       note = Synthetic sequence
misc_feature           1..13
                       note = U can be replaced by T. Any base can be replaced
                        with a modified base.
source                 1..13
                       mol_type = other RNA
                       organism = synthetic construct
SEQUENCE: 155
gagacatacc cag                                                       13

SEQ ID NO: 156         moltype = RNA   length = 13
FEATURE                Location/Qualifiers
misc_feature           1..13
                       note = Synthetic sequence
misc_feature           1..13
                       note = U can be replaced by T. Any base can be replaced
                        with a modified base.
source                 1..13
                       mol_type = other RNA
                       organism = synthetic construct
SEQUENCE: 156
agagacatac cca                                                       13

SEQ ID NO: 157         moltype = RNA   length = 13
FEATURE                Location/Qualifiers
misc_feature           1..13
                       note = Synthetic sequence
misc_feature           1..13
                       note = U can be replaced by T. Any base can be replaced
                        with a modified base.
source                 1..13
                       mol_type = other RNA
                       organism = synthetic construct
SEQUENCE: 157
aagagacata ccc                                                       13

SEQ ID NO: 158         moltype = RNA   length = 13
FEATURE                Location/Qualifiers
misc_feature           1..13
                       note = Synthetic sequence
misc_feature           1..13
                       note = U can be replaced by T. Any base can be replaced
                        with a modified base.
source                 1..13
                       mol_type = other RNA
                       organism = synthetic construct
SEQUENCE: 158
gaagagacat acc                                                       13

SEQ ID NO: 159         moltype = RNA   length = 13
FEATURE                Location/Qualifiers
misc_feature           1..13
                       note = Synthetic sequence
misc_feature           1..13
                       note = U can be replaced by T. Any base can be replaced
                        with a modified base.
source                 1..13
                       mol_type = other RNA
                       organism = synthetic construct
SEQUENCE: 159
ggaagagaca tac                                                       13

SEQ ID NO: 160         moltype = RNA   length = 13
FEATURE                Location/Qualifiers
misc_feature           1..13
                       note = Synthetic sequence
misc_feature           1..13
                       note = U can be replaced by T. Any base can be replaced
                        with a modified base.
source                 1..13
                       mol_type = other RNA
                       organism = synthetic construct
SEQUENCE: 160
tggaagagac ata                                                       13
```

| | | |
|---|---|---|
| SEQ ID NO: 161<br>FEATURE<br>misc_feature | | moltype = RNA   length = 13<br>Location/Qualifiers<br>1..13 |
| misc_feature | | note = Synthetic sequence<br>1..13<br>note = U can be replaced by T. Any base can be replaced<br>    with a modified base. |
| source | | 1..13<br>mol_type = other RNA<br>organism = synthetic construct |
| SEQUENCE: 161<br>ctggaagaga cat | | 13 |
| SEQ ID NO: 162<br>FEATURE<br>misc_feature | | moltype = RNA   length = 13<br>Location/Qualifiers<br>1..13 |
| misc_feature | | note = Synthetic sequence<br>1..13<br>note = U can be replaced by T. Any base can be replaced<br>    with a modified base. |
| source | | 1..13<br>mol_type = other RNA<br>organism = synthetic construct |
| SEQUENCE: 162<br>gctggaagag aca | | 13 |
| SEQ ID NO: 163<br>FEATURE<br>misc_feature | | moltype = RNA   length = 13<br>Location/Qualifiers<br>1..13 |
| misc_feature | | note = Synthetic sequence<br>1..13<br>note = U can be replaced by T. Any base can be replaced<br>    with a modified base. |
| source | | 1..13<br>mol_type = other RNA<br>organism = synthetic construct |
| SEQUENCE: 163<br>agctggaaga gac | | 13 |
| SEQ ID NO: 164<br>FEATURE<br>misc_feature | | moltype = RNA   length = 13<br>Location/Qualifiers<br>1..13 |
| source | | note = Synthetic sequence<br>1..13<br>mol_type = other RNA<br>organism = synthetic construct |
| SEQUENCE: 164<br>cagctggaag aga | | 13 |
| SEQ ID NO: 165<br>FEATURE<br>misc_feature | | moltype = RNA   length = 13<br>Location/Qualifiers<br>1..13 |
| misc_feature | | note = Synthetic sequence<br>1..13<br>note = U can be replaced by T. Any base can be replaced<br>    with a modified base. |
| source | | 1..13<br>mol_type = other RNA<br>organism = synthetic construct |
| SEQUENCE: 165<br>gcagctggaa gag | | 13 |
| SEQ ID NO: 166<br>FEATURE<br>misc_feature | | moltype = RNA   length = 13<br>Location/Qualifiers<br>1..13 |
| misc_feature | | note = Synthetic sequence<br>1..13<br>note = U can be replaced by T. Any base can be replaced<br>    with a modified base. |
| source | | 1..13<br>mol_type = other RNA<br>organism = synthetic construct |
| SEQUENCE: 166<br>ggcagctgga aga | | 13 |
| SEQ ID NO: 167<br>FEATURE<br>misc_feature | | moltype = RNA   length = 13<br>Location/Qualifiers<br>1..13 |

```
                    note = Synthetic sequence
misc_feature        1..13
                    note = U can be replaced by T. Any base can be replaced
                     with a modified base.
source              1..13
                    mol_type = other RNA
                    organism = synthetic construct
SEQUENCE: 167
aggcagctgg aag                                                            13

SEQ ID NO: 168      moltype = RNA   length = 13
FEATURE             Location/Qualifiers
misc_feature        1..13
                    note = Synthetic sequence
misc_feature        1..13
                    note = U can be replaced by T. Any base can be replaced
                     with a modified base.
source              1..13
                    mol_type = other RNA
                    organism = synthetic construct
SEQUENCE: 168
caggcagctg gaa                                                            13

SEQ ID NO: 169      moltype = RNA   length = 13
FEATURE             Location/Qualifiers
misc_feature        1..13
                    note = Synthetic sequence
misc_feature        1..13
                    note = U can be replaced by T. Any base can be replaced
                     with a modified base.
source              1..13
                    mol_type = other RNA
                    organism = synthetic construct
SEQUENCE: 169
ccaggcagct gga                                                            13

SEQ ID NO: 170      moltype = RNA   length = 13
FEATURE             Location/Qualifiers
misc_feature        1..13
                    note = Synthetic sequence
misc_feature        1..13
                    note = U can be replaced by T. Any base can be replaced
                     with a modified base.
source              1..13
                    mol_type = other RNA
                    organism = synthetic construct
SEQUENCE: 170
cccaggcagc tgg                                                            13

SEQ ID NO: 171      moltype = RNA   length = 13
FEATURE             Location/Qualifiers
misc_feature        1..13
                    note = Synthetic sequence
misc_feature        1..13
                    note = U can be replaced by T. Any base can be replaced
                     with a modified base.
source              1..13
                    mol_type = other RNA
                    organism = synthetic construct
SEQUENCE: 171
acccaggcag ctg                                                            13

SEQ ID NO: 172      moltype = RNA   length = 13
FEATURE             Location/Qualifiers
misc_feature        1..13
                    note = Synthetic sequence
misc_feature        1..13
                    note = U can be replaced by T. Any base can be replaced
                     with a modified base.
source              1..13
                    mol_type = other RNA
                    organism = synthetic construct
SEQUENCE: 172
aacccaggca gct                                                            13

SEQ ID NO: 173      moltype = RNA   length = 13
FEATURE             Location/Qualifiers
misc_feature        1..13
                    note = Synthetic sequence
```

```
misc_feature           1..13
                       note = U can be replaced by T. Any base can be replaced
                        with a modified base.
source                 1..13
                       mol_type = other RNA
                       organism = synthetic construct
SEQUENCE: 173
aaacccaggc agc                                                              13

SEQ ID NO: 174         moltype = RNA   length = 13
FEATURE                Location/Qualifiers
misc_feature           1..13
                       note = Synthetic sequence
misc_feature           1..13
                       note = U can be replaced by T. Any base can be replaced
                        with a modified base.
source                 1..13
                       mol_type = other RNA
                       organism = synthetic construct
SEQUENCE: 174
gaaacccagg cag                                                              13

SEQ ID NO: 175         moltype = RNA   length = 13
FEATURE                Location/Qualifiers
misc_feature           1..13
                       note = Synthetic sequence
misc_feature           1..13
                       note = U can be replaced by T. Any base can be replaced
                        with a modified base.
source                 1..13
                       mol_type = other RNA
                       organism = synthetic construct
SEQUENCE: 175
ggaaacccag gca                                                              13

SEQ ID NO: 176         moltype = RNA   length = 13
FEATURE                Location/Qualifiers
misc_feature           1..13
                       note = Synthetic sequence
misc_feature           1..13
                       note = U can be replaced by T. Any base can be replaced
                        with a modified base.
source                 1..13
                       mol_type = other RNA
                       organism = synthetic construct
SEQUENCE: 176
aggaaaccca ggc                                                              13

SEQ ID NO: 177         moltype = RNA   length = 13
FEATURE                Location/Qualifiers
misc_feature           1..13
                       note = Synthetic sequence
misc_feature           1..13
                       note = U can be replaced by T. Any base can be replaced
                        with a modified base.
source                 1..13
                       mol_type = other RNA
                       organism = synthetic construct
SEQUENCE: 177
caggaaaccc agg                                                              13

SEQ ID NO: 178         moltype = RNA   length = 13
FEATURE                Location/Qualifiers
misc_feature           1..13
                       note = Synthetic sequence
misc_feature           1..13
                       note = U can be replaced by T. Any base can be replaced
                        with a modified base.
source                 1..13
                       mol_type = other RNA
                       organism = synthetic construct
SEQUENCE: 178
ccaggaaacc cag                                                              13

SEQ ID NO: 179         moltype = RNA   length = 13
FEATURE                Location/Qualifiers
misc_feature           1..13
                       note = Synthetic sequence
misc_feature           1..13
```

```
                             note = U can be replaced by T. Any base can be replaced
                             with a modified base.
source                       1..13
                             mol_type = other RNA
                             organism = synthetic construct
SEQUENCE: 179
tccaggaaac cca                                                                    13

SEQ ID NO: 180               moltype = RNA  length = 13
FEATURE                      Location/Qualifiers
misc_feature                 1..13
                             note = Synthetic sequence
misc_feature                 1..13
                             note = U can be replaced by T. Any base can be replaced
                             with a modified base.
source                       1..13
                             mol_type = other RNA
                             organism = synthetic construct
SEQUENCE: 180
ttccaggaaa ccc                                                                    13

SEQ ID NO: 181               moltype = RNA  length = 13
FEATURE                      Location/Qualifiers
misc_feature                 1..13
                             note = Synthetic sequence
misc_feature                 1..13
                             note = U can be replaced by T. Any base can be replaced
                             with a modified base.
source                       1..13
                             mol_type = other RNA
                             organism = synthetic construct
SEQUENCE: 181
tttccaggaa acc                                                                    13

SEQ ID NO: 182               moltype = RNA  length = 13
FEATURE                      Location/Qualifiers
misc_feature                 1..13
                             note = Synthetic sequence
misc_feature                 1..13
                             note = U can be replaced by T. Any base can be replaced
                             with a modified base.
source                       1..13
                             mol_type = other RNA
                             organism = synthetic construct
SEQUENCE: 182
ctttccagga aac                                                                    13

SEQ ID NO: 183               moltype = RNA  length = 13
FEATURE                      Location/Qualifiers
misc_feature                 1..13
                             note = Synthetic sequence
misc_feature                 1..13
                             note = U can be replaced by T. Any base can be replaced
                             with a modified base.
source                       1..13
                             mol_type = other RNA
                             organism = synthetic construct
SEQUENCE: 183
tctttccagg aaa                                                                    13

SEQ ID NO: 184               moltype = RNA  length = 13
FEATURE                      Location/Qualifiers
misc_feature                 1..13
                             note = Synthetic sequence
misc_feature                 1..13
                             note = U can be replaced by T. Any base can be replaced
                             with a modified base.
source                       1..13
                             mol_type = other RNA
                             organism = synthetic construct
SEQUENCE: 184
ttctttccag gaa                                                                    13

SEQ ID NO: 185               moltype = RNA  length = 13
FEATURE                      Location/Qualifiers
misc_feature                 1..13
                             note = Synthetic sequence
misc_feature                 1..13
                             note = U can be replaced by T. Any base can be replaced
```

```
                        with a modified base.
source                  1..13
                        mol_type = other RNA
                        organism = synthetic construct
SEQUENCE: 185
gttctttcca gga                                                            13

SEQ ID NO: 186          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 186
agttctttcc agg                                                            13

SEQ ID NO: 187          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 187
gagttctttc cag                                                            13

SEQ ID NO: 188          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 188
agagttcttt cca                                                            13

SEQ ID NO: 189          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 189
aagagttctt tcc                                                            13

SEQ ID NO: 190          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 190
taagagttct ttc                                                            13

SEQ ID NO: 191          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
```

```
source              1..13
                    mol_type = other RNA
                    organism = synthetic construct
SEQUENCE: 191
ataagagttc ttt                                                          13

SEQ ID NO: 192      moltype = RNA   length = 13
FEATURE             Location/Qualifiers
misc_feature        1..13
                    note = Synthetic sequence
misc_feature        1..13
                    note = U can be replaced by T. Any base can be replaced
                    with a modified base.
source              1..13
                    mol_type = other RNA
                    organism = synthetic construct
SEQUENCE: 192
gataagagtt ctt                                                          13

SEQ ID NO: 193      moltype = RNA   length = 13
FEATURE             Location/Qualifiers
misc_feature        1..13
                    note = Synthetic sequence
misc_feature        1..13
                    note = U can be replaced by T. Any base can be replaced
                    with a modified base.
source              1..13
                    mol_type = other RNA
                    organism = synthetic construct
SEQUENCE: 193
ggataagagt tct                                                          13

SEQ ID NO: 194      moltype = RNA   length = 13
FEATURE             Location/Qualifiers
misc_feature        1..13
                    note = Synthetic sequence
misc_feature        1..13
                    note = U can be replaced by T. Any base can be replaced
                    with a modified base.
source              1..13
                    mol_type = other RNA
                    organism = synthetic construct
SEQUENCE: 194
gggataagag ttc                                                          13

SEQ ID NO: 195      moltype = RNA   length = 13
FEATURE             Location/Qualifiers
misc_feature        1..13
                    note = Synthetic sequence
misc_feature        1..13
                    note = U can be replaced by T. Any base can be replaced
                    with a modified base.
source              1..13
                    mol_type = other RNA
                    organism = synthetic construct
SEQUENCE: 195
ggggataaga gtt                                                          13

SEQ ID NO: 196      moltype = RNA   length = 13
FEATURE             Location/Qualifiers
misc_feature        1..13
                    note = Synthetic sequence
misc_feature        1..13
                    note = U can be replaced by T. Any base can be replaced
                    with a modified base.
source              1..13
                    mol_type = other RNA
                    organism = synthetic construct
SEQUENCE: 196
tggggataag agt                                                          13

SEQ ID NO: 197      moltype = RNA   length = 13
FEATURE             Location/Qualifiers
misc_feature        1..13
                    note = Synthetic sequence
misc_feature        1..13
                    note = U can be replaced by T. Any base can be replaced
                    with a modified base.
source              1..13
```

```
                            mol_type = other RNA
                            organism = synthetic construct
SEQUENCE: 197
ctggggataa gag                                                            13

SEQ ID NO: 198              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 198
cctgggata aga                                                             13

SEQ ID NO: 199              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 199
tcctggggat aag                                                            13

SEQ ID NO: 200              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 200
ttcctgggga taa                                                            13

SEQ ID NO: 201              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 201
gttcctgggg ata                                                            13

SEQ ID NO: 202              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 202
agttcctggg gat                                                            13

SEQ ID NO: 203              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
```

```
                         organism = synthetic construct
SEQUENCE: 203
tagttcctgg gga                                                               13

SEQ ID NO: 204           moltype = RNA   length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 204
ctagttcctg ggg                                                               13

SEQ ID NO: 205           moltype = RNA   length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 205
actagttcct ggg                                                               13

SEQ ID NO: 206           moltype = RNA   length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 206
aactagttcc tgg                                                               13

SEQ ID NO: 207           moltype = RNA   length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 207
aaactagttc ctg                                                               13

SEQ ID NO: 208           moltype = RNA   length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 208
caaactagtt cct                                                               13

SEQ ID NO: 209           moltype = RNA   length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
```

```
SEQUENCE: 209
acaaactagt tcc                                                              13

SEQ ID NO: 210          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 210
aacaaactag ttc                                                              13

SEQ ID NO: 211          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 211
caacaaacta gtt                                                              13

SEQ ID NO: 212          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 212
tcaacaaact agt                                                              13

SEQ ID NO: 213          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 213
ttcaacaaac tag                                                              13

SEQ ID NO: 214          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 214
attcaacaaa cta                                                              13

SEQ ID NO: 215          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 215
```
tattcaacaa act                                                                                  13

SEQ ID NO: 216          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 216
ttattcaaca aac                                                                                  13

SEQ ID NO: 217          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 217
tttattcaac aaa                                                                                  13

SEQ ID NO: 218          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 218
atttattcaa caa                                                                                  13

SEQ ID NO: 219          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 219
catttattca aca                                                                                  13

SEQ ID NO: 220          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 220
gcatttattc aac                                                                                  13

SEQ ID NO: 221          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 221
agcatttatt caa                                                                                  13

```
SEQ ID NO: 222            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 222
cagcatttat tca                                                            13

SEQ ID NO: 223            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 223
ccagcattta ttc                                                            13

SEQ ID NO: 224            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 224
accagcattt att                                                            13

SEQ ID NO: 225            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 225
caccagcatt tat                                                            13

SEQ ID NO: 226            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 226
tcaccagcat tta                                                            13

SEQ ID NO: 227            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 227
ttcaccagca ttt                                                            13
```

```
SEQ ID NO: 228          moltype = RNA  length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 228
attcaccagc att                                                            13

SEQ ID NO: 229          moltype = RNA  length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 229
cattcaccag cat                                                            13

SEQ ID NO: 230          moltype = RNA  length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 230
tcattcacca gca                                                            13

SEQ ID NO: 231          moltype = RNA  length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 231
ttcattcacc agc                                                            13

SEQ ID NO: 232          moltype = RNA  length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 232
attcattcac cag                                                            13

SEQ ID NO: 233          moltype = RNA  length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 233
cattcattca cca                                                            13

SEQ ID NO: 234          moltype = RNA  length = 13
```

```
FEATURE                   Location/Qualifiers
misc_feature              1..13
                          note = Synthetic sequence
misc_feature              1..13
                          note = U can be replaced by T. Any base can be replaced
                           with a modified base.
source                    1..13
                          mol_type = other RNA
                          organism = synthetic construct
SEQUENCE: 234
tcattcattc acc                                                                      13

SEQ ID NO: 235            moltype = RNA   length = 13
FEATURE                   Location/Qualifiers
misc_feature              1..13
                          note = Synthetic sequence
misc_feature              1..13
                          note = U can be replaced by T. Any base can be replaced
                           with a modified base.
source                    1..13
                          mol_type = other RNA
                          organism = synthetic construct
SEQUENCE: 235
ttcattcatt cac                                                                      13

SEQ ID NO: 236            moltype = RNA   length = 13
FEATURE                   Location/Qualifiers
misc_feature              1..13
                          note = Synthetic sequence
misc_feature              1..13
                          note = U can be replaced by T. Any base can be replaced
                           with a modified base.
source                    1..13
                          mol_type = other RNA
                          organism = synthetic construct
SEQUENCE: 236
attcattcat tca                                                                      13

SEQ ID NO: 237            moltype = RNA   length = 13
FEATURE                   Location/Qualifiers
misc_feature              1..13
                          note = Synthetic sequence
misc_feature              1..13
                          note = U can be replaced by T. Any base can be replaced
                           with a modified base.
source                    1..13
                          mol_type = other RNA
                          organism = synthetic construct
SEQUENCE: 237
cattcattca ttc                                                                      13

SEQ ID NO: 238            moltype = RNA   length = 13
FEATURE                   Location/Qualifiers
misc_feature              1..13
                          note = Synthetic sequence
misc_feature              1..13
                          note = U can be replaced by T. Any base can be replaced
                           with a modified base.
source                    1..13
                          mol_type = other RNA
                          organism = synthetic construct
SEQUENCE: 238
tcattcattc att                                                                      13

SEQ ID NO: 239            moltype = RNA   length = 13
FEATURE                   Location/Qualifiers
misc_feature              1..13
                          note = Synthetic sequence
misc_feature              1..13
                          note = U can be replaced by T. Any base can be replaced
                           with a modified base.
source                    1..13
                          mol_type = other RNA
                          organism = synthetic construct
SEQUENCE: 239
atcattcatt cat                                                                      13

SEQ ID NO: 240            moltype = RNA   length = 13
FEATURE                   Location/Qualifiers
```

```
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 240
aatcattcat tca                                                            13

SEQ ID NO: 241            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 241
caatcattca ttc                                                            13

SEQ ID NO: 242            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 242
tcaatcattc att                                                            13

SEQ ID NO: 243            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 243
ttcaatcatt cat                                                            13

SEQ ID NO: 244            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 244
gttcaatcat tca                                                            13

SEQ ID NO: 245            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 245
tgttcaatca ttc                                                            13

SEQ ID NO: 246            moltype = RNA   length = 13
FEATURE                   Location/Qualifiers
misc_feature              1..13
```

```
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 246
ctgttcaatc att                                                             13

SEQ ID NO: 247          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 247
tctgttcaat cat                                                             13

SEQ ID NO: 248          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 248
atctgttcaa tca                                                             13

SEQ ID NO: 249          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 249
catctgttca atc                                                             13

SEQ ID NO: 250          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 250
tcatctgttc aat                                                             13

SEQ ID NO: 251          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 251
ttcatctgtt caa                                                             13

SEQ ID NO: 252          moltype = RNA   length = 13
FEATURE                 Location/Qualifiers
misc_feature            1..13
                        note = Synthetic sequence
```

```
                        -continued misc_feature            1..13
                        note = U can be replaced by T. Any base can be replaced
                         with a modified base.
source                  1..13
                        mol_type = other RNA
                        organism = synthetic construct
SEQUENCE: 252
attcatctgt tca                                                              13

SEQ ID NO: 253          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 253
cattcatctg ttc                                                              13

SEQ ID NO: 254          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 254
tcattcatct gtt                                                              13

SEQ ID NO: 255          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 255
ctcattcatc tgt                                                              13

SEQ ID NO: 256          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 256
actcattcat ctg                                                              13

SEQ ID NO: 257          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 257
cactcattca tct                                                              13

SEQ ID NO: 258          moltype = RNA   length = 13
FEATURE                 Location/Qualifiers
misc_feature            1..13
                        note = Synthetic sequence
misc_feature            1..13
```

|  |  |  |
|---|---|---|
| | note = U can be replaced by T. Any base can be replaced with a modified base. | |
| source | 1..13<br>mol_type = other RNA<br>organism = synthetic construct | |
| SEQUENCE: 258 | | |
| tcactcattc atc | | 13 |
| SEQ ID NO: 259<br>FEATURE<br>misc_feature | moltype = RNA   length = 13<br>Location/Qualifiers<br>1..13<br>note = Synthetic sequence | |
| misc_feature | 1..13<br>note = U can be replaced by T. Any base can be replaced with a modified base. | |
| source | 1..13<br>mol_type = other RNA<br>organism = synthetic construct | |
| SEQUENCE: 259 | | |
| atcactcatt cat | | 13 |
| SEQ ID NO: 260<br>FEATURE<br>misc_feature | moltype = RNA   length = 13<br>Location/Qualifiers<br>1..13<br>note = Synthetic sequence | |
| misc_feature | 1..13<br>note = U can be replaced by T. Any base can be replaced with a modified base. | |
| source | 1..13<br>mol_type = other RNA<br>organism = synthetic construct | |
| SEQUENCE: 260 | | |
| catcactcat tca | | 13 |
| SEQ ID NO: 261<br>FEATURE<br>misc_feature | moltype = RNA   length = 13<br>Location/Qualifiers<br>1..13<br>note = Synthetic sequence | |
| misc_feature | 1..13<br>note = U can be replaced by T. Any base can be replaced with a modified base. | |
| source | 1..13<br>mol_type = other RNA<br>organism = synthetic construct | |
| SEQUENCE: 261 | | |
| tcatcactca ttc | | 13 |
| SEQ ID NO: 262<br>FEATURE<br>misc_feature | moltype = RNA   length = 13<br>Location/Qualifiers<br>1..13<br>note = Synthetic sequence | |
| misc_feature | 1..13<br>note = U can be replaced by T. Any base can be replaced with a modified base. | |
| source | 1..13<br>mol_type = other RNA<br>organism = synthetic construct | |
| SEQUENCE: 262 | | |
| ctcatcactc att | | 13 |
| SEQ ID NO: 263<br>FEATURE<br>misc_feature | moltype = RNA   length = 13<br>Location/Qualifiers<br>1..13<br>note = Synthetic sequence | |
| misc_feature | 1..13<br>note = U can be replaced by T. Any base can be replaced with a modified base. | |
| source | 1..13<br>mol_type = other RNA<br>organism = synthetic construct | |
| SEQUENCE: 263 | | |
| actcatcact cat | | 13 |
| SEQ ID NO: 264<br>FEATURE<br>misc_feature | moltype = RNA   length = 13<br>Location/Qualifiers<br>1..13<br>note = Synthetic sequence | |
| misc_feature | 1..13<br>note = U can be replaced by T. Any base can be replaced | |

```
                          with a modified base.
source                    1..13
                          mol_type = other RNA
                          organism = synthetic construct
SEQUENCE: 264
tactcatcac tca                                                            13

SEQ ID NO: 265            moltype = RNA   length = 13
FEATURE                   Location/Qualifiers
misc_feature              1..13
                          note = Synthetic sequence
misc_feature              1..13
                          note = U can be replaced by T. Any base can be replaced
                          with a modified base.
source                    1..13
                          mol_type = other RNA
                          organism = synthetic construct
SEQUENCE: 265
ctactcatca ctc                                                            13

SEQ ID NO: 266            moltype = RNA   length = 13
FEATURE                   Location/Qualifiers
misc_feature              1..13
                          note = Synthetic sequence
misc_feature              1..13
                          note = U can be replaced by T. Any base can be replaced
                          with a modified base.
source                    1..13
                          mol_type = other RNA
                          organism = synthetic construct
SEQUENCE: 266
tctactcatc act                                                            13

SEQ ID NO: 267            moltype = RNA   length = 13
FEATURE                   Location/Qualifiers
misc_feature              1..13
                          note = Synthetic sequence
misc_feature              1..13
                          note = U can be replaced by T. Any base can be replaced
                          with a modified base.
source                    1..13
                          mol_type = other RNA
                          organism = synthetic construct
SEQUENCE: 267
atctactcat cac                                                            13

SEQ ID NO: 268            moltype = RNA   length = 13
FEATURE                   Location/Qualifiers
misc_feature              1..13
                          note = Synthetic sequence
misc_feature              1..13
                          note = U can be replaced by T. Any base can be replaced
                          with a modified base.
source                    1..13
                          mol_type = other RNA
                          organism = synthetic construct
SEQUENCE: 268
tatctactca tca                                                            13

SEQ ID NO: 269            moltype = RNA   length = 13
FEATURE                   Location/Qualifiers
misc_feature              1..13
                          note = Synthetic sequence
misc_feature              1..13
                          note = U can be replaced by T. Any base can be replaced
                          with a modified base.
source                    1..13
                          mol_type = other RNA
                          organism = synthetic construct
SEQUENCE: 269
ttatctactc atc                                                            13

SEQ ID NO: 270            moltype = RNA   length = 13
FEATURE                   Location/Qualifiers
misc_feature              1..13
                          note = Synthetic sequence
misc_feature              1..13
                          note = U can be replaced by T. Any base can be replaced
                          with a modified base.
```

```
source                  1..13
                        mol_type = other RNA
                        organism = synthetic construct
SEQUENCE: 270
tttatctact cat                                                           13

SEQ ID NO: 271          moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 271
ttttatctac tca                                                           13

SEQ ID NO: 272          moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 272
cttttatcta ctc                                                           13

SEQ ID NO: 273          moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 273
ccttttatct act                                                           13

SEQ ID NO: 274          moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 274
gcttttatct act                                                           13

SEQ ID NO: 275          moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 275
tccttttatc tac                                                           13

SEQ ID NO: 276          moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
```

```
                         mol_type = other RNA
                         organism = synthetic construct
SEQUENCE: 276
tgcttttatc tac                                                              13

SEQ ID NO: 277           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 277
atcctttat cta                                                               13

SEQ ID NO: 278           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 278
atgctttat cta                                                               13

SEQ ID NO: 279           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 279
catcctttta tct                                                              13

SEQ ID NO: 280           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 280
catgctttta tct                                                              13

SEQ ID NO: 281           moltype = RNA   length = 13
FEATURE                  Location/Qualifiers
misc_feature             1..13
                         note = Synthetic sequence
source                   1..13
                         mol_type = other RNA
                         organism = synthetic construct
SEQUENCE: 281
ccatcctttt atc                                                              13

SEQ ID NO: 282           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 282
ccatgctttt atc                                                              13
```

| | | |
|---|---|---|
| SEQ ID NO: 283 | moltype = RNA length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 283 | | |
| tccatccttt tat | | 13 |
| SEQ ID NO: 284 | moltype = RNA length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 284 | | |
| tccatgcttt tat | | 13 |
| SEQ ID NO: 285 | moltype = RNA length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 285 | | |
| atccatcctt tta | | 13 |
| SEQ ID NO: 286 | moltype = RNA length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 286 | | |
| atccatgctt tta | | 13 |
| SEQ ID NO: 287 | moltype = RNA length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 287 | | |
| catccatcct ttt | | 13 |
| SEQ ID NO: 288 | moltype = RNA length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 288 | | |
| catccatgct ttt | | 13 |

```
SEQ ID NO: 289           moltype = RNA   length = 13
FEATURE                  Location/Qualifiers
misc_feature             1..13
                         note = Synthetic sequence
misc_feature             1..13
                         note = U can be replaced by T. Any base can be replaced
                         with a modified base.
source                   1..13
                         mol_type = other RNA
                         organism = synthetic construct
SEQUENCE: 289
ccatccatcc ttt                                                              13

SEQ ID NO: 290           moltype = RNA   length = 13
FEATURE                  Location/Qualifiers
misc_feature             1..13
                         note = Synthetic sequence
misc_feature             1..13
                         note = U can be replaced by T. Any base can be replaced
                         with a modified base.
source                   1..13
                         mol_type = other RNA
                         organism = synthetic construct
SEQUENCE: 290
ccatccatgc ttt                                                              13

SEQ ID NO: 291           moltype = RNA   length = 13
FEATURE                  Location/Qualifiers
misc_feature             1..13
                         note = Synthetic sequence
misc_feature             1..13
                         note = U can be replaced by T. Any base can be replaced
                         with a modified base.
source                   1..13
                         mol_type = other RNA
                         organism = synthetic construct
SEQUENCE: 291
tccatccatc ctt                                                              13

SEQ ID NO: 292           moltype = RNA   length = 13
FEATURE                  Location/Qualifiers
misc_feature             1..13
                         note = Synthetic sequence
misc_feature             1..13
                         note = U can be replaced by T. Any base can be replaced
                         with a modified base.
source                   1..13
                         mol_type = other RNA
                         organism = synthetic construct
SEQUENCE: 292
tccatccatg ctt                                                              13

SEQ ID NO: 293           moltype = RNA   length = 13
FEATURE                  Location/Qualifiers
misc_feature             1..13
                         note = Synthetic sequence
misc_feature             1..13
                         note = U can be replaced by T. Any base can be replaced
                         with a modified base.
source                   1..13
                         mol_type = other RNA
                         organism = synthetic construct
SEQUENCE: 293
ctccatccat cct                                                              13

SEQ ID NO: 294           moltype = RNA   length = 13
FEATURE                  Location/Qualifiers
misc_feature             1..13
                         note = Synthetic sequence
misc_feature             1..13
                         note = U can be replaced by T. Any base can be replaced
                         with a modified base.
source                   1..13
                         mol_type = other RNA
                         organism = synthetic construct
SEQUENCE: 294
ctccatccat gct                                                              13

SEQ ID NO: 295           moltype = RNA   length = 13
```

```
FEATURE              Location/Qualifiers
misc_feature         1..13
                     note = Synthetic sequence
misc_feature         1..13
                     note = U can be replaced by T. Any base can be replaced
                      with a modified base.
source               1..13
                     mol_type = other RNA
                     organism = synthetic construct
SEQUENCE: 295
tctccatcca tcc                                                               13

SEQ ID NO: 296       moltype = RNA  length = 13
FEATURE              Location/Qualifiers
misc_feature         1..13
                     note = Synthetic sequence
misc_feature         1..13
                     note = U can be replaced by T. Any base can be replaced
                      with a modified base.
source               1..13
                     mol_type = other RNA
                     organism = synthetic construct
SEQUENCE: 296
tctccatcca tgc                                                               13

SEQ ID NO: 297       moltype = RNA  length = 13
FEATURE              Location/Qualifiers
misc_feature         1..13
                     note = Synthetic sequence
misc_feature         1..13
                     note = U can be replaced by T. Any base can be replaced
                      with a modified base.
source               1..13
                     mol_type = other RNA
                     organism = synthetic construct
SEQUENCE: 297
ctctccatcc atc                                                               13

SEQ ID NO: 298       moltype = RNA  length = 13
FEATURE              Location/Qualifiers
misc_feature         1..13
                     note = Synthetic sequence
misc_feature         1..13
                     note = U can be replaced by T. Any base can be replaced
                      with a modified base.
source               1..13
                     mol_type = other RNA
                     organism = synthetic construct
SEQUENCE: 298
ctctccatcc atg                                                               13

SEQ ID NO: 299       moltype = RNA  length = 13
FEATURE              Location/Qualifiers
misc_feature         1..13
                     note = Synthetic sequence
misc_feature         1..13
                     note = U can be replaced by T. Any base can be replaced
                      with a modified base.
source               1..13
                     mol_type = other RNA
                     organism = synthetic construct
SEQUENCE: 299
tctctccatc cat                                                               13

SEQ ID NO: 300       moltype = RNA  length = 13
FEATURE              Location/Qualifiers
misc_feature         1..13
                     note = Synthetic sequence
misc_feature         1..13
                     note = U can be replaced by T. Any base can be replaced
                      with a modified base.
source               1..13
                     mol_type = other RNA
                     organism = synthetic construct
SEQUENCE: 300
atctctccat cca                                                               13

SEQ ID NO: 301       moltype = RNA  length = 13
FEATURE              Location/Qualifiers
```

```
                        misc_feature            1..13
                                                note = Synthetic sequence
                        misc_feature            1..13
                                                note = U can be replaced by T. Any base can be replaced
                                                 with a modified base.
                        source                  1..13
                                                mol_type = other RNA
                                                organism = synthetic construct
SEQUENCE: 301
catctctcca tcc                                                                          13

SEQ ID NO: 302          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 302
ccatctctcc atc                                                                          13

SEQ ID NO: 303          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 303
cccatctctc cat                                                                          13

SEQ ID NO: 304          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 304
acccatctct cca                                                                          13

SEQ ID NO: 305          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 305
cacccatctc tcc                                                                          13

SEQ ID NO: 306          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 306
tcacccatct ctc                                                                          13

SEQ ID NO: 307          moltype = RNA   length = 13
FEATURE                 Location/Qualifiers
misc_feature            1..13
```

```
                    note = Synthetic sequence
misc_feature        1..13
                    note = U can be replaced by T. Any base can be replaced
                     with a modified base.
source              1..13
                    mol_type = other RNA
                    organism = synthetic construct
SEQUENCE: 307
ctcacccatc tct                                                          13

SEQ ID NO: 308      moltype = RNA   length = 13
FEATURE             Location/Qualifiers
misc_feature        1..13
                    note = Synthetic sequence
misc_feature        1..13
                    note = U can be replaced by T. Any base can be replaced
                     with a modified base.
source              1..13
                    mol_type = other RNA
                    organism = synthetic construct
SEQUENCE: 308
actcacccat ctc                                                          13

SEQ ID NO: 309      moltype = RNA   length = 13
FEATURE             Location/Qualifiers
misc_feature        1..13
                    note = Synthetic sequence
misc_feature        1..13
                    note = U can be replaced by T. Any base can be replaced
                     with a modified base.
source              1..13
                    mol_type = other RNA
                    organism = synthetic construct
SEQUENCE: 309
tactcaccca tct                                                          13

SEQ ID NO: 310      moltype = RNA   length = 13
FEATURE             Location/Qualifiers
misc_feature        1..13
                    note = Synthetic sequence
misc_feature        1..13
                    note = U can be replaced by T. Any base can be replaced
                     with a modified base.
source              1..13
                    mol_type = other RNA
                    organism = synthetic construct
SEQUENCE: 310
gtactcaccc atc                                                          13

SEQ ID NO: 311      moltype = RNA   length = 13
FEATURE             Location/Qualifiers
misc_feature        1..13
                    note = Synthetic sequence
misc_feature        1..13
                    note = U can be replaced by T. Any base can be replaced
                     with a modified base.
source              1..13
                    mol_type = other RNA
                    organism = synthetic construct
SEQUENCE: 311
tgtactcacc cat                                                          13

SEQ ID NO: 312      moltype = RNA   length = 13
FEATURE             Location/Qualifiers
misc_feature        1..13
                    note = Synthetic sequence
misc_feature        1..13
                    note = U can be replaced by T. Any base can be replaced
                     with a modified base.
source              1..13
                    mol_type = other RNA
                    organism = synthetic construct
SEQUENCE: 312
atgtactcac cca                                                          13

SEQ ID NO: 313      moltype = RNA   length = 13
FEATURE             Location/Qualifiers
misc_feature        1..13
                    note = Synthetic sequence
```

```
                        1..13
                        note = U can be replaced by T. Any base can be replaced
                         with a modified base.
source                  1..13
                        mol_type = other RNA
                        organism = synthetic construct
SEQUENCE: 313
catgtactca ccc                                                             13

SEQ ID NO: 314          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 314
ccatgtactc acc                                                             13

SEQ ID NO: 315          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 315
tccatgtact cac                                                             13

SEQ ID NO: 316          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 316
atccatgtac tca                                                             13

SEQ ID NO: 317          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 317
catccatgta ctc                                                             13

SEQ ID NO: 318          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 318
ccatccatgt act                                                             13

SEQ ID NO: 319          moltype = RNA   length = 13
FEATURE                 Location/Qualifiers
misc_feature            1..13
                        note = Synthetic sequence
misc_feature            1..13
```

-continued

```
                          note = U can be replaced by T. Any base can be replaced
                            with a modified base.
source                    1..13
                          mol_type = other RNA
                          organism = synthetic construct
SEQUENCE: 319
tccatccatg tac                                                                  13

SEQ ID NO: 320            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 320
atccatccat gta                                                                  13

SEQ ID NO: 321            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 321
tatccatcca tgt                                                                  13

SEQ ID NO: 322            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 322
ctatccatcc atg                                                                  13

SEQ ID NO: 323            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 323
tctatccatc cat                                                                  13

SEQ ID NO: 324            moltype = RNA   length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 324
atctatccat cca                                                                  13

SEQ ID NO: 325            moltype = RNA   length = 13
FEATURE                   Location/Qualifiers
misc_feature              1..13
                          note = Synthetic sequence
misc_feature              1..13
                          note = U can be replaced by T. Any base can be replaced
```

```
                        with a modified base.
source                  1..13
                        mol_type = other RNA
                        organism = synthetic construct
SEQUENCE: 325
catctatcca tcc                                                             13

SEQ ID NO: 326          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 326
ccatctatcc atc                                                             13

SEQ ID NO: 327          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 327
tccatctatc cat                                                             13

SEQ ID NO: 328          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 328
atccatctat cca                                                             13

SEQ ID NO: 329          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 329
catccatcta tcc                                                             13

SEQ ID NO: 330          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 330
tcatccatct atc                                                             13

SEQ ID NO: 331          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
```

```
source                  1..13
                        mol_type = other RNA
                        organism = synthetic construct
SEQUENCE: 331
ctcatccatc tat                                                              13

SEQ ID NO: 332          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 332
actcatccat cta                                                              13

SEQ ID NO: 333          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 333
aactcatcca tct                                                              13

SEQ ID NO: 334          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 334
caactcatcc atc                                                              13

SEQ ID NO: 335          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 335
ccaactcatc cat                                                              13

SEQ ID NO: 336          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 336
accaactcat cca                                                              13

SEQ ID NO: 337          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
```

```
                              mol_type = other RNA
                              organism = synthetic construct
SEQUENCE: 337
caccaactca tcc                                                              13

SEQ ID NO: 338               moltype = RNA   length = 13
FEATURE                      Location/Qualifiers
misc_feature                 1..13
                             note = Synthetic sequence
misc_feature                 1..13
                             note = U can be replaced by T. Any base can be replaced
                              with a modified base.
source                       1..13
                             mol_type = other RNA
                             organism = synthetic construct
SEQUENCE: 338
ccaccaactc atc                                                              13

SEQ ID NO: 339               moltype = RNA   length = 13
FEATURE                      Location/Qualifiers
misc_feature                 1..13
                             note = Synthetic sequence
misc_feature                 1..13
                             note = U can be replaced by T. Any base can be replaced
                              with a modified base.
source                       1..13
                             mol_type = other RNA
                             organism = synthetic construct
SEQUENCE: 339
cccaccaact cat                                                              13

SEQ ID NO: 340               moltype = RNA   length = 13
FEATURE                      Location/Qualifiers
misc_feature                 1..13
                             note = Synthetic sequence
misc_feature                 1..13
                             note = U can be replaced by T. Any base can be replaced
                              with a modified base.
source                       1..13
                             mol_type = other RNA
                             organism = synthetic construct
SEQUENCE: 340
acccaccaac tca                                                              13

SEQ ID NO: 341               moltype = RNA   length = 13
FEATURE                      Location/Qualifiers
misc_feature                 1..13
                             note = Synthetic sequence
misc_feature                 1..13
                             note = U can be replaced by T. Any base can be replaced
                              with a modified base.
source                       1..13
                             mol_type = other RNA
                             organism = synthetic construct
SEQUENCE: 341
tacccaccaa ctc                                                              13

SEQ ID NO: 342               moltype = RNA   length = 13
FEATURE                      Location/Qualifiers
misc_feature                 1..13
                             note = Synthetic sequence
misc_feature                 1..13
                             note = U can be replaced by T. Any base can be replaced
                              with a modified base.
source                       1..13
                             mol_type = other RNA
                             organism = synthetic construct
SEQUENCE: 342
ctacccacca act                                                              13

SEQ ID NO: 343               moltype = RNA   length = 13
FEATURE                      Location/Qualifiers
misc_feature                 1..13
                             note = Synthetic sequence
misc_feature                 1..13
                             note = U can be replaced by T. Any base can be replaced
                              with a modified base.
source                       1..13
                             mol_type = other RNA
```

```
                        organism = synthetic construct
SEQUENCE: 343
tctacccacc aac                                                              13

SEQ ID NO: 344          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 344
atctacccac caa                                                              13

SEQ ID NO: 345          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 345
aatctaccca cca                                                              13

SEQ ID NO: 346          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 346
gaatctaccc acc                                                              13

SEQ ID NO: 347          moltype = RNA   length = 13
FEATURE                 Location/Qualifiers
misc_feature            1..13
                        note = Synthetic sequence
source                  1..13
                        mol_type = other RNA
                        organism = synthetic construct
SEQUENCE: 347
cgaatctacc cac                                                              13

SEQ ID NO: 348          moltype = RNA   length = 13
FEATURE                 Location/Qualifiers
misc_feature            1..13
                        note = Synthetic sequence
source                  1..13
                        mol_type = other RNA
                        organism = synthetic construct
SEQUENCE: 348
acgaatctac cca                                                              13

SEQ ID NO: 349          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 349
cacgaatcta ccc                                                              13

SEQ ID NO: 350          moltype = RNA   length = 13
FEATURE                 Location/Qualifiers
misc_feature            1..13
```

```
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 350
ccacgaatct acc                                                              13

SEQ ID NO: 351          moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 351
gccacgaatc tac                                                              13

SEQ ID NO: 352          moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 352
agccacgaat cta                                                              13

SEQ ID NO: 353          moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 353
cagccactca caa                                                              13

SEQ ID NO: 354          moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 354
ccagccactc aca                                                              13

SEQ ID NO: 355          moltype = RNA  length = 13
FEATURE                 Location/Qualifiers
misc_feature            1..13
                        note = SEQ ID NO 355
misc_feature            1..13
                        note = U can be replaced by T. Any base can be replaced
                         with a modified base.
source                  1..13
                        mol_type = other RNA
                        organism = synthetic construct
SEQUENCE: 355
accagccact cac                                                              13

SEQ ID NO: 356          moltype = RNA  length = 13
FEATURE                 Location/Qualifiers
misc_feature            1..13
                        note = Synthetic sequence
```

| | |
|---|---|
| misc_feature | 1..13<br>note = U can be replaced by T. Any base can be replaced with a modified base. |
| source | 1..13<br>mol_type = other RNA<br>organism = synthetic construct |

SEQUENCE: 356
caccagccac tca                                                                                  13

| | |
|---|---|
| SEQ ID NO: 357<br>FEATURE | moltype = RNA   length = 13<br>Location/Qualifiers |
| misc_feature | 1..13<br>note = Synthetic sequence |
| misc_feature | 1..13<br>note = U can be replaced by T. Any base can be replaced with a modified base. |
| source | 1..13<br>mol_type = other RNA<br>organism = synthetic construct |

SEQUENCE: 357
ccaccagcca ctc                                                                                  13

| | |
|---|---|
| SEQ ID NO: 358<br>FEATURE | moltype = RNA   length = 13<br>Location/Qualifiers |
| misc_feature | 1..13<br>note = Synthetic sequence |
| misc_feature | 1..13<br>note = U can be replaced by T. Any base can be replaced with a modified base. |
| source | 1..13<br>mol_type = other RNA<br>organism = synthetic construct |

SEQUENCE: 358
tccaccagcc act                                                                                  13

| | |
|---|---|
| SEQ ID NO: 359<br>FEATURE | moltype = RNA   length = 13<br>Location/Qualifiers |
| misc_feature | 1..13<br>note = Synthetic sequence |
| misc_feature | 1..13<br>note = U can be replaced by T. Any base can be replaced with a modified base. |
| source | 1..13<br>mol_type = other RNA<br>organism = synthetic construct |

SEQUENCE: 359
gtccaccagc cac                                                                                  13

| | |
|---|---|
| SEQ ID NO: 360<br>FEATURE | moltype = RNA   length = 13<br>Location/Qualifiers |
| misc_feature | 1..13<br>note = Synthetic sequence |
| misc_feature | 1..13<br>note = U can be replaced by T. Any base can be replaced with a modified base. |
| source | 1..13<br>mol_type = other RNA<br>organism = synthetic construct |

SEQUENCE: 360
tgtccaccag cca                                                                                  13

| | |
|---|---|
| SEQ ID NO: 361<br>FEATURE | moltype = RNA   length = 13<br>Location/Qualifiers |
| misc_feature | 1..13<br>note = Synthetic sequence |
| misc_feature | 1..13<br>note = U can be replaced by T. Any base can be replaced with a modified base. |
| source | 1..13<br>mol_type = other RNA<br>organism = synthetic construct |

SEQUENCE: 361
ctgtccacca gcc                                                                                  13

| | |
|---|---|
| SEQ ID NO: 362<br>FEATURE | moltype = RNA   length = 13<br>Location/Qualifiers |
| misc_feature | 1..13<br>note = Synthetic sequence |
| misc_feature | 1..13 |

-continued

```
                          note = U can be replaced by T. Any base can be replaced
                            with a modified base.
source                    1..13
                          mol_type = other RNA
                          organism = synthetic construct
SEQUENCE: 362
tctgtccacc agc                                                                     13

SEQ ID NO: 363            moltype = RNA  length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 363
gtctgtccac cag                                                                     13

SEQ ID NO: 364            moltype = RNA  length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 364
cgtctgtcca cca                                                                     13

SEQ ID NO: 365            moltype = RNA  length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 365
tcgtctgtcc acc                                                                     13

SEQ ID NO: 366            moltype = RNA  length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 366
ttcgtctgtc cac                                                                     13

SEQ ID NO: 367            moltype = RNA  length = 13
FEATURE                   Location/Qualifiers
misc_feature              1..13
                          note = Synthetic sequence
misc_feature              1..13
                          note = U can be replaced by T. Any base can be replaced
                            with a modified base.
source                    1..13
                          mol_type = other RNA
                          organism = synthetic construct
SEQUENCE: 367
tttcgtctgt cca                                                                     13

SEQ ID NO: 368            moltype = RNA  length = 13
FEATURE                   Location/Qualifiers
misc_feature              1..13
                          note = Synthetic sequence
misc_feature              1..13
                          note = U can be replaced by T. Any base can be replaced
```

```
                     with a modified base.
source               1..13
                     mol_type = other RNA
                     organism = synthetic construct
SEQUENCE: 368
ttttcgtctg tcc                                                           13

SEQ ID NO: 369       moltype = RNA   length = 13
FEATURE              Location/Qualifiers
misc_feature         1..13
                     note = Synthetic sequence
misc_feature         1..13
                     note = U can be replaced by T. Any base can be replaced
                     with a modified base.
source               1..13
                     mol_type = other RNA
                     organism = synthetic construct
SEQUENCE: 369
tttttcgtct gtc                                                           13

SEQ ID NO: 370       moltype = RNA   length = 13
FEATURE              Location/Qualifiers
misc_feature         1..13
                     note = Synthetic sequence
misc_feature         1..13
                     note = U can be replaced by T. Any base can be replaced
                     with a modified base.
source               1..13
                     mol_type = other RNA
                     organism = synthetic construct
SEQUENCE: 370
atttttcgtc tgt                                                           13

SEQ ID NO: 371       moltype = RNA   length = 13
FEATURE              Location/Qualifiers
misc_feature         1..13
                     note = Synthetic sequence
misc_feature         1..13
                     note = U can be replaced by T. Any base can be replaced
                     with a modified base.
source               1..13
                     mol_type = other RNA
                     organism = synthetic construct
SEQUENCE: 371
catttttcgt ctg                                                           13

SEQ ID NO: 372       moltype = RNA   length = 13
FEATURE              Location/Qualifiers
misc_feature         1..13
                     note = Synthetic sequence
misc_feature         1..13
                     note = U can be replaced by T. Any base can be replaced
                     with a modified base.
source               1..13
                     mol_type = other RNA
                     organism = synthetic construct
SEQUENCE: 372
ccatttttcg tct                                                           13

SEQ ID NO: 373       moltype = RNA   length = 13
FEATURE              Location/Qualifiers
misc_feature         1..13
                     note = Synthetic sequence
misc_feature         1..13
                     note = U can be replaced by T. Any base can be replaced
                     with a modified base.
source               1..13
                     mol_type = other RNA
                     organism = synthetic construct
SEQUENCE: 373
tccatttttc gtc                                                           13

SEQ ID NO: 374       moltype = RNA   length = 13
FEATURE              Location/Qualifiers
misc_feature         1..13
                     note = Synthetic sequence
misc_feature         1..13
                     note = U can be replaced by T. Any base can be replaced
                     with a modified base.
```

```
source                    1..13
                          mol_type = other RNA
                          organism = synthetic construct
SEQUENCE: 374
atccattttt cgt                                                              13

SEQ ID NO: 375            moltype = RNA   length = 13
FEATURE                   Location/Qualifiers
misc_feature              1..13
                          note = Synthetic sequence
misc_feature              1..13
                          note = U can be replaced by T. Any base can be replaced
                           with a modified base.
source                    1..13
                          mol_type = other RNA
                          organism = synthetic construct
SEQUENCE: 375
catccatttt tcg                                                              13

SEQ ID NO: 376            moltype = RNA   length = 13
FEATURE                   Location/Qualifiers
misc_feature              1..13
                          note = Synthetic sequence
misc_feature              1..13
                          note = U can be replaced by T. Any base can be replaced
                           with a modified base.
source                    1..13
                          mol_type = other RNA
                          organism = synthetic construct
SEQUENCE: 376
ccatccattt ttc                                                              13

SEQ ID NO: 377            moltype = RNA   length = 13
FEATURE                   Location/Qualifiers
misc_feature              1..13
                          note = Synthetic sequence
misc_feature              1..13
                          note = U can be replaced by T. Any base can be replaced
                           with a modified base.
source                    1..13
                          mol_type = other RNA
                          organism = synthetic construct
SEQUENCE: 377
accatccatt ttt                                                              13

SEQ ID NO: 378            moltype = RNA   length = 13
FEATURE                   Location/Qualifiers
misc_feature              1..13
                          note = Synthetic sequence
misc_feature              1..13
                          note = U can be replaced by T. Any base can be replaced
                           with a modified base.
source                    1..13
                          mol_type = other RNA
                          organism = synthetic construct
SEQUENCE: 378
cccatccatt ttt                                                              13

SEQ ID NO: 379            moltype = RNA   length = 13
FEATURE                   Location/Qualifiers
misc_feature              1..13
                          note = Synthetic sequence
misc_feature              1..13
                          note = U can be replaced by T. Any base can be replaced
                           with a modified base.
source                    1..13
                          mol_type = other RNA
                          organism = synthetic construct
SEQUENCE: 379
aaccatccat ttt                                                              13

SEQ ID NO: 380            moltype = RNA   length = 13
FEATURE                   Location/Qualifiers
misc_feature              1..13
                          note = Synthetic sequence
misc_feature              1..13
                          note = U can be replaced by T. Any base can be replaced
                           with a modified base.
source                    1..13
```

```
                            mol_type = other RNA
                            organism = synthetic construct
SEQUENCE: 380
acccatccat ttt                                                            13

SEQ ID NO: 381              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 381
caaccatcca ttt                                                            13

SEQ ID NO: 382              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 382
cacccatcca ttt                                                            13

SEQ ID NO: 383              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 383
ccaaccatcc att                                                            13

SEQ ID NO: 384              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 384
ccacccatcc att                                                            13

SEQ ID NO: 385              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 385
tccaaccatc cat                                                            13

SEQ ID NO: 386              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
```

```
                         organism = synthetic construct
SEQUENCE: 386
tccacccatc cat                                                           13

SEQ ID NO: 387           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 387
atccaaccat cca                                                           13

SEQ ID NO: 388           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 388
atccacccat cca                                                           13

SEQ ID NO: 389           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 389
tatccaacca tcc                                                           13

SEQ ID NO: 390           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 390
tatccaccca tcc                                                           13

SEQ ID NO: 391           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 391
ttatccaacc atc                                                           13

SEQ ID NO: 392           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
```

```
SEQUENCE: 392
ttatccaccc atc                                                                    13

SEQ ID NO: 393           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 393
tttatccaac cat                                                                    13

SEQ ID NO: 394           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 394
tttatccacc cat                                                                    13

SEQ ID NO: 395           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 395
atttatccaa cca                                                                    13

SEQ ID NO: 396           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 396
atttatccac cca                                                                    13

SEQ ID NO: 397           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 397
aatttatcca acc                                                                    13

SEQ ID NO: 398           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 398
```

```
aatttatcca ccc                                                            13

SEQ ID NO: 399          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 399
caatttatcc aac                                                            13

SEQ ID NO: 400          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 400
caatttatcc acc                                                            13

SEQ ID NO: 401          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 401
tcaatttatc caa                                                            13

SEQ ID NO: 402          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 402
tcaatttatc cac                                                            13

SEQ ID NO: 403          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 403
atcaatttat cca                                                            13

SEQ ID NO: 404          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 404
catcaattta tcc                                                            13
```

-continued

```
SEQ ID NO: 405            moltype = RNA  length = 13
FEATURE                   Location/Qualifiers
misc_feature              1..13
                          note = Synthetic sequence
misc_feature              1..13
                          note = U can be replaced by T. Any base can be replaced
                          with a modified base.
source                    1..13
                          mol_type = other RNA
                          organism = synthetic construct
SEQUENCE: 405
ccatcaattt atc                                                              13

SEQ ID NO: 406            moltype = RNA  length = 13
FEATURE                   Location/Qualifiers
misc_feature              1..13
                          note = Synthetic sequence
misc_feature              1..13
                          note = U can be replaced by T. Any base can be replaced
                          with a modified base.
source                    1..13
                          mol_type = other RNA
                          organism = synthetic construct
SEQUENCE: 406
cccatcaatt tat                                                              13

SEQ ID NO: 407            moltype = RNA  length = 13
FEATURE                   Location/Qualifiers
misc_feature              1..13
                          note = Synthetic sequence
misc_feature              1..13
                          note = U can be replaced by T. Any base can be replaced
                          with a modified base.
source                    1..13
                          mol_type = other RNA
                          organism = synthetic construct
SEQUENCE: 407
acccatcaat tta                                                              13

SEQ ID NO: 408            moltype = RNA  length = 13
FEATURE                   Location/Qualifiers
misc_feature              1..13
                          note = Synthetic sequence
misc_feature              1..13
                          note = U can be replaced by T. Any base can be replaced
                          with a modified base.
source                    1..13
                          mol_type = other RNA
                          organism = synthetic construct
SEQUENCE: 408
cacccatcaa ttt                                                              13

SEQ ID NO: 409            moltype = RNA  length = 13
FEATURE                   Location/Qualifiers
misc_feature              1..13
                          note = Synthetic sequence
misc_feature              1..13
                          note = U can be replaced by T. Any base can be replaced
                          with a modified base.
source                    1..13
                          mol_type = other RNA
                          organism = synthetic construct
SEQUENCE: 409
ccacccatca att                                                              13

SEQ ID NO: 410            moltype = RNA  length = 13
FEATURE                   Location/Qualifiers
misc_feature              1..13
                          note = Synthetic sequence
misc_feature              1..13
                          note = U can be replaced by T. Any base can be replaced
                          with a modified base.
source                    1..13
                          mol_type = other RNA
                          organism = synthetic construct
SEQUENCE: 410
tccacccatc aat                                                              13
```

```
SEQ ID NO: 411         moltype = RNA   length = 13
FEATURE                Location/Qualifiers
misc_feature           1..13
                       note = Synthetic sequence
misc_feature           1..13
                       note = U can be replaced by T. Any base can be replaced
                       with a modified base.
source                 1..13
                       mol_type = other RNA
                       organism = synthetic construct
SEQUENCE: 411
atccacccat caa                                                          13

SEQ ID NO: 412         moltype = RNA   length = 13
FEATURE                Location/Qualifiers
misc_feature           1..13
                       note = Synthetic sequence
misc_feature           1..13
                       note = U can be replaced by T. Any base can be replaced
                       with a modified base.
source                 1..13
                       mol_type = other RNA
                       organism = synthetic construct
SEQUENCE: 412
catccaccca tca                                                          13

SEQ ID NO: 413         moltype = RNA   length = 13
FEATURE                Location/Qualifiers
misc_feature           1..13
                       note = Synthetic sequence
misc_feature           1..13
                       note = U can be replaced by T. Any base can be replaced
                       with a modified base.
source                 1..13
                       mol_type = other RNA
                       organism = synthetic construct
SEQUENCE: 413
ccatccaccc atc                                                          13

SEQ ID NO: 414         moltype = RNA   length = 13
FEATURE                Location/Qualifiers
misc_feature           1..13
                       note = Synthetic sequence
misc_feature           1..13
                       note = U can be replaced by T. Any base can be replaced
                       with a modified base.
source                 1..13
                       mol_type = other RNA
                       organism = synthetic construct
SEQUENCE: 414
tccatccacc cat                                                          13

SEQ ID NO: 415         moltype = RNA   length = 13
FEATURE                Location/Qualifiers
misc_feature           1..13
                       note = Synthetic sequence
misc_feature           1..13
                       note = U can be replaced by T. Any base can be replaced
                       with a modified base.
source                 1..13
                       mol_type = other RNA
                       organism = synthetic construct
SEQUENCE: 415
atccatccac cca                                                          13

SEQ ID NO: 416         moltype = RNA   length = 13
FEATURE                Location/Qualifiers
misc_feature           1..13
                       note = Synthetic sequence
misc_feature           1..13
                       note = U can be replaced by T. Any base can be replaced
                       with a modified base.
source                 1..13
                       mol_type = other RNA
                       organism = synthetic construct
SEQUENCE: 416
catccatcca ccc                                                          13

SEQ ID NO: 417         moltype = RNA   length = 13
```

| | | |
|---|---|---|
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 417 | | |
| ccatccatcc acc | | 13 |
| | | |
| SEQ ID NO: 418 | moltype = RNA length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 418 | | |
| accatccatc cac | | 13 |
| | | |
| SEQ ID NO: 419 | moltype = RNA length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 419 | | |
| aaccatccat cca | | 13 |
| | | |
| SEQ ID NO: 420 | moltype = RNA length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 420 | | |
| caaccatcca tcc | | 13 |
| | | |
| SEQ ID NO: 421 | moltype = RNA length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 421 | | |
| ccaaccatcc atc | | 13 |
| | | |
| SEQ ID NO: 422 | moltype = RNA length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 422 | | |
| accaaccatc cat | | 13 |
| | | |
| SEQ ID NO: 423 | moltype = RNA length = 13 | |
| FEATURE | Location/Qualifiers | |

```
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 423
aaccaaccat cca                                                               13

SEQ ID NO: 424          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 424
caaccaacca tcc                                                               13

SEQ ID NO: 425          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 425
acaaccaacc atc                                                               13

SEQ ID NO: 426          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 426
tacaaccaac cat                                                               13

SEQ ID NO: 427          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 427
tccgcaactt aat                                                               13

SEQ ID NO: 428          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 428
atccgcaact taa                                                               13

SEQ ID NO: 429          moltype = RNA   length = 13
FEATURE                 Location/Qualifiers
misc_feature            1..13
```

```
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 429
gatccgcaac tta                                                              13

SEQ ID NO: 430           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 430
tgatccgcaa ctt                                                              13

SEQ ID NO: 431           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 431
ttgatccgca act                                                              13

SEQ ID NO: 432           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 432
attgatccgc aac                                                              13

SEQ ID NO: 433           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 433
cattgatccg caa                                                              13

SEQ ID NO: 434           moltype = RNA   length = 13
FEATURE                  Location/Qualifiers
misc_feature             1..13
                         note = Synthetic sequence
misc_feature             1..13
source                   1..13
                         mol_type = other RNA
                         organism = synthetic construct
SEQUENCE: 434
acattgatcc gca                                                              13

SEQ ID NO: 435           moltype = RNA   length = 13
FEATURE                  Location/Qualifiers
misc_feature             1..13
                         note = Synthetic sequence
misc_feature             1..13
                         note = U can be replaced by T. Any base can be replaced
```

```
                          with a modified base.
source                    1..13
                          mol_type = other RNA
                          organism = synthetic construct
SEQUENCE: 435
tacattgatc cgc                                                          13

SEQ ID NO: 436            moltype = RNA   length = 13
FEATURE                   Location/Qualifiers
misc_feature              1..13
                          note = Synthetic sequence
misc_feature              1..13
                          note = U can be replaced by T. Any base can be replaced
                          with a modified base.
source                    1..13
                          mol_type = other RNA
                          organism = synthetic construct
SEQUENCE: 436
atacattgat ccg                                                          13

SEQ ID NO: 437            moltype = RNA   length = 13
FEATURE                   Location/Qualifiers
misc_feature              1..13
                          note = Synthetic sequence
misc_feature              1..13
                          note = U can be replaced by T. Any base can be replaced
                          with a modified base.
source                    1..13
                          mol_type = other RNA
                          organism = synthetic construct
SEQUENCE: 437
catacattga tcc                                                          13

SEQ ID NO: 438            moltype = RNA   length = 13
FEATURE                   Location/Qualifiers
misc_feature              1..13
                          note = Synthetic sequence
misc_feature              1..13
                          note = U can be replaced by T. Any base can be replaced
                          with a modified base.
source                    1..13
                          mol_type = other RNA
                          organism = synthetic construct
SEQUENCE: 438
ccatacattg atc                                                          13

SEQ ID NO: 439            moltype = RNA   length = 13
FEATURE                   Location/Qualifiers
misc_feature              1..13
                          note = Synthetic sequence
misc_feature              1..13
                          note = U can be replaced by T. Any base can be replaced
                          with a modified base.
source                    1..13
                          mol_type = other RNA
                          organism = synthetic construct
SEQUENCE: 439
cccatacatt gat                                                          13

SEQ ID NO: 440            moltype = RNA   length = 13
FEATURE                   Location/Qualifiers
misc_feature              1..13
                          note = Synthetic sequence
misc_feature              1..13
                          note = U can be replaced by T. Any base can be replaced
                          with a modified base.
source                    1..13
                          mol_type = other RNA
                          organism = synthetic construct
SEQUENCE: 440
tcccatacat tga                                                          13

SEQ ID NO: 441            moltype = RNA   length = 13
FEATURE                   Location/Qualifiers
misc_feature              1..13
                          note = Synthetic sequence
misc_feature              1..13
                          note = U can be replaced by T. Any base can be replaced
                          with a modified base.
```

```
                        source               1..13
                                             mol_type = other RNA
                                             organism = synthetic construct
                        SEQUENCE: 441
                        atcccataca ttg                                                          13

SEQ ID NO: 442       moltype = RNA   length = 13
                        FEATURE              Location/Qualifiers
                        misc_feature         1..13
                                             note = Synthetic sequence
                        misc_feature         1..13
                                             note = U can be replaced by T. Any base can be replaced
                                               with a modified base.
                        source               1..13
                                             mol_type = other RNA
                                             organism = synthetic construct
                        SEQUENCE: 442
                        catcccatac att                                                          13

SEQ ID NO: 443       moltype = RNA   length = 13
                        FEATURE              Location/Qualifiers
                        misc_feature         1..13
                                             note = Synthetic sequence
                        misc_feature         1..13
                                             note = U can be replaced by T. Any base can be replaced
                                               with a modified base.
                        source               1..13
                                             mol_type = other RNA
                                             organism = synthetic construct
                        SEQUENCE: 443
                        ccatcccata cat                                                          13

SEQ ID NO: 444       moltype = RNA   length = 13
                        FEATURE              Location/Qualifiers
                        misc_feature         1..13
                                             note = Synthetic sequence
                        misc_feature         1..13
                                             note = U can be replaced by T. Any base can be replaced
                                               with a modified base.
                        source               1..13
                                             mol_type = other RNA
                                             organism = synthetic construct
                        SEQUENCE: 444
                        tccatcccat aca                                                          13

SEQ ID NO: 445       moltype = RNA   length = 13
                        FEATURE              Location/Qualifiers
                        misc_feature         1..13
                                             note = Synthetic sequence
                        misc_feature         1..13
                                             note = U can be replaced by T. Any base can be replaced
                                               with a modified base.
                        source               1..13
                                             mol_type = other RNA
                                             organism = synthetic construct
                        SEQUENCE: 445
                        atccatccca tac                                                          13

SEQ ID NO: 446       moltype = RNA   length = 13
                        FEATURE              Location/Qualifiers
                        misc_feature         1..13
                                             note = Synthetic sequence
                        misc_feature         1..13
                                             note = U can be replaced by T. Any base can be replaced
                                               with a modified base.
                        source               1..13
                                             mol_type = other RNA
                                             organism = synthetic construct
                        SEQUENCE: 446
                        catccatccc ata                                                          13

SEQ ID NO: 447       moltype = RNA   length = 13
                        FEATURE              Location/Qualifiers
                        misc_feature         1..13
                                             note = Synthetic sequence
                        misc_feature         1..13
                                             note = U can be replaced by T. Any base can be replaced
                                               with a modified base.
                        source               1..13
```

```
                              mol_type = other RNA
                              organism = synthetic construct
SEQUENCE: 447
tcatccatcc cat                                                              13

SEQ ID NO: 448                moltype = RNA   length = 13
FEATURE                       Location/Qualifiers
misc_feature                  1..13
                              note = Synthetic sequence
misc_feature                  1..13
                              note = U can be replaced by T. Any base can be replaced
                              with a modified base.
source                        1..13
                              mol_type = other RNA
                              organism = synthetic construct
SEQUENCE: 448
ttcatccatc cca                                                              13

SEQ ID NO: 449                moltype = RNA   length = 13
FEATURE                       Location/Qualifiers
misc_feature                  1..13
                              note = Synthetic sequence
misc_feature                  1..13
                              note = U can be replaced by T. Any base can be replaced
                              with a modified base.
source                        1..13
                              mol_type = other RNA
                              organism = synthetic construct
SEQUENCE: 449
attcatccat ccc                                                              13

SEQ ID NO: 450                moltype = RNA   length = 13
FEATURE                       Location/Qualifiers
misc_feature                  1..13
                              note = Synthetic sequence
misc_feature                  1..13
                              note = U can be replaced by T. Any base can be replaced
                              with a modified base.
source                        1..13
                              mol_type = other RNA
                              organism = synthetic construct
SEQUENCE: 450
cattcatcca tcc                                                              13

SEQ ID NO: 451                moltype = RNA   length = 13
FEATURE                       Location/Qualifiers
misc_feature                  1..13
                              note = Synthetic sequence
misc_feature                  1..13
                              note = U can be replaced by T. Any base can be replaced
                              with a modified base.
source                        1..13
                              mol_type = other RNA
                              organism = synthetic construct
SEQUENCE: 451
ccattcatcc atc                                                              13

SEQ ID NO: 452                moltype = RNA   length = 13
FEATURE                       Location/Qualifiers
misc_feature                  1..13
                              note = Synthetic sequence
misc_feature                  1..13
                              note = U can be replaced by T. Any base can be replaced
                              with a modified base.
source                        1..13
                              mol_type = other RNA
                              organism = synthetic construct
SEQUENCE: 452
tccattcatc cat                                                              13

SEQ ID NO: 453                moltype = RNA   length = 13
FEATURE                       Location/Qualifiers
misc_feature                  1..13
                              note = Synthetic sequence
misc_feature                  1..13
                              note = U can be replaced by T. Any base can be replaced
                              with a modified base.
source                        1..13
                              mol_type = other RNA
```

```
                        organism = synthetic construct
SEQUENCE: 453
atccattcat cca                                                           13

SEQ ID NO: 454          moltype = RNA   length = 12
FEATURE                 Location/Qualifiers
misc_feature            1..12
                        note = Synthetic sequence
misc_feature            1..12
                        note = U can be replaced by T. Any base can be replaced
                        with a modified base.
source                  1..12
                        mol_type = other RNA
                        organism = synthetic construct
SEQUENCE: 454
catccattca tc                                                            12

SEQ ID NO: 455          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 455
ccatccattc atc                                                           13

SEQ ID NO: 456          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 456
tccatccatt cat                                                           13

SEQ ID NO: 457          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 457
atccatccat tca                                                           13

SEQ ID NO: 458          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
SEQUENCE: 458
catccatcca ttc                                                           13

SEQ ID NO: 459          moltype = RNA   length = 13
FEATURE                 Location/Qualifiers
misc_feature            1..13
                        note = Synthetic sequence
misc_feature            1..13
                        note = U can be replaced by T. Any base can be replaced
                        with a modified base.
source                  1..13
                        mol_type = other RNA
                        organism = synthetic construct
```

```
SEQUENCE: 459
ccatccatcc att                                                              13

SEQ ID NO: 460          moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 460
tccatccatc cat                                                              13

SEQ ID NO: 461          moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 461
atccatccat cca                                                              13

SEQ ID NO: 462          moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 462
catccatcca tcc                                                              13

SEQ ID NO: 463          moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 463
ccatccatcc atc                                                              13

SEQ ID NO: 464          moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 464
acatccatcc atc                                                              13

SEQ ID NO: 465          moltype = RNA  length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 465
```

```
cacatccatc cat                                                        13

SEQ ID NO: 466          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 466
acacatccat cca                                                        13

SEQ ID NO: 467          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 467
cacacatcca tcc                                                        13

SEQ ID NO: 468          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 468
ccacacatcc atc                                                        13

SEQ ID NO: 469          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 469
accacacatc cat                                                        13

SEQ ID NO: 470          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 470
aaccacacat cca                                                        13

SEQ ID NO: 471          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 471
caaccacaca tcc                                                        13
```

```
SEQ ID NO: 472           moltype = RNA  length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 472
tcaaccacac atc                                                              13

SEQ ID NO: 473           moltype = RNA  length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 473
ttcaaccaca cat                                                              13

SEQ ID NO: 474           moltype = RNA  length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 474
attcaaccac aca                                                              13

SEQ ID NO: 475           moltype = RNA  length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 475
tctatccagc aat                                                              13

SEQ ID NO: 476           moltype = RNA  length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 476
atctatccag caa                                                              13

SEQ ID NO: 477           moltype = RNA  length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 477
catctatcca gca                                                              13
```

| | | |
|---|---|---|
| SEQ ID NO: 478 | moltype = RNA length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 478 | | |
| tcatctatcc agc | | 13 |
| | | |
| SEQ ID NO: 479 | moltype = RNA length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 479 | | |
| atcatctatc cag | | 13 |
| | | |
| SEQ ID NO: 480 | moltype = RNA length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 480 | | |
| aatcatctat cca | | 13 |
| | | |
| SEQ ID NO: 481 | moltype = RNA length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 481 | | |
| caatcatcta tcc | | 13 |
| | | |
| SEQ ID NO: 482 | moltype = RNA length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 482 | | |
| tcaatcatct atc | | 13 |
| | | |
| SEQ ID NO: 483 | moltype = RNA length = 13 | |
| FEATURE | Location/Qualifiers | |
| misc_feature | 1..13 | |
| | note = Synthetic sequence | |
| misc_feature | 1..13 | |
| | note = U can be replaced by T. Any base can be replaced with a modified base. | |
| source | 1..13 | |
| | mol_type = other RNA | |
| | organism = synthetic construct | |
| SEQUENCE: 483 | | |
| gtcaatcatc tat | | 13 |
| | | |
| SEQ ID NO: 484 | moltype = RNA length = 13 | |

-continued

```
FEATURE               Location/Qualifiers
misc_feature          1..13
                      note = Synthetic sequence
misc_feature          1..13
                      note = U can be replaced by T. Any base can be replaced
                       with a modified base.
source                1..13
                      mol_type = other RNA
                      organism = synthetic construct
SEQUENCE: 484
agtcaatcat cta                                                              13

SEQ ID NO: 485        moltype = RNA  length = 13
FEATURE               Location/Qualifiers
misc_feature          1..13
                      note = Synthetic sequence
misc_feature          1..13
                      note = U can be replaced by T. Any base can be replaced
                       with a modified base.
source                1..13
                      mol_type = other RNA
                      organism = synthetic construct
SEQUENCE: 485
cagtcaatca tct                                                              13

SEQ ID NO: 486        moltype = RNA  length = 13
FEATURE               Location/Qualifiers
misc_feature          1..13
                      note = Synthetic sequence
misc_feature          1..13
                      note = U can be replaced by T. Any base can be replaced
                       with a modified base.
source                1..13
                      mol_type = other RNA
                      organism = synthetic construct
SEQUENCE: 486
ccagtcaatc atc                                                              13

SEQ ID NO: 487        moltype = RNA  length = 13
FEATURE               Location/Qualifiers
misc_feature          1..13
                      note = Synthetic sequence
misc_feature          1..13
                      note = U can be replaced by T. Any base can be replaced
                       with a modified base.
source                1..13
                      mol_type = other RNA
                      organism = synthetic construct
SEQUENCE: 487
cccagtcaat cat                                                              13

SEQ ID NO: 488        moltype = RNA  length = 13
FEATURE               Location/Qualifiers
misc_feature          1..13
                      note = Synthetic sequence
misc_feature          1..13
                      note = U can be replaced by T. Any base can be replaced
                       with a modified base.
source                1..13
                      mol_type = other RNA
                      organism = synthetic construct
SEQUENCE: 488
acccagtcaa tca                                                              13

SEQ ID NO: 489        moltype = RNA  length = 13
FEATURE               Location/Qualifiers
misc_feature          1..13
                      note = Synthetic sequence
misc_feature          1..13
                      note = U can be replaced by T. Any base can be replaced
                       with a modified base.
source                1..13
                      mol_type = other RNA
                      organism = synthetic construct
SEQUENCE: 489
cacccagtca atc                                                              13

SEQ ID NO: 490        moltype = RNA  length = 13
FEATURE               Location/Qualifiers
```

```
misc_feature         1..13
                     note = Synthetic sequence
misc_feature         1..13
                     note = U can be replaced by T. Any base can be replaced
                     with a modified base.
source               1..13
                     mol_type = other RNA
                     organism = synthetic construct
SEQUENCE: 490
ccacccagtc aat                                                      13

SEQ ID NO: 491       moltype = RNA   length = 13
FEATURE              Location/Qualifiers
misc_feature         1..13
                     note = Synthetic sequence
misc_feature         1..13
                     note = U can be replaced by T. Any base can be replaced
                     with a modified base.
source               1..13
                     mol_type = other RNA
                     organism = synthetic construct
SEQUENCE: 491
tccacccagt caa                                                      13

SEQ ID NO: 492       moltype = RNA   length = 13
FEATURE              Location/Qualifiers
misc_feature         1..13
                     note = Synthetic sequence
misc_feature         1..13
                     note = U can be replaced by T. Any base can be replaced
                     with a modified base.
source               1..13
                     mol_type = other RNA
                     organism = synthetic construct
SEQUENCE: 492
atccacccag tca                                                      13

SEQ ID NO: 493       moltype = RNA   length = 13
FEATURE              Location/Qualifiers
misc_feature         1..13
                     note = Synthetic sequence
misc_feature         1..13
                     note = U can be replaced by T. Any base can be replaced
                     with a modified base.
source               1..13
                     mol_type = other RNA
                     organism = synthetic construct
SEQUENCE: 493
tatccaccca gtc                                                      13

SEQ ID NO: 494       moltype = RNA   length = 13
FEATURE              Location/Qualifiers
misc_feature         1..13
                     note = Synthetic sequence
misc_feature         1..13
                     note = U can be replaced by T. Any base can be replaced
                     with a modified base.
source               1..13
                     mol_type = other RNA
                     organism = synthetic construct
SEQUENCE: 494
ctatccaccc agt                                                      13

SEQ ID NO: 495       moltype = RNA   length = 13
FEATURE              Location/Qualifiers
misc_feature         1..13
                     note = Synthetic sequence
misc_feature         1..13
                     note = U can be replaced by T. Any base can be replaced
                     with a modified base.
source               1..13
                     mol_type = other RNA
                     organism = synthetic construct
SEQUENCE: 495
tctatccacc cag                                                      13

SEQ ID NO: 496       moltype = RNA   length = 13
FEATURE              Location/Qualifiers
misc_feature         1..13
```

```
                        note = Synthetic sequence
misc_feature            1..13
                        note = U can be replaced by T. Any base can be replaced
                           with a modified base.
source                  1..13
                        mol_type = other RNA
                        organism = synthetic construct
SEQUENCE: 496
atctatccac cca                                                              13

SEQ ID NO: 497          moltype = RNA   length = 13
FEATURE                 Location/Qualifiers
misc_feature            1..13
                        note = Synthetic sequence
misc_feature            1..13
                        note = U can be replaced by T. Any base can be replaced
                           with a modified base.
source                  1..13
                        mol_type = other RNA
                        organism = synthetic construct
SEQUENCE: 497
catctatcca ccc                                                              13

SEQ ID NO: 498          moltype = RNA   length = 13
FEATURE                 Location/Qualifiers
misc_feature            1..13
                        note = Synthetic sequence
misc_feature            1..13
                        note = U can be replaced by T. Any base can be replaced
                           with a modified base.
source                  1..13
                        mol_type = other RNA
                        organism = synthetic construct
SEQUENCE: 498
tcatctatcc acc                                                              13

SEQ ID NO: 499          moltype = RNA   length = 13
FEATURE                 Location/Qualifiers
misc_feature            1..13
                        note = Synthetic sequence
misc_feature            1..13
                        note = U can be replaced by T. Any base can be replaced
                           with a modified base.
source                  1..13
                        mol_type = other RNA
                        organism = synthetic construct
SEQUENCE: 499
ttcatctatc cac                                                              13

SEQ ID NO: 500          moltype = RNA   length = 13
FEATURE                 Location/Qualifiers
misc_feature            1..13
                        note = Synthetic sequence
misc_feature            1..13
                        note = U can be replaced by T. Any base can be replaced
                           with a modified base.
source                  1..13
                        mol_type = other RNA
                        organism = synthetic construct
SEQUENCE: 500
tttcatctat cca                                                              13

SEQ ID NO: 501          moltype = RNA   length = 13
FEATURE                 Location/Qualifiers
misc_feature            1..13
                        note = Synthetic sequence
source                  1..13
                        mol_type = other RNA
                        organism = synthetic construct
SEQUENCE: 501
atttcatcta tcc                                                              13

SEQ ID NO: 502          moltype = RNA   length = 13
FEATURE                 Location/Qualifiers
misc_feature            1..13
                        note = Synthetic sequence
misc_feature            1..13
                        note = U can be replaced by T. Any base can be replaced
                           with a modified base.
```

| | | |
|---|---|---|
| source | 1..13<br>mol_type = other RNA<br>organism = synthetic construct | |
| SEQUENCE: 502<br>catttcatct atc | | 13 |
| SEQ ID NO: 503<br>FEATURE<br>misc_feature | moltype = RNA   length = 13<br>Location/Qualifiers<br>1..13<br>note = Synthetic sequence | |
| misc_feature | 1..13<br>note = U can be replaced by T. Any base can be replaced<br> with a modified base. | |
| source | 1..13<br>mol_type = other RNA<br>organism = synthetic construct | |
| SEQUENCE: 503<br>acatttcatc tat | | 13 |
| SEQ ID NO: 504<br>FEATURE<br>misc_feature | moltype = RNA   length = 13<br>Location/Qualifiers<br>1..13<br>note = Synthetic sequence | |
| misc_feature | 1..13<br>note = U can be replaced by T. Any base can be replaced<br> with a modified base. | |
| source | 1..13<br>mol_type = other RNA<br>organism = synthetic construct | |
| SEQUENCE: 504<br>aacatttcat cta | | 13 |
| SEQ ID NO: 505<br>FEATURE<br>misc_feature | moltype = RNA   length = 13<br>Location/Qualifiers<br>1..13<br>note = Synthetic sequence | |
| misc_feature | 1..13<br>note = U can be replaced by T. Any base can be replaced<br> with a modified base. | |
| source | 1..13<br>mol_type = other RNA<br>organism = synthetic construct | |
| SEQUENCE: 505<br>caacatttca tct | | 13 |
| SEQ ID NO: 506<br>FEATURE<br>misc_feature | moltype = RNA   length = 13<br>Location/Qualifiers<br>1..13<br>note = Synthetic sequence | |
| misc_feature | 1..13<br>note = U can be replaced by T. Any base can be replaced<br> with a modified base. | |
| source | 1..13<br>mol_type = other RNA<br>organism = synthetic construct | |
| SEQUENCE: 506<br>tctggggcag ctt | | 13 |
| SEQ ID NO: 507<br>FEATURE<br>misc_feature | moltype = RNA   length = 13<br>Location/Qualifiers<br>1..13<br>note = Synthetic sequence | |
| misc_feature | 1..13<br>note = U can be replaced by T. Any base can be replaced<br> with a modified base. | |
| source | 1..13<br>mol_type = other RNA<br>organism = synthetic construct | |
| SEQUENCE: 507<br>gtctggggca gct | | 13 |
| SEQ ID NO: 508<br>FEATURE<br>misc_feature | moltype = RNA   length = 13<br>Location/Qualifiers<br>1..13<br>note = Synthetic sequence | |
| misc_feature | 1..13<br>note = U can be replaced by T. Any base can be replaced<br> with a modified base. | |
| source | 1..13 | |

-continued

```
                            mol_type = other RNA
                            organism = synthetic construct
SEQUENCE: 508
ggtctggggc agc                                                              13

SEQ ID NO: 509              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 509
gggtctgggg cag                                                              13

SEQ ID NO: 510              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 510
agggtctggg gca                                                              13

SEQ ID NO: 511              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 511
cagggtctgg ggc                                                              13

SEQ ID NO: 512              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 512
ccagggtctg ggg                                                              13

SEQ ID NO: 513              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
                            organism = synthetic construct
SEQUENCE: 513
cccagggtct ggg                                                              13

SEQ ID NO: 514              moltype = RNA   length = 13
FEATURE                     Location/Qualifiers
misc_feature                1..13
                            note = Synthetic sequence
misc_feature                1..13
                            note = U can be replaced by T. Any base can be replaced
                             with a modified base.
source                      1..13
                            mol_type = other RNA
```

```
                        organism = synthetic construct
SEQUENCE: 514
tcccagggtc tgg                                                          13

SEQ ID NO: 515          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 515
gtcccagggt ctg                                                          13

SEQ ID NO: 516          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 516
ggtcccaggg tct                                                          13

SEQ ID NO: 517          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 517
aggtcccagg gtc                                                          13

SEQ ID NO: 518          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 518
gaggtcccag ggt                                                          13

SEQ ID NO: 519          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 519
agaggtccca ggg                                                          13

SEQ ID NO: 520          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
```

```
SEQUENCE: 520
cagaggtccc agg                                                          13

SEQ ID NO: 521           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 521
tcagaggtcc cag                                                          13

SEQ ID NO: 522           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 522
gtcagaggtc cca                                                          13

SEQ ID NO: 523           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 523
ggtcagaggt ccc                                                          13

SEQ ID NO: 524           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 524
gggtcagagg tcc                                                          13

SEQ ID NO: 525           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 525
ggggtcagag gtc                                                          13

SEQ ID NO: 526           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 526
```

```
gggggtcaga ggt                                                    13

SEQ ID NO: 527          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 527
cgggggtcag agg                                                    13

SEQ ID NO: 528          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 528
ccgggggtca gag                                                    13

SEQ ID NO: 529          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 529
gccgggggtc aga                                                    13

SEQ ID NO: 530          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 530
cgccgggggt cag                                                    13

SEQ ID NO: 531          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 531
tcgccggggg tca                                                    13

SEQ ID NO: 532          moltype = RNA   length = 13
FEATURE                 Location/Qualifiers
misc_feature            1..13
                        note = Synthetic sequence
misc_feature            1..13
                        note = U can be replaced by T. Any base can be replaced
                         with a modified base.
source                  1..13
                        mol_type = other RNA
                        organism = synthetic construct
SEQUENCE: 532
gtcgccgggg gtc                                                    13
```

```
SEQ ID NO: 533           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 533
ggtcgccggg ggt                                                              13

SEQ ID NO: 534           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 534
gggtcgccgg ggg                                                              13

SEQ ID NO: 535           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 535
ggggtcgccg ggg                                                              13

SEQ ID NO: 536           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 536
aggggtcgcc ggg                                                              13

SEQ ID NO: 537           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 537
aaggggtcgc cgg                                                              13

SEQ ID NO: 538           moltype = RNA   length = 13
FEATURE                  Location/Qualifiers
misc_feature             1..13
                         note = Synthetic sequence
misc_feature             1..13
                         note = U can be replaced by T. Any base can be replaced
                          with a modified base.
source                   1..13
                         mol_type = other RNA
                         organism = synthetic construct
SEQUENCE: 538
caagggtcg ccg                                                               13
```

```
SEQ ID NO: 539           moltype = RNA  length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 539
gcaaggggtc gcc                                                              13

SEQ ID NO: 540           moltype = RNA  length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 540
tgcaaggggt cgc                                                              13

SEQ ID NO: 541           moltype = RNA  length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 541
gtgcaagggg tcg                                                              13

SEQ ID NO: 542           moltype = RNA  length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 542
agtgcaaggg gtc                                                              13

SEQ ID NO: 543           moltype = RNA  length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 543
gagtgcaagg ggt                                                              13

SEQ ID NO: 544           moltype = RNA  length = 13
FEATURE                  Location/Qualifiers
misc_feature             1..13
                         note = Synthetic sequence
misc_feature             1..13
                         note = U can be replaced by T. Any base can be replaced
                           with a modified base.
source                   1..13
                         mol_type = other RNA
                         organism = synthetic construct
SEQUENCE: 544
agagtgcaag ggg                                                              13

SEQ ID NO: 545           moltype = RNA  length = 13
```

| FEATURE | Location/Qualifiers |
|---|---|
| misc_feature | 1..13 |
| | note = Synthetic sequence |
| misc_feature | 1..13 |
| | note = U can be replaced by T. Any base can be replaced with a modified base. |
| source | 1..13 |
| | mol_type = other RNA |
| | organism = synthetic construct |

SEQUENCE: 545
gagagtgcaa ggg　　　　　　　　　　　　　　　　　　　　　　　　　　　　　13

| SEQ ID NO: 546 | moltype = RNA   length = 13 |
|---|---|
| FEATURE | Location/Qualifiers |
| misc_feature | 1..13 |
| | note = Synthetic sequence |
| misc_feature | 1..13 |
| | note = U can be replaced by T. Any base can be replaced with a modified base. |
| source | 1..13 |
| | mol_type = other RNA |
| | organism = synthetic construct |

SEQUENCE: 546
ggagagtgca agg　　　　　　　　　　　　　　　　　　　　　　　　　　　　　13

| SEQ ID NO: 547 | moltype = RNA   length = 80 |
|---|---|
| FEATURE | Location/Qualifiers |
| source | 1..80 |
| | mol_type = other RNA |
| | organism = Homo sapiens |

SEQUENCE: 547
atgagtagat aaaaggatgg atggagagat gggtgagtac atggatggat agatggatga　　60
gttggtgggt agattcgtgc　　　　　　　　　　　　　　　　　　　　　　　　80

| SEQ ID NO: 548 | moltype = RNA   length = 80 |
|---|---|
| FEATURE | Location/Qualifiers |
| source | 1..80 |
| | mol_type = other RNA |
| | organism = Homo sapiens |

SEQUENCE: 548
atgagtagat aaaagcatgg atggagagat gggtgagtac atggatggat agatggatga　　60
gttggtgggt agattcgtgc　　　　　　　　　　　　　　　　　　　　　　　　80

| SEQ ID NO: 549 | moltype = RNA   length = 40 |
|---|---|
| FEATURE | Location/Qualifiers |
| source | 1..40 |
| | mol_type = other RNA |
| | organism = Homo sapiens |

SEQUENCE: 549
ggatggatgg agagatgggt gagtacatgg atgatagat　　　　　　　　　　　　　　40

| SEQ ID NO: 550 | moltype = RNA   length = 40 |
|---|---|
| FEATURE | Location/Qualifiers |
| source | 1..40 |
| | mol_type = other RNA |
| | organism = Homo sapiens |

SEQUENCE: 550
gcatggatgg agagatgggt gagtacatgg atgatagat　　　　　　　　　　　　　　40

| SEQ ID NO: 551 | moltype = RNA   length = 29 |
|---|---|
| FEATURE | Location/Qualifiers |
| source | 1..29 |
| | mol_type = other RNA |
| | organism = Homo sapiens |

SEQUENCE: 551
atggagagat gggtgagtac atggatgga　　　　　　　　　　　　　　　　　　　29

| SEQ ID NO: 552 | moltype = RNA   length = 97 |
|---|---|
| FEATURE | Location/Qualifiers |
| source | 1..97 |
| | mol_type = other RNA |
| | organism = Homo sapiens |

SEQUENCE: 552
gttcttcctt ctattccagc cctaaccact caggattggg ccgtttgtgt ctgggtatgt　　60
ctcttccagc tgcctgggtt tcctggaaag aactctt　　　　　　　　　　　　　　97

| SEQ ID NO: 553 | moltype = RNA   length = 43 |
|---|---|
| FEATURE | Location/Qualifiers |
| source | 1..43 |

```
                        mol_type = other RNA
                        organism = Homo sapiens
SEQUENCE: 553
gtgtctgggt atgtctcttc cagctgcctg ggtttcctgg aaa                 43

SEQ ID NO: 554          moltype = RNA  length = 46
FEATURE                 Location/Qualifiers
source                  1..46
                        mol_type = other RNA
                        organism = Homo sapiens
SEQUENCE: 554
tcatcaggtt cttccttcta ttccagccct aaccactcag gattgg              46

SEQ ID NO: 555          moltype = DNA  length = 21
FEATURE                 Location/Qualifiers
modified_base           1..21
                        mod_base = OTHER
                        note = * = a phosphorothioate, + = LNA
modified_base           1..21
                        mod_base = OTHER
                        note = phosphorothioate linkage, LNA at positions 1, 4, 7,
                        10, 13, 16, 19
source                  1..21
                        mol_type = other DNA
                        organism = synthetic construct
SEQUENCE: 555
cacccatctc tccatccatg c                                         21

SEQ ID NO: 556          moltype = DNA  length = 21
FEATURE                 Location/Qualifiers
misc_feature            1..21
                        note = Synthetic sequence
modified_base           1..21
                        mod_base = OTHER
                        note = phosphorthioate backbone, and LNA at positions 1, 4,
                        7, 10, 13, 16 and 19
modified_base           1..21
                        mod_base = OTHER
                        note = phosphorthioate linkage, and LNA at positions 1, 4,
                        7, 10, 13, 16 and 19
source                  1..21
                        mol_type = other DNA
                        organism = synthetic construct
SEQUENCE: 556
cacccatctc tccatccatc c                                         21

SEQ ID NO: 557          moltype = DNA  length = 21
FEATURE                 Location/Qualifiers
misc_feature            1..21
                        note = Synthetic sequence
modified_base           1..21
                        mod_base = OTHER
                        note = phosphorthioate backbone, LNA at positions 1, 4, 7,
                        10, 13, 16, 19 and 21
modified_base           1..21
                        mod_base = OTHER
                        note = phosphorthioate linkage, LNA at positions 1, 4, 7,
                        10, 13, 16, 19 and 21
source                  1..21
                        mol_type = other DNA
                        organism = synthetic construct
SEQUENCE: 557
ctcacccatc tctccatcca t                                         21

SEQ ID NO: 558          moltype = DNA  length = 21
FEATURE                 Location/Qualifiers
misc_feature            1..21
                        note = Synthetic sequence
modified_base           1..21
                        mod_base = OTHER
                        note = phosphorthioate backbone, LNA at positions 1, 4, 7,
                        10, 13, 16, 19 and 21
modified_base           1..21
                        mod_base = OTHER
                        note = phosphorthioate linkage, LNA at positions 1, 4, 7,
                        10, 13, 16, 19 and 21
source                  1..21
                        mol_type = other DNA
                        organism = synthetic construct
```

```
SEQUENCE: 558
tgtactcacc catctctcca t                                                 21

SEQ ID NO: 559          moltype = DNA  length = 21
FEATURE                 Location/Qualifiers
misc_feature            1..21
                        note = Synthetic sequence
modified_base           1..21
                        mod_base = OTHER
                        note = phosphorthioate backbone, LNA at positions 1, 4, 7,
                        10, 13, 16, 19 and 21
modified_base           1..21
                        mod_base = OTHER
                        note = phosphorthioate linkage, LNA at positions 1, 4, 7,
                        10, 13, 16, 19 and 21
source                  1..21
                        mol_type = other DNA
                        organism = synthetic construct
SEQUENCE: 559
tccatgtact cacccatctc t                                                 21

SEQ ID NO: 560          moltype = DNA  length = 21
FEATURE                 Location/Qualifiers
misc_feature            1..21
                        note = Synthetic sequence
modified_base           1..21
                        mod_base = OTHER
                        note = phosphorthioate backbone, LNA at positions 1, 4, 7,
                        10, 13, 16, 19 and 21
modified_base           1..21
                        mod_base = OTHER
                        note = phosphorthioate linkage, LNA at positions 1, 4, 7,
                        10, 13, 16, 19 and 21
source                  1..21
                        mol_type = other DNA
                        organism = synthetic construct
SEQUENCE: 560
tccatccatg tactcaccca t                                                 21

SEQ ID NO: 561          moltype = DNA  length = 21
FEATURE                 Location/Qualifiers
misc_feature            1..21
                        note = Synthetic sequence
modified_base           1..21
                        mod_base = OTHER
                        note = phosphorthioate backbone, LNA at positions 1, 4, 7,
                        10, 13, 16, 19 and 21
modified_base           1..21
                        mod_base = OTHER
                        note = phosphorthioate linkage, LNA at positions 1, 4, 7,
                        10, 13, 16, 19 and 21
source                  1..21
                        mol_type = other DNA
                        organism = synthetic construct
SEQUENCE: 561
atctatccat ccatgtactc a                                                 21

SEQ ID NO: 562          moltype = DNA  length = 17
FEATURE                 Location/Qualifiers
misc_feature            1..17
                        note = Synthetic sequence
modified_base           1..17
                        mod_base = OTHER
                        note = phosphorthioate backbone, LNA at postions 1, 4, 7,
                        10, 13, 16 and 17
modified_base           1..17
                        mod_base = OTHER
                        note = phosphorthioate linkage, LNA at postions 1, 4, 7,
                        10, 13, 16 and 17
source                  1..17
                        mol_type = other DNA
                        organism = synthetic construct
SEQUENCE: 562
tcacccatct ctccatc                                                      17

SEQ ID NO: 563          moltype = DNA  length = 17
FEATURE                 Location/Qualifiers
misc_feature            1..17
                        note = Synthetic sequence
```

```
modified_base          1..17
                       mod_base = OTHER
                       note = phosphorothioate linkage, LNA at 1, 3, 5, 7, 9, 11,
                       13, 15 and 17
source                 1..17
                       mol_type = other DNA
                       organism = synthetic construct
SEQUENCE: 563
tcacccatct ctccatc                                                        17

SEQ ID NO: 564         moltype = DNA   length = 17
FEATURE                Location/Qualifiers
misc_feature           1..17
                       note = Synthetic sequence
modified_base          1..17
                       mod_base = OTHER
                       note = phosphorthioate backbone, LNA bases at 1, 4, 7, 10,
                       13, 16 and 17
modified_base          1..17
                       mod_base = OTHER
                       note = phosphorothioate linkage, LNA bases at 1, 4, 7, 10,
                       13, 16 and 17
source                 1..17
                       mol_type = other DNA
                       organism = synthetic construct
SEQUENCE: 564
gtactcaccc atctctc                                                        17

SEQ ID NO: 565         moltype = DNA   length = 17
FEATURE                Location/Qualifiers
misc_feature           1..17
                       note = Synthetic sequence
modified_base          1..17
                       mod_base = OTHER
                       note = phosphorthioate backbone, LNA at positins 1, 3, 5,
                       7, 9, 11, 13, 15 and 17
source                 1..17
                       mol_type = other DNA
                       organism = synthetic construct
SEQUENCE: 565
gtactcaccc atctctc                                                        17

SEQ ID NO: 566         moltype = DNA   length = 13
FEATURE                Location/Qualifiers
misc_feature           1..13
                       note = Synthetic sequence
modified_base          1..13
                       mod_base = OTHER
                       note = phosphorthioate backbone, LNA bases at 2, 4, 6, 8,
                       10 and 12
modified_base          1..13
                       mod_base = OTHER
                       note = phosphorthioate linkage, LNA bases at 2, 4, 6, 8, 10
                       and 12
source                 1..13
                       mol_type = other DNA
                       organism = synthetic construct
SEQUENCE: 566
cacccatctc tcc                                                            13

SEQ ID NO: 567         moltype = RNA   length = 25
FEATURE                Location/Qualifiers
misc_feature           1..25
                       note = Synthetic sequence
modified_base          1..25
                       mod_base = OTHER
                       note = phosphorthioate backbone and 2-OMe-RNA at all
                       positions
modified_base          1..25
                       mod_base = OTHER
                       note = phosphorthioate linkage and 2-OMe-RNA at all
                       positions
source                 1..25
                       mol_type = other RNA
                       organism = synthetic construct
SEQUENCE: 567
catgtactca cccatctctc catcc                                               25

SEQ ID NO: 568         moltype = RNA   length = 30
```

```
                                    -continued
FEATURE                 Location/Qualifiers
misc_feature            1..30
                        note = Synthetic sequence
modified_base           1..30
                        mod_base = OTHER
                        note = phosphorthioate backbone, all bases substituted with
                        2--O-methyl-RNA
modified_base           1..30
                        mod_base = OTHER
                        note = phosphorthioate linkage, all bases substitued with
                        2--O-methyl-RNA
source                  1..30
                        mol_type = other RNA
                        organism = synthetic construct
SEQUENCE: 568
atccatgtac tcacccatct ctccatccat                                              30

SEQ ID NO: 569          moltype = DNA  length = 21
FEATURE                 Location/Qualifiers
misc_feature            1..21
                        note = Synthetic sequence
modified_base           1..21
                        mod_base = OTHER
                        note = phosphorthioate backbone, LNA at positions 1, 4, 7,
                        10, 13, 16, 19 and 21
modified_base           1..21
                        mod_base = OTHER
                        note = phosphorthioate linkage, LNA at positions 1, 4, 7,
                        10, 13, 16, 19 and 21
source                  1..21
                        mol_type = other DNA
                        organism = synthetic construct
SEQUENCE: 569
caggcagctg gaagagacat a                                                       21

SEQ ID NO: 570          moltype = DNA  length = 21
FEATURE                 Location/Qualifiers
misc_feature            1..21
                        note = Synthetic sequence
modified_base           1..21
                        mod_base = OTHER
                        note = phosphorothioate linkage, LNA at positions 2, 4, 7,
                        10, 13, 16, 19 and 21
source                  1..21
                        mol_type = other DNA
                        organism = synthetic construct
SEQUENCE: 570
aacccaggca gctggaagag a                                                       21

SEQ ID NO: 571          moltype = DNA  length = 21
FEATURE                 Location/Qualifiers
misc_feature            1..21
                        note = Synthetic sequence
modified_base           1..21
                        mod_base = OTHER
                        note = phosphorthioate backbone, LNA at positions 1, 4, 7,
                        10, 13, 16, 19 and 21
modified_base           1..21
                        mod_base = OTHER
                        note = phosphorthioate linkage, LNA at positions 1, 4, 7,
                        10, 13, 16, 19 and 21
source                  1..21
                        mol_type = other DNA
                        organism = synthetic construct
SEQUENCE: 571
ggaaacccag gcagctggaa g                                                       21

SEQ ID NO: 572          moltype = DNA  length = 13
FEATURE                 Location/Qualifiers
misc_feature            1..13
                        note = Synthetic sequence
source                  1..13
                        mol_type = other DNA
                        organism = synthetic construct
SEQUENCE: 572
agttttcaat tcc                                                                13

SEQ ID NO: 573          moltype = DNA  length = 20
FEATURE                 Location/Qualifiers
```

```
misc_feature            1..20
                        note = Synthetic sequence
source                  1..20
                        mol_type = other DNA
                        organism = synthetic construct
SEQUENCE: 573
gacatcaaat cccgcgtgaa                                                       20

SEQ ID NO: 574          moltype = DNA  length = 20
FEATURE                 Location/Qualifiers
misc_feature            1..20
                        note = Synthetic sequence
source                  1..20
                        mol_type = other DNA
                        organism = synthetic construct
SEQUENCE: 574
cattgatgtt ggcgagcagg                                                       20

SEQ ID NO: 575          moltype = DNA  length = 20
FEATURE                 Location/Qualifiers
misc_feature            1..20
                        note = Synthetic sequence
source                  1..20
                        mol_type = other DNA
                        organism = synthetic construct
SEQUENCE: 575
cagacgatca ttgaggtgcg                                                       20

SEQ ID NO: 576          moltype = DNA  length = 20
FEATURE                 Location/Qualifiers
misc_feature            1..20
                        note = Synthetic sequence
source                  1..20
                        mol_type = other DNA
                        organism = synthetic construct
SEQUENCE: 576
atacttggag gagaggcagg                                                       20

SEQ ID NO: 577          moltype = DNA  length = 18
FEATURE                 Location/Qualifiers
misc_feature            1..18
                        note = Synthetic sequence
source                  1..18
                        mol_type = other DNA
                        organism = synthetic construct
SEQUENCE: 577
caagcgaact gacaaatc                                                         18

SEQ ID NO: 578          moltype = DNA  length = 17
FEATURE                 Location/Qualifiers
misc_feature            1..17
                        note = Synthetic sequence
source                  1..17
                        mol_type = other DNA
                        organism = synthetic construct
SEQUENCE: 578
ctgggatctt cacgacc                                                          17

SEQ ID NO: 579          moltype = DNA  length = 21
FEATURE                 Location/Qualifiers
misc_feature            1..21
                        note = Synthetic sequence
modified_base           1..21
                        mod_base = OTHER
                        note = phosphorothioate linkage, LNA at bases 1, 4, 7, 10,
                        13, 16, 19, and 21
source                  1..21
                        mol_type = other DNA
                        organism = synthetic construct
SEQUENCE: 579
tagggctgga atagaaggaa g                                                     21

SEQ ID NO: 580          moltype = DNA  length = 21
FEATURE                 Location/Qualifiers
misc_feature            1..21
                        note = Synthetic sequence
modified_base           1..21
                        mod_base = OTHER
                        note = phosphorothioate linkage, LNA at bases 1, 4, 7, 10,
```

```
                        13, 16, 19, and 21
source                  1..21
                        mol_type = other DNA
                        organism = synthetic construct
SEQUENCE: 580
tgagtggtta gggctggaat a                                             21

SEQ ID NO: 581          moltype = RNA  length = 65
FEATURE                 Location/Qualifiers
source                  1..65
                        mol_type = other RNA
                        organism = synthetic construct
SEQUENCE: 581
aaaagcatgg atgagagat gggtgaggaa aaatggatgg gtggataaat tgatgggtgg    60
atgga                                                               65

SEQ ID NO: 582          moltype = RNA  length = 35
FEATURE                 Location/Qualifiers
source                  1..35
                        mol_type = other RNA
                        organism = synthetic construct
SEQUENCE: 582
taaaaggaaa aggaaggatg gggatggaga tggat                              35

SEQ ID NO: 583          moltype = RNA  length = 35
FEATURE                 Location/Qualifiers
source                  1..35
                        mol_type = other RNA
                        organism = synthetic construct
SEQUENCE: 583
taaaagcaaa agcaagcatg ggcatggaca tggat                              35
```